United States Patent [19]
Rowlette

[11] Patent Number: 5,784,281
[45] Date of Patent: Jul. 21, 1998

[54] NON-GRAPHICAL AUTOMATION OF MACHINE CONTROLS

[75] Inventor: Jeffrey L. Rowlette, Pomona, Calif.

[73] Assignee: QCAM, Upland, Calif.

[21] Appl. No.: 701,829

[22] Filed: Aug. 23, 1996

[51] Int. Cl.⁶ .................................................. G05B 19/409
[52] U.S. Cl. ............................... 364/474.23; 364/474.27
[58] Field of Search ........................... 364/474.22–474.27, 364/191–193, 188, 189, 146; 318/568.1

[56] References Cited

U.S. PATENT DOCUMENTS

| | | | |
|---|---|---|---|
| 3,913,429 | 10/1975 | Uchida et al. | 82/2 |
| 4,530,046 | 7/1985 | Munekata et al. | 364/474.27 X |
| 4,700,290 | 10/1987 | Ichikawa | 364/474.23 X |
| 4,788,636 | 11/1988 | Shiratori et al. | 364/191 |
| 4,890,234 | 12/1989 | Tanaka et al. | 364/474.23 |
| 4,962,472 | 10/1990 | Seki et al. | 364/900 |
| 4,998,196 | 3/1991 | Seki et al. | 364/191 |
| 5,008,828 | 4/1991 | Pinard et al. | 364/474.28 |
| 5,060,163 | 10/1991 | Matsumura | 364/474.22 |
| 5,072,398 | 12/1991 | Seki et al. | 364/474.25 |
| 5,099,432 | 3/1992 | Fukaya et al. | 364/474.25 |
| 5,122,717 | 6/1992 | Hayashi | 364/474.01 X |
| 5,266,876 | 11/1993 | Ito et al. | 364/474.25 X |
| 5,270,940 | 12/1993 | Shinozaki | 364/474.29 |
| 5,278,766 | 1/1994 | Takahashi | 364/474.14 |
| 5,315,503 | 5/1994 | Kato et al. | 364/474.22 X |
| 5,383,110 | 1/1995 | Fujita et al. | 364/191 |
| 5,465,215 | 11/1995 | Strickland et al. | 364/474.22 |

*Primary Examiner*—Joseph Ruggiero
*Attorney, Agent, or Firm*—Michael Zarrabian

[57] ABSTRACT

A method of, and computer software system for, non-graphical programming of a machine control to control the operations of a machine, comprising: (a) displaying one or more data entry fields on a display for a user to input data including the physical dimensions of a part to be machined; (b) receiving the input data; (c) storing the input data in a memory device; and (d) generating program code for said machine control utilizing the stored input data according to a predetermined programming convention, the program code including program instructions for the machine control to control operations of the machine in machining the part; whereby the user can program machining of the part without a graphical representation of the part.

24 Claims, 13 Drawing Sheets

---

DISPLAY ONE OR MORE MACHINE CONTROL INFORMATION TO ALLOW USER TO SELECT A DESIRED MACHINE CONTROL FROM AMONG DIFFERENT MACHINE CONTROLS

RECEIVE USER'S SELECTION

ACCESS A DATA BASE INCLUDING PROGRAMMING CONVENTIONS FOR THE DIFFERENT MACHINE CONTROLS

OBTAIN THE PROGRAMMING CONVENTION FOR THE SELECTED MACHINE CONTROL

DISPLAY ONE OR MORE DATA ENTRY FIELDS ON A COMPUTER DISPLAY FOR A USER TO INPUT DATA INCLUDING THE PHYSICAL DIMENSIONS OF A PART TO BE MACHINED

RECEIVE THE INPUT DATA

STORE THE INPUT DATA IN A MEMORY DEVICE

GENERATE PROGRAM CODE FOR THE SELECTED MACHINE CONTROL UTILIZING THE STORED INPUT DATA ACCORDING TO A PREDETERMINED PROGRAMMING CONVENTION FOR THE SELECTED MACHINE CONTROL

ALLOW USER TO EDIT THE GENERATED PROGRAM CODE

TRANSMIT THE GENERATED PROGRAM CODE TO THE MACHINE CONTROL

FIRST TOOL                                                          ☒

PROGRAM NAME: A
CUSTOMER AND PART NUMBER: IS PROGRAM PART # 123456789
SEQUENCE NUMBER: 2
TOOL COMMENT: .032 RADIUS CNMG F/T
R.P.M.: 1000
ADD PART STOP FIRST: ☑

[ WRITE ]   [ CANCEL ]

*Fig. 11*

FACE AND TURN                                                       ☒

STOCK DIAMETER: 2.0            WHAT SIZE CHAMFER: .015
DIAMETER TO FACE TO: 0         TOOL NOSE RADIUS: .032
DIAMETER TO TURN: 1.9
Z VALUE TO FACE AT: 0
Z DEPTH TO TURN TO: 1.25
FEED RATE FOR FACING: .003
FEED RATE FOR TURNING: .005

◉ ONE DIAMETER    ○ TWO DIAMETERS    ☐ CORRECT TURNING CYCLES

[ WRITE ]   [ CANCEL ]

*Fig. 13*

NON-GRAPHICAL AUTOMATION OF MACHINE CONTROLS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

BACKGROUND

The present invention generally relates to control of tooling machines, and, in particular, to automated control of tooling machines.

Tooling machines are utilized to machine parts from blocks of materials. Recently, tooling machines have been automated utilizing dedicated control systems that are programmable by a technician in directing the tooling machine to machine a part. However, the technician has to enter a long list of commands and data into the dedicated control system for a desired machining operation.

To remedy this problem, some manufacturers of tooling machines have provided graphical drawing systems for their tooling machines. Such systems typically provide a technician with a drawing editor on a computer screen whereby the technician is asked to draw a desired part to be machined and include other dimensional data in addition to machine operations.

An important disadvantage of such systems is that the technician has to spend an inordinate amount of time in drawing the part graphically on the computer screen to specify the necessary machining operations. The technician has to go through such a laborious task no matter what the complexity of the machining operation desired. For example, for drilling a hole in a part, the technician must at least perform the following time-consuming operations: invoke a graphics drawing editor, select tools for graphically drawing the part on the screen, draw a perfect circle by trial and error, and include dimensions of the hole to be drilled. The scenario gets far more complex as the shape of the desired part gets more complex.

A further disadvantage of existing systems is that the technician is not presented with the opportunity to make changes or additions to the machining operations performed by the tooling machine. Such a feature is desirable since in many instances a technician is required to enter additional data or machining operations to fine tune machining, and existing graphical drawing systems do not provide for that.

A further disadvantage of existing systems is their inability to provide the technician with a range of programming options for different tooling machines. As such the technician has to have detailed knowledge of programming conventions for different tooling machines.

There is, therefore, a need for a system for automating machine controls in which the user does not have to provide a graphical representation of a part to be machined. There is also a need for such a system to allow the technician to provide machining operations and data in addition to those provided through a drawing graphics system. There is also a need for such a system to not require a technician to have detailed knowledge of various machine control programming conventions.

SUMMARY

The present invention satisfies these needs. The present invention provides a method of non-graphical programming of a machine control to control the operations of a machine. The method comprises the steps of: (a) displaying one or more data entry fields on a display for a user to input data including the physical dimensions of a part to be machined; (b) receiving the input data; (c) storing the input data in a memory device; and (d) generating program code for said machine control utilizing the stored input data according to a predetermined programming convention, the program code including program instructions for the machine control to control operations of the machine in machining the part. As such, the user can program machining of the part without a graphical representation of the part. Preferably, the user is allowed to edit the generated program code.

The method can further comprise the steps of displaying one or more machine control information and allowing the user to select a desired machine control from among different machine controls and generating program code for the machine control selected by the user, wherein the program code is generated according to a predetermined programming convention for the selected machine control. Preferably, the step of generating program code includes accessing a data base including programming conventions for said different machine controls; and obtaining the programming convention for the selected machine control.

The present invention also provides a system and a computer software system implementing the method of the present invention.

DRAWINGS

These and other features, aspects and advantages of the present invention will become understood with reference to the following description, appended claims and accompanying drawings where:

FIG. 11 illustrates a display for acquiring input parameters for a desired tooling operation;

FIG. 13 illustrates a display for acquiring input parameters for a cutting operation;

DESCRIPTION

Figure 1:
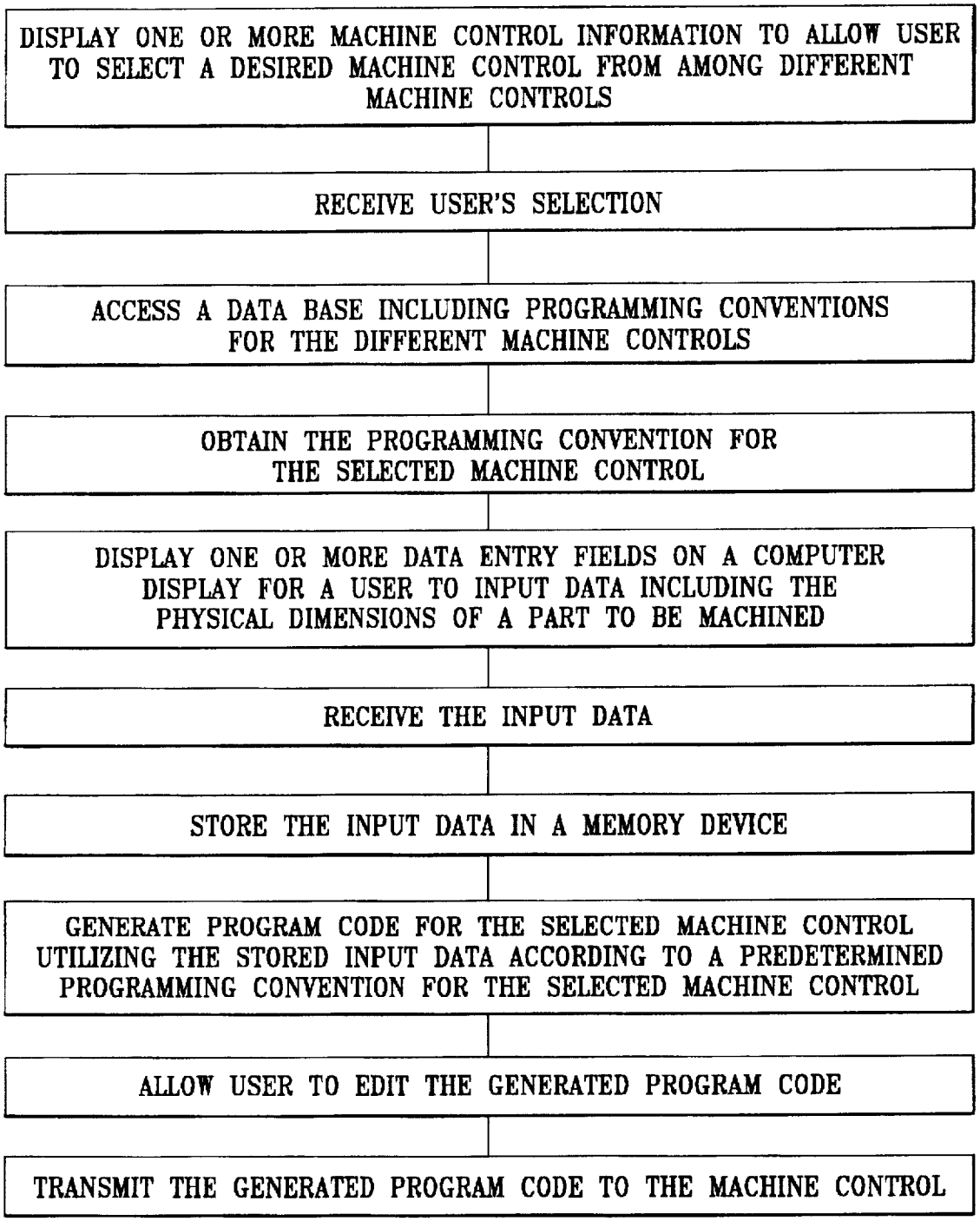
FIG. 1 illustrates an embodiment of method of non-graphical automation of a machine control according to the present invention.

Referring to FIG. 1, the present invention provides a method of non-graphical programming of a machine control to control the operations of a machine. The method comprises the steps of: (a) displaying one or more data entry fields on a display for a user to input data including the physical dimensions of a part to be machined; (b) receiving the input data; (c) storing the input data in a memory device; and (d) generating program code for said machine control utilizing the stored input data according to a predetermined programming convention, the program code including program instructions for the machine control to control operations of the machine in machining the part. Therefore, the user can program machining of the part without a graphical representation of the part. Preferably, the user is provided with a display of the generated program code and allowed to edit the generated program code.

The method can further comprise the steps of displaying one or more machine control information and allowing the user to select a desired machine control from among different machine controls and generating program code for the machine control selected by the user, wherein the program code is generated according to a predetermined programming convention for the selected machine control. Preferably, the step of generating program code includes accessing a data base including programming conventions for said different machine controls; and obtaining the programming convention for the selected machine control.

Figure 2:
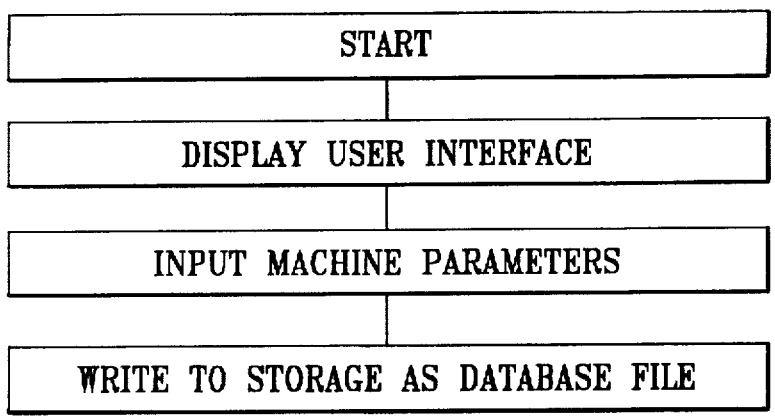
FIG. 2 illustrates the steps of creating programming conventions for a desired machine.

Referring to FIG. 2, the programming conventions can be stored in storage in a data base or a sequential file with an index for each programming convention. A desired programming convention is read into memory from storage based upon user selection.

The user sets up machine-specific language components in a sequential file for such machines as a Moriseki lathe and an Okuma lathe. Therefore, the user can create many different sequential files and select one as desired as described below.

Each one of the sequential files includes a programming convention for a particular machine. The sequential files include the specific steps, such as drilling code. The drilling code may be different for different machine. For example, the drilling code can start with the letter G followed by two numbers. In one machine, the drilling code can be G74 and on another machine the drilling code can be G92. Both require the G-code, but the numbers following the G-code are different. To allow the user to create programming conventions for different machine, the method of the present invention includes the step of allowing the user to change specific codes for different machines as desired such as entering G91, G82 or whatever the user desires. The user code is then used in the generated program code for a selected drill cycle.

Figure 3:
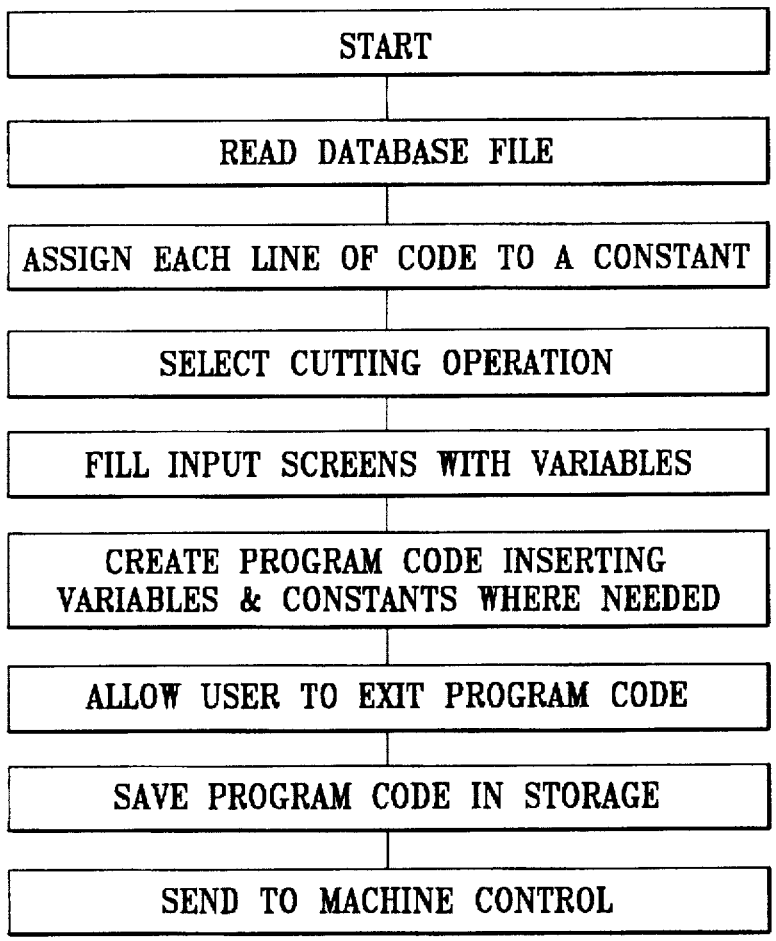
FIG. 3 illustrates the steps of providing input parameters for generating program code.

Referring to FIG. 3, once the programming convention is specified, the user can begin defining specific tooling operations. For example, to drill a hole, the drilling operations are selected from the programming conventions in memory. A screen is then displayed for a user to enter necessary parameters for the drilling operations. The parameters and the drilling operations are then utilized to generate a program code according to the programming conventions. No graphical display of the part is required.

The present invention also provides a system and a computer software system implementing the method of the present invention. The software system includes program instructions for implementing the steps of the method of the present invention.

Figure 4:
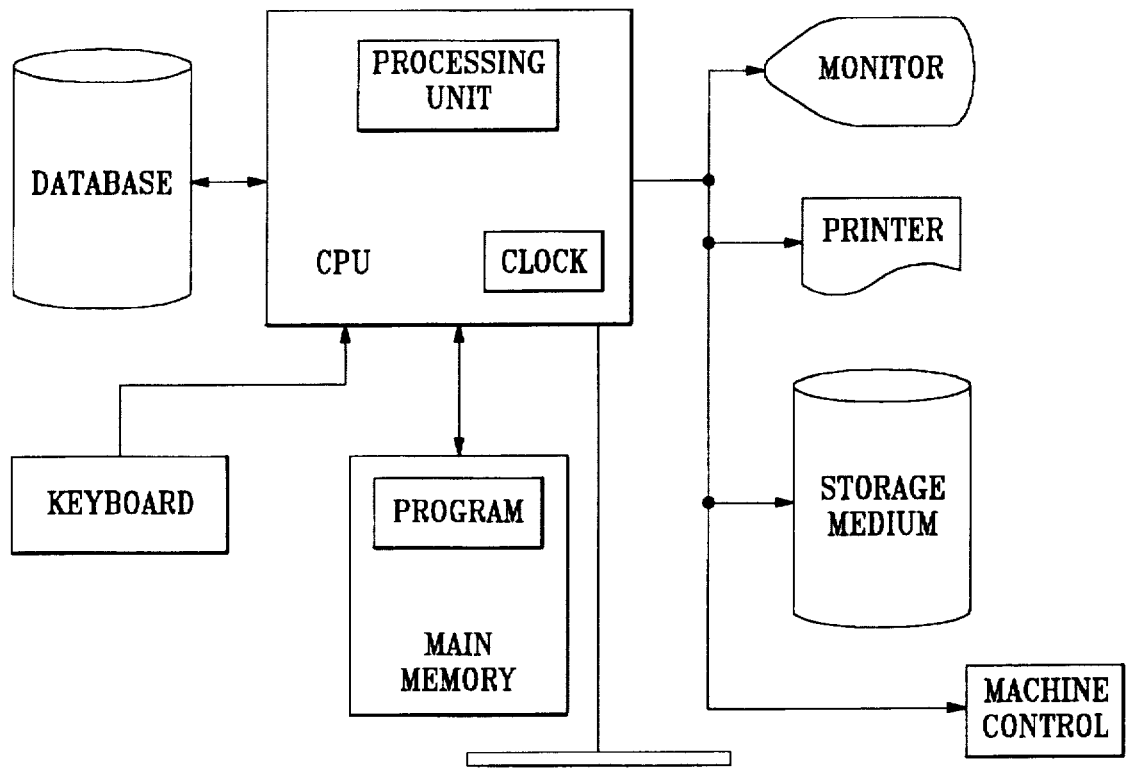
FIG. 4 illustrates an example block diagram of a suitable computer system for a software system according to the present invention.

A suitable computer system for executing such computer software system can be a general purpose computer system such as a personal computer or a dedicated computer system. FIG. 4 shows a functional block diagram of a computer system embodying the present invention which is accessible by a user or a machinist at a machine control. A central processing unit (CPU) operates on program instructions using the processing unit. The CPU also has a clock/calendar logic circuit for maintaining an internal time/date clock. A database for storing information pertaining to programming conventions and generated program code is connected to the CPU over a bus. The database can be located on a file server over a LAN or local to the CPU. A keyboard receives instructions from the user concerning the machine operations as necessary.

A main memory stores a computer program containing program instructions implementing the method of the present invention. The computer system prompts the user for information and generates program code as described above. User input fields and program code are visually displayed on a monitor or printed using a local printer (or network printer). Also, the program code can be stored in a storage medium, such as a hard drive, as a flat computer file. Finally, the program code can be electronically transmitted to the machine control.

An example of a work station suitable for embodying computer system 10 is an IBM PS/2 microcomputer equipped with an 80486 microprocessor running at 50 Mhz, manufactured by International Business Machines Corporation, Armonk, N.Y. Such a system is preferably equipped with at least 8 megabytes of random access memory and a 60 megabyte hard drive. The system preferably runs an operating system such as MS-DOS 6.0 or higher and uses the Windows™ operating environment, version 3.11. MS-DOS, Windows™ are manufactured by Microsoft Corporation, Redmond, WA.

Figure 5:
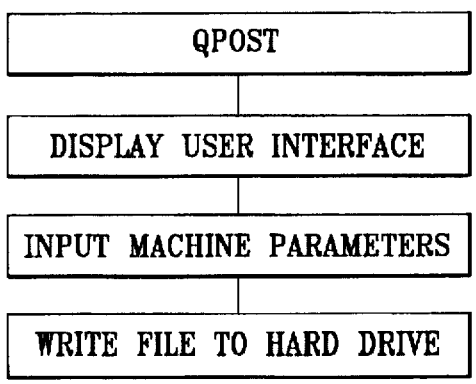
FIG. 5 illustrates a flow diagram for an example software system for creating programming conventions according to the present invention.
Figure 6:
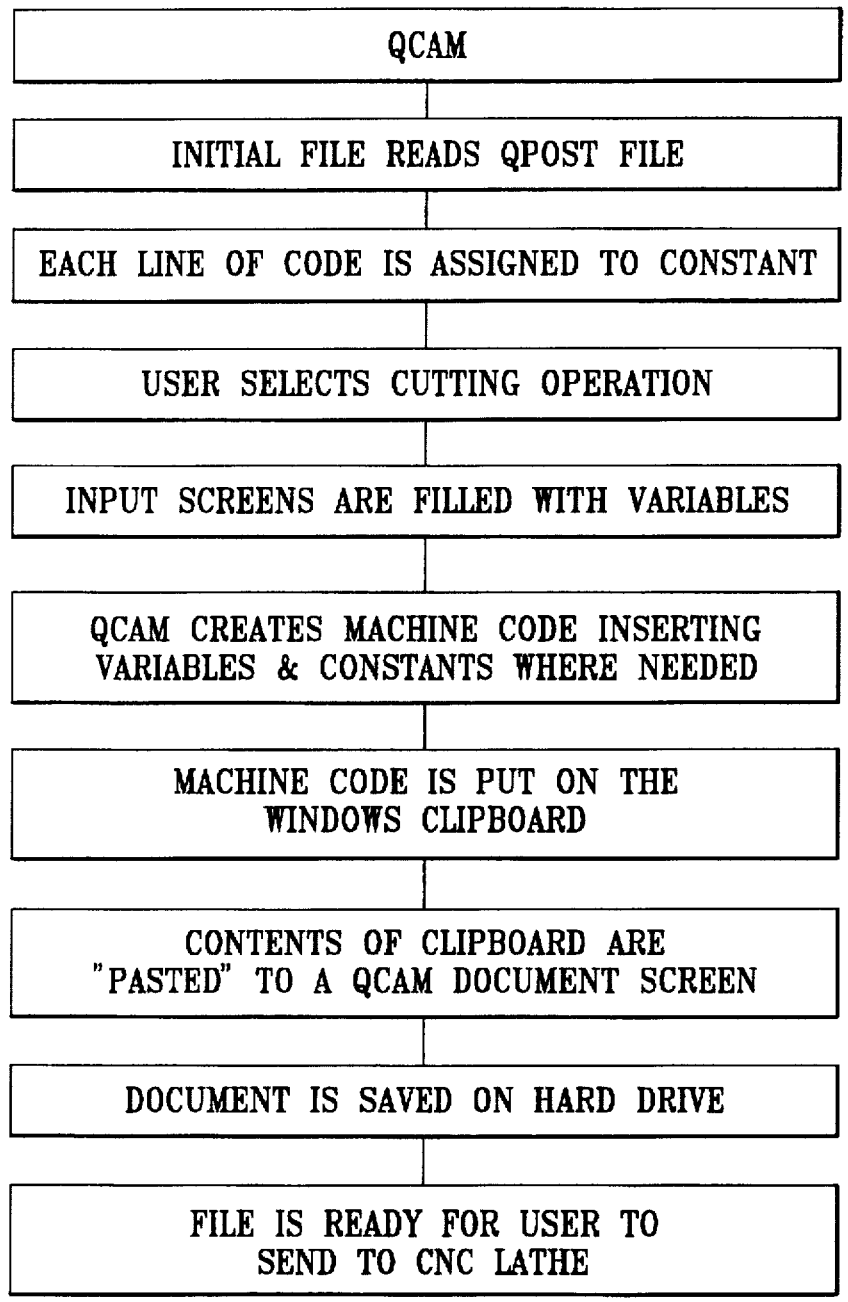
FIG. 6 illustrates a flow diagram for an example software system for generating program code for a machine control according to the present invention.
Figure 7:
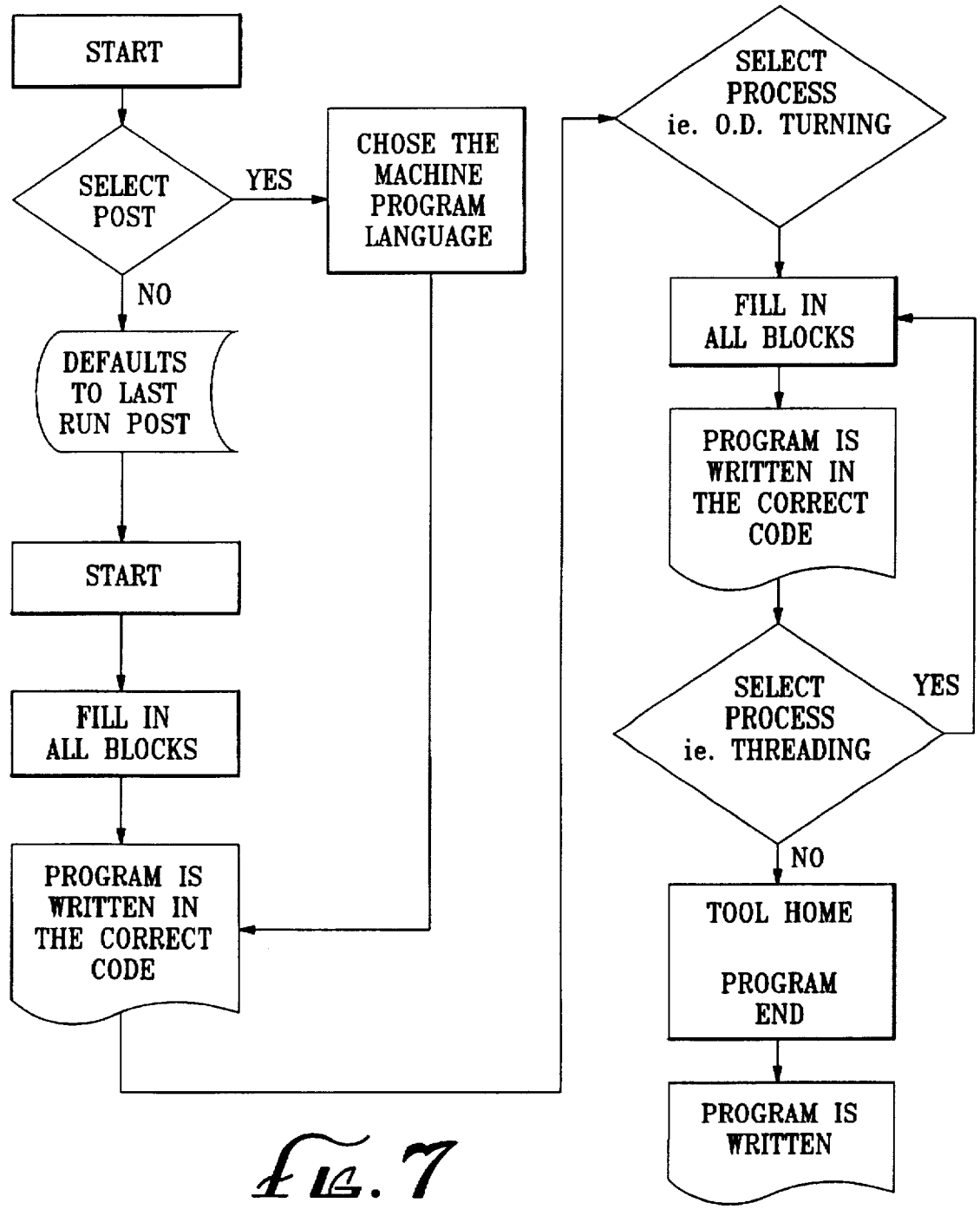
FIG. 7 illustrates general operational steps followed by a user in selecting programming conventions and generating program code.

The program instructions can be implemented using a programming language such as C or Pascal as is well known to the art. A listing of an example embodiment of a software system according to the present invention is enclosed in the Appendix section. The listing includes computer instructions for the Visual Basic 4.0 programming system. Visual Basic is manufactured by Microsoft Corporation, Redmond, WA. FIG. 5 illustrates a general flow diagram for that portion of said listing for allowing user to create and/or select programming conventions for different machines. That section of the listing is marked as QPOST. FIG. 6 illustrates a general flow diagram for that portion of said listing for allowing user to select machining operations, input data, generate and edit the program code and transmit to a machine control. That section of the listing is marked as QCAM. FIG. 7 illustrates general operational steps followed by a user in selecting programming conventions and generating program code.

Figure 8:
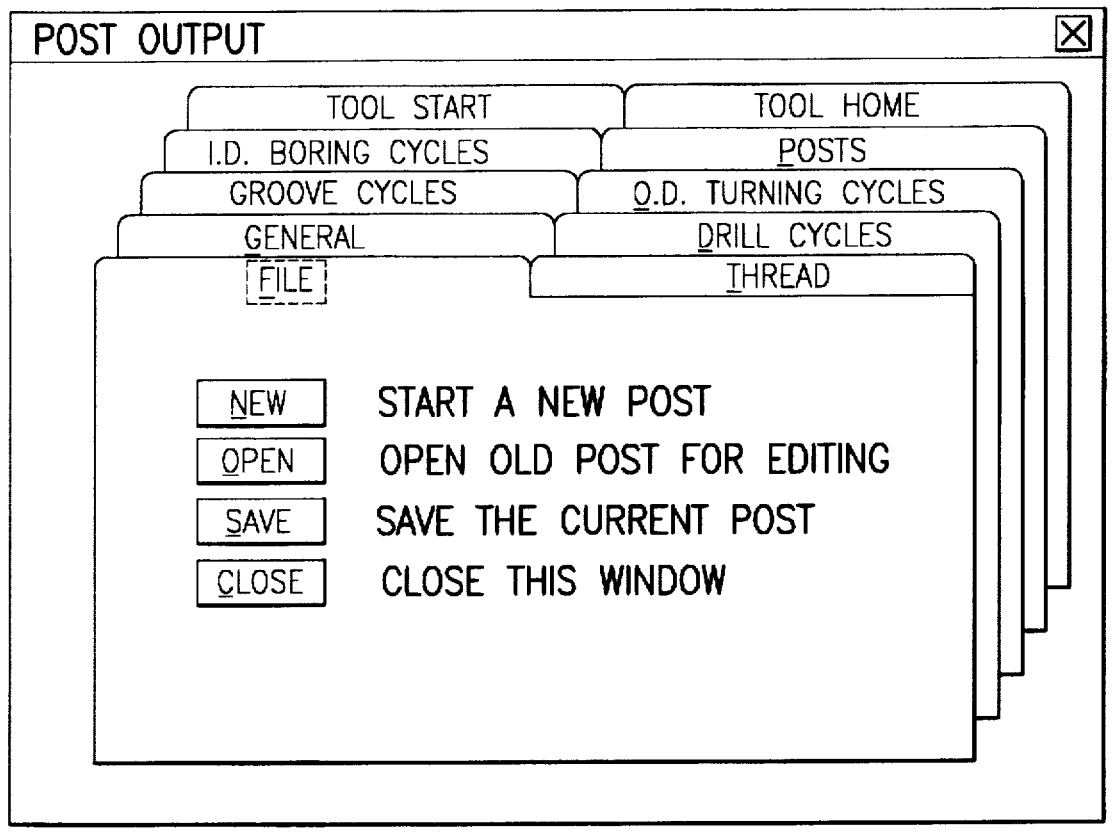
FIG. 8 illustrates a display screen when the user desires to select and/or create a programming convention.
Figure 9:
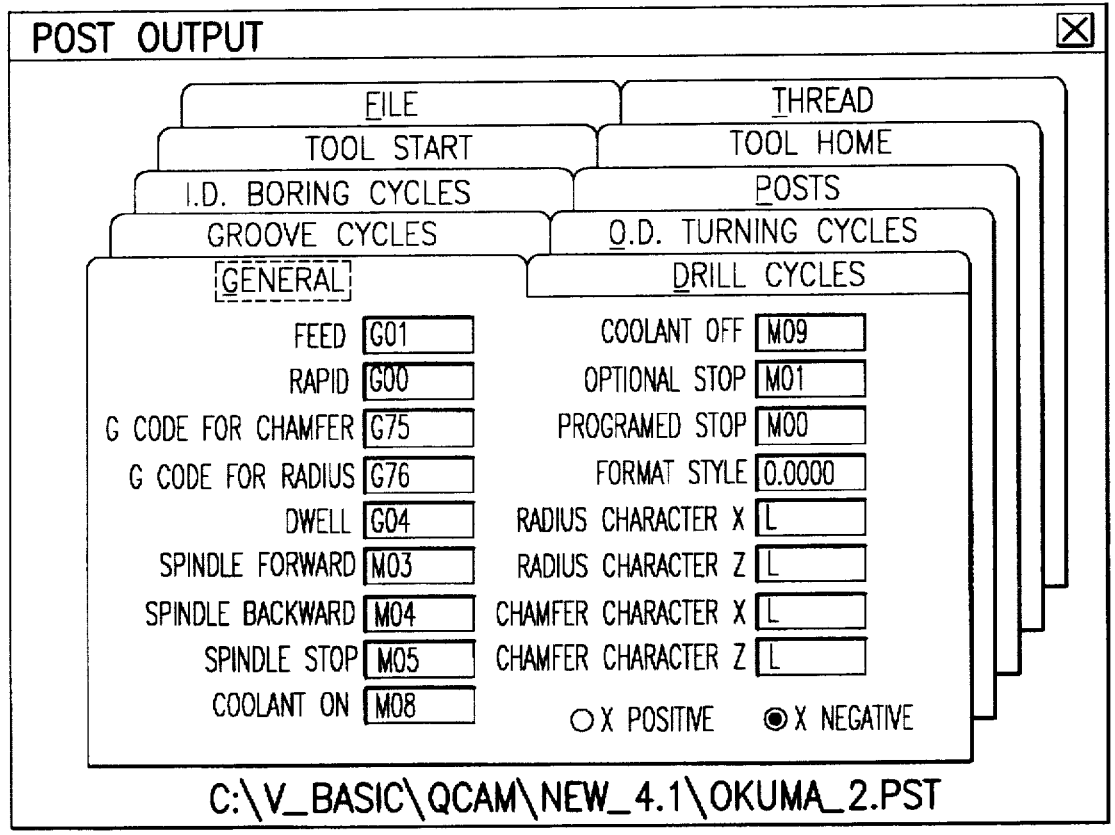
FIG. 9 illustrates a display of programming conventions created by a user.

FIGS. 8–16 illustrate a sequence of example display screens generated by aforementioned example embodiment of the computer software system of the present invention. FIGS. 8–9 are example display screens from the QPOST program. FIGS. 10–16 are example display screens from the QCAM program.

FIG. 8 is the display screen when the user desires to select and/or create a programming convention (post). FIG. 9 is a display of the programming conventions for a new post. The user is allowed to edit the programming conventions.

Figure 10:
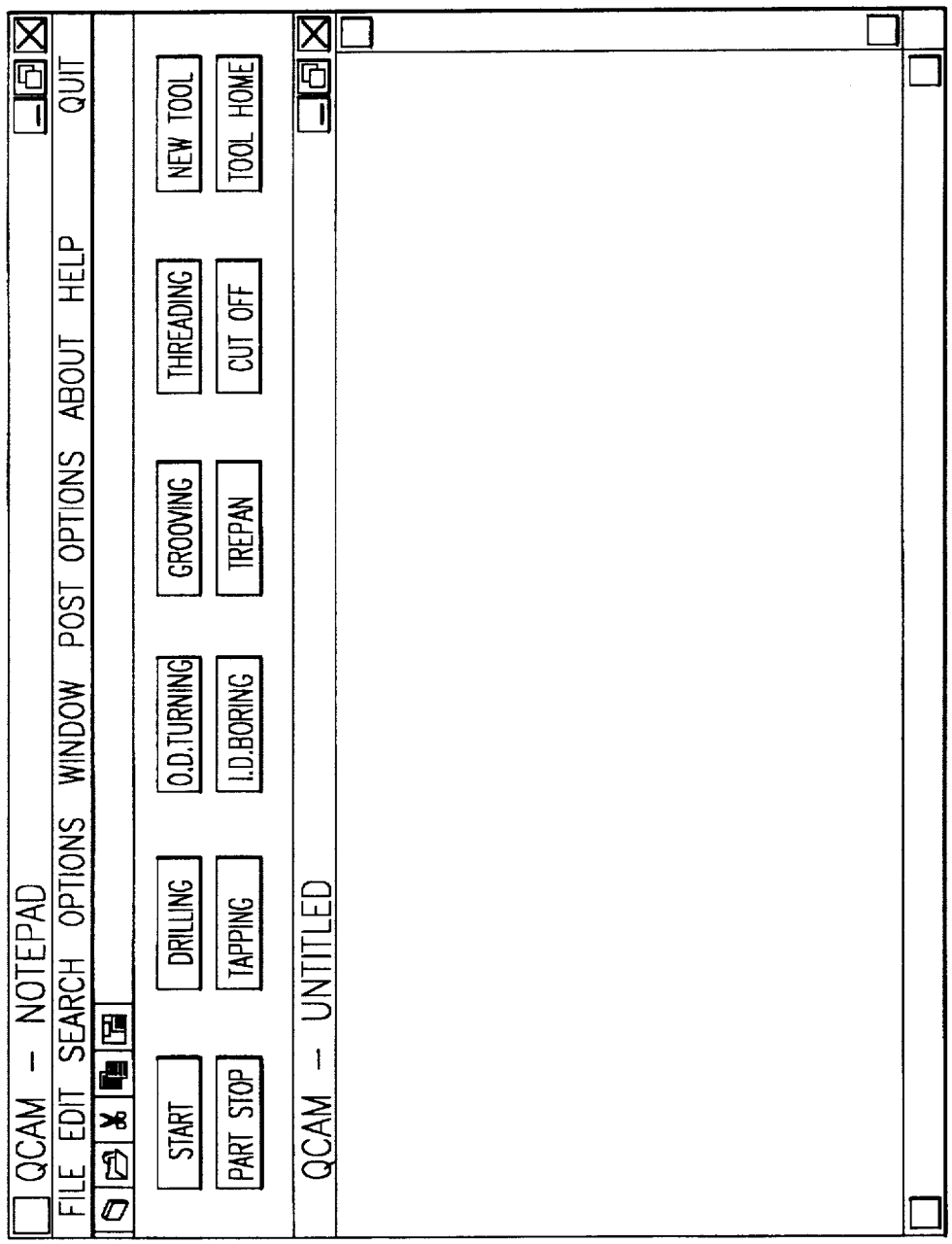
FIG. 10 illustrates initial selection screen for generating program codes by a user.
Figure 12:
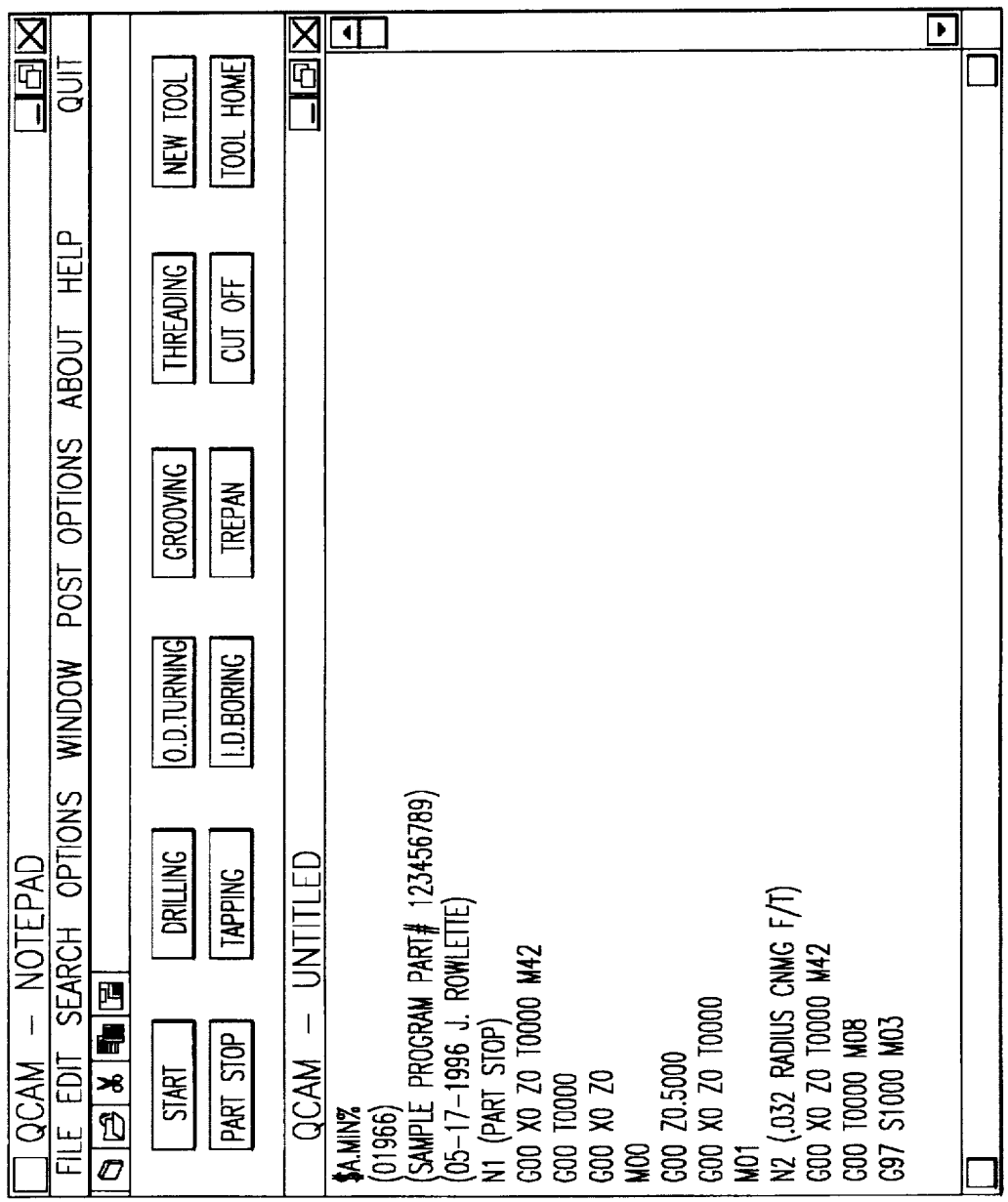
FIG. 12 illustrates a display of the program code generated utilizing the input values in FIG. 11.
Figure 14:
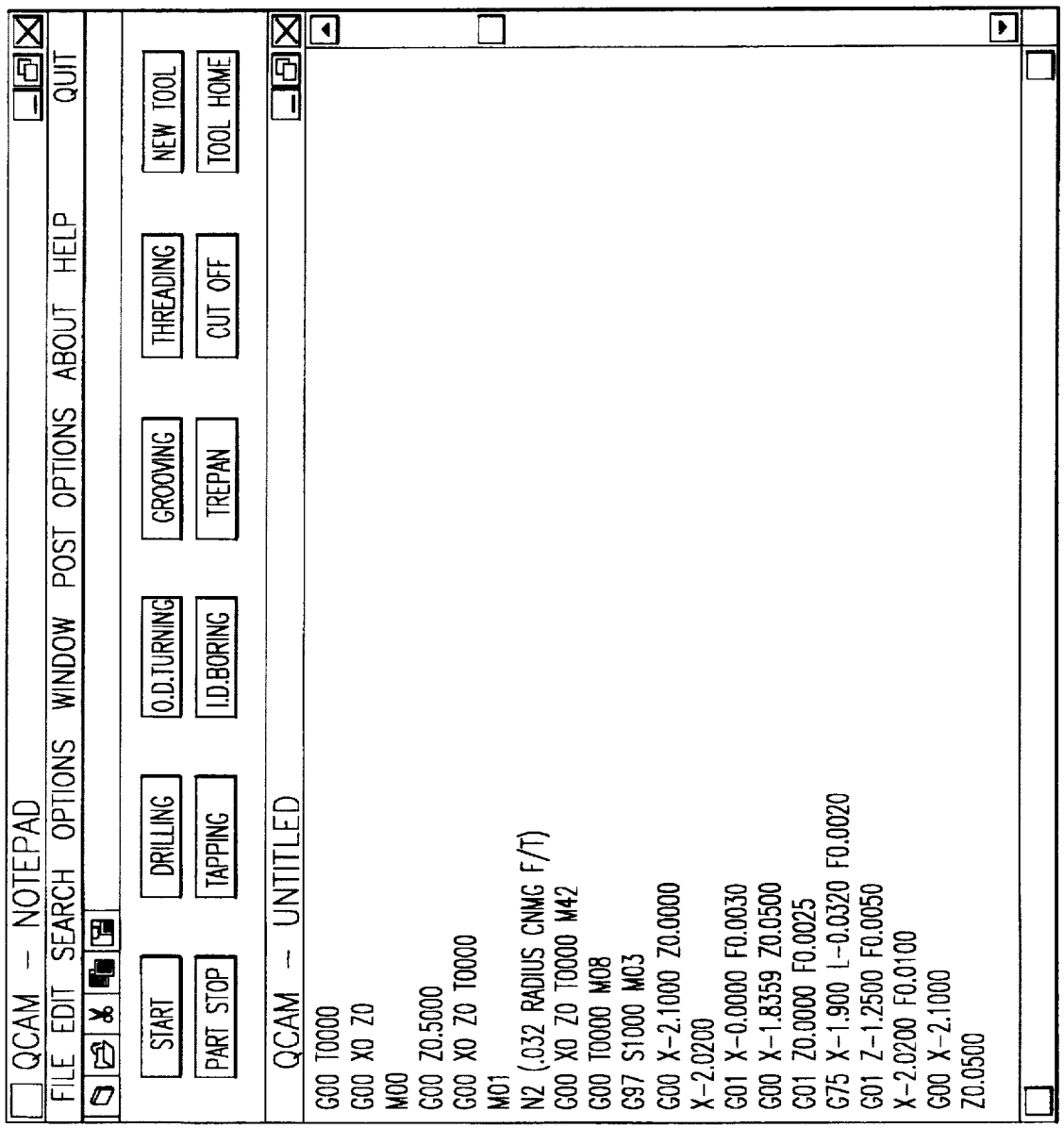
FIG. 14 illustrates a display of program code generated utilizing the input values of FIG. 13.
Figure 15:
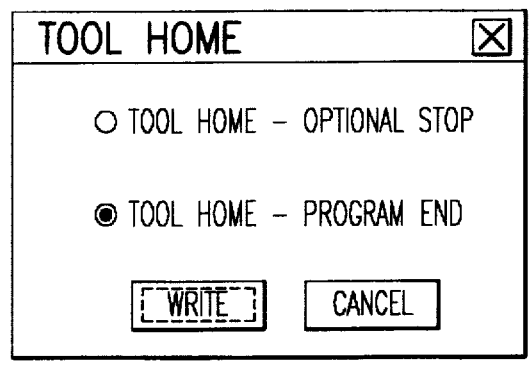
FIG. 15 illustrates a display of a screen for sending a tool home and ending the program if desired.
Figure 16:
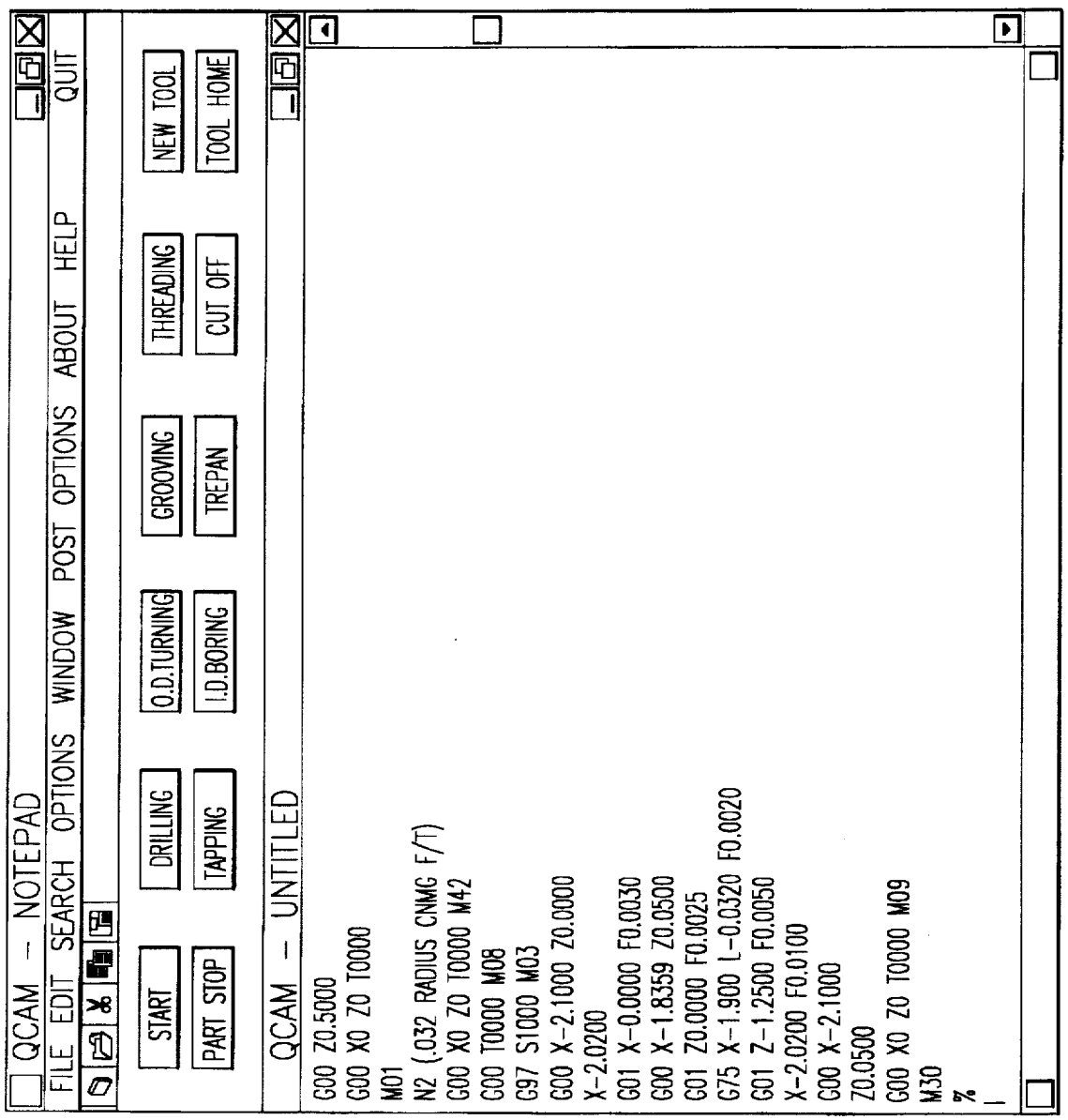
FIG. 16 illustrates a display of program code generated utilizing the input values of FIG. 15.

FIG. 10 is the initial screen displayed by QCAM. FIG. 11 is a display for acquiring input parameters for a desired tooling operation. FIG. 12 is a display of the program code generated utilizing the input values in FIG. 11. The user is allowed to edit the program code as desired. FIG. 13 is a display for acquiring input parameters for a cutting operation. FIG. 14 is a display of program code generated utilizing the input values of FIG. 13. The user is allowed to edit the program code as desired. FIG. 15 is a display of a screen for sending a tool home and ending the program if desired. FIG. 16 is a display of program code generated utilizing the input values of FIG. 15. The user is allowed to edit the program code as desired.

In operation, a user first utilizes QPOST to creating and/or selecting a desired programming convention as described above. The user then utilizes QCAM and is presented with input fields on a display screen based on a particular machining operation selected by the user in QCAM. FIG. 13 shows the input fields for a cutting operation. The software system reads variables from the user screen and utilizes the selected programming conventions with machine-specific language components to generate program code. The program code is then transmitted to the machine.

The present invention has been described in considerable detail with reference to certain preferred versions thereof; however, other versions are possible. Therefore, the spirit and scope of the appended claims should not be limited to the description of the preferred versions contained herein.

APPENDIX

COPYRIGHT 1996, Jeffrey Rowlette
(CNC LATHE OPERATION)

```
J. ROWLETTE
G01
G00

G04
M03
M04
M05
M08
M09
M01
M00
0.0000
R
R
I
K
X-
G30 U0 W0 M09
M30

G30 U0 W0
G50 X-1.0000 Z1.0000 M42
G30 U0 W0 M09

G30 U0 W0 M09
M30

G00 X0 Z0 T0000 M09
M05

G74
K

G76
K
D
F
G75
D
K
I
G71 P30 Q40 U0.0100 W0.0020

G70 P30 Q40
N30
N40
G71 P10 Q20 U-0.0100 W0.0020

G70 P10 Q20
N10
N20
U
Rad
Rad
True
True
1
1
```

11,538

```
            (CNC LATHE OPERATION)

J. ROWLETTE
            G01
            G00

G04
            M03
            M04
            M05
            M08
            M09
            M01
            M00
            0.0000
            R
            R
            I
            K
            X-
            G30 U0 W0 M09
            M30

G30 U0 W0
            G50 X-1.0000 Z1.0000 M42
            G30 U0 W0 M09

G30 U0 W0 M09
            M30

G00 X0 Z0 T0000 M09
            M05

G74
            K

G76
            K
            D
            F
            G75
            D
            K
            I
            G71 P30 Q40 U0.0100 W0.0020

G70 P30 Q40
            N30
            N40
            G71 P10 Q20 U-0.0100 W0.0020

G70 P10 Q20
            N10
            N20
            U
            Rad
            Rad
            True
            True
            1
            1
            VERSION 4.00
```

```
Begin VB.Form Form2
    BorderStyle     =   3  'Fixed Dialog
    ClientHeight    =   2160
    ClientLeft      =   1140
    ClientTop       =   1635
    ClientWidth     =   5580
    ControlBox      =   0  'False
    Height          =   2625
    Icon            =   "FORM2.frx":0000
    Left            =   1080
    LinkTopic       =   "Form2"
    MaxButton       =   0  'False
    MinButton       =   0  'False
    ScaleHeight     =   420
    ScaleWidth      =   2400
    ShowInTaskbar   =   0  'False
    Top             =   1230
    Visible         =   0  'False
    Width           =   5700
End
Attribute VB_Name = "Form2"
Attribute VB_Creatable = False
Attribute VB_Exposed = False
Private Sub Form_Load()

' Paint the background.
GradateBackGround Me, &H400000, &HFF0000, 1, 1, 1

' Print 3D text on my start up form.
' Parameters 24, 40,30 are:
' 24 is the font size
' 40 is the "Z" position.
' 30 is the "X" position
Text3d Me, True, True, &HC0C0C0, &HFFFFFF, &H0&, "Qpost For Windows" & Chr(13) + Chr(10) & "              By J. Rowlette", 24, 40, 30

Screen.MousePointer = 11

If WindowState = 0 Then
        Move (Screen.Width - Form2.Width) / 2, (Screen.Height - Form2.Height) / 2
    End If Show Load frmPstout frmPstout.Show Screen.MousePointer = 0

Unload Me

End Sub

Public Sub GradateBackGround(DestObj As Object, BackColor As Long, ForeColor As Long, GradStyle As Integer, x As Long, Y As Long)
Dim foo As Integer, foobar As Integer
Dim DestWidth As Integer, DestHeight As Integer, DestMode As Integer
Dim StartPnt As Integer, EndPnt As Integer, DrawHeight As Double, DrawWidth As Double
Dim dblG As Double, dblR As Double, dblB As Double
Dim addg As Double, addr As Double, addb As Double
Dim Mask As Long, Mask2 As Long, colorstep As Integer
Dim bckR As Double, bckG As Double, bckB As Double
Dim Linecolor As Long, PixelStep As Long, LineHeight As Integer
Dim PixelCount As Integer, aspect As Single
Dim CenterX As Long, CenterY As Long
On Error Resume Next Screen.MousePointer = 11

'set up rgb bitmask
Mask = 255
Mask = Mask ^ 2
```

```
        Mask2 = 255
        Mask2 = 255 ^ 3

'Init dimensions in twips, set backcolor, set modes
 5      DestMode = DestObj.ScaleMode
        DestObj.ScaleMode = 1
        DestHeight = DestObj.ScaleHeight
        DestWidth = DestObj.ScaleWidth
        DestObj.BackColor = BackColor
10      DestObj.AutoRedraw = True
        DestObj.DrawStyle = 5 'transparent
        DestObj.DrawMode = 13 'CopyPen 'solid offset
15      Select Case GradStyle
        Case 2 'Horizontal
            StartPnt = DestWidth * 0.05
            EndPnt = DestWidth * 0.95
        Case Else
20          StartPnt = DestHeight * 0.05
            EndPnt = DestHeight * 0.95
            Select Case GradStyle
            Case 3 'ellipse from upper left
                CenterX = 0
25              CenterY = 0
            Case 4 'ellipse from upper right
                CenterX = DestWidth
                CenterY = 0
            Case 5 'ellipse from lower right
30              CenterX = DestWidth
                CenterY = DestHeight
            Case 6 'ellipse from lower left
                CenterX = 0
                CenterY = DestHeight
35          Case 7 'ellipse from upper center
                CenterX = DestWidth / 2
                CenterY = 0
            Case 8 'ellipse from right center
                CenterX = DestWidth
40              CenterY = DestHeight / 2
            Case 9 'ellipse from lower center
                CenterX = DestWidth / 2
                CenterY = DestHeight
            Case 10 'ellipse from left center
45              CenterX = 0
                CenterY = DestHeight / 2
            Case 11 'ellipse from x,y - twips
                CenterX = x
                CenterY = Y
50          End Select
        End Select
        aspect = DestHeight / DestWidth Select Case GradStyle
55      Case 0
            DrawHeight = EndPnt - StartPnt
        Case 1
            DrawHeight = Sqr((DestHeight / 2) ^ 2 + (DestWidth / 2) ^ 2)
        Case 2
60          DrawWidth = EndPnt - StartPnt
        Case 3, 4, 5, 6
            DrawHeight = Sqr((DestHeight) ^ 2 + (DestWidth) ^ 2)
        Case 7, 8, 9, 10
            If DestHeight >= DestWidth Then
65              DrawHeight = DestHeight
            Else
                DrawHeight = DestWidth
            End If
        Case 11
70          DrawHeight = CenterX
            If Sqr(CenterY ^ 2 + CenterX ^ 2) > DrawHeight Then DrawHeight = Sqr(CenterY ^ 2 + CenterX ^ 2)
            If Sqr(CenterY ^ 2 + (DestWidth - CenterX) ^ 2) > DrawHeight Then DrawHeight = Sqr(CenterY ^ 2 + (DestWidth - CenterX) ^ 2)
            If Sqr((DestHeight - CenterY) ^ 2 + (DestWidth - CenterX) ^ 2) > DrawHeight Then DrawHeight = Sqr((DestHeight - CenterY) ^ 2 +
        (DestWidth - CenterX) ^ 2)
```

```
If Sqr((DestHeight - CenterY) ^ 2 + CenterX ^ 2) > DrawHeight Then DrawHeight = Sqr((DestHeight - CenterY) ^ 2 + CenterX ^ 2)
'DrawHeight = DrawHeight * .9
End Select
dblR = CDbl(BackColor And &HFF)
dblG = CDbl(BackColor And &HFF00&) / 255
dblB = CDbl(BackColor And &HFF0000) / &HFF00&
bckR = CDbl(ForeColor And &HFF&)
bckG = CDbl(ForeColor And &HFF00&) / 255
bckB = CDbl(ForeColor And &HFF0000) / &HFF00&
If GradStyle = 2 Then
    addr = (bckR - dblR) / (DrawWidth / Screen.TwipsPerPixelY)
    addg = (bckG - dblG) / (DrawWidth / Screen.TwipsPerPixelY)
    addb = (bckB - dblB) / (DrawWidth / Screen.TwipsPerPixelY)
Else
    addr = (bckR - dblR) / (DrawHeight / Screen.TwipsPerPixelY)
    addg = (bckG - dblG) / (DrawHeight / Screen.TwipsPerPixelY)
    addb = (bckB - dblB) / (DrawHeight / Screen.TwipsPerPixelY)
End If DestObj.Cls PixelStep = Screen.TwipsPerPixelY
LineHeight = PixelStep * 2
Select Case GradStyle
Case 0 'Vertical
    For foo = 1 To DrawHeight Step PixelStep
        dblR = dblR + addr
        dblG = dblG + addg
        dblB = dblB + addb
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.Line (0, foo + StartPnt)-(DestWidth, foo + StartPnt + LineHeight), Linecolor, BF
    Next foo
    For foo = EndPnt To DestHeight Step PixelStep
        DestObj.Line (0, foo)-(DestWidth, foo + LineHeight), ForeColor, BF
    Next foo
Case 2 'horizontal
    For foo = 1 To DrawWidth Step PixelStep
        dblR = dblR + addr
        dblG = dblG + addg
        dblB = dblB + addb
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.Line (foo + StartPnt, 0)-(foo + StartPnt + LineHeight, DestHeight), Linecolor, BF
    Next foo
    For foo = EndPnt To DestWidth Step PixelStep
        DestObj.Line (foo, 0)-(foo + LineHeight, DestHeight), ForeColor, BF
    Next foo
Case 1 'circular
    Screen.MousePointer = 11
    DestObj.FillStyle = 0
    PixelCount = 5
    PixelStep = PixelStep * -1 * PixelCount
    For foo = DrawHeight To 1 Step PixelStep
        dblR = dblR + (addr * PixelCount)
        dblG = dblG + (addg * PixelCount)
        dblB = dblB + (addb * PixelCount)
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
```

```
        DestObj.FillColor = Linecolor
        DestObj.Circle (DestWidth / 2, DestHeight / 2), foo, Linecolor, , , aspect
      Next foo
      Screen.MousePointer = 0
    Case Else 'elliptical from various points
      DestObj.FillStyle = 0
      PixelCount = 5
      PixelStep = PixelStep * -1 * PixelCount
      For foo = DrawHeight To 1 Step PixelStep
        dblR = dblR + (addr * PixelCount)
        dblG = dblG + (addg * PixelCount)
        dblB = dblB + (addb * PixelCount)
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.FillColor = Linecolor
        DestObj.Circle (CenterX, CenterY), foo, Linecolor, , , aspect
      Next foo
  End Select
  DestObj.ScaleMode = DestMode
  Screen.MousePointer = 0
End Sub Sub Text3d(PrintObj As Object, Raised As Integer, Heavy As Integer, Textcolor As Long, LightColor As Long, DarkColor As Long,
Caption As String, Fontsize As String, x As Long, Y As Long)
  Dim Lite As Long, Dark As Long, HoldMode As Integer If Raised Then
    Lite = LightColor
    Dark = DarkColor
  Else 'Indented
    Lite = DarkColor
    Dark = LightColor
  End If
  HoldMode = PrintObj.ScaleMode
  PrintObj.ScaleMode = 3

PrintObj.Fontsize = Val(Fontsize)
  PrintObj.AutoRedraw = True
  PrintObj.ForeColor = Lite
  PrintObj.CurrentX = x - 1
  PrintObj.CurrentY = Y - 1
  PrintObj.Print Caption
  PrintObj.ForeColor = Dark
  PrintObj.CurrentX = x + 1
  PrintObj.CurrentY = Y + 1
  PrintObj.Print Caption
  PrintObj.ForeColor = Textcolor
  PrintObj.CurrentX = x
  PrintObj.CurrentY = Y
  PrintObj.Print Caption PrintObj.ScaleMode = HoldMode End Sub VERSION 4.00
Begin VB.Form frmPstout
  BackColor     =   &H00C0C0C0&
  BorderStyle   =   3 'Fixed Dialog
  Caption       =   "Post Output"
  ClientHeight  =   6375
  ClientLeft    =   285
  ClientTop     =   675
  ClientWidth   =   8790
  Height        =   6780
  Icon          =   "FRMPSTOU.frx":0000
  Left          =   225
  LinkTopic     =   "Form1"
```

```
        MaxButton    = 0  'False
        MinButton    = 0  'False
        ScaleHeight  = 6375
        ScaleWidth   = 8790
        ShowInTaskbar = 0  'False
        Top          = 330
        Width        = 8910
        Begin VB.CommandButton Command3
           Caption    = "&Save"
           Height     = 375
           Left       = 7680
           TabIndex   = 3
           Top        = 4680
           Width      = 975
        End
        Begin VB.CommandButton Command4
           Caption    = "&Open"
           Height     = 375
           Left       = 7680
           TabIndex   = 2
           Top        = 4080
           Width      = 975
        End
        Begin VB.CommandButton Command5
           Caption    = "&New"
           Height     = 375
           Left       = 7680
           TabIndex   = 1
           Top        = 3480
           Width      = 975
        End
        Begin VB.CommandButton Command2
           Caption    = "Close"
           Height     = 375
           Left       = 7680
           TabIndex   = 0
           Top        = 5280
           Width      = 975
        End
        Begin TabDlg.SSTab SSTab1
           Height     = 5535
           Left       = 120
           TabIndex   = 4
           Top        = 120
           Width      = 7335
           _version   = 65536
           _extentx   = 12938
           _extenty   = 9763
           _stockprops = 15
           caption    = "&General"
           BeginProperty font {FB8F0823-0164-101B-84ED-08002B2EC713}
              name         = "MS Sans Serif"
              charset      = 1
              weight       = 700
              size         = 8.25
              underline    = 0  'False
              italic       = 0  'False
              strikethrough = 0  'False
           EndProperty
           tabsperrow  = 2
           tab         = 2
           taborientation = 0
           tabs        = 12
           style       = 0
           tabmaxwidth = 0
           tabheight   = 529
           tabcaption(0) = "Qcam"
           tab(0).controlcount= 2
           tab(0).controlenabled= 0  'False
           tab(0).control(0)= "Label40"
           tab(0).control(1)= "Picture1"
           tabcaption(1) = "&Thread"
           tab(1).controlcount= 10
           tab(1).controlenabled= 0  'False
```

```
tab(1).control(0)=    "Text46"
tab(1).control(1)=    "Check4"
tab(1).control(2)=    "Check3"
tab(1).control(3)=    "Text45"
tab(1).control(4)=    "Text44"
tab(1).control(5)=    "Text43"
tab(1).control(6)=    "Label48"
tab(1).control(7)=    "Label47"
tab(1).control(8)=    "Label46"
tab(1).control(9)=    "Label45"
tabcaption(2)    =    "&General"
tab(2).controlcount=  39
tab(2).controlenabled=  -1 'True
tab(2).control(0)=    "CommonDialog1"
tab(2).control(1)=    "Label1"
tab(2).control(2)=    "Label2"
tab(2).control(3)=    "Label4"
tab(2).control(4)=    "Label5"
tab(2).control(5)=    "Label6"
tab(2).control(6)=    "Label7"
tab(2).control(7)=    "Label8"
tab(2).control(8)=    "Label9"
tab(2).control(9)=    "Label19"
tab(2).control(10)=   "Label20"
tab(2).control(11)=   "Label27"
tab(2).control(12)=   "Label28"
tab(2).control(13)=   "Label29"
tab(2).control(14)=   "Label30"
tab(2).control(15)=   "Label31"
tab(2).control(16)=   "Label3"
tab(2).control(17)=   "Label10"
tab(2).control(18)=   "Label59"
tab(2).control(19)=   "Text1"
tab(2).control(20)=   "Text2"
tab(2).control(21)=   "Text4"
tab(2).control(22)=   "Text5"
tab(2).control(23)=   "Text6"
tab(2).control(24)=   "Text7"
tab(2).control(25)=   "Text8"
tab(2).control(26)=   "Text9"
tab(2).control(27)=   "Text10"
tab(2).control(28)=   "Text11"
tab(2).control(29)=   "Text12"
tab(2).control(30)=   "Text13"
tab(2).control(31)=   "Text14"
tab(2).control(32)=   "Text15"
tab(2).control(33)=   "Text16"
tab(2).control(34)=   "Option1"
tab(2).control(35)=   "Option2"
tab(2).control(36)=   "Text17"
tab(2).control(37)=   "Text18"
tab(2).control(38)=   "Text61"
tabcaption(3)    =    "&Drill Cycles"
tab(3).controlcount=  7
tab(3).controlenabled=  0 'False
tab(3).control(0)=    "Label36"
tab(3).control(1)=    "Label38"
tab(3).control(2)=    "Label39"
tab(3).control(3)=    "Label37"
tab(3).control(4)=    "Text36"
tab(3).control(5)=    "Text38"
tab(3).control(6)=    "Text39"
tabcaption(4)    =    "G&roove Cycles"
tab(4).controlcount=  10
tab(4).controlenabled=  0 'False
tab(4).control(0)=    "Label41"
tab(4).control(1)=    "Label42"
tab(4).control(2)=    "Label43"
tab(4).control(3)=    "Label44"
tab(4).control(4)=    "Text37"
tab(4).control(5)=    "Text40"
tab(4).control(6)=    "Text41"
tab(4).control(7)=    "Text42"
tab(4).control(8)=    "Check1"
```

```
tab(4).control(9)=  "Check2"
tabcaption(5)  =  "&O.D. Turning cycles"
tab(5).controlcount=  13
tab(5).controlenabled=  0  'False
tab(5).control(0)=  "Text58"
tab(5).control(1)=  "Text57"
tab(5).control(2)=  "Check5"
tab(5).control(3)=  "Text55"
tab(5).control(4)=  "Text50"
tab(5).control(5)=  "Text49"
tab(5).control(6)=  "Text48"
tab(5).control(7)=  "Text47"
tab(5).control(8)=  "Label56"
tab(5).control(9)=  "Label55"
tab(5).control(10)=  "Label54"
tab(5).control(11)=  "Label52"
tab(5).control(12)=  "Label49"
tabcaption(6)  =  "&I.D. Boring cycles"
tab(6).controlcount=  13
tab(6).controlenabled=  0  'False
tab(6).control(0)=  "Text60"
tab(6).control(1)=  "Text59"
tab(6).control(2)=  "Check6"
tab(6).control(3)=  "Text56"
tab(6).control(4)=  "Text54"
tab(6).control(5)=  "Text53"
tab(6).control(6)=  "Text52"
tab(6).control(7)=  "Text51"
tab(6).control(8)=  "Label58"
tab(6).control(9)=  "Label57"
tab(6).control(10)=  "Label53"
tab(6).control(11)=  "Label51"
tab(6).control(12)=  "Label50"
tabcaption(7)  =  "Tool Home With Program Stop"
tab(7).controlcount=  7
tab(7).controlenabled=  0  'False
tab(7).control(0)=  "Text35"
tab(7).control(1)=  "Text34"
tab(7).control(2)=  "Text33"
tab(7).control(3)=  "Label35"
tab(7).control(4)=  "Label34"
tab(7).control(5)=  "Label33"
tab(7).control(6)=  "Label32"
tabcaption(8)  =  "Tool Start"
tab(8).controlcount=  5
tab(8).controlenabled=  0  'False
tab(8).control(0)=  "Label11"
tab(8).control(1)=  "Label12"
tab(8).control(2)=  "Label26"
tab(8).control(3)=  "Text29"
tab(8).control(4)=  "Text30"
tabcaption(9)  =  "Tool Home"
tab(9).controlcount=  5
tab(9).controlenabled=  0  'False
tab(9).control(0)=  "Label13"
tab(9).control(1)=  "Label15"
tab(9).control(2)=  "Label25"
tab(9).control(3)=  "Text31"
tab(9).control(4)=  "Text32"
tabcaption(10)  =  "Program &End"
tab(10).controlcount=  6
tab(10).controlenabled=  0  'False
tab(10).control(0)=  "Label24"
tab(10).control(1)=  "Text28"
tab(10).control(2)=  "Text27"
tab(10).control(3)=  "Text26"
tab(10).control(4)=  "Text25"
tab(10).control(5)=  "Text24"
tabcaption(11)  =  "Program &Start"
tab(11).controlcount=  12
tab(11).controlenabled=  0  'False
tab(11).control(0)=  "Label23"
tab(11).control(1)=  "Label22"
tab(11).control(2)=  "Label21"
```

```
tab(11).control(3)=    "Label18"
tab(11).control(4)=    "Label17"
tab(11).control(5)=    "Label16"
tab(11).control(6)=    "Text23"
tab(11).control(7)=    "Text22"
tab(11).control(8)=    "Text21"
tab(11).control(9)=    "Text20"
tab(11).control(10)=   "Text19"
tab(11).control(11)=   "Text3"
Begin VB.TextBox Text61
   BackColor    =   &H00FFFFFF&
   Height       =   285
   Left         =   1920
   MaxLength    =   4
   TabIndex     =   132
   Top          =   3600
   Width        =   855
End
Begin VB.TextBox Text60
   BackColor    =   &H00FFFFFF&
   Height       =   285
   Left         =   -69480
   MaxLength    =   4
   TabIndex     =   127
   Top          =   4800
   Visible      =   0   'False
   Width        =   855
End
Begin VB.TextBox Text59
   BackColor    =   &H00FFFFFF&
   Height       =   285
   Left         =   -71040
   MaxLength    =   4
   TabIndex     =   126
   Top          =   4800
   Visible      =   0   'False
   Width        =   855
End
Begin VB.CheckBox Check6
   Caption      =   "Number the first and last lines ?"
   Height       =   255
   Left         =   -74040
   TabIndex     =   125
   Top          =   4800
   Width        =   2535
End
Begin VB.TextBox Text58
   BackColor    =   &H00FFFFFF&
   Height       =   285
   Left         =   -69480
   MaxLength    =   4
   TabIndex     =   124
   Top          =   4800
   Visible      =   0   'False
   Width        =   855
End
Begin VB.TextBox Text57
   BackColor    =   &H00FFFFFF&
   Height       =   285
   Left         =   -71040
   MaxLength    =   4
   TabIndex     =   123
   Top          =   4800
   Visible      =   0   'False
   Width        =   855
End
Begin VB.CheckBox Check5
   Caption      =   "Number the first and last lines ?"
   Height       =   255
   Left         =   -74040
   TabIndex     =   122
   Top          =   4800
   Width        =   2535
End
```

```
Begin VB.TextBox Text56
    BackColor   =   &H00FFFFFF&
    Height      =   285
    Left        =   -74040
    TabIndex    =   116
    Top         =   4320
    Width       =   3855
End
Begin VB.TextBox Text55
    BackColor   =   &H00FFFFFF&
    Height      =   285
    Left        =   -74040
    TabIndex    =   115
    Top         =   4320
    Width       =   3855
End
Begin VB.TextBox Text54
    BackColor   =   &H00FFFFFF&
    Height      =   285
    Left        =   -74040
    TabIndex    =   113
    Top         =   3600
    Width       =   3855
End
Begin VB.TextBox Text53
    BackColor   =   &H00FFFFFF&
    Height      =   285
    Left        =   -74040
    TabIndex    =   112
    Top         =   3240
    Width       =   3855
End
Begin VB.TextBox Text52
    BackColor   =   &H00FFFFFF&
    Height      =   285
    Left        =   -74040
    TabIndex    =   111
    Top         =   2520
    Width       =   3855
End
Begin VB.TextBox Text51
    BackColor   =   &H00FFFFFF&
    Height      =   285
    Left        =   -74040
    TabIndex    =   110
    Top         =   2160
    Width       =   3855
End
Begin VB.TextBox Text50
    BackColor   =   &H00FFFFFF&
    Height      =   285
    Left        =   -74040
    TabIndex    =   109
    Top         =   3600
    Width       =   3855
End
Begin VB.TextBox Text49
    BackColor   =   &H00FFFFFF&
    Height      =   285
    Left        =   -74040
    TabIndex    =   108
    Top         =   3240
    Width       =   3855
End
Begin VB.TextBox Text48
    BackColor   =   &H00FFFFFF&
    Height      =   285
    Left        =   -74040
    TabIndex    =   107
    Top         =   2520
    Width       =   3855
End
Begin VB.TextBox Text47
    BackColor   =   &H00FFFFFF&
```

```
         Height         =  285
         Left           =  -74040
         TabIndex       =  106
         Top            =  2160
 5       Width          =  3855
      End
      Begin VB.TextBox Text46
         BackColor      =  &H00FFFFFF&
         Height         =  285
10       Left           =  -72600
         MaxLength      =  4
         TabIndex       =  105
         Top            =  3960
         Width          =  855
15    End
      Begin VB.CheckBox Check4
         Caption        =  "Height value Rad "
         Height         =  255
         Left           =  -70080
20       TabIndex       =  101
         Top            =  3000
         Width          =  1575
      End
      Begin VB.CheckBox Check3
25       Caption        =  "Height value Dia "
         Height         =  255
         Left           =  -71640
         TabIndex       =  100
         Top            =  3000
30       Width          =  1575
      End
      Begin VB.TextBox Text45
         BackColor      =  &H00FFFFFF&
         Height         =  285
35       Left           =  -72600
         MaxLength      =  4
         TabIndex       =  99
         Top            =  3480
         Width          =  855
40    End
      Begin VB.TextBox Text44
         BackColor      =  &H00FFFFFF&
         Height         =  285
         Left           =  -72600
45       MaxLength      =  4
         TabIndex       =  98
         Top            =  3000
         Width          =  855
      End
50    Begin VB.TextBox Text43
         BackColor      =  &H00FFFFFF&
         Height         =  285
         Left           =  -72600
         MaxLength      =  4
55       TabIndex       =  97
         Top            =  2520
         Width          =  855
      End
      Begin VB.CheckBox Check2
60       Caption        =  "Height value Rad."
         Height         =  255
         Left           =  -70080
         TabIndex       =  95
         Top            =  2760
65       Width          =  1575
      End
      Begin VB.CheckBox Check1
         Caption        =  "Height value Dia "
         Height         =  255
70       Left           =  -71760
         TabIndex       =  94
         Top            =  2760
         Width          =  1575
      End
```

```
Begin VB.TextBox Text42
   BackColor    =   &H00FFFFFF&
   Height       =   285
   Left         =   -72720
   MaxLength    =   4
   TabIndex     =   89
   Top          =   3720
   Width        =   855
End
Begin VB.TextBox Text41
   BackColor    =   &H00FFFFFF&
   Height       =   285
   Left         =   -72720
   MaxLength    =   4
   TabIndex     =   88
   Top          =   3240
   Width        =   855
End
Begin VB.TextBox Text40
   BackColor    =   &H00FFFFFF&
   Height       =   285
   Left         =   -72720
   MaxLength    =   4
   TabIndex     =   87
   Top          =   2760
   Width        =   855
End
Begin VB.TextBox Text37
   BackColor    =   &H00FFFFFF&
   Height       =   285
   Left         =   -72720
   MaxLength    =   4
   TabIndex     =   86
   Top          =   2280
   Width        =   855
End
Begin VB.TextBox Text39
   BackColor    =   &H00FFFFFF&
   Height       =   285
   Left         =   -71280
   MaxLength    =   4
   TabIndex     =   80
   Top          =   3000
   Width        =   855
End
Begin VB.TextBox Text38
   BackColor    =   &H00FFFFFF&
   Height       =   285
   Left         =   -71280
   MaxLength    =   4
   TabIndex     =   79
   Top          =   3480
   Width        =   855
End
Begin VB.TextBox Text36
   BackColor    =   &H00FFFFFF&
   Height       =   285
   Left         =   -71280
   MaxLength    =   4
   TabIndex     =   78
   Top          =   2640
   Width        =   855
End
Begin VB.TextBox Text35
   BackColor    =   &H00FFFFFF&
   Height       =   285
   Left         =   -72240
   TabIndex     =   73
   Top          =   3840
   Width        =   3375
End
Begin VB.TextBox Text34
   BackColor    =   &H00FFFFFF&
   Height       =   285
```

```
      Left            = -72240
      TabIndex        = 72
      Top             = 3360
      Width           = 3375
   End
   Begin VB.TextBox Text33
      BackColor       = &H00FFFFFF&
      Height          = 285
      Left            = -72240
      TabIndex        = 71
      Top             = 2880
      Width           = 3375
   End
   Begin VB.TextBox Text32
      BackColor       = &H00FFFFFF&
      Height          = 285
      Left            = -72240
      TabIndex        = 68
      Top             = 3120
      Width           = 3375
   End
   Begin VB.TextBox Text31
      BackColor       = &H00FFFFFF&
      Height          = 285
      Left            = -72240
      TabIndex        = 67
      Top             = 2640
      Width           = 3375
   End
   Begin VB.TextBox Text30
      BackColor       = &H00FFFFFF&
      Height          = 285
      Left            = -72480
      TabIndex        = 62
      Top             = 3240
      Width           = 3375
   End
   Begin VB.TextBox Text29
      BackColor       = &H00FFFFFF&
      Height          = 285
      Left            = -72480
      TabIndex        = 61
      Top             = 2760
      Width           = 3375
   End
   Begin VB.PictureBox Picture1
      Height          = 2415
      Left            = -74160
      Picture         = "FRMPSTOU.frx":030A
      ScaleHeight     = 2355
      ScaleWidth      = 4755
      TabIndex        = 60
      Top             = 2400
      Width           = 4815
   End
   Begin VB.TextBox Text18
      BackColor       = &H00FFFFFF&
      Height          = 285
      Left            = 4920
      MaxLength       = 1
      TabIndex        = 34
      Top             = 3900
      Width           = 855
   End
   Begin VB.TextBox Text17
      BackColor       = &H00FFFFFF&
      Height          = 285
      Left            = 4920
      MaxLength       = 1
      TabIndex        = 33
      Top             = 4620
      Width           = 855
   End
   Begin VB.OptionButton Option2
```

```
            Caption         =   "X Negitive"
            Height          =   255
            Left            =   5160
            TabIndex        =   32
            TabStop         =   0  'False
            Top             =   5100
            Width           =   1215
        End
        Begin VB.OptionButton Option1
            Caption         =   "X Positive"
            Height          =   255
            Left            =   3600
            TabIndex        =   31
            TabStop         =   0  'False
            Top             =   5100
            Width           =   1215
        End
        Begin VB.TextBox Text16
            BackColor       =   &H00FFFFFF&
            Height          =   285
            Left            =   4920
            MaxLength       =   1
            TabIndex        =   30
            Top             =   4260
            Width           =   855
        End
        Begin VB.TextBox Text15
            BackColor       =   &H00FFFFFF&
            Height          =   285
            Left            =   1920
            MaxLength       =   4
            TabIndex        =   29
            Top             =   3960
            Width           =   855
        End
        Begin VB.TextBox Text14
            BackColor       =   &H00FFFFFF&
            Height          =   285
            Left            =   1920
            MaxLength       =   4
            TabIndex        =   28
            Top             =   4320
            Width           =   855
        End
        Begin VB.TextBox Text13
            BackColor       =   &H00FFFFFF&
            Height          =   285
            Left            =   1920
            MaxLength       =   4
            TabIndex        =   27
            Top             =   4680
            Width           =   855
        End
        Begin VB.TextBox Text12
            BackColor       =   &H00FFFFFF&
            Height          =   285
            Left            =   4920
            MaxLength       =   1
            TabIndex        =   26
            Top             =   3540
            Width           =   855
        End
        Begin VB.TextBox Text11
            BackColor       =   &H00FFFFFF&
            Height          =   285
            Left            =   4920
            MaxLength       =   4
            TabIndex        =   25
            Top             =   2100
            Width           =   855
        End
        Begin VB.TextBox Text10
            BackColor       =   &H00FFFFFF&
            Height          =   285
```

```
            Left            =   1920
            MaxLength       =   4
            TabIndex        =   24
            Top             =   5040
            Width           =   855
        End
        Begin VB.TextBox Text9
            BackColor       =   &H00FFFFFF&
            Height          =   285
            Left            =   4920
            MaxLength       =   6
            TabIndex        =   23
            Top             =   3180
            Width           =   855
        End
        Begin VB.TextBox Text8
            BackColor       =   &H00FFFFFF&
            Height          =   285
            Left            =   4920
            MaxLength       =   4
            TabIndex        =   22
            Top             =   2820
            Width           =   855
        End
        Begin VB.TextBox Text7
            BackColor       =   &H00FFFFFF&
            Height          =   285
            Left            =   4920
            MaxLength       =   4
            TabIndex        =   21
            Top             =   2460
            Width           =   855
        End
        Begin VB.TextBox Text6
            BackColor       =   &H00FFFFFF&
            Height          =   285
            Left            =   1920
            MaxLength       =   4
            TabIndex        =   20
            Top             =   3240
            Width           =   855
        End
        Begin VB.TextBox Text5
            BackColor       =   &H00FFFFFF&
            Height          =   285
            Left            =   1920
            MaxLength       =   4
            TabIndex        =   19
            Top             =   2880
            Width           =   855
        End
        Begin VB.TextBox Text4
            BackColor       =   &H00FFFFFF&
            Height          =   285
            Left            =   1920
            MaxLength       =   4
            TabIndex        =   18
            Top             =   2520
            Width           =   855
        End
        Begin VB.TextBox Text2
            BackColor       =   &H00FFFFFF&
            Height          =   285
            Left            =   1920
            MaxLength       =   4
            TabIndex        =   17
            Top             =   2160
            Width           =   855
        End
        Begin VB.TextBox Text1
            BackColor       =   &H00FFFFFF&
            Height          =   285
            Left            =   1920
            MaxLength       =   4
```

```
        TabIndex       =  16
        Top            =  1800
        Width          =  855
     End
     Begin VB.TextBox Text3
        BackColor      =  &H00FFFFFF&
        Height         =  285
        Left           =  -72840
        TabIndex       =  15
        Top            =  2160
        Width          =  3375
     End
     Begin VB.TextBox Text19
        BackColor      =  &H00FFFFFF&
        Height         =  285
        Left           =  -72840
        TabIndex       =  14
        Top            =  2640
        Width          =  3375
     End
     Begin VB.TextBox Text20
        BackColor      =  &H00FFFFFF&
        Height         =  285
        Left           =  -72840
        TabIndex       =  13
        Top            =  3120
        Width          =  3375
     End
     Begin VB.TextBox Text21
        BackColor      =  &H00FFFFFF&
        Height         =  285
        Left           =  -72840
        TabIndex       =  12
        Top            =  3600
        Width          =  3375
     End
     Begin VB.TextBox Text22
        BackColor      =  &H00FFFFFF&
        Height         =  285
        Left           =  -72840
        TabIndex       =  11
        Top            =  4080
        Width          =  3375
     End
     Begin VB.TextBox Text23
        BackColor      =  &H00FFFFFF&
        Height         =  285
        Left           =  -72840
        TabIndex       =  10
        Top            =  4560
        Width          =  3375
     End
     Begin VB.TextBox Text24
        BackColor      =  &H00FFFFFF&
        Height         =  285
        Left           =  -72600
        TabIndex       =  9
        Top            =  2640
        Width          =  3015
     End
     Begin VB.TextBox Text25
        BackColor      =  &H00FFFFFF&
        Height         =  285
        Left           =  -72600
        TabIndex       =  8
        Top            =  3120
        Width          =  3015
     End
     Begin VB.TextBox Text26
        BackColor      =  &H00FFFFFF&
        Height         =  285
        Left           =  -72600
        TabIndex       =  7
        Top            =  3600
```

```
         Width           =   3015
      End
      Begin VB.TextBox Text27
         BackColor       =   &H00FFFFFF&
         Height          =   285
         Left            =   -72600
         TabIndex        =   6
         Top             =   4080
         Width           =   3015
      End
      Begin VB.TextBox Text28
         BackColor       =   &H00FFFFFF&
         Height          =   285
         Left            =   -72600
         TabIndex        =   5
         Top             =   4560
         Width           =   3015
      End
      Begin VB.Label Label59
         Alignment       =   1  'Right Justify
         Caption         =   "Letter code for dwell"
         Height          =   255
         Left            =   240
         TabIndex        =   133
         Top             =   3720
         Width           =   1575
      End
      Begin VB.Label Label58
         Alignment       =   1  'Right Justify
         Caption         =   "Last"
         Height          =   255
         Left            =   -70080
         TabIndex        =   131
         Top             =   4920
         Visible         =   0  'False
         Width           =   495
      End
      Begin VB.Label Label57
         Alignment       =   1  'Right Justify
         Caption         =   "First"
         Height          =   255
         Left            =   -71640
         TabIndex        =   130
         Top             =   4920
         Visible         =   0  'False
         Width           =   495
      End
      Begin VB.Label Label56
         Alignment       =   1  'Right Justify
         Caption         =   "Last"
         Height          =   255
         Left            =   -70080
         TabIndex        =   129
         Top             =   4920
         Visible         =   0  'False
         Width           =   495
      End
      Begin VB.Label Label55
         Alignment       =   1  'Right Justify
         Caption         =   "First"
         Height          =   255
         Left            =   -71640
         TabIndex        =   128
         Top             =   4920
         Visible         =   0  'False
         Width           =   495
      End
      Begin VB.Label Label54
         Caption         =   "Enter the ending lines of your canned boring cycle below."
         Height          =   255
         Left            =   -74160
         TabIndex        =   121
         Top             =   3000
         Width           =   4095
```

```
         End
         Begin VB.Label Label53
            Caption        =   "Enter the ending lines of your canned boring cycle below."
            Height         =   255
            Left           =   -74160
            TabIndex       =   120
            Top            =   3000
            Width          =   4095
         End
         Begin VB.Label Label52
            Caption        =   "Enter the text for your finishing cycle below."
            Height         =   255
            Left           =   -74040
            TabIndex       =   119
            Top            =   4080
            Width          =   3855
         End
         Begin VB.Label Label51
            Caption        =   "Enter the text for your finishing cycle below."
            Height         =   255
            Left           =   -74040
            TabIndex       =   118
            Top            =   4080
            Width          =   3855
         End
         Begin VB.Label Label50
            Caption        =   "Enter the start up lines of your canned boring cycle below."
            Height         =   255
            Left           =   -74160
            TabIndex       =   117
            Top            =   1920
            Width          =   4095
         End
         Begin VB.Label Label49
            Caption        =   "Enter the start up lines of your canned turning cycle below."
            Height         =   255
            Left           =   -74160
            TabIndex       =   114
            Top            =   1920
            Width          =   4215
         End
         Begin VB.Label Label48
            Alignment      =   1  'Right Justify
            Caption        =   "Letter code for feed rate"
            Height         =   255
            Left           =   -74760
            TabIndex       =   104
            Top            =   4080
            Width          =   2055
         End
         Begin VB.Label Label47
            Alignment      =   1  'Right Justify
            Caption        =   "Letter code for depth of cut"
            Height         =   255
            Left           =   -74760
            TabIndex       =   103
            Top            =   3600
            Width          =   2055
         End
         Begin VB.Label Label46
            Alignment      =   1  'Right Justify
            Caption        =   "Letter code for thread height"
            Height         =   255
            Left           =   -74880
            TabIndex       =   102
            Top            =   3120
            Width          =   2175
         End
         Begin VB.Label Label45
            Alignment      =   1  'Right Justify
            Caption        =   "G code for threading cycle"
            Height         =   255
            Left           =   -74760
            TabIndex       =   96
```

```
      Top             = 2640
      Width           = 2055
   End
   Begin VB.Label Label44
      Alignment       = 1  'Right Justify
      Caption         = "Letter code for pecking in X"
      Height          = 255
      Left            = -74880
      TabIndex        = 93
      Top             = 3840
      Width           = 2055
   End
   Begin VB.Label Label43
      Alignment       = 1  'Right Justify
      Caption         = "Letter code for Z stepover"
      Height          = 255
      Left            = -74760
      TabIndex        = 92
      Top             = 3360
      Width           = 1935
   End
   Begin VB.Label Label42
      Alignment       = 1  'Right Justify
      Caption         = "Letter code for height in X"
      Height          = 255
      Left            = -74760
      TabIndex        = 91
      Top             = 2880
      Width           = 1935
   End
   Begin VB.Label Label41
      Alignment       = 1  'Right Justify
      Caption         = "G code for groove cycle"
      Height          = 255
      Left            = -74880
      TabIndex        = 90
      Top             = 2400
      Width           = 2055
   End
   Begin VB.Label Label40
      Caption         = "Opening or Saving a post file saves it as the default."
      BeginProperty Font
         name            = "MS Sans Serif"
         charset         = 1
         weight          = 700
         size            = 9.75
         underline       = 0  'False
         italic          = 0  'False
         strikethrough   = 0  'False
      EndProperty
      Height          = 375
      Left            = -74400
      TabIndex        = 85
      Top             = 5040
      Width           = 5775
   End
   Begin VB.Label Label37
      Caption         = $"FRMPSTOU.frx":CF44
      Height          = 735
      Left            = -72840
      TabIndex        = 84
      Top             = 4080
      Width           = 2895
   End
   Begin VB.Label Label39
      Alignment       = 1  'Right Justify
      Caption         = "First Peck Letter Code"
      Height          = 255
      Left            = -73080
      TabIndex        = 83
      Top             = 3120
      Width           = 1695
   End
   Begin VB.Label Label38
```

```
            Alignment       =   1  'Right Justify
            Caption         =   "Second Peck Letter Code"
            Height          =   255
            Left            =   -73440
            TabIndex        =   82
            Top             =   3600
            Width           =   2055
        End
        Begin VB.Label Label36
            Alignment       =   1  'Right Justify
            Caption         =   "G code"
            Height          =   255
            Left            =   -73080
            TabIndex        =   81
            Top             =   2760
            Width           =   1695
        End
        Begin VB.Label Label35
            Alignment       =   1  'Right Justify
            Caption         =   "Second Line"
            Height          =   255
            Left            =   -73320
            TabIndex        =   77
            Top             =   3480
            Width           =   975
        End
        Begin VB.Label Label34
            Alignment       =   1  'Right Justify
            Caption         =   "Third Line"
            Height          =   255
            Left            =   -73320
            TabIndex        =   76
            Top             =   3960
            Width           =   975
        End
        Begin VB.Label Label33
            Alignment       =   1  'Right Justify
            Caption         =   "First Line"
            Height          =   255
            Left            =   -73320
            TabIndex        =   75
            Top             =   3000
            Width           =   975
        End
        Begin VB.Label Label32
            Caption         =   $"FRMPSTOU.frx":CFAD
            Height          =   375
            Left            =   -73440
            TabIndex        =   74
            Top             =   2160
            Width           =   3255
        End
        Begin VB.Label Label26
            Caption         =   $"FRMPSTOU.frx":CFF3
            Height          =   375
            Left            =   -73680
            TabIndex        =   70
            Top             =   2160
            Width           =   3255
        End
        Begin VB.Label Label25
            Caption         =   "Enter the imformation to send the tool home."
            Height          =   375
            Left            =   -73680
            TabIndex        =   69
            Top             =   2160
            Width           =   3255
        End
        Begin VB.Label Label15
            Alignment       =   1  'Right Justify
            Caption         =   "First Line"
            Height          =   255
            Left            =   -73320
            TabIndex        =   66
```

```
        Top             =   2760
        Width           =   975
    End
    Begin VB.Label Label13
        Alignment       =   1  'Right Justify
        Caption         =   "Second Line"
        Height          =   255
        Left            =   -73320
        TabIndex        =   65
        Top             =   3240
        Width           =   975
    End
    Begin VB.Label Label12
        Alignment       =   1  'Right Justify
        Caption         =   "Second Line"
        Height          =   255
        Left            =   -73560
        TabIndex        =   64
        Top             =   3360
        Width           =   975
    End
    Begin VB.Label Label11
        Alignment       =   1  'Right Justify
        Caption         =   "First Line"
        Height          =   255
        Left            =   -73560
        TabIndex        =   63
        Top             =   2880
        Width           =   975
    End
    Begin VB.Label Label24
        Caption         =   "Enter the last few lines of your program here."
        Height          =   495
        Left            =   -72240
        TabIndex        =   58
        Top             =   2040
        Width           =   1695
    End
    Begin VB.Label Label10
        Alignment       =   1  'Right Justify
        Caption         =   "Radius Character Z"
        Height          =   255
        Left            =   3120
        TabIndex        =   57
        Top             =   4020
        Width           =   1695
    End
    Begin VB.Label Label3
        Alignment       =   1  'Right Justify
        Caption         =   "Chamfer Character Z"
        Height          =   255
        Left            =   3000
        TabIndex        =   56
        Top             =   4740
        Width           =   1815
    End
    Begin VB.Label Label31
        Alignment       =   1  'Right Justify
        Caption         =   "Chamfer Character X"
        Height          =   255
        Left            =   3240
        TabIndex        =   55
        Top             =   4380
        Width           =   1575
    End
    Begin VB.Label Label30
        Alignment       =   1  'Right Justify
        Caption         =   "Spindle Forward"
        Height          =   255
        Left            =   360
        TabIndex        =   54
        Top             =   4080
        Width           =   1455
    End
```

```
Begin VB.Label Label29
    Alignment    =   1  'Right Justify
    Caption      =   "Spindle Backward"
    Height       =   255
    Left         =   240
    TabIndex     =   53
    Top          =   4440
    Width        =   1575
End
Begin VB.Label Label28
    Alignment    =   1  'Right Justify
    Caption      =   "Spindle Stop"
    Height       =   255
    Left         =   720
    TabIndex     =   52
    Top          =   4800
    Width        =   1095
End
Begin VB.Label Label27
    Alignment    =   1  'Right Justify
    Caption      =   "Radius Character X"
    Height       =   255
    Left         =   3000
    TabIndex     =   51
    Top          =   3660
    Width        =   1815
End
Begin VB.Label Label20
    Alignment    =   1  'Right Justify
    Caption      =   "Coolant Off"
    Height       =   255
    Left         =   3720
    TabIndex     =   50
    Top          =   2220
    Width        =   1095
End
Begin VB.Label Label19
    Alignment    =   1  'Right Justify
    Caption      =   "Coolant On"
    Height       =   255
    Left         =   720
    TabIndex     =   49
    Top          =   5160
    Width        =   1095
End
Begin VB.Label Label9
    Alignment    =   1  'Right Justify
    Caption      =   "Format Style"
    Height       =   255
    Left         =   3360
    TabIndex     =   48
    Top          =   3300
    Width        =   1455
End
Begin VB.Label Label8
    Alignment    =   1  'Right Justify
    Caption      =   "Programed Stop"
    Height       =   255
    Left         =   3360
    TabIndex     =   47
    Top          =   2940
    Width        =   1455
End
Begin VB.Label Label7
    Alignment    =   1  'Right Justify
    Caption      =   "Optional Stop"
    Height       =   255
    Left         =   3600
    TabIndex     =   46
    Top          =   2580
    Width        =   1215
End
Begin VB.Label Label6
    Alignment    =   1  'Right Justify
```

```
            Caption         =   "Dwell"
            Height          =   255
            Left            =   1200
            TabIndex        =   45
            Top             =   3360
            Width           =   615
         End
         Begin VB.Label Label5
            Alignment       =   1  'Right Justify
            Caption         =   "G code for radius"
            Height          =   255
            Left            =   240
            TabIndex        =   44
            Top             =   3000
            Width           =   1575
         End
         Begin VB.Label Label4
            Alignment       =   1  'Right Justify
            Caption         =   "G code for chamfer"
            Height          =   255
            Left            =   120
            TabIndex        =   43
            Top             =   2640
            Width           =   1695
         End
         Begin VB.Label Label2
            Alignment       =   1  'Right Justify
            Caption         =   "Rapid"
            Height          =   255
            Left            =   1080
            TabIndex        =   42
            Top             =   2280
            Width           =   735
         End
         Begin VB.Label Label1
            Alignment       =   1  'Right Justify
            Caption         =   "Feed"
            Height          =   255
            Left            =   1200
            TabIndex        =   41
            Top             =   1920
            Width           =   615
         End
         Begin MSComDlg.CommonDialog CommonDialog1
            Left            =   240
            Top             =   4860
            _version        =   65536
            _extentx        =   847
            _extenty        =   847
            _stockprops     =   0
         End
         Begin VB.Label Label16
            Alignment       =   1  'Right Justify
            Caption         =   "First Line"
            Height          =   255
            Left            =   -73920
            TabIndex        =   40
            Top             =   2280
            Width           =   975
         End
         Begin VB.Label Label17
            Alignment       =   1  'Right Justify
            Caption         =   "Second Line"
            Height          =   255
            Left            =   -73920
            TabIndex        =   39
            Top             =   2760
            Width           =   975
         End
         Begin VB.Label Label18
            Alignment       =   1  'Right Justify
            Caption         =   "Third Line"
            Height          =   255
            Left            =   -73920
```

```
                    TabIndex       =  38
                    Top            =  3240
                    Width          =  975
                End
            Begin VB.Label Label21
                Alignment      =  1  'Right Justify
                Caption        =  "Fourth Line"
                Height         =  255
                Left           =  -74160
                TabIndex       =  37
                Top            =  3720
                Width          =  1215
            End
            Begin VB.Label Label22
                Alignment      =  1  'Right Justify
                Caption        =  "Fifth Line"
                Height         =  255
                Left           =  -73800
                TabIndex       =  36
                Top            =  4200
                Width          =  855
            End
            Begin VB.Label Label23
                Alignment      =  1  'Right Justify
                Caption        =  "Programers Name"
                Height         =  255
                Left           =  -74400
                TabIndex       =  35
                Top            =  4680
                Width          =  1455
            End
        End
        Begin VB.Label Label14
            Alignment      =  2  'Center
            BackColor      =  &H00C0C0C0&
            BeginProperty Font
                name           =  "MS Sans Serif"
                charset        =  1
                weight         =  700
                size           =  12
                underline      =  0   'False
                italic         =  0   'False
                strikethrough  =  0   'False
            EndProperty
            ForeColor      =  &H000000FF&
            Height         =  375
            Left           =  240
            TabIndex       =  59
            Top            =  5880
            Width          =  6855
        End
        Begin MSComDlg.CommonDialog CommonDialog2
            Left           =  8040
            Top            =  240
            _version       =  65536
            _extentx       =  847
            _extenty       =  847
            _stockprops    =  0
        End
    End
    Attribute VB_Name = "frmPstout"
    Attribute VB_Creatable = False
    Attribute VB_Exposed = False Private Sub check1_Click()
    If check1 = 1 Then
    Check2 = 0
    End If
    End Sub Private Sub Check2_Click()
    If Check2 = 1 Then
    check1 = 0
```

```
            End If
        End Sub

Private Sub Check3_Click()
            If Check3 = 1 Then
                Check4 = 0
            End If
        End Sub Private Sub Check4_Click()
            If Check4 = 1 Then
                Check3 = 0
            End If
        End Sub Private Sub Check5_Click()

If Check5 = 1 Then
                Label55.Visible = True
                Label56.Visible = True
                Text57.Visible = True
                Text58.Visible = True
            End If If Check5 = 0 Then
                Label55.Visible = False
                Label56.Visible = False
                Text57.Visible = False
                Text58.Visible = False
            End If End Sub Private Sub Check6_Click()

If Check6 = 1 Then
                Label57.Visible = True
                Label58.Visible = True
                Text59.Visible = True
                Text60.Visible = True
            End If If Check6 = 0 Then
                Label57.Visible = False
                Label58.Visible = False
                Text59.Visible = False
                Text60.Visible = False
            End If End Sub Private Sub Command2_Click()
            frmPstout.Visible = False
            frmMDI.ActiveForm.ActiveControl.SetFocus ' RETURNS THE CURSER TO THE SCREEN
        End Sub Private Sub Command3_Click()

' User pressed the save button

' Display a common dialog window...
            Dim RetVal
            On Error Resume Next
            CommonDialog2.Filter = "post (*.pst)|*.pst|All Files (*.*)|*.*" ' Filters
            CommonDialog2.FilterIndex = 1   ' Sets *.pst as first choice
            CommonDialog2.Action = 2   ' Shows the "Save As" style box
            frmPstout.Label14 = CommonDialog2.Filename
            frmMDI.label1 = CommonDialog2.Filename ' Check to see if the file exists...
```

```
    Dim x As integer    ' Set "X" as a number to be used as a file number...

x = FreeFile

5   On Error Resume Next
    Open CommonDialog2.Filename For Input As x
    If Err = 0 Then    ' If I dont get an error, then the file must exist.
       Filename = True
    Else: Filename = Not True
10  Close x    ' Closes file number "x"
    End If If Filename = True Then    ' Must be a existing filename !
15  Close x
    'MsgBox "FILENAME TRUE"
    GoTo 400   ' Ask the user if they want to overwrite the file.
    End If 20  If Filename = Not True Then ' It must be a new file, save it !
    Close x
    'MsgBox "FILE NAME FALSE"
    GoTo 500   ' Go ahead and save the file...
       Close x
25

400    ' Set up a message box, ask the user Yes or No, and get a response...

30  Const MB_OK = 0, MB_OKCANCEL = 1    ' Define buttons.
       Const MB_YESNOCANCEL = 3, MB_YESNO = 4
       Const MB_ICONSTOP = 16, MB_ICONQUESTION = 32   ' Define Icons.
       Const MB_ICONEXCLAMATION = 48, MB_ICONINFORMATION = 64
       Const MB_DEFBUTTON2 = 256, IDYES = 6, IDNO = 7 ' Define other.
35     Dim DgDef, Msg, Response, Title ' Declare variables.
       Title = "File already exists !"
       ' Put together a sample message box with all the proper components.
       Msg = "File already exists" & Chr(13) + Chr(10)
       Msg = Msg & " Do you want to overwrite the file"
40     DgDef = MB_YESNO + MB_ICONSTOP + MB_DEFBUTTON2 ' Describe dialog.

Response = MsgBox(Msg, DgDef, Title)    ' Get user response.
       If Response = IDNO Then   ' Evaluate response
          ' The user pressed the "No" button - do not overwrite the file
45        GoTo 1001 ' and take appropriate
       Else   ' action.
          ' The user pressed the "Yes" button - overwrite the file...

End If
50
    500
    'MsgBox "500 !!!"
       'Dim PostName As String
       PostName = Label14.Caption
55     PostName = CommonDialog2.Filename   ' Sets "postname" as file name Open CommonDialog2.Filename For Output As #1    ' Open file for input.

Print #1, frmPstout.text3.Text ' = PRG_STRT_1
60  Print #1, frmPstout.Text19.Text ' = PRG_STRT_2
    Print #1, frmPstout.Text20.Text ' = PRG_STRT_3
    Print #1, frmPstout.Text21.Text ' = PRG_STRT_4
    Print #1, frmPstout.Text22.Text ' = PRG_STRT_5
    Print #1, frmPstout.Text23.Text ' = PRG_STRT_6
65
    Print #1, frmPstout.text1.Text ' = Feed
    Print #1, frmPstout.text2.Text ' = Rapid
    Print #1, frmPstout.text4.Text ' = G_Code_Chamfer
    Print #1, frmPstout.text5.Text ' = G_Code_Radius
70  Print #1, frmPstout.text6.Text ' = dwell
    Print #1, frmPstout.text15.Text ' = Spinfrd
    Print #1, frmPstout.text14.Text '= Spinbckwrd
    Print #1, frmPstout.text13.Text '= Spinstop
    Print #1, frmPstout.text10.Text '= ClntOn
```

```
Print #1, frmPstout.text11.Text '= CIntOff
Print #1, frmPstout.text7.Text ' = opstp
Print #1, frmPstout.text8.Text ' = prgstop
Print #1, frmPstout.text9.Text ' = formats
Print #1, frmPstout.text12.Text ' = Rad_X
Print #1, frmPstout.Text18.Text ' = Rad_Z
Print #1, frmPstout.text16.Text ' = Chamfer_X
Print #1, frmPstout.Text17.Text ' = Chamfer_Z If Option1 = True Then
    Print #1, "X"
    End If If option2 = True Then
    Print #1, "X-"
    End If Print #1, frmPstout.Text24.Text ' = PRG_END_1
Print #1, frmPstout.Text25.Text ' = PRG_END_2
Print #1, frmPstout.Text26.Text ' = PRG_END_3
Print #1, frmPstout.Text27.Text ' = PRG_END_4
Print #1, frmPstout.Text28.Text ' = PRG_END_5

Print #1, frmPstout.Text29.Text '= Tool_Home_Start_1
Print #1, frmPstout.Text30.Text '= Tool_Home_Start_2

Print #1, frmPstout.Text31.Text '= Tool_Home_End_1
Print #1, frmPstout.Text32.Text '= Tool_Home_End_2

Print #1, frmPstout.Text24.Text '= Prg_End_1
Print #1, frmPstout.Text25.Text '= Prg_End_2
Print #1, frmPstout.Text26.Text '= Prg_End_3
Print #1, frmPstout.Text27.Text '= Prg_End_4
Print #1, frmPstout.Text28.Text '= Prg_End_5

Print #1, frmPstout.Text33.Text '= opt_stop_1
Print #1, frmPstout.Text34.Text '= opt_stop_2
Print #1, frmPstout.Text35.Text '= opt_stop_3

Print #1, frmPstout.Text36.Text '= Drill_G_Code
Print #1, frmPstout.Text39.Text '= Drill_Peck_1
Print #1, frmPstout.Text38.Text '= Drill_Peck_2

Close #1

' RE-READ THE VALUES

Open CommonDialog2.Filename For Input As #1   ' Open file for input.

Dim linesfromfile As String

Do While Not EOF(1)
            Line Input #1, PRG_STRT_1
            Line Input #1, PRG_STRT_2
            Line Input #1, PRG_STRT_3
            Line Input #1, PRG_STRT_4
            Line Input #1, PRG_STRT_5
            Line Input #1, PRG_STRT_6

Line Input #1, Feed
            Line Input #1, Rapid
            Line Input #1, G_Code_Chamfer
            Line Input #1, G_Code_Radius
            Line Input #1, dwell
            Line Input #1, Spinfrd
            Line Input #1, Spinbckwrd
            Line Input #1, Spinstop
            Line Input #1, ClntOn
            Line Input #1, ClntOff
            Line Input #1, opstp
```

```
        Line Input #1, prgstop
        Line Input #1, formats
        Line Input #1, Rad_X
        Line Input #1, Rad_Z
        Line Input #1, Chamfer_X
        Line Input #1, Chamfer_Z
        Line Input #1, XCode Line Input #1, PRG_END_1
        Line Input #1, PRG_END_2
        Line Input #1, PRG_END_3
        Line Input #1, PRG_END_4
        Line Input #1, PRG_END_5

Line Input #1, Tool_Home_Start_1
        Line Input #1, Tool_Home_Start_2

Line Input #1, Tool_Home_End_1
        Line Input #1, Tool_Home_End_2

Line Input #1, PRG_END_1
        Line Input #1, PRG_END_2
        Line Input #1, PRG_END_3
        Line Input #1, PRG_END_4
        Line Input #1, PRG_END_5

Line Input #1, Opt_Stop_1
        Line Input #1, Opt_Stop_2
        Line Input #1, Opt_Stop_3

Line Input #1, Drill_G_Code
        Line Input #1, Drill_Peck_1
        Line Input #1, Drill_Peck_2

Loop

Close #1    ' Close file.

' Set Qcampost.ini
pstname = WritePrivateProfileString("Last Post Used", "lastpost", PostName, "Qcampost.ini")
Clipboard.SetText PostName End If
FileExists = False Dim FName, FNum, i, Msg2, TestString ' Declare variables.

FNum = FreeFile ' Determine file number.
    FName = CommonDialog2.Filename

Close   ' Close all files.

1001

End Sub

Private Sub Command4_Click()

' User pressed the open button

Dim RetVal
    On Error Resume Next
    CommonDialog2.Filter = "Post (*.pst)|*.pst|All Files (*.*)|*.*"  ' Filters
    CommonDialog2.FilterIndex = 1  ' Sets *.pst as first choice
    CommonDialog2.Action = 1    ' Shows the "Open" style box
    frmPstout.Label14 = CommonDialog2.Filename
    frmMDI.label1 = CommonDialog2.Filename
    Dim PostName As String
    PostName = Label14.Caption
    PostName = CommonDialog2.Filename   ' Sets "postname" as file name
```

```
Open PostName For Input As #1    ' Open file for input.

' Reads the file
    Do While Not EOF(1)
        Line Input #1, PRG_STRT_1
        Line Input #1, PRG_STRT_2
        Line Input #1, PRG_STRT_3
        Line Input #1, PRG_STRT_4
        Line Input #1, PRG_STRT_5
        Line Input #1, PRG_STRT_6

Line Input #1, Feed
        Line Input #1, Rapid
        Line Input #1, G_Code_Chamfer
        Line Input #1, G_Code_Radius
        Line Input #1, dwell
        Line Input #1, Spinfrd
        Line Input #1, Spinbckwrd
        Line Input #1, Spinstop
        Line Input #1, ClntOn
        Line Input #1, ClntOff
        Line Input #1, opstp
        Line Input #1, prgstop
        Line Input #1, formats
        Line Input #1, Rad_X
        Line Input #1, Rad_Z
        Line Input #1, Chamfer_X
        Line Input #1, Chamfer_Z
        Line Input #1, XCode If XCode = "X" Then ' This just sets the option buttons.
            Option1 = True
            option2 = False
        End If If XCode = "X-" Then 'This just sets the option buttons.
            option2 = True
            Option1 = False
        End If Line Input #1, PRG_END_1
        Line Input #1, PRG_END_2
        Line Input #1, PRG_END_3
        Line Input #1, PRG_END_4
        Line Input #1, PRG_END_5

Line Input #1, Tool_Home_Start_1
        Line Input #1, Tool_Home_Start_2

Line Input #1, Tool_Home_End_1
        Line Input #1, Tool_Home_End_2

Line Input #1, PRG_END_1
        Line Input #1, PRG_END_2
        Line Input #1, PRG_END_3
        Line Input #1, PRG_END_4
        Line Input #1, PRG_END_5

Line Input #1, Opt_Stop_1
        Line Input #1, Opt_Stop_2
        Line Input #1, Opt_Stop_3

Line Input #1, Drill_G_Code
        Line Input #1, Drill_Peck_1
        Line Input #1, Drill_Peck_2

Loop frmPstout.text3.Text = PRG_STRT_1 ' Shows the next line.
    frmPstout.Text19.Text = PRG_STRT_2 ' Shows the next line.
    frmPstout.Text20.Text = PRG_STRT_3 ' Shows the next line.
```

```
frmPstout.Text21.Text = PRG_STRT_4 ' Shows the next line.
frmPstout.Text22.Text = PRG_STRT_5 ' Shows the next line.
frmPstout.Text23.Text = PRG_STRT_6 ' Shows the next line.
frmPstout.text1.Text = Feed ' Shows the next line.
frmPstout.text2.Text = Rapid ' Shows the next line.
frmPstout.text4.Text = G_Code_Chamfer ' Shows the next line.
frmPstout.text5.Text = G_Code_Radius ' Shows the next line.
frmPstout.text6.Text = dwell ' Shows the next line.
frmPstout.text15.Text = Spinfrd ' Shows the next line.
frmPstout.text14.Text = Spinbckwrd ' Shows the next line.
frmPstout.text13.Text = Spinstop ' Shows the next line.
frmPstout.text10.Text = ClntOn ' Shows the next line.
frmPstout.text11.Text = ClntOff ' Shows the next line.
frmPstout.text7.Text = opstp ' Shows the next line.
frmPstout.text8.Text = prgstop ' Shows the next line.
frmPstout.text9.Text = formats ' Shows the next line.
frmPstout.text12.Text = Rad_X ' Shows the next line.
frmPstout.Text18.Text = Rad_Z ' Shows the next line.
frmPstout.text16.Text = Chamfer_X ' Shows the next line.
frmPstout.Text17.Text = Chamfer_Z ' Shows the next line.

frmPstout.Text24.Text = PRG_END_1 ' Shows the next line.
frmPstout.Text25.Text = PRG_END_2 ' Shows the next line.
frmPstout.Text26.Text = PRG_END_3 ' Shows the next line.
frmPstout.Text27.Text = PRG_END_4 ' Shows the next line.
frmPstout.Text28.Text = PRG_END_5 ' Shows the next line.

frmPstout.Text29.Text = Tool_Home_Start_1 ' Shows the next line.
frmPstout.Text30.Text = Tool_Home_Start_2 ' Shows the next line.

frmPstout.Text31.Text = Tool_Home_End_1 ' Shows the next line.
frmPstout.Text32.Text = Tool_Home_End_2 ' Shows the next line.

frmPstout.Text24.Text = PRG_END_1
frmPstout.Text25.Text = PRG_END_2
frmPstout.Text26.Text = PRG_END_3
frmPstout.Text27.Text = PRG_END_4
frmPstout.Text28.Text = PRG_END_5 frmPstout.Text33.Text = Opt_Stop_1
frmPstout.Text34.Text = Opt_Stop_2
frmPstout.Text35.Text = Opt_Stop_3 frmPstout.Text36.Text = Drill_G_Code
frmPstout.Text39.Text = Drill_Peck_1
frmPstout.Text38.Text = Drill_Peck_2

Close #1   ' Close file.

' Set the option buttons for X or X-
If XCode = "X" Then
   Option1 = True
   option2 = False
End If If XCode = "X-" Then
   option2 = True
   Option1 = False
End If ' Write post name to qcampost.ini...
pstname = WritePrivateProfileString("Last Post Used", "lastpost", PostName, "Qcampost.ini")

End Sub

Private Sub Command5_Click()

' The user pressed the "New" button.

Dim RetVal
On Error Resume Next
CommonDialog2.Filter = "Post (*.pst)|*.pst|All Files (*.*)|*.*" ' Filters
```

```
        CommonDialog2.FilterIndex = 1   ' Sets *.txt as first choice
        CommonDialog2.Action = 1   ' Shows the "Open" style box
        frmPstout.Label14 = CommonDialog2.Filename
        Dim PostName As String
        PostName = Label14.Caption
        PostName = CommonDialog2.Filename   ' Sets "postname" as file name Open PostName For Output As #1   ' Open file for output
           ' Creates a new file...
           ' When you press "Close" it writes it to "QcamPost.ini" ...
        Close #1   ' Close file.

End Sub

Private Sub Form_Deactivate()
    Visible = False
    frmMDI.ActiveForm.ActiveControl.SetFocus ' RETURNS THE CURSER TO THE SCREEN
    End Sub Private Sub Form_Load()
    If WindowState = 0 Then
        Move (Screen.Width - frmPstout.Width) / 2, (Screen.Height - frmPstout.Height) / 2
        End If
    End Sub Private Sub Form_Paint()
    If WindowState = 0 Then
        Move (Screen.Width - frmPstout.Width) / 2, (Screen.Height - frmPstout.Height) / 2
        End If
    End Sub Private Sub Form_Resize()
    If WindowState = 0 Then
        Move (Screen.Width - frmPstout.Width) / 2, (Screen.Height - frmPstout.Height) / 2
        End If
    End Sub (O1966)
    (CNC LATHE OPERATION)

J. ROWLETTE
    G01
    G00
    G75
    G76
    G04
    M03
    M04
    M05
    M08
    M09
    M01
    M00
    0.0000
    L
    L
    L
    L
    X
    G00 X0 Z0 T0000 M09
    M30
    %

G00 X0 Z0 T0000 M42

G00 X0 Z0 T0000 M09

G00 X0 Z0 T0000 M09
    M30
```

```
        %

G00 X0 Z0 T0000 M09
 5      M05

G74
        L
        D
10      G71
        H
        D
        F
        G73
15      D
        K
        I
        NLAP2 G81

20      G80
        G85 NLAP2 U0.0100 W0.0020
        G87 NLAP2 U0 W0

25      NLAP1 G81

G80
        G85 NLAP1 U0.0100 W0.0020
        G87 NLAP1 U0 W0
30

F
        Dia
        Dia
35      False
        False
        4
        4
        Form=FORM2.FRM
40      Module=Module1; STARTUP.BAS
        Form=FRMPSTOU.FRM
        Object={F9043C88-F6F2-101A-A3C9-08002B2F49FB}#1.0#0; COMDLG16.OCX
        Object={BDC217C8-ED16-11CD-956C-0000C04E4C0A}#1.0#0; TABCTL16.OCX
        Object={FAEEE763-117E-101B-8933-08002B2F4F5A}#1.0#0; DBLIST16.OCX
45      Object={00028C01-0000-0000-0000-000000000046}#1.0#0; DBGRID16.OCX
        Reference="\G{BEF6E001-A874-101A-8BBA-00AA00300CAB}#1.0#0#C:\WINDOWS\SYSTEM\OC25.DLL#Standard OLE Types
        Reference="\G{00025E01-0000-0000-C000-000000000046}#2.5#0#C:\WINDOWS\SYSTEM\DAO2516.DLL#Microsoft DAO 2.5
        Object Library
        Object={0BA686C6-F7D3-101A-993E-0000C0EF6F5E}#1.0#0; THREED16.OCX
50      ProjWinSize=72,427,213,115
        ProjWinShow=2
        IconForm="Form2"
        HelpFile=""
        ExeName="QPOST.EXE"
55      Name="Qpost"
        HelpContextID="0"
        StartMode=0
        VersionCompatible="0"
        MajorVer=1
60      MinorVer=0
        RevisionVer=0
        AutoIncrementVer=0
        ServerSupportFiles=0
        VersionCompanyName="Jeff Rowlette"
65      Attribute VB_Name = "Module1"

Sub main()

Load Form1
70
        Form1.Visible = True

Load frmPstout
```

```
        frmPstout.Visible = True

Unload Form1

End Sub

' This code checks to see if a file exists
                        ' and then prompts you for a response...

Dim RetVal
        On Error Resume Next
        CommonDialog2.Filter = "post (*.pst)|*.pst|All Files (*.*)|*.*" ' Filters
        CommonDialog2.FilterIndex = 1  ' Sets *.pst as first choice
        CommonDialog2.Action = 2   ' Shows the "Save As" style box
        frmPstout.Label14 = CommonDialog2.filename Dim x As Integer x = FreeFile On Error Resume Next
        Open CommonDialog2.filename For Input As x
        If Err = 0 Then
            filename = True
        Else: filename = Not True
        Close x
        End If If filename = True Then   ' Must be a existing filename !
        Close x
        'MsgBox "FILENAME TRUE"
        GoTo 400
        End If If filename = Not True Then ' It must be a new file, save it !
        Close x
        'MsgBox "FILE NAME FALSE"
        GoTo 500
            Close x 400
        Const MB_OK = 0, MB_OKCANCEL = 1   ' Define buttons.
            Const MB_YESNOCANCEL = 3, MB_YESNO = 4
            Const MB_ICONSTOP = 16, MB_ICONQUESTION = 32   ' Define Icons.
            Const MB_ICONEXCLAMATION = 48, MB_ICONINFORMATION = 64
            Const MB_DEFBUTTON2 = 256, IDYES = 6, IDNO = 7 ' Define other.
            Dim DgDef, Msg, Response, Title ' Declare variables.
            Title = "File already exists !"
            ' Put together a sample message box with all the proper components.
            Msg = "File already exists" & Chr(13) + Chr(10)
            Msg = Msg & " Do you want to overwrite the file"
            DgDef = MB_YESNO + MB_ICONSTOP + MB_DEFBUTTON2 ' Describe dialog.

Response = MsgBox(Msg, DgDef, Title)   ' Get user response.
            If Response = IDNO Then   ' Evaluate response
                ' The user pressed the "No" button - do not overwrite the file
                GoTo 1001 ' and take appropriate
            Else  ' action.
                ' The user pressed the "Yes" button - overwrite the file...

End If

500
        'MsgBox "500 !!!"
        VERSION 4.00
        Begin VB.Form frmFind
            Caption      = "Find"
            ClientHeight = 1395
            ClientLeft   = 1875
            ClientTop    = 2745
```

```
ClientWidth     =   4950
BeginProperty Font
   name         =   "MS Sans Serif"
   charset      =   1
   weight       =   700
   size         =   8.25
   underline    =   0  'False
   italic       =   0  'False
   strikethrough =  0  'False
EndProperty
ForeColor       =   &H80000008&
Height          =   1920
Icon            =   "FIND.frx":0000
Left            =   1755
LinkTopic       =   "Form2"
LockControls    =   -1  'True
ScaleHeight     =   1395
ScaleWidth      =   4950
Top             =   2340
Width           =   5190
Begin VB.Frame Frame1
   Caption      =   "Direction"
   Height       =   612
   Left         =   1560
   TabIndex     =   3
   Top          =   720
   Width        =   2052
   Begin VB.OptionButton optDirection
      Caption   =   "&Down"
      Height    =   252
      Index     =   1
      Left      =   960
      TabIndex  =   5
      Top       =   240
      Value     =   -1  'True
      Width     =   852
   End
   Begin VB.OptionButton optDirection
      Caption   =   "&Up"
      Height    =   252
      Index     =   0
      Left      =   240
      TabIndex  =   4
      Top       =   240
      Width     =   612
   End
End
Begin VB.CheckBox chkCase
   Caption      =   "Match &Case"
   Height       =   495
   Left         =   120
   TabIndex     =   2
   Top          =   720
   Width        =   1335
End
Begin VB.TextBox Text1
   Height       =   375
   Left         =   1200
   TabIndex     =   1
   Top          =   240
   Width        =   2415
End
Begin VB.CommandButton cmdcancel
   Appearance   =   0  'Flat
   BackColor    =   &H80000005&
   Cancel       =   -1  'True
   Caption      =   "Cancel"
   Height       =   372
   Left         =   3720
   TabIndex     =   7
   Top          =   600
   Width        =   1092
End
Begin VB.CommandButton cmdFind
```

```
        Appearance      =  0  'Flat
        BackColor       =  &H80000005&
        Caption         =  "&Find"
        Default         =  -1  'True
        Height          =  372
        Left            =  3720
        TabIndex        =  6
        Top             =  120
        Width           =  1092
     End
     Begin VB.Label Label1
        Caption         =  "Fi&nd What:"
        Height          =  255
        Left            =  120
        TabIndex        =  0
        Top             =  240
        Width           =  975
     End
  End
Attribute VB_Name = "frmFind"
Attribute VB_Creatable = False
Attribute VB_Exposed = False Private Sub chkCase_Click()
    gFindCase = chkCase.Value
End Sub Private Sub cmdcancel_Click()
    gFindString = text1.Text
    gFindCase = chkCase.Value
    Unload frmFind
End Sub Private Sub cmdFind_Click()
    gFindString = text1.Text
    FindIt
End Sub Private Sub Form_Load()
    cmdFind.Enabled = False
    gFindDirection = 1
End Sub Private Sub optDirection_Click(index As Integer)
    gFindDirection = index
End Sub Private Sub Text1_Change()
    FirstTime = True If text1.Text = "" Then
        cmdFind.Enabled = False
    Else
        cmdFind.Enabled = True
    End If
End Sub VERSION 4.00
Begin VB.Form FRMBORING
   BorderStyle     =  3  'Fixed Dialog
   Caption         =  "Boring"
   ClientHeight    =  4650
   ClientLeft      =  1440
   ClientTop       =  1740
   ClientWidth     =  6555
   BeginProperty Font
      name         =  "MS Sans Serif"
      charset      =  1
      weight       =  700
      size         =  8.25
      underline    =  0  'False
      italic       =  0  'False
      strikethrough =  0  'False
```

```
EndProperty
   ForeColor       =   &H80000008&
   Height          =   5115
   Icon            =   "FRMBORIN.frx":0000
   Left            =   1380
   LinkTopic       =   "Form3"
   LockControls    =   -1  'True
   ScaleHeight     =   4650
   ScaleWidth      =   6555
   Top             =   1335
   Width           =   6675
   Begin VB.CheckBox Check1
      Caption      =   "Rough and Finish"
      BeginProperty Font
         name         =   "MS Sans Serif"
         charset      =   1
         weight       =   400
         size         =   8.25
         underline    =   0  'False
         italic       =   0  'False
         strikethrough =   0  'False
      EndProperty
      Height       =   375
      Left         =   4800
      TabIndex     =   33
      Top          =   2400
      Value        =   1  'Checked
      Visible      =   0  'False
      Width        =   1575
   End
   Begin VB.CheckBox Check2
      Caption      =   "Rough only"
      BeginProperty Font
         name         =   "MS Sans Serif"
         charset      =   1
         weight       =   400
         size         =   8.25
         underline    =   0  'False
         italic       =   0  'False
         strikethrough =   0  'False
      EndProperty
      Height       =   375
      Left         =   4800
      TabIndex     =   32
      Top          =   2760
      Visible      =   0  'False
      Width        =   1335
   End
   Begin VB.CheckBox Check3
      Caption      =   "Finish only"
      BeginProperty Font
         name         =   "MS Sans Serif"
         charset      =   1
         weight       =   400
         size         =   8.25
         underline    =   0  'False
         italic       =   0  'False
         strikethrough =   0  'False
      EndProperty
      Height       =   375
      Left         =   4800
      TabIndex     =   31
      Top          =   3120
      Visible      =   0  'False
      Width        =   1335
   End
   Begin VB.TextBox Text1
      BackColor    =   &H00FFFFFF&
      Height       =   285
      Left         =   1920
      MaxLength    =   20
      TabIndex     =   0
      Top          =   120
      Width        =   855
```

```
        End
     Begin VB.CheckBox chknlap
        Caption      =  "Canned Boring cycle"
        BeginProperty Font
           name       =  "MS Sans Serif"
           charset    =  1
           weight     =  400
           size       =  8.25
           underline  =  0  'False
           italic     =  0  'False
           strikethrough = 0  'False
        EndProperty
        Height    =  495
        Left      =  4320
        TabIndex  =  15
        Top       =  3480
        Width     =  1815
     End
     Begin VB.OptionButton Option1
        Caption      =  "One diameter"
        BeginProperty Font
           name       =  "MS Sans Serif"
           charset    =  1
           weight     =  400
           size       =  8.25
           underline  =  0  'False
           italic     =  0  'False
           strikethrough = 0  'False
        EndProperty
        Height    =  495
        Left      =  960
        TabIndex  =  13
        Top       =  3480
        Value     =  -1  'True
        Width     =  1575
     End
     Begin VB.OptionButton Option2
        Caption      =  "Two diameters"
        BeginProperty Font
           name       =  "MS Sans Serif"
           charset    =  1
           weight     =  400
           size       =  8.25
           underline  =  0  'False
           italic     =  0  'False
           strikethrough = 0  'False
        EndProperty
        Height    =  495
        Left      =  2640
        TabIndex  =  14
        Top       =  3480
        Width     =  1575
     End
     Begin VB.TextBox Text6
        BackColor    =  &H00FFFFFF&
        Height    =  285
        Left      =  1920
        MaxLength =  20
        TabIndex  =  1
        Top       =  600
        Width     =  855
     End
     Begin VB.CommandButton Command1
        Caption      =  "&Cancel"
        BeginProperty Font
           name       =  "MS Sans Serif"
           charset    =  1
           weight     =  400
           size       =  8.25
           underline  =  0  'False
           italic     =  0  'False
           strikethrough = 0  'False
        EndProperty
        Height    =  375
```

```
        Left         =   3600
        TabIndex     =   16
        Top          =   4080
        Width        =   975
     End
     Begin VB.CommandButton Command2
        BackColor    =   &H00C0C0C0&
        Caption      =   "&Write"
        BeginProperty Font
           name         =   "MS Sans Serif"
           charset      =   1
           weight       =   400
           size         =   8.25
           underline    =   0  'False
           italic       =   0  'False
           strikethrough =  0  'False
        EndProperty
        Height       =   375
        Left         =   2280
        TabIndex     =   12
        Top          =   4080
        Width        =   975
     End
     Begin VB.TextBox Text11
        BackColor    =   &H00FFFFFF&
        Height       =   285
        Left         =   1920
        MaxLength    =   20
        TabIndex     =   3
        Top          =   1560
        Width        =   855
     End
     Begin VB.TextBox Text12
        BackColor    =   &H00FFFFFF&
        Height       =   285
        Left         =   1920
        MaxLength    =   20
        TabIndex     =   4
        Top          =   2040
        Width        =   855
     End
     Begin VB.TextBox Text13
        BackColor    =   &H00FFFFFF&
        Height       =   285
        Left         =   4920
        MaxLength    =   20
        TabIndex     =   5
        Top          =   120
        Width        =   855
     End
     Begin VB.TextBox Text14
        BackColor    =   &H00FFFFFF&
        Height       =   285
        Left         =   4920
        MaxLength    =   20
        TabIndex     =   6
        Top          =   600
        Visible      =   0  'False
        Width        =   855
     End
     Begin VB.TextBox Text15
        BackColor    =   &H00FFFFFF&
        Height       =   285
        Left         =   4920
        MaxLength    =   20
        TabIndex     =   7
        Top          =   1080
        Visible      =   0  'False
        Width        =   855
     End
     Begin VB.TextBox Text17
        BackColor    =   &H00FFFFFF&
        Height       =   285
        Left         =   4920
```

```
            MaxLength    = 20
            TabIndex     = 9
            Top          = 2040
            Visible      = 0 'False
            Width        = 855
         End
         Begin VB.TextBox Text18
            BackColor    = &H00FFFFFF&
            Height       = 285
            Left         = 3360
            MaxLength    = 20
            TabIndex     = 10
            Top          = 2520
            Visible      = 0 'False
            Width        = 855
         End
         Begin VB.TextBox Text19
            BackColor    = &H00FFFFFF&
            Height       = 285
            Left         = 3360
            MaxLength    = 20
            TabIndex     = 11
            Top          = 3000
            Visible      = 0 'False
            Width        = 855
         End
         Begin VB.TextBox Text16
            BackColor    = &H00FFFFFF&
            Height       = 285
            Left         = 4920
            MaxLength    = 20
            TabIndex     = 8
            Top          = 1560
            Visible      = 0 'False
            Width        = 855
         End
         Begin VB.TextBox TEXT9
            BackColor    = &H00FFFFFF&
            Height       = 285
            Left         = 1920
            MaxLength    = 20
            TabIndex     = 2
            Top          = 1080
            Width        = 855
         End
         Begin VB.Label Label3
            Alignment    = 1  'Right Justify
            Caption      = "What size radius"
            BeginProperty Font
               name         = "MS Sans Serif"
               charset      = 1
               weight       = 400
               size         = 8.25
               underline    = 0 'False
               italic       = 0 'False
               strikethrough = 0 'False
            EndProperty
            Height       = 255
            Left         = 0
            TabIndex     = 30
            Top          = 2160
            Visible      = 0 'False
            Width        = 1815
         End
         Begin VB.Label Label2
            Alignment    = 1  'Right Justify
            Caption      = "Second dia. radius"
            BeginProperty Font
               name         = "MS Sans Serif"
               charset      = 1
               weight       = 400
               size         = 8.25
               underline    = 0 'False
               italic       = 0 'False
```

```
        strikethrough   =   0  'False
      EndProperty
      Height    =  255
      Left      =  3000
      TabIndex  =  29
      Top       =  1200
      Visible   =  0  'False
      Width     =  1815
   End
   Begin VB.Label Label1
      Alignment  =  1  'Right Justify
      Caption    =  "Drilled Hole Dia."
      BeginProperty Font
         name          =  "MS Sans Serif"
         charset       =  1
         weight        =  400
         size          =  8.25
         underline     =  0  'False
         italic        =  0  'False
         strikethrough =  0  'False
      EndProperty
      Height    =  255
      Left      =  480
      TabIndex  =  28
      Top       =  240
      Width     =  1335
   End
   Begin VB.Label Label6
      Alignment  =  1  'Right Justify
      Caption    =  "Diameter to bore"
      BeginProperty Font
         name          =  "MS Sans Serif"
         charset       =  1
         weight        =  400
         size          =  8.25
         underline     =  0  'False
         italic        =  0  'False
         strikethrough =  0  'False
      EndProperty
      Height    =  255
      Left      =  120
      TabIndex  =  17
      Top       =  720
      Width     =  1695
   End
   Begin VB.Label Label12
      Alignment  =  1  'Right Justify
      Caption    =  "What size chamfer"
      BeginProperty Font
         name          =  "MS Sans Serif"
         charset       =  1
         weight        =  400
         size          =  8.25
         underline     =  0  'False
         italic        =  0  'False
         strikethrough =  0  'False
      EndProperty
      Height    =  255
      Left      =  0
      TabIndex  =  21
      Top       =  2160
      Width     =  1815
   End
   Begin VB.Label Label11
      Alignment  =  1  'Right Justify
      Caption    =  "Feed rate for boring"
      BeginProperty Font
         name          =  "MS Sans Serif"
         charset       =  1
         weight        =  400
         size          =  8.25
         underline     =  0  'False
         italic        =  0  'False
         strikethrough =  0  'False
```

```
            EndProperty
            Height       = 255
            Left         = 0
            TabIndex     = 22
            Top          = 1680
            Width        = 1815
         End
         Begin VB.Label Label13
            Alignment    = 1  'Right Justify
            Caption      = "Tool nose radius"
            BeginProperty Font
               name       = "MS Sans Serif"
               charset    = 1
               weight     = 400
               size       = 8.25
               underline  = 0  'False
               italic     = 0  'False
               strikethrough = 0  'False
            EndProperty
            Height       = 255
            Left         = 3480
            TabIndex     = 23
            Top          = 240
            Width        = 1335
         End
         Begin VB.Label Label14
            Alignment    = 1  'Right Justify
            Caption      = " Second (small) diameter"
            BeginProperty Font
               name       = "MS Sans Serif"
               charset    = 1
               weight     = 400
               size       = 8.25
               underline  = 0  'False
               italic     = 0  'False
               strikethrough = 0  'False
            EndProperty
            Height       = 255
            Left         = 3000
            TabIndex     = 24
            Top          = 720
            Visible      = 0  'False
            Width        = 1815
         End
         Begin VB.Label Label15
            Alignment    = 1  'Right Justify
            Caption      = "Second dia. chamfer"
            BeginProperty Font
               name       = "MS Sans Serif"
               charset    = 1
               weight     = 400
               size       = 8.25
               underline  = 0  'False
               italic     = 0  'False
               strikethrough = 0  'False
            EndProperty
            Height       = 255
            Left         = 2880
            TabIndex     = 25
            Top          = 1200
            Visible      = 0  'False
            Width        = 1935
         End
         Begin VB.Label Label17
            Alignment    = 1  'Right Justify
            Caption      = "Second dia. feed"
            BeginProperty Font
               name       = "MS Sans Serif"
               charset    = 1
               weight     = 400
               size       = 8.25
               underline  = 0  'False
               italic     = 0  'False
               strikethrough = 0  'False
```

```
        EndProperty
        Height          =   255
        Left            =   3000
        TabIndex        =   26
        Top             =   2160
        Visible         =   0   'False
        Width           =   1815
     End
     Begin VB.Label Label18
        Alignment       =   1   'Right Justify
        Caption         =   "Roughing feed rate"
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   1440
        TabIndex        =   27
        Top             =   2640
        Visible         =   0   'False
        Width           =   1815
     End
     Begin VB.Label Label19
        Alignment       =   1   'Right Justify
        Caption         =   "Depth of cut"
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   2040
        TabIndex        =   18
        Top             =   3120
        Visible         =   0   'False
        Width           =   1215
     End
     Begin VB.Label Label16
        Alignment       =   1   'Right Justify
        Caption         =   "Z Depth of second Dia."
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   3000
        TabIndex        =   19
        Top             =   1680
        Visible         =   0   'False
        Width           =   1815
     End
     Begin VB.Label Label9
        Alignment       =   1   'Right Justify
        Caption         =   "Z depth to bore to"
        BeginProperty Font
           name         =   "MS Sans Serif"
           charset      =   1
           weight       =   400
           size         =   8.25
           underline    =   0   'False
```

```
            italic         = 0  'False
            strikethrough  = 0  'False
         EndProperty
         Height      = 255
         Left        = 0
         TabIndex    = 20
         Top         = 1200
         Width       = 1815
      End
   End
Attribute VB_Name = "FRMBORING"
Attribute VB_Creatable = False
Attribute VB_Exposed = False Private Sub chk1dia_Click()
Label14.Visible = False
TEXT14.Visible = False
Label15.Visible = False
text15.Visible = False
Label16.Visible = False
TEXT16.Visible = False
Label17.Visible = False
Text17.Visible = False
End Sub Private Sub chk2dia_Click()
Label14.Visible = True
TEXT14.Visible = True
Label15.Visible = True
text15.Visible = True
Label16.Visible = True
TEXT16.Visible = True
Label17.Visible = True
Text17.Visible = True
End Sub Private Sub check1_Click()
If check1 = 1 Then
Check2 = 0
Check3 = 0
End If
End Sub Private Sub Check2_Click()
If Check2 = 1 Then
check1 = 0
Check3 = 0
End If
End Sub Private Sub Check3_Click()

' Check to see if first edge break is radius or chamfer.
If Label3.Visible = True Then
br_first_brk_rad = True
br_first_brk_cham = False
End If ' Check to see if first edge break is radius or chamfer.
If Label12.Visible = True Then
br_first_brk_cham = True
br_first_brk_rad = False
End If ' Check to see if second edge break is radius or chamfer.
If label2.Visible = True Then
br_second_brk_rad = True
br_second_brk_cham = False
End If ' Check to see if second edge break is radius or chamfer.
If Label15.Visible = True Then
br_second_brk_cham = True
br_second_brk_rad = False
```

```
                End If

' User wants "Finish cycle only", then make everything
        ' you dont need invisible.
        If Check3 = 1 Then
            Check2 = 0
            check1 = 0
            label1.Visible = True
            Label3.Visible = False
            Label12.Visible = False
            Label6.Visible = False
            text6.Visible = False
            Label9.Visible = False
            text9.Visible = False
            Label11.Visible = False
            text11.Visible = False
            Label18.Visible = False
            Text18.Visible = False
            Label19.Visible = False
            Text19.Visible = False
            label1.Visible = False
            text12.Visible = False
            Label13.Visible = False
            text13.Visible = False
            Option1.Visible = False
            option2.Visible = False
            Label14.Visible = False
            TEXT14.Visible = False
            Label15.Visible = False
            text15.Visible = False
            Label16.Visible = False
            TEXT16.Visible = False
            Label17.Visible = False
            Text17.Visible = False
            label2.Visible = False
            check1.Visible = False
            Check2.Visible = False
        End If ' The user turned off the "Finish cycle only" option.
        ' Make that shit visible again !...
        If Check3 = 0 Then
            label1.Visible = True
            Label6.Visible = True
            text6.Visible = True
            Label9.Visible = True
            text9.Visible = True
            Label11.Visible = True
            text11.Visible = True
            Label18.Visible = True
            Text18.Visible = True
            Label19.Visible = True
            Text19.Visible = True
            label1.Visible = True
            text12.Visible = True
            Label13.Visible = True
            text13.Visible = True
            Option1.Visible = True
            option2.Visible = True
            check1 = 1
            check1.Visible = True
            Check2.Visible = True
        End If ' User turned off "Finish cycle only" - fix everything
        ' back up for one diameter...
        If Check3 = 0 Then
            If Option1 = True Then
                If option2 = False Then If br_first_brk_rad = True Then
```

```
            Label3.Visible = True
            Label12.Visible = False
        End If If br_first_brk_cham = True Then
            Label12.Visible = True
            Label3.Visible = False
        End If Label14.Visible = False
        TEXT14.Visible = False
        Label15.Visible = False
        text15.Visible = False
        Label16.Visible = False
        TEXT16.Visible = False
        Label17.Visible = False
        Text17.Visible = False
        label2.Visible = False
        Label6.Caption = "Diameter To Bore"
        Label9.Caption = "Z depth to Bore to"
      End If
    End If
End If ' User turned off "Finish cycle only" - fix everything
' up for using two diameters...
If Check3 = 0 Then
    If option2 = True Then
        If Option1 = False Then If br_first_brk_rad = True Then
                Label3.Visible = True
                Label12.Visible = False
            End If If br_first_brk_cham = True Then
                Label12.Visible = True
                Label3.Visible = False
            End If If br_second_brk_rad = True Then
                label2.Visible = True
                Label15.Visible = False
            End If If br_second_brk_cham = True Then
                Label15.Visible = True
                label2.Visible = False
            End If Label14.Visible = True
            TEXT14.Visible = True
            text15.Visible = True
            Label16.Visible = True
            TEXT16.Visible = True
            Label17.Visible = True
            Text17.Visible = True
            Label6.Caption = "First (large) Diameter"
            Label9.Caption = "First Z Depth"
        End If
    End If
End If label1.Visible = True
End Sub Private Sub chknlap_Click()

' Check to see if first edge break is radius or chamfer.
If Label3.Visible = True Then
br_first_brk_rad = True
br_first_brk_cham = False
End If
```

```
' Check to see if first edge break is radius or chamfer.
If Label12.Visible = True Then
    br_first_brk_cham = True
    br_first_brk_rad = False
End If ' Check to see if second edge break is radius or chamfer.
If label2.Visible = True Then
    br_second_brk_rad = True
    br_second_brk_cham = False
End If ' Check to see if second edge break is radius or chamfer
If Label15.Visible = True Then
    br_second_brk_cham = True
    br_second_brk_rad = False
End If ' The user turned off the canned cycle option.
' Make all this shit visible...!
If chknlap = 0 Then
    Label6.Visible = True
    text6.Visible = True
    Label9.Visible = True
    text9.Visible = True
    Label11.Visible = True
    text11.Visible = True
    Label18.Visible = True
    Text18.Visible = True
    Label19.Visible = True
    Text19.Visible = True
    label1.Visible = True
    text12.Visible = True
    Label13.Visible = True
    text13.Visible = True
    Option1.Visible = True
    option2.Visible = True
    check1 = 1
    check1.Visible = True
    Check2.Visible = True
End If ' Fix everything up for one diameter..
If Option1 = True Then
    If option2 = False Then If br_first_brk_rad = True Then
            Label3.Visible = True
            Label12.Visible = False
        End If If br_first_brk_cham = True Then
            Label12.Visible = True
            Label3.Visible = False
        End If Label14.Visible = False
        TEXT14.Visible = False
        Label15.Visible = False
        text15.Visible = False
        Label16.Visible = False
        TEXT16.Visible = False
        Label17.Visible = False
        Text17.Visible = False
        label2.Visible = False
        Label6.Caption = "Diameter To Bore"
        Label9.Caption = "Z depth to Bore to"
    End If
End If ' Fix everything up for two diameters...
```

```
If option2 = True Then
    If Option1 = False Then

If br_first_brk_rad = True Then
            Label3.Visible = True
            Label12.Visible = False
        End If If br_first_brk_cham = True Then
            Label12.Visible = True
            Label3.Visible = False
        End If If br_second_brk_rad = True Then
            label2.Visible = True
            Label15.Visible = False
        End If If br_second_brk_cham = True Then
            Label15.Visible = True
            label2.Visible = False
        End If Label14.Visible = True
        TEXT14.Visible = True
        text15.Visible = True
        Label16.Visible = True
        TEXT16.Visible = True
        Label17.Visible = True
        Text17.Visible = True
        Label6.Caption = "First (large) Diameter"
        Label9.Caption = "First Z Depth"
    End If
End If ' This makes everything for the canned cycle visible...
If chknlap.Value = 1 Then
    check1.Visible = True
    Check2.Visible = True
    Check3.Visible = True
    Label18.Visible = True
    Text18.Visible = True
    Label19.Visible = True
    Text19.Visible = True
    Label18.Visible = True
    Text18.Visible = True
    Label19.Visible = True
    Text19.Visible = True
End If ' This makes everything for the canned cycle invisible...
If chknlap.Value = 0 Then
    check1.Visible = False
    Check2.Visible = False
    Check3.Visible = False
    Label18.Visible = False
    Text18.Visible = False
    Label19.Visible = False
    Text19.Visible = False
    Label18.Visible = False
    Text18.Visible = False
    Label19.Visible = False
    Text19.Visible = False
End If End Sub Private Sub chknonlap_Click()
Label18.Visible = False
Text18.Visible = False
Label19.Visible = False
Text19.Visible = False
End Sub
```

```
Private Sub Command1_Click()
FRMBORING.Visible = False
frmMDI.ActiveForm.ActiveControl.SetFocus ' RETURNS THE CURSER TO THE SCREEN
End Sub Private Sub Command2_Click()

Screen.MousePointer = 11

If TEXT1.Visible = True And TEXT1.Text = "" Then
Bore_Error_Blank_Text_Box
GoTo 650
End If If text6.Visible = True And text6.Text = "" Then
Bore_Error_Blank_Text_Box
GoTo 650
End If If text9.Visible = True And text9.Text = "" Then
Bore_Error_Blank_Text_Box
GoTo 650
End If If text11.Visible = True And text11.Text = "" Then
Bore_Error_Blank_Text_Box
GoTo 650
End If If text12.Visible = True And text12.Text = "" Then
Bore_Error_Blank_Text_Box
GoTo 650
End If If text13.Visible = True And text13.Text = "" Then
Bore_Error_Blank_Text_Box
GoTo 650
End If If TEXT14.Visible = True And TEXT14.Text = "" Then
Bore_Error_Blank_Text_Box
GoTo 650
End If If text15.Visible = True And text15.Text = "" Then
Bore_Error_Blank_Text_Box
GoTo 650
End If If TEXT16.Visible = True And TEXT16.Text = "" Then
Bore_Error_Blank_Text_Box
GoTo 650
End If If Text17.Visible = True And Text17.Text = "" Then
Bore_Error_Blank_Text_Box
GoTo 650
End If If Text18.Visible = True And Text18.Text = "" Then
Bore_Error_Blank_Text_Box
GoTo 650
End If If Text19.Visible = True And Text19.Text = "" Then
Bore_Error_Blank_Text_Box
GoTo 650
End If If option2.Value = True Then If ((TEXT14.Text * 2) / 2) > ((text6.Text * 2) / 2) Then
    MsgBox "The second diameter is larger" & Chr(13) + Chr(10) & "than the first diameter !", 48, "Bore Alert !"
    GoTo 650
```

```
        End If

End If

Dim TEXT2 As Double ' Used for "Z0.0500"
Dim TEXT3 As Double ' Used for feed rates
Dim TEXT4 As Double ' Used for feed rates
Dim TEXT5 As Double   ' Used for feed rates
TEXT2 = 0.05
TEXT3 = 0.0025
TEXT4 = 0.01
TEXT5 = 0.002

1700 FRMBORING.Visible = False

If Label12.Visible = True Then
Comp = text13.Text * 0.53 ' Calculates comp for first chamfer
EdgeBreak_1 = text12.Text + Comp
End If If Label3.Visible = True Then
Comp = text13.Text * 1 ' Calculates comp for first radius
EdgeBreak_1 = text12.Text + Comp
End If DIA1 = TEXT1.Text - 0.1 ' Drilled hole diameter minus 0.1000
DIA2 = TEXT1.Text - 0.02 ' Drilled hole diameter minus 0.0200

EdgeBreak_Dia = text6.Text + (EdgeBreak_1 * 2) ' Calculates diameter to start edge break Screen.MousePointer = 11

'————————————————————————————————————
'           Start CNC program here !
'————————————————————————————————————

'       Rapid to the part
Clipboard.Clear
Clipboard.SetText Rapid & XCode & Format(DIA2, formats) & " Z" & Format(TEXT2, formats) & Chr(13) & Chr(10)
editpasteproc '     'Check to see if the user only wants a finish cycle
If Check3 = 1 Then ' Check3 is finish cycle only
    If Not ID_Bore_Cycle_Line_5 = "" Then
    Clipboard.SetText ID_Bore_Cycle_Line_5 & Chr(13) + Chr(10)
    editpasteproc
    End If
Clipboard.SetText Rapid & "Z" & Format(TEXT2, formats) & Chr(13) & Chr(10)
editpasteproc
GoTo 100
End If '————————————————————————————————————
'                   'Canned cycle
'       Check to see if user wants a canned rough cycle
If chknlap = 1 Then ' If they used the first text box, paste it...
    If Not ID_Bore_Cycle_Line_1 = "" Then
    Clipboard.SetText ID_Bore_Cycle_Line_1
    editpasteproc
    End If ' If the first text box was selected for "D & F" ...
    If ID_Line_Depth_and_Feed = "1" Then
    Clipboard.SetText " D" & Format(Text19.Text, formats) & " F" & Format(Text18.Text, formats) & Chr(13) + Chr(10)
    editpasteproc
    Else
```

```
            If Not ID_Bore_Cycle_Line_1 = "" Then
                Clipboard.SetText Chr(13) + Chr(10)
                editpasteproc
            End If
        End If ' If they used the second text box, paste it...
        If Not ID_Bore_Cycle_Line_2 = "" Then
            Clipboard.SetText ID_Bore_Cycle_Line_2
            editpasteproc
        End If ' If the second text box was selected for "D & F" ...
        If ID_Line_Depth_and_Feed = "2" Then
            Clipboard.SetText " D" & Format(Text19.Text, formats) & " F" & Format(Text18.Text, formats) & Chr(13) + Chr(10)
            editpasteproc
        Else
            If Not ID_Bore_Cycle_Line_2 = "" Then
                Clipboard.SetText Chr(13) + Chr(10)
                editpasteproc
            End If
        End If ' If user is numbering first and last lines of canned cycle
        If chknlap = 1 Then
            If Not ID_Bore_Cycle_Line_6 = "" Then
                Clipboard.SetText ID_Bore_Cycle_Line_6
                editpasteproc
            End If
        End If If Label12.Visible = True And Label3.Visible = False Then    ' If user wants first and/only dia. chamfer
            EdgeBkeak_Dia = (EdgeBreak_Dia - 0.0002) ' Chamfers need an extra "tenth" !
            Clipboard.SetText Rapid & XCode & Format(EdgeBreak_Dia, formats) & " Z" & Format(TEXT2, formats) & Chr(13) & Chr(10)
            editpasteproc
        End If If Label3.Visible = True And Label12.Visible = False Then    ' If user wants first and/only dia. radius
            Clipboard.SetText Rapid & XCode & Format(EdgeBreak_Dia, formats) & " Z" & Format(TEXT2, formats) & Chr(13) & Chr(10)
            editpasteproc
        End If End If
    '_____ End of start of canned cycle _____

'_____
    ' Without canned cycle
    If Label12.Visible = True And Label3.Visible = False Then    ' If user wants first and/only dia. chamfer
        EdgeBkeak_Dia = (EdgeBreak_Dia + 0.0002) ' Chamfers need an extra "tenth" !
        Clipboard.SetText XCode & Format(EdgeBreak_Dia, formats) & Chr(13) & Chr(10)
        editpasteproc
    End If If Label3.Visible = True And Label12.Visible = False Then    ' If user wants first and/only dia. radius
        Clipboard.SetText XCode & Format(EdgeBreak_Dia, formats) & Chr(13) & Chr(10)
        editpasteproc
    End If ' G01 "Z0"
    Clipboard.SetText Feed & "Z0 F" & Format(TEXT3, formats) & Chr(13) & Chr(10)
    editpasteproc ' First edge break If Label12.Visible = True And Label3.Visible = False Then  ' First chamfer
        Clipboard.SetText G_Code_Chamfer & XCode & Format(text6.Text, formats) & " " & Chamfer_Z & "-" & Format(EdgeBreak_1, formats) _
        & " F" & Format(TEXT3, formats) & Chr(13) & Chr(10)
        editpasteproc
    End If
```

```
        If Label3.Visible = True And Label12.Visible = False Then    ' First radius
        Clipboard.SetText G_Code_Radius & XCode & Format(text6.Text, formats) & " " & Rad_Z & "-" & Format(EdgeBreak_1, formats) & " F"
        & Format(TEXT3, formats) & Chr(13) & Chr(10)
        editpasteproc
        End If ' Feed Back in "Z" - First and/or only depth
        Clipboard.SetText "Z-" & Format(text9.Text, formats) & " F" & Format(text11.Text, formats) & Chr(13) & Chr(10)
        editpasteproc ' Check to see if the user wants two diameters If option2 = True Then
            ' Declare EdgeBreak_2
        If Label15.Visible = True Then   ' Chamfer second diameter
        Comp = (text13.Text * 0.53) ' Calculates comp for second chamfer
        EdgeBreak_2 = (text15.Text + Comp)
        Clipboard.SetText G_Code_Chamfer & XCode & Format(TEXT14.Text, formats) & " " & Chamfer_Z & "-" & Format(EdgeBreak_2,
        formats) & " F" & Format(TEXT3, formats) & Chr(13) & Chr(10)
        editpasteproc
        Clipboard.SetText "Z-" & Format(TEXT16.Text, formats) & " F" & Format(Text17.Text, formats) & Chr(13) & Chr(10)
        editpasteproc
        End If If label2.Visible = True Then   ' Radius second diameter
        Comp = (text13.Text * 1) ' Calculates comp for second radius
        EdgeBreak_2 = (text15.Text + Comp)
        Clipboard.SetText G_Code_Radius & XCode & Format(TEXT14.Text, formats) & " " & Rad_Z & "-" & Format(EdgeBreak_2, formats) & "
        F" & Format(TEXT3, formats) & Chr(13) & Chr(10)
        editpasteproc
        Clipboard.SetText "Z-" & Format(TEXT16.Text, formats) & " F" & Format(Text17.Text, formats) & Chr(13) & Chr(10)
        editpasteproc
        End If End If          ' End of second diameter ' If user is numbering first and last lines of canned cycle
        If chknlap = 1 Then
            If Not ID_Bore_Cycle_Line_7 = "" Then
            Clipboard.SetText ID_Bore_Cycle_Line_7
            editpasteproc
            End If
        End If ' Feed down past the drilled hole diameter
        Clipboard.SetText XCode & Format(DIA2, formats) & " F" & Format(TEXT4, formats) & Chr(13) & Chr(10)
        editpasteproc ' Check to see if user is using the canned cycle
        If chknlap = 1 Then ' If they used the third text box, paste it...
        If Not ID_Bore_Cycle_Line_3 = "" Then
        Clipboard.SetText ID_Bore_Cycle_Line_3
        editpasteproc
        End If ' If the third text box was selected for "D & F"
            If ID_Line_Depth_and_Feed = "3" Then
            Clipboard.SetText " D" & Format(Text19.Text, formats) & " F" & Format(Text18.Text, formats) & Chr(13) + Chr(10)
            editpasteproc
            ' Rapid to "Z0.0500"
            Clipboard.SetText Rapid & "Z" & Format(TEXT2, formats) & Chr(13) & Chr(10)
            editpasteproc
            Else
            If Not ID_Bore_Cycle_Line_3 = "" Then
            Clipboard.SetText Chr(13) + Chr(10)
            editpasteproc
            End If
            End If Clipboard.SetText Rapid & "Z" & Format(TEXT2, formats) & Chr(13) & Chr(10)
```

```
editpasteproc

' If they used the fourth text box, paste it...
    If Not ID_Bore_Cycle_Line_4 = "" Then
    Clipboard.SetText ID_Bore_Cycle_Line_4
    editpasteproc
    End If ' If the fourth text box was selected for "D & F"...
        If ID_Line_Depth_and_Feed = "4" Then
        Clipboard.SetText " D" & Format(Text19.Text, formats) & " F" & Format(Text18.Text, formats) & Chr(13) + Chr(10)
        editpasteproc
        ' Rapid to "Z0.0500"
        Clipboard.SetText Rapid & "Z" & Format(TEXT2, formats) & Chr(13) & Chr(10)
        editpasteproc
        Else
        If Not ID_Bore_Cycle_Line_4 = "" Then
        Clipboard.SetText Chr(13) + Chr(10)
        editpasteproc
        End If
Clipboard.SetText Rapid & "Z" & Format(TEXT2, formats) & Chr(13) & Chr(10)
editpasteproc
        End If ' if the user only wants a rough cycle, then skip to the end...
    If Check2 = 1 Then
    GoTo 100
    End If If Not ID_Bore_Cycle_Line_5 = "" Then
        Clipboard.SetText ID_Bore_Cycle_Line_5 & Chr(13) + Chr(10)
        editpasteproc
        End If Clipboard.SetText Rapid & "Z" & Format(TEXT2, formats) & Chr(13) & Chr(10)
editpasteproc
End If ' If no canned cycle - "G00 Z0.0500"
        If chknlap = 0 Then
Clipboard.SetText Rapid & "Z" & Format(TEXT2, formats) & Chr(13) & Chr(10)
editpasteproc
End If Clipboard.Clear Screen.MousePointer = 0
100
651
FRMBORING.Visible = False
650

Screen.MousePointer = 0 frmMDI.ActiveForm.ActiveControl.SetFocus ' RETURNS THE CURSER TO THE SCREEN

End Sub

Private Sub Form_Deactivate()
Visible = False
frmMDI.ActiveForm.ActiveControl.SetFocus ' RETURNS THE CURSER TO THE SCREEN
End Sub Private Sub Form_Load()
    If WindowState = 0 Then
        Move (Screen.Width - FRMBORING.Width) / 2, (Screen.Height - FRMBORING.Height) / 2
    End If End Sub Private Sub Form_Paint()
```

```
        If WindowState = 0 Then
            Move (Screen.Width - FRMBORING.Width) / 2, (Screen.Height - FRMBORING.Height) / 2
        End If
    End Sub Private Sub Form_Resize()
        If WindowState = 0 Then
            Move (Screen.Width - FRMBORING.Width) / 2, (Screen.Height - FRMBORING.Height) / 2
        End If End Sub Private Sub opt1dia_Click()
    Label13.Visible = False
    text13.Visible = False
    Label14.Visible = False
    TEXT14.Visible = False
    Label15.Visible = False
    text15.Visible = False
    'label7.Visible = False
    'text7.Visible = False
    End Sub Private Sub opt2dia_Click()
    Label13.Visible = True
    text13.Visible = True
    Label14.Visible = True
    TEXT14.Visible = True
    Label15.Visible = True
    text15.Visible = True
    'label7.Visible = True
    'text7.Visible = True
    End Sub Private Sub Label12_DblClick()
    Label12.Visible = False
    Label3.Visible = True
    End Sub Private Sub Label15_DblClick()
    Label15.Visible = False
    label2.Visible = True
    End Sub Private Sub label2_DblClick()
    label2.Visible = False
    Label15.Visible = True
    End Sub Private Sub Label3_DblClick()
    Label3.Visible = False
    Label12.Visible = True
    End Sub Private Sub Option1_Click()

' Check to see if first edge break is radius or chamfer.
    If Label3.Visible = True Then
    br_first_brk_rad = True
    br_first_brk_cham = False
    End If ' Check to see if first edge break is radius or chamfer.
    If Label12.Visible = True Then
    br_first_brk_cham = True
    br_first_brk_rad = False
    End If ' Check to see if second edge break is radius or chamfer.
```

```
If label2.Visible = True Then
    br_second_brk_rad = True
    br_second_brk_cham = False
End If ' Check to see if second edge break is radius or chamfer
If Label15.Visible = True Then
    br_second_brk_cham = True
    br_second_brk_rad = False
End If Label14.Visible = False
TEXT14.Visible = False
Label15.Visible = False
text15.Visible = False
Label16.Visible = False
TEXT16.Visible = False
Label17.Visible = False
Text17.Visible = False
label2.Visible = False Label6.Caption = "Diameter to Bore"
Label9.Caption = "Z depth to Bore to"

End Sub

Private Sub option2_Click()

Label14.Visible = True
TEXT14.Visible = True
Label15.Visible = True
text15.Visible = True
Label16.Visible = True
TEXT16.Visible = True
Label17.Visible = True
Text17.Visible = True If br_second_brk_rad = True Then
    label2.Visible = True
    Label15.Visible = False
End If If br_second_brk_cham = True Then
    Label15.Visible = True
    label2.Visible = False
End If Label6.Caption = "First (large) Diameter"
Label9.Caption = "Z Depth of first Dia."

End Sub

Private Sub optnlap_Click()
Label16.Visible = True
TEXT16.Visible = True
Label17.Visible = True
Text17.Visible = True
End Sub Private Sub Text1_KeyPress(KeyAscii As Integer)

If KeyAscii = (13) Then
    SendKeys ("{tab}"), True
End If

Const DECIMAL_OK = -1     ' 0 = no, -1 = YES
Const MIN_VALUE = -999    ' Minimum value
Const MAX_VALUE = 999     ' Maximum value
key$ = Chr$(KeyAscii)     ' Convert to string
Select Case key$
    Case "0" To "9"       ' Numbers and minus signs
        Newvalue = Val(Left$(TEXT1.Text, TEXT1.SelStart) + key$ + Mid$(TEXT1.Text, TEXT1.SelStart + TEXT1.SelLength + 1))
```

```
        If Newvalue > MAX_VALUE Or Newvalue < MIN_VALUE Then
            KeyAscii = 0
        End If
        Case "."
            If DECIMAL_OK = 0 Or InStr(TEXT1.Text, ".") Then
                KeyAscii = 0
            End If
        Case Chr$(8)           ' Backspace
        Case Else
            KeyAscii = 0
    End Select
    If key$ = "-" And (InStr(TEXT1.Text, "-") Or TEXT1.SelStart <> 0) Then
        KeyAscii = 0
    End If
End Sub Private Sub Text11_KeyPress(KeyAscii As Integer)

If KeyAscii = (13) Then
    SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text11.Text, text11.SelStart) + key$ + Mid$(text11.Text, text11.SelStart + text11.SelLength + 1))
            If Newvalue > MAX_VALUE Or Newvalue < MIN_VALUE Then
                KeyAscii = 0
            End If
        Case "."
            If DECIMAL_OK = 0 Or InStr(text11.Text, ".") Then
                KeyAscii = 0
            End If
        Case Chr$(8)           ' Backspace
        Case Else
            KeyAscii = 0
    End Select
    If key$ = "-" And (InStr(text11.Text, "-") Or text11.SelStart <> 0) Then
        KeyAscii = 0
    End If
End Sub Private Sub Text12_KeyPress(KeyAscii As Integer)

If KeyAscii = (13) Then
    SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text12.Text, text12.SelStart) + key$ + Mid$(text12.Text, text12.SelStart + text12.SelLength + 1))
            If Newvalue > MAX_VALUE Or Newvalue < MIN_VALUE Then
                KeyAscii = 0
            End If
        Case "."
            If DECIMAL_OK = 0 Or InStr(text12.Text, ".") Then
                KeyAscii = 0
            End If
        Case Chr$(8)           ' Backspace
        Case Else
            KeyAscii = 0
    End Select
    If key$ = "-" And (InStr(text12.Text, "-") Or text12.SelStart <> 0) Then
        KeyAscii = 0
    End If
```

```
    End Sub

Private Sub Text13_KeyPress(KeyAscii As Integer)

If KeyAscii = (13) Then
            SendKeys ("{tab}"), True
        End If

Const DECIMAL_OK = -1      ' 0 = no, -1 = YES
        Const MIN_VALUE = -999     ' Minimum value
        Const MAX_VALUE = 999      ' Maximum value
        key$ = Chr$(KeyAscii)      ' Convert to string
        Select Case key$
            Case "0" To "9"        ' Numbers and minus signs
                Newvalue = Val(Left$(text13.Text, text13.SelStart) + key$ + Mid$(text13.Text, text13.SelStart + text13.SelLength + 1))
                If Newvalue > MAX_VALUE Or Newvalue < MIN_VALUE Then
                    KeyAscii = 0
                End If
            Case "."
                If DECIMAL_OK = 0 Or InStr(text13.Text, ".") Then
                    KeyAscii = 0
                End If
            Case Chr$(8)           ' Backspace
            Case Else
                KeyAscii = 0
        End Select
        If key$ = "-" And (InStr(text13.Text, "-") Or text13.SelStart <> 0) Then
            KeyAscii = 0
        End If
    End Sub Private Sub Text14_KeyPress(KeyAscii As Integer)

If KeyAscii = (13) Then
            SendKeys ("{tab}"), True
        End If

Const DECIMAL_OK = -1      ' 0 = no, -1 = YES
        Const MIN_VALUE = -999     ' Minimum value
        Const MAX_VALUE = 999      ' Maximum value
        key$ = Chr$(KeyAscii)      ' Convert to string
        Select Case key$
            Case "0" To "9"        ' Numbers and minus signs
                Newvalue = Val(Left$(TEXT14.Text, TEXT14.SelStart) + key$ + Mid$(TEXT14.Text, TEXT14.SelStart + TEXT14.SelLength + 1))
                If Newvalue > MAX_VALUE Or Newvalue < MIN_VALUE Then
                    KeyAscii = 0
                End If
            Case "."
                If DECIMAL_OK = 0 Or InStr(TEXT14.Text, ".") Then
                    KeyAscii = 0
                End If
            Case Chr$(8)           ' Backspace
            Case Else
                KeyAscii = 0
        End Select
        If key$ = "-" And (InStr(TEXT14.Text, "-") Or TEXT14.SelStart <> 0) Then
            KeyAscii = 0
        End If
    End Sub Private Sub Text15_KeyPress(KeyAscii As Integer)

If KeyAscii = (13) Then
            SendKeys ("{tab}"), True
        End If

Const DECIMAL_OK = -1      ' 0 = no, -1 = YES
        Const MIN_VALUE = -999     ' Minimum value
        Const MAX_VALUE = 999      ' Maximum value
        key$ = Chr$(KeyAscii)      ' Convert to string
        Select Case key$
```

```
        Case "0" To "9"          ' Numbers and minus signs
          Newvalue = Val(Left$(text15.Text, text15.SelStart) + key$ + Mid$(text15.Text, text15.SelStart + text15.SelLength + 1))
          If Newvalue > MAX_VALUE Or Newvalue < MIN_VALUE Then
            KeyAscii = 0
          End If
        Case "."
          If DECIMAL_OK = 0 Or InStr(text15.Text, ".") Then
            KeyAscii = 0
          End If
        Case Chr$(8)              ' Backspace
        Case Else
          KeyAscii = 0
      End Select
      If key$ = "-" And (InStr(text15.Text, "-") Or text15.SelStart <> 0) Then
        KeyAscii = 0
      End If
    End Sub Private Sub text16_KeyPress(KeyAscii As Integer)

If KeyAscii = (13) Then
      SendKeys ("{tab}"), True
      End If

Const DECIMAL_OK = -1         ' 0 = no, -1 = YES
      Const MIN_VALUE = -999        ' Minimum value
      Const MAX_VALUE = 999         ' Maximum value
        key$ = Chr$(KeyAscii)       ' Convert to string
      Select Case key$
        Case "0" To "9"             ' Numbers and minus signs
          Newvalue = Val(Left$(TEXT16.Text, TEXT16.SelStart) + key$ + Mid$(TEXT16.Text, TEXT16.SelStart + TEXT16.SelLength + 1))
          If Newvalue > MAX_VALUE Or Newvalue < MIN_VALUE Then
            KeyAscii = 0
          End If
        Case "."
          If DECIMAL_OK = 0 Or InStr(TEXT16.Text, ".") Then
            KeyAscii = 0
          End If
        Case Chr$(8)              ' Backspace
        Case Else
          KeyAscii = 0
      End Select
      If key$ = "-" And (InStr(TEXT16.Text, "-") Or TEXT16.SelStart <> 0) Then
        KeyAscii = 0
      End If
    End Sub Private Sub Text17_KeyPress(KeyAscii As Integer)

If KeyAscii = (13) Then
      SendKeys ("{tab}"), True
      End If

Const DECIMAL_OK = -1         ' 0 = no, -1 = YES
      Const MIN_VALUE = -999        ' Minimum value
      Const MAX_VALUE = 999         ' Maximum value
        key$ = Chr$(KeyAscii)       ' Convert to string
      Select Case key$
        Case "0" To "9"             ' Numbers and minus signs
          Newvalue = Val(Left$(Text17.Text, Text17.SelStart) + key$ + Mid$(Text17.Text, Text17.SelStart + Text17.SelLength + 1))
          If Newvalue > MAX_VALUE Or Newvalue < MIN_VALUE Then
            KeyAscii = 0
          End If
        Case "."
          If DECIMAL_OK = 0 Or InStr(Text17.Text, ".") Then
            KeyAscii = 0
          End If
        Case Chr$(8)              ' Backspace
        Case Else
          KeyAscii = 0
      End Select
      If key$ = "-" And (InStr(Text17.Text, "-") Or Text17.SelStart <> 0) Then
```

```
            KeyAscii = 0
        End If
    End Sub

Private Sub Text18_KeyPress(KeyAscii As Integer)

If KeyAscii = (13) Then
            SendKeys ("{tab}"), True
        End If

Const DECIMAL_OK = -1          ' 0 = no, -1 = YES
        Const MIN_VALUE = -999         ' Minimum value
        Const MAX_VALUE = 999          ' Maximum value
        key$ = Chr$(KeyAscii)          ' Convert to string
        Select Case key$
            Case "0" To "9"            ' Numbers and minus signs
                Newvalue = Val(Left$(Text18.Text, Text18.SelStart) + key$ + Mid$(Text18.Text, Text18.SelStart + Text18.SelLength + 1))
                If Newvalue > MAX_VALUE Or Newvalue < MIN_VALUE Then
                    KeyAscii = 0
                End If
            Case "."
                If DECIMAL_OK = 0 Or InStr(Text18.Text, ".") Then
                    KeyAscii = 0
                End If
            Case Chr$(8)               ' Backspace
            Case Else
                KeyAscii = 0
        End Select
        If key$ = "-" And (InStr(Text18.Text, "-") Or Text18.SelStart <> 0) Then
            KeyAscii = 0
        End If
    End Sub Private Sub Text19_KeyPress(KeyAscii As Integer)

If KeyAscii = (13) Then
            SendKeys ("{tab}"), True
        End If

Const DECIMAL_OK = -1          ' 0 = no, -1 = YES
        Const MIN_VALUE = -999         ' Minimum value
        Const MAX_VALUE = 999          ' Maximum value
        key$ = Chr$(KeyAscii)          ' Convert to string
        Select Case key$
            Case "0" To "9"            ' Numbers and minus signs
                Newvalue = Val(Left$(Text19.Text, Text19.SelStart) + key$ + Mid$(Text19.Text, Text19.SelStart + Text19.SelLength + 1))
                If Newvalue > MAX_VALUE Or Newvalue < MIN_VALUE Then
                    KeyAscii = 0
                End If
            Case "."
                If DECIMAL_OK = 0 Or InStr(Text19.Text, ".") Then
                    KeyAscii = 0
                End If
            Case Chr$(8)               ' Backspace
            Case Else
                KeyAscii = 0
        End Select
        If key$ = "-" And (InStr(Text19.Text, "-") Or Text19.SelStart <> 0) Then
            KeyAscii = 0
        End If
    End Sub Private Sub Text2_KeyPress(KeyAscii As Integer)

If KeyAscii = (13) Then
            SendKeys ("{tab}"), True
        End If

End Sub

Private Sub Text3_KeyPress(KeyAscii As Integer)
```

```
If KeyAscii = (13) Then
    SendKeys ("{tab}"), True
End If

Const DECIMAL_OK = -1          ' 0 = no, -1 = YES
Const MIN_VALUE = -999         ' Minimum value
Const MAX_VALUE = 999          ' Maximum value
key$ = Chr$(KeyAscii)          ' Convert to string
Select Case key$
    Case "0" To "9"            ' Numbers and minus signs
        Newvalue = Val(Left$(TEXT1.Text, TEXT1.SelStart) + key$ + Mid$(TEXT1.Text, TEXT1.SelStart + TEXT1.SelLength + 1))
        If Newvalue > MAX_VALUE Or Newvalue < MIN_VALUE Then
            KeyAscii = 0
        End If
    Case "."
        If DECIMAL_OK = 0 Or InStr(TEXT1.Text, ".") Then
            KeyAscii = 0
        End If
    Case Chr$(8)               ' Backspace
    Case Else
        KeyAscii = 0
End Select
If key$ = "-" And (InStr(TEXT1.Text, "-") Or TEXT1.SelStart <> 0) Then
    KeyAscii = 0
End If
End Sub Private Sub Text4_KeyPress(KeyAscii As Integer)

If KeyAscii = (13) Then
    SendKeys ("{tab}"), True
End If

Const DECIMAL_OK = -1          ' 0 = no, -1 = YES
Const MIN_VALUE = -999         ' Minimum value
Const MAX_VALUE = 999          ' Maximum value
key$ = Chr$(KeyAscii)          ' Convert to string
Select Case key$
    Case "0" To "9"            ' Numbers and minus signs
        Newvalue = Val(Left$(TEXT1.Text, TEXT1.SelStart) + key$ + Mid$(TEXT1.Text, TEXT1.SelStart + TEXT1.SelLength + 1))
        If Newvalue > MAX_VALUE Or Newvalue < MIN_VALUE Then
            KeyAscii = 0
        End If
    Case "."
        If DECIMAL_OK = 0 Or InStr(TEXT1.Text, ".") Then
            KeyAscii = 0
        End If
    Case Chr$(8)               ' Backspace
    Case Else
        KeyAscii = 0
End Select
If key$ = "-" And (InStr(TEXT1.Text, "-") Or TEXT1.SelStart <> 0) Then
    KeyAscii = 0
End If
End Sub Private Sub Text6_KeyPress(KeyAscii As Integer)

If KeyAscii = (13) Then
    SendKeys ("{tab}"), True
End If

Const DECIMAL_OK = -1          ' 0 = no, -1 = YES
Const MIN_VALUE = -999         ' Minimum value
Const MAX_VALUE = 999          ' Maximum value
key$ = Chr$(KeyAscii)          ' Convert to string
Select Case key$
    Case "0" To "9"            ' Numbers and minus signs
        Newvalue = Val(Left$(text6.Text, text6.SelStart) + key$ + Mid$(text6.Text, text6.SelStart + text6.SelLength + 1))
        If Newvalue > MAX_VALUE Or Newvalue < MIN_VALUE Then
```

```
Begin TextBox Text4
   BackColor    =   &H00FFFFFF&
   Height       =   285
   Left         =   3360
   MaxLength    =   20
   TabIndex     =   3
   Top          =   1560
   Width        =   2535
End
Begin TextBox Text3
   BackColor    =   &H00FFFFFF&
   Height       =   285
   Left         =   3360
   MaxLength    =   20
   TabIndex     =   2
   Top          =   1080
   Width        =   2535
End
Begin TextBox Text2
   BackColor    =   &H00FFFFFF&
   Height       =   285
   Left         =   3360
   MaxLength    =   50
   TabIndex     =   1
   Top          =   600
   Width        =   2535
End
Begin CommandButton Command2
   Caption      =   "&Write"
   Height       =   495
   Left         =   1920
   TabIndex     =   5
   Top          =   3000
   Width        =   1695
End
Begin CommandButton Command1
   Caption      =   "&Cancel"
   Height       =   495
   Left         =   4440
   TabIndex     =   6
   Top          =   3000
   Width        =   1695
End
Begin TextBox Text1
   BackColor    =   &H00FFFFFF&
   Height       =   285
   Left         =   3360
   MaxLength    =   20
   TabIndex     =   0
   Top          =   120
   Width        =   2535
End
Begin Label Label5
   Alignment    =   1  'Right Justify
   BackColor    =   &H00C0C0C0&
   Caption      =   "Feed rate of Center Drill"
   ForeColor    =   &H00000000&
   Height       =   255
   Left         =   1080
   TabIndex     =   11
   Top          =   2040
   Width        =   2175
End
Begin Label Label4
   Alignment    =   1  'Right Justify
   BackColor    =   &H00C0C0C0&
   Caption      =   "Depth of Center Drill"
   ForeColor    =   &H00000000&
   Height       =   255
   Left         =   1440
   TabIndex     =   10
   Top          =   1560
   Width        =   1815
End
```

```
        KeyAscii = 0
    End If
    Case "."
        If DECIMAL_OK = 0 Or InStr(text6.Text, ".") Then
            KeyAscii = 0
        End If
    Case Chr$(8)          ' Backspace
    Case Else
        KeyAscii = 0
    End Select
    If key$ = "-" And (InStr(text6.Text, "-") Or text6.SelStart <> 0) Then
        KeyAscii = 0
    End If
End Sub Private Sub Text9_KeyPress(KeyAscii As Integer)

If KeyAscii = (13) Then
        SendKeys ("{tab}"), True
    End If

Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
    Case "0" To "9"             ' Numbers and minus signs
        Newvalue = Val(Left$(text9.Text, text9.SelStart) + key$ + Mid$(text9.Text, text9.SelStart + text9.SelLength + 1))
        If Newvalue > MAX_VALUE Or Newvalue < MIN_VALUE Then
            KeyAscii = 0
        End If
    Case "."
        If DECIMAL_OK = 0 Or InStr(text9.Text, ".") Then
            KeyAscii = 0
        End If
    Case Chr$(8)          ' Backspace
    Case Else
        KeyAscii = 0
    End Select
    If key$ = "-" And (InStr(text9.Text, "-") Or text9.SelStart <> 0) Then
        KeyAscii = 0
    End If
End Sub Private Sub Bore_Error_Blank_Text_Box()
MsgBox "Fill in all the blanks.", 48, "Boring"
End Sub
VERSION 2.00
Begin Form frmCenterdrill
    BackColor       =   &H00C0C0C0&
    BorderStyle     =   3  'Fixed Double
    Caption         =   "Center Drill"
    ClientHeight    =   4020
    ClientLeft      =   1140
    ClientTop       =   1425
    ClientWidth     =   7365
    Height          =   4425
    Left            =   1080
    LinkTopic       =   "Form3"
    ScaleHeight     =   4020
    ScaleWidth      =   7365
    Top             =   1080
    Width           =   7485
    Begin TextBox Text5
        BackColor       =   &H00FFFFFF&
        Height          =   285
        Left            =   3360
        MaxLength       =   20
        TabIndex        =   4
        Top             =   2040
        Width           =   2535
    End
```

```
        Begin Label Label3
            Alignment       =   1  'Right Justify
            BackColor       =   &H00C0C0C0&
            Caption         =   "R.P.M."
            ForeColor       =   &H00000000&
            Height          =   255
            Left            =   1440
            TabIndex        =   9
            Top             =   1080
            Width           =   1815
        End
        Begin Label Label2
            Alignment       =   1  'Right Justify
            BackColor       =   &H00C0C0C0&
            Caption         =   "Tool Comment"
            ForeColor       =   &H00000000&
            Height          =   255
            Left            =   1440
            TabIndex        =   8
            Top             =   600
            Width           =   1815
        End
        Begin Label Label1
            Alignment       =   1  'Right Justify
            BackColor       =   &H00C0C0C0&
            Caption         =   "Sequence Number"
            ForeColor       =   &H00000000&
            Height          =   255
            Left            =   1440
            TabIndex        =   7
            Top             =   120
            Width           =   1815
        End
    End Sub Command1_Click ()
    visible = fasle
    End Sub Sub Command2_Click ()

If Text1.Text = "" Then
    MsgBox "Fill in all the blanks.", 48, "Center Drill"
    GoTo 300
    End If If Text2.Text = "" Then
    MsgBox "Fill in all the blanks.", 48, "Center Drill"
    GoTo 300
    End If If Text3.Text = "" Then
    MsgBox "Fill in all the blanks.", 48, "Center Drill"
    GoTo 300
    End If If Text4.Text = "" Then
    MsgBox "Fill in all the blanks.", 48, "Center Drill"
    GoTo 300
    End If If Text5.Text = "" Then
    MsgBox "Fill in all the blanks.", 48, "Center Drill"
    GoTo 300
    End If frmcenterdrill.Visible = False 301
    frmcenterdrill.Visible = False

300
```

```
End Sub

Sub Command3_Click ()
MsgBox "Answer all the questions. Dont bother with making the depth negitive, it's taken care of !   Makes a standard center drill
sequence.", LF, "Center Drill Help"

End Sub

Sub Form_Deactivate ()
visible = False
End Sub

Sub Form_Load ()

If windowstate = 0 Then
        Move (screen.Width - frmcenterdrill.Width) / 2, (screen.Height - frmcenterdrill.Height) / 2
    End If End Sub Sub Form_Paint ()

If windowstate = 0 Then
        Move (screen.Width - frmcenterdrill.Width) / 2, (screen.Height - frmcenterdrill.Height) / 2
    End If End Sub Sub Form_Resize ()

If windowstate = 0 Then
        Move (screen.Width - frmcenterdrill.Width) / 2, (screen.Height - frmcenterdrill.Height) / 2
    End If End Sub Sub Text1_KeyPress (keyascii As Integer)
    If keyascii = (13) Then
    SendKeys ("{TAB}"), True
    End If Const DECIMAL_OK = -1         ' 0 = no, -1 = YES
Const MIN_VALUE = -999        ' Minimum value
Const MAX_VALUE = 999         ' Maximum value
    Key$ = Chr$(keyascii)     ' Convert to string
    Select Case Key$
        Case "0" To "9"       ' Numbers and minus signs
            Newvalue = Val(Left$(Text1.Text, Text1.SelStart) + Key$ + Mid$(Text1.Text, Text1.SelStart + Text1.SelLength + 1))
            If Newvalue > MAX_VALUE Or Newvalue < MIN_VALUE Then
                keyascii = 0
            End If
        Case "."
            If DECIMAL_OK = 0 Or InStr(Text1.Text, ".") Then
                keyascii = 0
            End If
        Case Chr$(8)          ' Backspace
        Case Else
            keyascii = 0
    End Select
    If Key$ = "-" And (InStr(Text1.Text, "-") Or Text1.SelStart <> 0) Then
        keyascii = 0
    End If
End Sub Sub Text2_KeyPress (keyascii As Integer)

If keyascii = (13) Then
    SendKeys ("{tab}"), True
    End If

End Sub
```

```
Sub Text3_KeyPress (keyascii As Integer)
    If keyascii = (13) Then
        SendKeys ("{TAB}"), True
    End If Const DECIMAL_OK = -1        ' 0 = no, -1 = YES
    Const MIN_VALUE = -999       ' Minimum value
    Const MAX_VALUE = 999        ' Maximum value
    Key$ = Chr$(keyascii)        ' Convert to string
    Select Case Key$
        Case "0" To "9"          ' Numbers and minus signs
            Newvalue = Val(Left$(Text1.Text, Text1.SelStart) + Key$ + Mid$(Text1.Text, Text1.SelStart + Text1.SelLength + 1))
            If Newvalue > MAX_VALUE Or Newvalue < MIN_VALUE Then
                keyascii = 0
            End If
        Case "."
            If DECIMAL_OK = 0 Or InStr(Text1.Text, ".") Then
                keyascii = 0
            End If
        Case Chr$(8)             ' Backspace
        Case Else
            keyascii = 0
    End Select
    If Key$ = "-" And (InStr(Text1.Text, "-") Or Text1.SelStart <> 0) Then
        keyascii = 0
    End If
End Sub Sub Text4_KeyPress (keyascii As Integer)
    If keyascii = (13) Then
        SendKeys ("{TAB}"), True
    End If Const DECIMAL_OK = -1        ' 0 = no, -1 = YES
    Const MIN_VALUE = -999       ' Minimum value
    Const MAX_VALUE = 999        ' Maximum value
    Key$ = Chr$(keyascii)        ' Convert to string
    Select Case Key$
        Case "0" To "9"          ' Numbers and minus signs
            Newvalue = Val(Left$(Text1.Text, Text1.SelStart) + Key$ + Mid$(Text1.Text, Text1.SelStart + Text1.SelLength + 1))
            If Newvalue > MAX_VALUE Or Newvalue < MIN_VALUE Then
                keyascii = 0
            End If
        Case "."
            If DECIMAL_OK = 0 Or InStr(Text1.Text, ".") Then
                keyascii = 0
            End If
        Case Chr$(8)             ' Backspace
        Case Else
            keyascii = 0
    End Select
    If Key$ = "-" And (InStr(Text1.Text, "-") Or Text1.SelStart <> 0) Then
        keyascii = 0
    End If
End Sub Sub Text5_KeyPress (keyascii As Integer)
    If keyascii = (13) Then
        SendKeys ("{TAB}"), True
    End If Const DECIMAL_OK = -1        ' 0 = no, -1 = YES
    Const MIN_VALUE = -999       ' Minimum value
    Const MAX_VALUE = 999        ' Maximum value
    Key$ = Chr$(keyascii)        ' Convert to string
    Select Case Key$
        Case "0" To "9"          ' Numbers and minus signs
            Newvalue = Val(Left$(Text1.Text, Text1.SelStart) + Key$ + Mid$(Text1.Text, Text1.SelStart + Text1.SelLength + 1))
            If Newvalue > MAX_VALUE Or Newvalue < MIN_VALUE Then
                keyascii = 0
            End If
        Case "."
            If DECIMAL_OK = 0 Or InStr(Text1.Text, ".") Then
                keyascii = 0
```

```
            End If
            Case Chr$(8)          ' Backspace
            Case Else
               keyascii = 0
         End Select
         If Key$ = "-" And (InStr(Text1.Text, "-") Or Text1.SelStart <> 0) Then
            keyascii = 0
         End If
      End Sub
VERSION 4.00
Begin VB.Form frmcutoff
   BorderStyle     =   3  'Fixed Dialog
   Caption         =   "Cut Off"
   ClientHeight    =   4755
   ClientLeft      =   2010
   ClientTop       =   1500
   ClientWidth     =   4545
   BeginProperty Font
      name            =   "MS Sans Serif"
      charset         =   1
      weight          =   700
      size            =   8.25
      underline       =   0   'False
      italic          =   0   'False
      strikethrough   =   0   'False
   EndProperty
   ForeColor       =   &H80000008&
   Height          =   5280
   Icon            =   "FRMCUTOF.frx":0000
   Left            =   1890
   LinkTopic       =   "Form3"
   LockControls    =   -1  'True
   ScaleHeight     =   4755
   ScaleWidth      =   4545
   Top             =   1095
   Width           =   4785
   Begin VB.TextBox Text11
      Appearance      =   0  'Flat
      Height          =   285
      Left            =   1680
      TabIndex        =   21
      TabStop         =   0   'False
      Text            =   "0.0025"
      Top             =   5160
      Visible         =   0   'False
      Width           =   735
   End
   Begin VB.TextBox Text3
      Appearance      =   0  'Flat
      Height          =   285
      Left            =   1560
      TabIndex        =   20
      TabStop         =   0   'False
      Text            =   "0.0015"
      Top             =   4800
      Visible         =   0   'False
      Width           =   735
   End
   Begin VB.TextBox Text2
      Appearance      =   0  'Flat
      Height          =   285
      Left            =   480
      TabIndex        =   19
      TabStop         =   0   'False
      Text            =   "0.0500"
      Top             =   5160
      Visible         =   0   'False
      Width           =   855
   End
   Begin VB.TextBox Text1
      Appearance      =   0  'Flat
      Height          =   285
      Left            =   480
```

```
         TabIndex       =   18
         TabStop        =   0   'False
         Text           =   "0.0100"
         Top            =   4800
         Visible        =   0   'False
         Width          =   855
      End
      Begin VB.TextBox Text10
         BackColor      =   &H00FFFFFF&
         Height         =   285
         Left           =   2280
         MaxLength      =   20
         TabIndex       =   6
         Top            =   3000
         Width          =   855
      End
      Begin VB.OptionButton Option2
         Caption        =   "Radius"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height         =   375
         Left           =   2640
         TabIndex       =   9
         Top            =   3480
         Width          =   1095
      End
      Begin VB.OptionButton Option1
         Caption        =   "Chamfer"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height         =   375
         Left           =   1440
         TabIndex       =   10
         Top            =   3480
         Value          =   -1  'True
         Width          =   1095
      End
      Begin VB.TextBox Text6
         BackColor      =   &H00FFFFFF&
         Height         =   285
         Left           =   2280
         MaxLength      =   20
         TabIndex       =   2
         Top            =   1080
         Width          =   855
      End
      Begin VB.TextBox Text7
         BackColor      =   &H00FFFFFF&
         Height         =   285
         Left           =   2280
         MaxLength      =   20
         TabIndex       =   3
         Top            =   1560
         Width          =   855
      End
      Begin VB.TextBox Text4
         BackColor      =   &H00FFFFFF&
         Height         =   285
         Left           =   2280
         MaxLength      =   20
```

```
         TabIndex        =  0
         Top             =  120
         Width           =  855
      End
   Begin VB.TextBox Text5
         BackColor       =  &H00FFFFFF&
         Height          =  285
         Left            =  2280
         MaxLength       =  20
         TabIndex        =  1
         Top             =  600
         Width           =  855
      End
   Begin VB.TextBox Text9
         BackColor       =  &H00FFFFFF&
         Height          =  285
         Left            =  2280
         MaxLength       =  20
         TabIndex        =  5
         Top             =  2520
         Width           =  855
      End
   Begin VB.TextBox TEXT8
         BackColor       =  &H00FFFFFF&
         Height          =  285
         Left            =  2280
         MaxLength       =  20
         TabIndex        =  4
         Top             =  2040
         Width           =  855
      End
   Begin VB.CommandButton Command2
         Caption         =  "&Write"
         BeginProperty Font
            name         =  "MS Sans Serif"
            charset      =  1
            weight       =  400
            size         =  8.25
            underline    =  0  'False
            italic       =  0  'False
            strikethrough =  0  'False
         EndProperty
         Height          =  375
         Left            =  1440
         TabIndex        =  7
         Top             =  4080
         Width           =  975
      End
   Begin VB.CommandButton Command1
         Caption         =  "&Cancel"
         BeginProperty Font
            name         =  "MS Sans Serif"
            charset      =  1
            weight       =  400
            size         =  8.25
            underline    =  0  'False
            italic       =  0  'False
            strikethrough =  0  'False
         EndProperty
         Height          =  375
         Left            =  2760
         TabIndex        =  8
         Top             =  4080
         Width           =  855
      End
   Begin VB.Label Label10
         Alignment       =  1  'Right Justify
         Caption         =  "Diameter to cut off to"
         BeginProperty Font
            name         =  "MS Sans Serif"
            charset      =  1
            weight       =  400
            size         =  8.25
            underline    =  0  'False
```

```
              italic       = 0  'False
              strikethrough = 0  'False
           EndProperty
           Height    = 255
           Left      = 120
           TabIndex  = 14
           Top       = 3120
           Width     = 2055
        End
        Begin VB.Label Label6
           Alignment  =  1  'Right Justify
           Caption    =  "Length of part"
           BeginProperty Font
              name       = "MS Sans Serif"
              charset    = 1
              weight     = 400
              size       = 8.25
              underline  = 0  'False
              italic     = 0  'False
              strikethrough = 0  'False
           EndProperty
           Height    = 255
           Left      = 720
           TabIndex  = 12
           Top       = 1200
           Width     = 1455
        End
        Begin VB.Label Label7
           Alignment  =  1  'Right Justify
           Caption    =  "Tool width"
           BeginProperty Font
              name       = "MS Sans Serif"
              charset    = 1
              weight     = 400
              size       = 8.25
              underline  = 0  'False
              italic     = 0  'False
              strikethrough = 0  'False
           EndProperty
           Height    = 255
           Left      = 960
           TabIndex  = 13
           Top       = 1680
           Width     = 1215
        End
        Begin VB.Label Label4
           Alignment  =  1  'Right Justify
           Caption    =  "Stock Diameter"
           BeginProperty Font
              name       = "MS Sans Serif"
              charset    = 1
              weight     = 400
              size       = 8.25
              underline  = 0  'False
              italic     = 0  'False
              strikethrough = 0  'False
           EndProperty
           Height    = 255
           Left      = 480
           TabIndex  = 17
           Top       = 240
           Width     = 1695
        End
        Begin VB.Label Label5
           Alignment  =  1  'Right Justify
           Caption    =  "O.D. of part"
           BeginProperty Font
              name       = "MS Sans Serif"
              charset    = 1
              weight     = 400
              size       = 8.25
              underline  = 0  'False
              italic     = 0  'False
              strikethrough = 0  'False
```

```
        EndProperty
        Height        =   255
        Left          =   840
        TabIndex      =   16
        Top           =   720
        Width         =   1335
     End
     Begin VB.Label Label9
        Alignment     =   1  'Right Justify
        Caption       =   "Chamfer on part"
        BeginProperty Font
           name       =   "MS Sans Serif"
           charset    =   1
           weight     =   400
           size       =   8.25
           underline  =   0  'False
           italic     =   0  'False
           strikethrough = 0  'False
        EndProperty
        Height        =   255
        Left          =   360
        TabIndex      =   15
        Top           =   2640
        Width         =   1815
     End
     Begin VB.Label Label8
        Alignment     =   1  'Right Justify
        Caption       =   "Tool nose radius"
        BeginProperty Font
           name       =   "MS Sans Serif"
           charset    =   1
           weight     =   400
           size       =   8.25
           underline  =   0  'False
           italic     =   0  'False
           strikethrough = 0  'False
        EndProperty
        Height        =   255
        Left          =   600
        TabIndex      =   11
        Top           =   2160
        Width         =   1575
     End
  End
Attribute VB_Name = "frmcutoff"
Attribute VB_Creatable = False
Attribute VB_Exposed = False Private Sub Command1_Click()
frmcutoff.Visible = False
frmMDI.ActiveForm.ActiveControl.SetFocus ' RETURNS THE CURSER TO THE SCREEN
End Sub Private Sub Command2_Click()

Screen.MousePointer = 11

If text4.Text = "" Then
MsgBox "Fill in all the blanks.", 48, "Cut Off"
GoTo 755
End If If text5.Text = "" Then
MsgBox "Fill in all the blanks.", 48, "Cut Off"
GoTo 755
End If If text6.Visible = True And text6.Text = "" Then
MsgBox "Fill in all the blanks.", 48, "Cut Off"
GoTo 755
End If
```

```
If text7.Visible = True And text7.Text = "" Then
MsgBox "Fill in all the blanks.", 48, "Cut Off"
GoTo 755
End If If text8.Visible = True And text8.Text = "" Then
MsgBox "Fill in all the blanks.", 48, "Cut Off"
GoTo 755
End If If text9.Visible = True And text9.Text = "" Then
MsgBox "Fill in all the blanks.", 48, "Cut Off"
GoTo 755
End If If text10.Text = "" Then
MsgBox "Fill in all the blanks.", 48, "Cut Off"
GoTo 755
End If If option2.Value = True Then
GoTo 750
End If 749            ' CUTOFF WITH CHAMFER
stockdia = ((text4.Text * 2) / 2)
OD = ((text5.Text * 2) / 2)
loa = ((text6.Text * 2) / 2)
TWIDTH = ((text7.Text * 2) / 2)
TNR = ((text8.Text * 2) / 2)
chamfer = ((text9.Text * 2) / 2)
iD = ((text10.Text * 2) / 2)
XPOS = stockdia + 0.1
Comp = TNR * 0.53
RADIUS = TNR + chamfer
I = chamfer + Comp
L1 = loa + TWIDTH
L2 = L1 + 0.005
L3 = (L1 - I) - 0.0011
ODCLEAR = OD + 0.025
ODRELIEF = OD - (I * 2)

frmcutoff.Visible = False

Screen.MousePointer = "1

Clipboard.SetText Rapid & XCode & Format(XPOS, formats) & " Z" & Format(text2.Text, formats) & Chr(13) & Chr(10)
editpasteproc
Clipboard.SetText "Z-" & Format(L2, formats) & Chr(13) & Chr(10)
editpasteproc
Clipboard.SetText Feed & XCode & Format(ODCLEAR, formats) & " F" & Format(text1.Text, formats) & Chr(13) & Chr(10)
editpasteproc
Clipboard.SetText XCode & Format(ODRELIEF, formats) & " F" & Format(text3.Text, formats) & Chr(13) & Chr(10)
editpasteproc
Clipboard.SetText Rapid & XCode & Format(ODCLEAR, formats) & Chr(13) & Chr(10)
editpasteproc
Clipboard.SetText "Z-" & Format(L3, formats) & Chr(13) & Chr(10)
editpasteproc
Clipboard.SetText Feed & XCode & Format(OD, formats) & " F" & Format(text11.Text, formats) & Chr(13) & Chr(10)
editpasteproc
Clipboard.SetText G_Code_Chamfer & "Z-" & Format(L1, formats) & " " & Chamfer_X & "-" & Formal(I, formats) & " F" & Format(text3.Text, formats) & Chr(13) & Chr(10)
editpasteproc
Clipboard.SetText XCode & Format(iD, formats) & Chr(13) & Chr(10)
editpasteproc
Clipboard.SetText Rapid & XCode & Format(XPOS, formats) & Chr(13) & Chr(10)
editpasteproc
Clipboard.SetText "Z" & Format(text2.Text, formats) & Chr(13) & Chr(10)
editpasteproc
Clipboard.Clear Screen.MousePointer = 0
```

```
        frmcutoff.Visible = False
        GoTo 755

750             ' CUTOFF WITH RADIUS
        stockdia = ((text4.Text * 2) / 2)
        OD = ((text5.Text * 2) / 2)
        loa = ((text6.Text * 2) / 2)
        TWIDTH = ((text7.Text * 2) / 2)
        TNR = ((text8.Text * 2) / 2)
        chamfer = ((text9.Text * 2) / 2)
        iD = ((text10.Text * 2) / 2)
        XPOS = stockdia + 0.1
        Comp = TNR * 0.53
        RADIUS = TNR + chamfer
        I = chamfer + Comp
        L1 = loa + TWIDTH
        L2 = L1 + 0.005
        L3 = (L1 - I) - 0.0011
        L33 = L1 - RADIUS
        ODCLEAR = OD + 0.025
        ODRELIEF = OD - (RADIUS * 2)

frmcutoff.Visible = False

Screen.MousePointer = 11

Clipboard.SetText Rapid & XCode & Format(XPOS, formats) & " Z" & Format(text2.Text, formats) & Chr(13) & Chr(10)
        editpasteproc
        Clipboard.SetText "Z-" & Format(L2, formats) & Chr(13) & Chr(10)
        editpasteproc
        Clipboard.SetText Feed & XCode & Format(ODCLEAR, formats) & " F" & Format(text2.Text, formats) & Chr(13) & Chr(10)
        editpasteproc
        Clipboard.SetText XCode & Format(ODRELIEF, formats) & " F" & Format(text3.Text, formats) & Chr(13) & Chr(10)
        editpasteproc
        Clipboard.SetText Rapid & XCode & Format(ODCLEAR, formats) & Chr(13) & Chr(10)
        editpasteproc
        Clipboard.SetText "Z-" & Format(L33, formats) & Chr(13) & Chr(10)
        editpasteproc
        Clipboard.SetText Feed & XCode & Format(OD, formats) & " F" & Format(text11.Text, formats) & Chr(13) & Chr(10)
        editpasteproc
        Clipboard.SetText G_Code_Radius & "Z-" & Format(L1, formats) & " " & Rad_X & "-" & Format(RADIUS, formats) & " F" &
        Format(text3.Text, formats) & Chr(13) & Chr(10)
        editpasteproc
        Clipboard.SetText XCode & Format(iD, formats) & Chr(13) & Chr(10)
        editpasteproc
        Clipboard.SetText Rapid & XCode & Format(XPOS, formats) & Chr(13) & Chr(10)
        editpasteproc
        Clipboard.SetText "Z" & Format(text2.Text, formats) & Chr(13) & Chr(10)
        editpasteproc
        Clipboard.Clear Screen.MousePointer = 0 frmcutoff.Visible = False 756
        frmcutoff.Visible = False

755

Screen.MousePointer = 0 frmMDI.ActiveForm.ActiveControl.SetFocus ' RETURNS THE CURSER TO THE SCREEN

End Sub

Private Sub Form_Deactivate()
        Visible = False
        frmMDI.ActiveForm.ActiveControl.SetFocus ' RETURNS THE CURSER TO THE SCREEN
        End Sub Private Sub Form_Load()
```

```
            If WindowState = 0 Then
                Move (Screen.Width - frmcutoff.Width) / 2, (Screen.Height - frmcutoff.Height) / 2
            End If
        End Sub Private Sub Form_Paint()

If WindowState = 0 Then
                Move (Screen.Width - frmcutoff.Width) / 2, (Screen.Height - frmcutoff.Height) / 2
            End If End Sub Private Sub Form_Resize()

If WindowState = 0 Then
                Move (Screen.Width - frmcutoff.Width) / 2, (Screen.Height - frmcutoff.Height) / 2
            End If End Sub Private Sub Option1_Click()
        If Option1.Value = True Then
        Label9.Caption = "Chamfer on part"
        End If
        End Sub Private Sub option2_Click()
        If option2.Value = True Then
        Label9.Caption = "Radius on part"
        End If
        End Sub Private Sub Text10_KeyPress(KeyAscii As Integer)

If KeyAscii = (13) Then
            SendKeys ("{tab}"), True
            End If

Const DECIMAL_OK = -1           ' 0 = no, -1 = YES
            Const MIN_VALUE = -999          ' Minimum value
            Const MAX_VALUE = 999           ' Maximum value
            key$ = Chr$(KeyAscii)           ' Convert to string
            Select Case key$
                Case "0" To "9"             ' Numbers and minus signs
                    Newvalue = Val(Left$(text10.Text, text10.SelStart) + key$ + Mid$(text10.Text, text10.SelStart + text10.SelLength + 1))
                    If Newvalue > MAX_VALUE Or Newvalue < MIN_VALUE Then
                        KeyAscii = 0
                    End If
                Case "."
                    If DECIMAL_OK = 0 Or InStr(text10.Text, ".") Then
                        KeyAscii = 0
                    End If
                Case Chr$(8)                ' Backspace
                Case Else
                    KeyAscii = 0
            End Select
            If key$ = "-" And (InStr(text10.Text, "-") Or text10.SelStart <> 0) Then
                KeyAscii = 0
            End If
        End Sub Private Sub Text4_KeyPress(KeyAscii As Integer)

If KeyAscii = (13) Then
            SendKeys ("{tab}"), True
            End If

Const DECIMAL_OK = -1           ' 0 = no, -1 = YES
            Const MIN_VALUE = -999          ' Minimum value
            Const MAX_VALUE = 999           ' Maximum value
```

```
        key$ = Chr$(KeyAscii)          ' Convert to string
        Select Case key$
            Case "0" To "9"             ' Numbers and minus signs
                Newvalue = Val(Left$(text4.Text, text4.SelStart) + key$ + Mid$(text4.Text, text4.SelStart + text4.SelLength + 1))
                If Newvalue > MAX_VALUE Or Newvalue < MIN_VALUE Then
                    KeyAscii = 0
                End If
            Case "."
                If DECIMAL_OK = 0 Or InStr(text4.Text, ".") Then
                    KeyAscii = 0
                End If
            Case Chr$(8)                ' Backspace
            Case Else
                KeyAscii = 0
        End Select
        If key$ = "-" And (InStr(text4.Text, "-") Or text4.SelStart <> 0) Then
            KeyAscii = 0
        End If
    End Sub Private Sub Text5_KeyPress(KeyAscii As Integer)

If KeyAscii = (13) Then
            SendKeys ("{tab}"), True
        End If

Const DECIMAL_OK = -1           ' 0 = no, -1 = YES
        Const MIN_VALUE = -999          ' Minimum value
        Const MAX_VALUE = 999           ' Maximum value
        key$ = Chr$(KeyAscii)           ' Convert to string
        Select Case key$
            Case "0" To "9"             ' Numbers and minus signs
                Newvalue = Val(Left$(text5.Text, text5.SelStart) + key$ + Mid$(text5.Text, text5.SelStart + text5.SelLength + 1))
                If Newvalue > MAX_VALUE Or Newvalue < MIN_VALUE Then
                    KeyAscii = 0
                End If
            Case "."
                If DECIMAL_OK = 0 Or InStr(text5.Text, ".") Then
                    KeyAscii = 0
                End If
            Case Chr$(8)                ' Backspace
            Case Else
                KeyAscii = 0
        End Select
        If key$ = "-" And (InStr(text5.Text, "-") Or text5.SelStart <> 0) Then
            KeyAscii = 0
        End If
    End Sub Private Sub Text6_KeyPress(KeyAscii As Integer)

If KeyAscii = (13) Then
            SendKeys ("{tab}"), True
        End If

Const DECIMAL_OK = -1           ' 0 = no, -1 = YES
        Const MIN_VALUE = -999          ' Minimum value
        Const MAX_VALUE = 999           ' Maximum value
        key$ = Chr$(KeyAscii)           ' Convert to string
        Select Case key$
            Case "0" To "9"             ' Numbers and minus signs
                Newvalue = Val(Left$(text6.Text, text6.SelStart) + key$ + Mid$(text6.Text, text6.SelStart + text6.SelLength + 1))
                If Newvalue > MAX_VALUE Or Newvalue < MIN_VALUE Then
                    KeyAscii = 0
                End If
            Case "."
                If DECIMAL_OK = 0 Or InStr(text6.Text, ".") Then
                    KeyAscii = 0
                End If
            Case Chr$(8)                ' Backspace
            Case Else
                KeyAscii = 0
```

```
        End Select
        If key$ = "-" And (InStr(text6.Text, "-") Or text6.SelStart <> 0) Then
            KeyAscii = 0
        End If
    End Sub Private Sub Text7_KeyPress(KeyAscii As Integer)

If KeyAscii = (13) Then
            SendKeys ("{tab}"), True
        End If

Const DECIMAL_OK = -1         ' 0 = no, -1 = YES
        Const MIN_VALUE = -999        ' Minimum value
        Const MAX_VALUE = 999         ' Maximum value
        key$ = Chr$(KeyAscii)         ' Convert to string
        Select Case key$
            Case "0" To "9"            ' Numbers and minus signs
                Newvalue = Val(Left$(text7.Text, text7.SelStart) + key$ + Mid$(text7.Text, text7.SelStart + text7.SelLength + 1))
                If Newvalue > MAX_VALUE Or Newvalue < MIN_VALUE Then
                    KeyAscii = 0
                End If
            Case "."
                If DECIMAL_OK = 0 Or InStr(text7.Text, ".") Then
                    KeyAscii = 0
                End If
            Case Chr$(8)              ' Backspace
            Case Else
                KeyAscii = 0
        End Select
        If key$ = "-" And (InStr(text7.Text, "-") Or text7.SelStart <> 0) Then
            KeyAscii = 0
        End If
    End Sub Private Sub Text8_KeyPress(KeyAscii As Integer)

If KeyAscii = (13) Then
            SendKeys ("{tab}"), True
        End If

Const DECIMAL_OK = -1         ' 0 = no, -1 = YES
        Const MIN_VALUE = -999        ' Minimum value
        Const MAX_VALUE = 999         ' Maximum value
        key$ = Chr$(KeyAscii)         ' Convert to string
        Select Case key$
            Case "0" To "9"            ' Numbers and minus signs
                Newvalue = Val(Left$(text8.Text, text8.SelStart) + key$ + Mid$(text8.Text, text8.SelStart + text8.SelLength + 1))
                If Newvalue > MAX_VALUE Or Newvalue < MIN_VALUE Then
                    KeyAscii = 0
                End If
            Case "."
                If DECIMAL_OK = 0 Or InStr(text8.Text, ".") Then
                    KeyAscii = 0
                End If
            Case Chr$(8)              ' Backspace
            Case Else
                KeyAscii = 0
        End Select
        If key$ = "-" And (InStr(text8.Text, "-") Or text8.SelStart <> 0) Then
            KeyAscii = 0
        End If
    End Sub Private Sub Text9_KeyPress(KeyAscii As Integer)

If KeyAscii = (13) Then
            SendKeys ("{tab}"), True
        End If

Const DECIMAL_OK = -1         ' 0 = no, -1 = YES
```

```
      Const MIN_VALUE = -999          ' Minimum value
      Const MAX_VALUE = 999           ' Maximum value
      key$ = Chr$(KeyAscii)           ' Convert to string
      Select Case key$
5       Case "0" To "9"               ' Numbers and minus signs
          Newvalue = Val(Left$(text9.Text, text9.SelStart) + key$ + Mid$(text9.Text, text9.SelStart + text9.SelLength + 1))
          If Newvalue > MAX_VALUE Or Newvalue < MIN_VALUE Then
            KeyAscii = 0
          End If
10      Case "."
          If DECIMAL_OK = 0 Or InStr(text9.Text, ".") Then
            KeyAscii = 0
          End If
        Case Chr$(8)                  ' Backspace
15      Case Else
          KeyAscii = 0
      End Select
      If key$ = "-" And (InStr(text9.Text, "-") Or text9.SelStart <> 0) Then
        KeyAscii = 0
20    End If
    End Sub
    VERSION 4.00
    Begin VB.Form frmDrilling
      BorderStyle    =  3 'Fixed Dialog
25    Caption        =  "Drilling"
      ClientHeight   =  3240
      ClientLeft     =  2520
      ClientTop      =  1995
      ClientWidth    =  4980
30    BeginProperty Font
        name        =  "MS Sans Serif"
        charset     =  1
        weight      =  700
        size        =  8.25
35      underline   =  0 'False
        italic      =  0 'False
        strikethrough = 0 'False
      EndProperty
      ForeColor      =  &H80000008&
40    Height         =  3765
      Icon           =  "FRMDRILL.frx":0000
      Left           =  2400
      LinkTopic      =  "Form2"
      LockControls   =  -1 'True
45    MaxButton      =  0 'False
      MinButton      =  0 'False
      ScaleHeight    =  3240
      ScaleWidth     =  4980
      ShowInTaskbar  =  0 'False
50    Top            =  1590
      Width          =  5220
      Begin VB.TextBox Text5
        BackColor    =  &H00FFFFFF&
        Height       =  285
55      Left         =  2280
        MaxLength    =  20
        TabIndex     =  3
        Top          =  1560
        Visible      =  0 'False
60      Width        =  855
      End
      Begin VB.CheckBox Check1
        Caption      =  "Center Drill "
        BeginProperty Font
65        name        =  "MS Sans Serif"
          charset     =  1
          weight      =  400
          size        =  8.25
          underline   =  0 'False
70        italic      =  0 'False
          strikethrough = 0 'False
        EndProperty
        Height       =  375
        Left         =  3840
```

```
            TabIndex       = 8
            Top            = 2160
            Width          = 1215
        End
        Begin VB.OptionButton optg74
            Caption        = "Canned Drill Cycle"
            BeginProperty Font
                name       = "MS Sans Serif"
                charset    = 1
                weight     = 400
                size       = 8.25
                underline  = 0  'False
                italic     = 0  'False
                strikethrough = 0  'False
            EndProperty
            Height         = 375
            Left           = 2040
            TabIndex       = 9
            Top            = 2160
            Width          = 1695
        End
        Begin VB.OptionButton optregular
            Caption        = "Regular Drilling"
            BeginProperty Font
                name       = "MS Sans Serif"
                charset    = 1
                weight     = 400
                size       = 8.25
                underline  = 0  'False
                italic     = 0  'False
                strikethrough = 0  'False
            EndProperty
            Height         = 375
            Left           = 360
            TabIndex       = 10
            Top            = 2160
            Value          = -1  'True
            Width          = 1575
        End
        Begin VB.TextBox Text3
            BackColor      = &H00FFFFFF&
            Height         = 285
            Left           = 2280
            MaxLength      = 20
            TabIndex       = 2
            Top            = 1080
            Visible        = 0  'False
            Width          = 855
        End
        Begin VB.CommandButton Command1
            Caption        = "&Cancel"
            BeginProperty Font
                name       = "MS Sans Serif"
                charset    = 1
                weight     = 400
                size       = 8.25
                underline  = 0  'False
                italic     = 0  'False
                strikethrough = 0  'False
            EndProperty
            Height         = 375
            Left           = 2760
            TabIndex       = 5
            Top            = 2760
            Width          = 975
        End
        Begin VB.CommandButton Command2
            Caption        = "&Write"
            BeginProperty Font
                name       = "MS Sans Serif"
                charset    = 1
                weight     = 400
                size       = 8.25
                underline  = 0  'False
```

```
              italic         = 0  'False
              strikethrough  = 0  'False
           EndProperty
           Height      = 375
  5        Left        = 1440
           TabIndex    = 4
           Top         = 2760
           Width       = 975
        End
 10     Begin VB.TextBox Text1
           BackColor   = &H00FFFFFF&
           Height      = 285
           Left        = 2280
           MaxLength   = 20
 15        TabIndex    = 0
           Top         = 120
           Width       = 855
        End
        Begin VB.TextBox Text2
 20        BackColor   = &H00FFFFFF&
           Height      = 285
           Left        = 2280
           MaxLength   = 20
           TabIndex    = 1
 25        Top         = 600
           Width       = 855
        End
        Begin VB.Label Label1
           Alignment   = 1  'Right Justify
 30        Caption     = "Depth of second peck"
           BeginProperty Font
              name         = "MS Sans Serif"
              charset      = 1
              weight       = 400
 35           size         = 8.25
              underline    = 0  'False
              italic       = 0  'False
              strikethrough = 0  'False
           EndProperty
 40        Height      = 255
           Left        = 360
           TabIndex    = 12
           Top         = 1680
           Visible     = 0  'False
 45        Width       = 1815
        End
        Begin VB.Label Label6
           Alignment   = 1  'Right Justify
           Caption     = "Depth of first peck"
 50        BeginProperty Font
              name         = "MS Sans Serif"
              charset      = 1
              weight       = 400
              size         = 8.25
 55           underline    = 0  'False
              italic       = 0  'False
              strikethrough = 0  'False
           EndProperty
           Height      = 255
 60        Left        = 360
           TabIndex    = 11
           Top         = 1200
           Visible     = 0  'False
           Width       = 1815
 65     End
        Begin VB.Label Label4
           Alignment   = 1  'Right Justify
           Caption     = "Depth of Drill"
           BeginProperty Font
 70           name         = "MS Sans Serif"
              charset      = 1
              weight       = 400
              size         = 8.25
              underline    = 0  'False
```

```
            italic          = 0  'False
            strikethrough   = 0  'False
         EndProperty
         Height       = 255
         Left         = 360
         TabIndex     = 7
         Top          = 240
         Width        = 1815
      End
      Begin VB.Label Label5
         Alignment    = 1  'Right Justify
         Caption      = "Feed rate of Drill"
         BeginProperty Font
            name         = "MS Sans Serif"
            charset      = 1
            weight       = 400
            size         = 8.25
            underline    = 0  'False
            italic       = 0  'False
            strikethrough = 0 'False
         EndProperty
         Height       = 255
         Left         = 0
         TabIndex     = 6
         Top          = 720
         Width        = 2175
      End
   End
Attribute VB_Name = "frmDrilling"
Attribute VB_Creatable = False
Attribute VB_Exposed = False Private Sub check1_Click()

If check1.Value = 1 Then
optg74.Visible = False
optregular.Visible = False
TEXT3.Visible = True
Label6.Visible = True
Label6.Caption = "Ammount of Dwell"
TEXT5.Visible = False
label1.Visible = False
End If If check1.Value = 0 Then
optg74.Visible = True
optregular.Visible = True
Label6.Visible = False
TEXT3.Visible = False
   If optg74 = True Then
      TEXT3.Visible = True
      Label6.Visible = True
         If Not Drill_Peck_2 = "" Then
         Label6 = "Depth of first peck"
         TEXT5.Visible = True
         label1.Visible = True
         label1 = "Depth of second peck"
         Else
         Label6.Caption = "Depth of Peck"
         End If
   End If
End If If Not Drill_Peck_2 = "" And optg74 = 1 Then
TEXT5.Visible = True
label1.Visible = True
label1 = "Depth of second peck"
End If End Sub Private Sub Command1_Click()
frmDrilling.Visible = False
frmMDI.ActiveForm.ActiveControl.SetFocus ' RETURNS THE CURSER TO THE SCREEN
```

```
End Sub

Private Sub Command2_Click()

Screen.MousePointer = 11

If TEXT1.Text = "" Then
MsgBox "Fill in all the blanks.", 48, "Drilling"
GoTo 500
End If If TEXT2.Text = "" Then
MsgBox "Fill in all the blanks.", 48, "Drilling"
GoTo 500
End If If TEXT3.Visible = True And TEXT3.Text = "" Then
MsgBox "Fill in all the blanks.", 48, "Drilling"
GoTo 500
End If Dim zclear As Double ' Used for "Z0.0750"
zclear = 0.075

If check1.Value = 1 Then
GoTo 100
End If

If optregular = True Then
GoTo 200
End If

If optg74 = True Then
GoTo 300
End If

100             ' center drill section
frmDrilling.Visible = False

Screen.MousePointer = 11

Clipboard.Clear
Clipboard.SetText Rapid & "X0 Z" & Format(zclear, formats) & Chr(13) & Chr(10)
editpasteproc
Clipboard.SetText Feed & "Z-"
editpasteproc
Clipboard.SetText Format(TEXT1.Text, formats)
editpasteproc
Clipboard.SetText " F"
editpasteproc
Clipboard.SetText Format(TEXT2.Text, formats) & Chr(13) & Chr(10)
editpasteproc
Clipboard.SetText dwell & "F" & Format(TEXT3.Text, formats) & Chr(13) & Chr(10)
editpasteproc
Clipboard.SetText Rapid & "Z" & Format(zclear, formats) & Chr(13) & Chr(10)
editpasteproc Screen.MousePointer = 0
    GoTo 500

200             ' regular drilling section frmDrilling.Visible = False

Screen.MousePointer = 11

Clipboard.Clear
Clipboard.SetText Rapid & "X0 Z" & Format(zclear, formats) & Chr(13) & Chr(10)
editpasteproc
Clipboard.SetText Feed & "Z-"
```

```
        editpasteproc
        Clipboard.SetText Format(TEXT1.Text, formats)
        editpasteproc
        Clipboard.SetText " F"
 5      editpasteproc
        Clipboard.SetText Format(TEXT2.Text, formats) & Chr(13) + Chr(10)
        editpasteproc
        Clipboard.SetText Rapid & "Z" & Format(zclear, formats) & Chr(13) & Chr(10)
        editpasteproc
10
            Screen.MousePointer = 0

GoTo 500
15

20      300             ' peck drilling section
        frmDrilling.Visible = False Screen.MousePointer = 11
25
        Clipboard.Clear
        Clipboard.SetText Rapid & "X0 Z" & Format(zclear, formats) & Chr(13) & Chr(10)
        editpasteproc
        Clipboard.SetText Drill_G_Code & "X0 Z-"
30      editpasteproc
        Clipboard.SetText Format(TEXT1.Text, formats)
        editpasteproc
        Clipboard.SetText " " & Drill_Peck_1
        editpasteproc
35      Clipboard.SetText Format(TEXT3.Text, formats)
        editpasteproc If Not Drill_Peck_2 = "" Then 'Check to see if there is a second peck...
        Clipboard.SetText " " & Drill_Peck_2
40      editpasteproc
        Clipboard.SetText Format(TEXT5.Text, formats)
        editpasteproc
        End If 45      Clipboard.SetText " F"
        editpasteproc
        Clipboard.SetText Format(TEXT2.Text, formats) & Chr(13) + Chr(10)
        editpasteproc
        Clipboard.SetText Rapid & "Z" & Format(zclear, formats) & Chr(13) & Chr(10)
50      editpasteproc Screen.MousePointer = 0

500
55
        Screen.MousePointer = 0 frmMDI.ActiveForm.ActiveControl.SetFocus ' RETURNS THE CURSER TO THE SCREEN

60      End Sub

Private Sub Form_Deactivate()
        Visible = False
        frmMDI.ActiveForm.ActiveControl.SetFocus ' RETURNS THE CURSER TO THE SCREEN
65      End Sub Private Sub Form_Load()

If WindowState = 0 Then
70          Move (Screen.Width - frmDrilling.Width) / 2, (Screen.Height - frmDrilling.Height) / 2
        End If End Sub
```

```
Private Sub Form_Paint()

If WindowState = 0 Then
        Move (Screen.Width - frmDrilling.Width) / 2, (Screen.Height - frmDrilling.Height) / 2
    End If End Sub Private Sub Form_Resize()

If WindowState = 0 Then
        Move (Screen.Width - frmDrilling.Width) / 2, (Screen.Height - frmDrilling.Height) / 2
    End If End Sub Private Sub optg74_Click()

TEXT3.Visible = True
Label6.Visible = True

If Not Drill_Peck_1 = "" Then
Label6 = "Depth of first peck"
Else
Label6 = "Depth of peck"
End If If Not Drill_Peck_2 = "" Then
TEXT5.Visible = True
label1.Visible = True
label1 = "Depth of second peck"
End If End Sub Private Sub optregular_Click()
TEXT3.Visible = False
Label6.Visible = False
TEXT5.Visible = False
label1.Visible = False
End Sub Private Sub Text1_KeyPress(KeyAscii As Integer)

If KeyAscii = (13) Then
        SendKeys ("{tab}"), True
    End If

Const DECIMAL_OK = -1          ' 0 = no, -1 = YES
    Const MIN_VALUE = -999         ' Minimum value
    Const MAX_VALUE = 999          ' Maximum value
    key$ = Chr$(KeyAscii)          ' Convert to string
    Select Case key$
       Case "0" To "9"             ' Numbers and minus signs
          Newvalue = Val(Left$(TEXT1.Text, TEXT1.SelStart) + key$ + Mid$(TEXT1.Text, TEXT1.SelStart + TEXT1.SelLength + 1))
          If Newvalue > MAX_VALUE Or Newvalue < MIN_VALUE Then
             KeyAscii = 0
          End If
       Case "."
          If DECIMAL_OK = 0 Or InStr(TEXT1.Text, ".") Then
             KeyAscii = 0
          End If
       Case Chr$(8)                ' Backspace
       Case Else
          KeyAscii = 0
    End Select
    If key$ = "-" And (InStr(TEXT1.Text, "-") Or TEXT1.SelStart <> 0) Then
       KeyAscii = 0
    End If End Sub Private Sub Text2_KeyPress(KeyAscii As Integer)
```

```
            If KeyAscii = (13) Then
                SendKeys ("{tab}"), True
            End If Const DECIMAL_OK = -1         ' 0 = no, -1 = YES
            Const MIN_VALUE = -999        ' Minimum value
            Const MAX_VALUE = 999         ' Maximum value
            key$ = Chr$(KeyAscii)         ' Convert to string
            Select Case key$
                Case "0" To "9"           ' Numbers and minus signs
                    Newvalue = Val(Left$(TEXT2.Text, TEXT2.SelStart) + key$ + Mid$(TEXT1.Text, TEXT1.SelStart + TEXT1.SelLength + 1))
                    If Newvalue > MAX_VALUE Or Newvalue < MIN_VALUE Then
                        KeyAscii = 0
                    End If
                Case "."
                    If DECIMAL_OK = 0 Or InStr(TEXT2.Text, ".") Then
                        KeyAscii = 0
                    End If
                Case Chr$(8)              ' Backspace
                Case Else
                    KeyAscii = 0
            End Select
            If key$ = "-" And (InStr(TEXT1.Text, "-") Or TEXT1.SelStart <> 0) Then
                KeyAscii = 0
            End If End Sub Private Sub Text3_KeyPress(KeyAscii As Integer)

If KeyAscii = (13) Then
                SendKeys ("{tab}"), True
            End If Const DECIMAL_OK = -1         ' 0 = no, -1 = YES
            Const MIN_VALUE = -999        ' Minimum value
            Const MAX_VALUE = 999         ' Maximum value
            key$ = Chr$(KeyAscii)         ' Convert to string
            Select Case key$
                Case "0" To "9"           ' Numbers and minus signs
                    Newvalue = Val(Left$(TEXT3.Text, TEXT3.SelStart) + key$ + Mid$(TEXT1.Text, TEXT1.SelStart + TEXT1.SelLength + 1))
                    If Newvalue > MAX_VALUE Or Newvalue < MIN_VALUE Then
                        KeyAscii = 0
                    End If
                Case "."
                    If DECIMAL_OK = 0 Or InStr(TEXT3.Text, ".") Then
                        KeyAscii = 0
                    End If
                Case Chr$(8)              ' Backspace
                Case Else
                    KeyAscii = 0
            End Select
            If key$ = "-" And (InStr(TEXT1.Text, "-") Or TEXT1.SelStart <> 0) Then
                KeyAscii = 0
            End If End Sub Private Sub Text4_KeyPress(KeyAscii As Integer)

If KeyAscii = (13) Then
                SendKeys ("{tab}"), True
            End If Const DECIMAL_OK = -1         ' 0 = no, -1 = YES
            Const MIN_VALUE = -999        ' Minimum value
            Const MAX_VALUE = 999         ' Maximum value
            key$ = Chr$(KeyAscii)         ' Convert to string
            Select Case key$
                Case "0" To "9"           ' Numbers and minus signs
```

```
            Newvalue = Val(Left$(TEXT1.Text, TEXT1.SelStart) + key$ + Mid$(TEXT1.Text, TEXT1.SelStart + TEXT1.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT1.Text, ".") Then
                KeyAscii = 0
            End If
        Case Chr$(8)          ' Backspace
        Case Else
            KeyAscii = 0
    End Select
    If key$ = "-" And (InStr(TEXT1.Text, "-") Or TEXT1.SelStart <> 0) Then
        KeyAscii = 0
    End If
End Sub Private Sub Text5_KeyPress(KeyAscii As Integer)

If KeyAscii = (13) Then
    SendKeys ("{tab}"), True
    End If

Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
        Case "0" To "9"         ' Numbers and minus signs
            Newvalue = Val(Left$(TEXT5.Text, TEXT5.SelStart) + key$ + Mid$(TEXT5.Text, TEXT5.SelStart + TEXT5.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT5.Text, ".") Then
                KeyAscii = 0
            End If
        Case Chr$(8)          ' Backspace
        Case Else
            KeyAscii = 0
    End Select
    If key$ = "-" And (InStr(TEXT5.Text, "-") Or TEXT5.SelStart <> 0) Then
        KeyAscii = 0
    End If
End Sub Private Sub Text6_KeyPress(KeyAscii As Integer)

If KeyAscii = (13) Then
    SendKeys ("{tab}"), True
    End If

Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
        Case "0" To "9"         ' Numbers and minus signs
            Newvalue = Val(Left$(TEXT1.Text, TEXT1.SelStart) + key$ + Mid$(TEXT1.Text, TEXT1.SelStart + TEXT1.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT1.Text, ".") Then
                KeyAscii = 0
            End If
        Case Chr$(8)          ' Backspace
        Case Else
            KeyAscii = 0
    End Select
    If key$ = "-" And (InStr(TEXT1.Text, "-") Or TEXT1.SelStart <> 0) Then
        KeyAscii = 0
```

```
        End If
    End Sub

Private Sub Text7_KeyPress(KeyAscii As Integer)
        Const DECIMAL_OK = -1       ' 0 = no, -1 = YES
        Const MIN_VALUE = -999      ' Minimum value
        Const MAX_VALUE = 999       ' Maximum value
        key$ = Chr$(KeyAscii)       ' Convert to string
        Select Case key$
            Case "0" To "9"         ' Numbers and minus signs
                Newvalue = Val(Left$(TEXT1.Text, TEXT1.SelStart) + key$ + Mid$(TEXT1.Text, TEXT1.SelStart + TEXT1.SelLength + 1))
                If Newvalue > MAX_VALUE Or Newvalue < MIN_VALUE Then
                    KeyAscii = 0
                End If
            Case "."
                If DECIMAL_OK = 0 Or InStr(TEXT1.Text, ".") Then
                    KeyAscii = 0
                End If
            Case Chr$(8)            ' Backspace
            Case Else
                KeyAscii = 0
        End Select
        If key$ = "-" And (InStr(TEXT1.Text, "-") Or TEXT1.SelStart <> 0) Then
            KeyAscii = 0
        End If
    End Sub
    VERSION 4.00
    Begin VB.Form FRMFACEANDTURN
        BorderStyle     =   3  'Fixed Dialog
        Caption         =   "Face and Turn"
        ClientHeight    =   5205
        ClientLeft      =   1305
        ClientTop       =   1305
        ClientWidth     =   7455
        BeginProperty Font
            name            =   "MS Sans Serif"
            charset         =   1
            weight          =   700
            size            =   8.25
            underline       =   0   'False
            italic          =   0   'False
            strikethrough   =   0   'False
        EndProperty
        ForeColor       =   &H80000008&
        Height          =   5670
        Icon            =   "FRMFACEA.frx":0000
        Left            =   1245
        LinkTopic       =   "Form2"
        LockControls    =   -1  'True
        MaxButton       =   0   'False
```

```
MinButton       = 0  'False
ScaleHeight     = 5205
ScaleWidth      = 7455
ShowInTaskbar   = 0  'False
Top             = 900
Width           = 7575
Begin VB.CheckBox Check3
   Caption         = "Finish only"
   BeginProperty Font
      name            = "MS Sans Serif"
      charset         = 1
      weight          = 400
      size            = 8.25
      underline       = 0  'False
      italic          = 0  'False
      strikethrough   = 0  'False
   EndProperty
   Height          = 375
   Left            = 5760
   TabIndex        = 39
   Top             = 3840
   Visible         = 0  'False
   Width           = 1335
End
```

```
Begin VB.CheckBox Check2
   Caption       =   "Rough only"
   BeginProperty Font
      name          =   "MS Sans Serif"
      charset       =   1
      weight        =   400
      size          =   8.25
      underline     =   0   'False
      italic        =   0   'False
      strikethrough =   0   'False
   EndProperty
   Height        =   375
   Left          =   5760
   TabIndex      =   38
   Top           =   3480
   Visible       =   0   'False
   Width         =   1335
End
Begin VB.CheckBox Check1
   Caption       =   "Rough and Finish"
   BeginProperty Font
      name          =   "MS Sans Serif"
      charset       =   1
      weight        =   400
      size          =   8.25
      underline     =   0   'False
      italic        =   0   'False
      strikethrough =   0   'False
   EndProperty
   Height        =   375
   Left          =   5760
   TabIndex      =   37
   Top           =   3120
   Value         =   1   'Checked
   Visible       =   0   'False
   Width         =   1575
End
Begin VB.OptionButton Option2
   Caption       =   "Two diameters"
   BeginProperty Font
      name          =   "MS Sans Serif"
      charset       =   1
      weight        =   400
      size          =   8.25
      underline     =   0   'False
      italic        =   0   'False
      strikethrough =   0   'False
   EndProperty
   Height        =   255
   Left          =   3480
   TabIndex      =   19
   Top           =   4320
   Width         =   1335
End
Begin VB.OptionButton Option1
   Caption       =   "One diameter"
   BeginProperty Font
      name          =   "MS Sans Serif"
      charset       =   1
      weight        =   400
      size          =   8.25
      underline     =   0   'False
      italic        =   0   'False
      strikethrough =   0   'False
   EndProperty
   Height        =   255
   Left          =   2160
   TabIndex      =   20
   Top           =   4320
   Value         =   -1  'True
   Width         =   1215
End
Begin VB.CheckBox chknlap
   Caption       =   "Canned Turning cycle"
```

```
        BeginProperty Font
            name       =   "MS Sans Serif"
            charset    =   1
            weight     =   400
            size       =   8.25
            underline  =   0  'False
            italic     =   0  'False
            strikethrough = 0 'False
        EndProperty
        Height       =   255
        Left         =   4920
        TabIndex     =   21
        Top          =   4320
        Width        =   1935
    End
    Begin VB.TextBox TEXT9
        BackColor    =   &H00FFFFFF&
        Height       =   285
        Left         =   2160
        MaxLength    =   20
        TabIndex     =   4
        Top          =   2160
        Width        =   855
    End
    Begin VB.TextBox Text16
        BackColor    =   &H00FFFFFF&
        Height       =   285
        Left         =   5280
        MaxLength    =   20
        TabIndex     =   11
        Top          =   2160
        Visible      =   0  'False
        Width        =   855
    End
    Begin VB.TextBox Text19
        BackColor    =   &H00FFFFFF&
        Height       =   285
        Left         =   4560
        MaxLength    =   20
        TabIndex     =   14
        Top          =   3840
        Visible      =   0  'False
        Width        =   855
    End
    Begin VB.TextBox Text18
        BackColor    =   &H00FFFFFF&
        Height       =   285
        Left         =   4560
        MaxLength    =   20
        TabIndex     =   13
        Top          =   3360
        Visible      =   0  'False
        Width        =   855
    End
    Begin VB.TextBox Text17
        BackColor    =   &H00FFFFFF&
        Height       =   285
        Left         =   5280
        MaxLength    =   20
        TabIndex     =   12
        Top          =   2640
        Visible      =   0  'False
        Width        =   855
    End
    Begin VB.TextBox Text15
        BackColor    =   &H00FFFFFF&
        Height       =   285
        Left         =   5280
        MaxLength    =   20
        TabIndex     =   10
        Top          =   1680
        Visible      =   0  'False
        Width        =   855
    End
```

```
Begin VB.TextBox Text14
   BackColor    =   &H00FFFFFF&
   Height       =   285
   Left         =   5280
   MaxLength    =   20
   TabIndex     =   9
   Top          =   1200
   Visible      =   0   'False
   Width        =   855
End
Begin VB.TextBox Text13
   BackColor    =   &H00FFFFFF&
   Height       =   285
   Left         =   5280
   MaxLength    =   20
   TabIndex     =   8
   Top          =   720
   Width        =   855
End
Begin VB.TextBox Text12
   BackColor    =   &H00FFFFFF&
   Height       =   285
   Left         =   5280
   MaxLength    =   20
   TabIndex     =   7
   Top          =   240
   Width        =   855
End
Begin VB.TextBox Text11
   BackColor    =   &H00FFFFFF&
   Height       =   285
   Left         =   2160
   MaxLength    =   20
   TabIndex     =   6
   Top          =   3120
   Width        =   855
End
Begin VB.TextBox Text10
   BackColor    =   &H00FFFFFF&
   Height       =   285
   Left         =   2160
   MaxLength    =   20
   TabIndex     =   5
   Top          =   2640
   Width        =   855
End
Begin VB.TextBox Text5
   BackColor    =   &H00FFFFFF&
   Height       =   285
   Left         =   2160
   MaxLength    =   20
   TabIndex     =   1
   Top          =   720
   Width        =   855
End
Begin VB.TextBox Text4
   BackColor    =   &H00FFFFFF&
   Height       =   285
   Left         =   2160
   MaxLength    =   20
   TabIndex     =   0
   Top          =   240
   Width        =   855
End
Begin VB.CommandButton Command2
   Caption          =   "&Write"
   BeginProperty Font
      name          =   "MS Sans Serif"
      charset       =   1
      weight        =   400
      size          =   8.25
      underline     =   0   'False
      italic        =   0   'False
      strikethrough =   0   'False
```

```
            EndProperty
            Height          =   375
            Left            =   2880
            TabIndex        =   15
            Top             =   4680
            Width           =   975
         End
         Begin VB.CommandButton Command1
            Caption         =   "&Cancel"
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   375
            Left            =   4200
            TabIndex        =   16
            Top             =   4680
            Width           =   975
         End
         Begin VB.TextBox Text7
            BackColor       =   &H00FFFFFF&
            Height          =   285
            Left            =   2160
            MaxLength       =   20
            TabIndex        =   3
            Top             =   1680
            Width           =   855
         End
         Begin VB.TextBox Text6
            BackColor       =   &H00FFFFFF&
            Height          =   285
            Left            =   2160
            MaxLength       =   20
            TabIndex        =   2
            Top             =   1200
            Width           =   855
         End
         Begin VB.Label Label2
            Alignment       =   1   'Right Justify
            Caption         =   "Second dia. Radius"
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   255
            Left            =   3360
            TabIndex        =   36
            Top             =   1800
            Visible         =   0   'False
            Width           =   1815
         End
         Begin VB.Label Label1
            Alignment       =   1   'Right Justify
            Caption         =   "What size Radius"
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   255
```

```
              Left            =   3360
              TabIndex        =   35
              Top             =   360
              Visible         =   0   'False
              Width           =   1815
           End
           Begin VB.Label Label9
              Alignment       =   1  'Right Justify
              Caption         =   "Z depth to turn to"
              BeginProperty Font
                 name         =   "MS Sans Serif"
                 charset      =   1
                 weight       =   400
                 size         =   8.25
                 underline    =   0   'False
                 italic       =   0   'False
                 strikethrough =  0   'False
              EndProperty
              Height          =   255
              Left            =   90
              TabIndex        =   34
              Top             =   2280
              Width           =   1965
           End
           Begin VB.Label Label16
              Alignment       =   1  'Right Justify
              Caption         =   "Z Depth of second Dia."
              BeginProperty Font
                 name         =   "MS Sans Serif"
                 charset      =   1
                 weight       =   400
                 size         =   8.25
                 underline    =   0   'False
                 italic       =   0   'False
                 strikethrough =  0   'False
              EndProperty
              Height          =   255
              Left            =   3150
              TabIndex        =   33
              Top             =   2280
              Visible         =   0   'False
              Width           =   2025
           End
           Begin VB.Label Label19
              Alignment       =   1  'Right Justify
              Caption         =   "Depth of cut"
              BeginProperty Font
                 name         =   "MS Sans Serif"
                 charset      =   1
                 weight       =   400
                 size         =   8.25
                 underline    =   0   'False
                 italic       =   0   'False
                 strikethrough =  0   'False
              EndProperty
              Height          =   255
              Left            =   3360
              TabIndex        =   32
              Top             =   3960
              Visible         =   0   'False
              Width           =   1095
           End
           Begin VB.Label Label18
              Alignment       =   1  'Right Justify
              Caption         =   "Roughing feed rate"
              BeginProperty Font
                 name         =   "MS Sans Serif"
                 charset      =   1
                 weight       =   400
                 size         =   8.25
                 underline    =   0   'False
                 italic       =   0   'False
                 strikethrough =  0   'False
              EndProperty
```

```
         Height      =   255
         Left        =   3000
         TabIndex    =   31
         Top         =   3480
         Visible     =   0   'False
         Width       =   1455
      End
      Begin VB.Label Label17
         Alignment   =   1  'Right Justify
         Caption     =   "Second dia. feed"
         BeginProperty Font
            name          =   "MS Sans Serif"
            charset       =   1
            weight        =   400
            size          =   8.25
            underline     =   0   'False
            italic        =   0   'False
            strikethrough =   0   'False
         EndProperty
         Height      =   255
         Left        =   3600
         TabIndex    =   30
         Top         =   2760
         Visible     =   0   'False
         Width       =   1575
      End
      Begin VB.Label Label15
         Alignment   =   1  'Right Justify
         Caption     =   "Second dia. Chamfer"
         BeginProperty Font
            name          =   "MS Sans Serif"
            charset       =   1
            weight        =   400
            size          =   8.25
            underline     =   0   'False
            italic        =   0   'False
            strikethrough =   0   'False
         EndProperty
         Height      =   255
         Left        =   3240
         TabIndex    =   29
         Top         =   1800
         Visible     =   0   'False
         Width       =   1935
      End
      Begin VB.Label Label14
         Alignment   =   1  'Right Justify
         Caption     =   "Second (large) diameter"
         BeginProperty Font
            name          =   "MS Sans Serif"
            charset       =   1
            weight        =   400
            size          =   8.25
            underline     =   0   'False
            italic        =   0   'False
            strikethrough =   0   'False
         EndProperty
         Height      =   255
         Left        =   3195
         TabIndex    =   28
         Top         =   1320
         Visible     =   0   'False
         Width       =   1980
      End
      Begin VB.Label Label13
         Alignment   =   1  'Right Justify
         Caption     =   "Tool nose radius"
         BeginProperty Font
            name          =   "MS Sans Serif"
            charset       =   1
            weight        =   400
            size          =   8.25
            underline     =   0   'False
            italic        =   0   'False
```

```
         strikethrough   =  0  'False
      EndProperty
      Height      =  255
      Left        =  3720
      TabIndex    =  27
      Top         =  840
      Width       =  1455
   End
   Begin VB.Label Label11
      Alignment   =  1  'Right Justify
      Caption     =  "Feed rate for turning"
      BeginProperty Font
         name            =  "MS Sans Serif"
         charset         =  1
         weight          =  400
         size            =  8.25
         underline       =  0  'False
         italic          =  0  'False
         strikethrough   =  0  'False
      EndProperty
      Height      =  255
      Left        =  240
      TabIndex    =  26
      Top         =  3240
      Width       =  1815
   End
   Begin VB.Label Label12
      Alignment   =  1  'Right Justify
      Caption     =  "What size chamfer"
      BeginProperty Font
         name            =  "MS Sans Serif"
         charset         =  1
         weight          =  400
         size            =  8.25
         underline       =  0  'False
         italic          =  0  'False
         strikethrough   =  0  'False
      EndProperty
      Height      =  255
      Left        =  3360
      TabIndex    =  25
      Top         =  360
      Width       =  1815
   End
   Begin VB.Label Label10
      Alignment   =  1  'Right Justify
      Caption     =  "Feed rate for facing"
      BeginProperty Font
         name            =  "MS Sans Serif"
         charset         =  1
         weight          =  400
         size            =  8.25
         underline       =  0  'False
         italic          =  0  'False
         strikethrough   =  0  'False
      EndProperty
      Height      =  255
      Left        =  240
      TabIndex    =  24
      Top         =  2760
      Width       =  1815
   End
   Begin VB.Label Label5
      Alignment   =  1  'Right Justify
      Caption     =  "Diameter to face to"
      BeginProperty Font
         name            =  "MS Sans Serif"
         charset         =  1
         weight          =  400
         size            =  8.25
         underline       =  0  'False
         italic          =  0  'False
         strikethrough   =  0  'False
      EndProperty
```

```
        Height     =  255
        Left       =  360
        TabIndex   =  23
        Top        =  840
        Width      =  1695
      End
      Begin VB.Label Label4
        Alignment  =  1  'Right Justify
        Caption    =  "Stock Diameter"
        BeginProperty Font
          name     =  "MS Sans Serif"
          charset  =  1
          weight   =  400
          size     =  8.25
          underline  =  0  'False
          italic     =  0  'False
          strikethrough  =  0  'False
        EndProperty
        Height     =  255
        Left       =  600
        TabIndex   =  22
        Top        =  360
        Width      =  1455
      End
      Begin VB.Label Label7
        Alignment  =  1  'Right Justify
        Caption    =  "Z value to face at"
        BeginProperty Font
          name     =  "MS Sans Serif"
          charset  =  1
          weight   =  400
          size     =  8.25
          underline  =  0  'False
          italic     =  0  'False
          strikethrough  =  0  'False
        EndProperty
        Height     =  255
        Left       =  600
        TabIndex   =  18
        Top        =  1800
        Width      =  1455
      End
      Begin VB.Label Label6
        Alignment  =  1  'Right Justify
        Caption    =  "Diameter to turn"
        BeginProperty Font
          name     =  "MS Sans Serif"
          charset  =  1
          weight   =  400
          size     =  8.25
          underline  =  0  'False
          italic     =  0  'False
          strikethrough  =  0  'False
        EndProperty
        Height     =  255
        Left       =  0
        TabIndex   =  17
        Top        =  1320
        Width      =  2055
      End
End
Attribute VB_Name = "FRMFACEANDTURN"
Attribute VB_Creatable = False
Attribute VB_Exposed = False Private Sub chk1dia_Click()
Label14.Visible = False
TEXT14.Visible = False
Label15.Visible = False
text15.Visible = False
Label16.Visible = False
TEXT16.Visible = False
Label17.Visible = False
Text17.Visible = False
```

```
End Sub

Private Sub chk2dia_Click()
Label14.Visible = True
TEXT14.Visible = True
Label15.Visible = True
text15.Visible = True
Label16.Visible = True
TEXT16.Visible = True
Label17.Visible = True
Text17.Visible = True
End Sub Private Sub check1_Click()
If check1 = 1 Then
Check2 = 0
Check3 = 0
End If
End Sub Private Sub check1_MouseUp(Button As Integer, Shift As Integer, x As Single, Y As Single)
check1 = 1
End Sub Private Sub Check2_Click()
If Check2 = 1 Then
check1 = 0
Check3 = 0
End If
End Sub Private Sub Check2_MouseUp(Button As Integer, Shift As Integer, x As Single, Y As Single)
Check2 = 1
End Sub Private Sub Check3_Click()

' Check to see if first edge break is radius or chamfer.
If label1.Visible = True Then
ft_first_brk_rad = True
ft_first_brk_cham = False
End If ' Check to see if first edge break is radius or chamfer.
If Label12.Visible = True Then
ft_first_brk_cham = True
ft_first_brk_rad = False
End If ' Check to see if second edge break is radius or chamfer.
If label2.Visible = True Then
ft_second_brk_rad = True
ft_second_brk_cham = False
End If ' Check to see if second edge break is radius or chamfer.
If Label15.Visible = True Then
ft_second_brk_cham = True
ft_second_brk_rad = False
End If ' The user wants "Finish cycle only".
If Check3 = 1 Then
Check2 = 0   ' Turn off "Rough only".
check1 = 0   ' Turn off "Rough and finish".
' Make all the un-nessacary stuff invisible...
Label12.Visible = False
Label6.Visible = False
text6.Visible = False
Label9.Visible = False
text9.Visible = False
```

```
Label11.Visible = False
text11.Visible = False
Label18.Visible = False
Text18.Visible = False
Label19.Visible = False
Text19.Visible = False
label1.Visible = False
text12.Visible = False
Label13.Visible = False
text13.Visible = False
Option1.Visible = False
option2.Visible = False
Label14.Visible = False
TEXT14.Visible = False
Label15.Visible = False
text15.Visible = False
Label16.Visible = False
TEXT16.Visible = False
Label17.Visible = False
Text17.Visible = False
label2.Visible = False
check1.Visible = False
Check2.Visible = False
label1.Visible = False
End If ' If user turns off "Finish cycle only"...
If Check3 = 0 Then
    ' Make it all visible again...
    Label6.Visible = True
    text6.Visible = True
    Label9.Visible = True
    text9.Visible = True
    Label11.Visible = True
    text11.Visible = True
    Label18.Visible = True
    Text18.Visible = True
    Label19.Visible = True
    Text19.Visible = True If ft_first_brk_rad = True Then
        label1.Visible = True
        Label12.Visible = False
    End If If ft_first_brk_cham = True Then
        Label12.Visible = True
        label1.Visible = False
    End If text12.Visible = True
    Label13.Visible = True
    text13.Visible = True
    Option1.Visible = True
    option2.Visible = True
    check1 = 1
    check1.Visible = True
    Check2.Visible = True
End If ' If only one dia. then make sure the two dia. stuff
' is not visible...
If Check3 = 0 Then
    If Option1 = True Then
        If option2 = False Then
            Label14.Visible = False
            TEXT14.Visible = False
            Label15.Visible = False
            text15.Visible = False
            Label16.Visible = False
            TEXT16.Visible = False
            Label17.Visible = False
            Text17.Visible = False
```

```
            label2.Visible = False
            Label6.Caption = "Diameter To Turn"
            Label9.Caption = "Z depth to turn to"
          End If
      End If
    End If ' If two diameters, make sure all the two dia.
    ' stuff is visible...
    If Check3 = 0 Then
      If option2 = True Then
        If Option1 = False Then
          Label14.Visible = True
          TEXT14.Visible = True If ft_second_brk_rad = True Then
            label2.Visible = True
            Label15.Visible = False
          End If If ft_second_brk_cham = True Then
            Label15.Visible = True
            label2.Visible = False
          End If text15.Visible = True
          Label16.Visible = True
          TEXT16.Visible = True
          Label17.Visible = True
          Text17.Visible = True
          Label6.Caption = "First (small) Diameter"
          Label9.Caption = "First Z Depth"
        End If
      End If
    End If End Sub Private Sub chknlap_Click()

' Check to see if first edge break is radius or chamfer.
If label1.Visible = True Then
  ft_first_brk_rad = True
  ft_first_brk_cham = False
End If ' Check to see if first edge break is radius or chamfer.
If Label12.Visible = True Then
  ft_first_brk_cham = True
  ft_first_brk_rad = False
End If ' Check to see if second edge break is radius or chamfer.
If label2.Visible = True Then
  ft_second_brk_rad = True
  ft_second_brk_cham = False
End If ' Check to see if second edge break is radius or chamfer
If Label15.Visible = True Then
  ft_second_brk_cham = True
  ft_second_brk_rad = False
End If ' User turned off the canned cycle function.
If chknlap = 0 Then
  Label6.Visible = True
  text6.Visible = True
  Label9.Visible = True
  text9.Visible = True
  Label11.Visible = True
```

```
        text11.Visible = True
        Label18.Visible = True
        Text18.Visible = True
        Label19.Visible = True
        Text19.Visible = True
        text12.Visible = True
        Label13.Visible = True
        text13.Visible = True
        Option1.Visible = True
        option2.Visible = True
        check1 = 1
        check1.Visible = True
        Check2.Visible = True
    End If ' One diameter - make all the two dia. stuff invisible.
    If Option1 = True Then
        If option2 = False Then If ft_first_brk_rad = True Then
                label1.Visible = True
                Label12.Visible = False
            End If If ft_first_brk_cham = True Then
                Label12.Visible = True
                label1.Visible = False
            End If Label14.Visible = False
            TEXT14.Visible = False
            text15.Visible = False
            Label16.Visible = False
            TEXT16.Visible = False
            Label17.Visible = False
            Text17.Visible = False
            Label6.Caption = "Diameter To Turn"
            Label9.Caption = "Z depth to turn to"
        End If
    End If ' Two diameters - make the two dia. stuff visible.
    If option2 = True Then
        If Option1 = False Then
            If ft_first_brk_rad = True Then
                label1.Visible = True
                Label12.Visible = False
            End If If ft_first_brk_cham = True Then
                Label12.Visible = True
                label1.Visible = False
            End If If ft_second_brk_rad = True Then
                label2.Visible = True
                Label15.Visible = False
            End If If ft_second_brk_cham = True Then
                Label15.Visible = True
                label2.Visible = False
            End If Label14.Visible = True
            TEXT14.Visible = True
            text15.Visible = True
            Label16.Visible = True
            TEXT16.Visible = True
            Label17.Visible = True
            Text17.Visible = True
            Label6.Caption = "First (small) Diameter"
```

```
        Label9.Caption = "First Z Depth"
      End If
    End If

' If user turned on the canned cycle function,
    ' Make everything visible that goes with it...
    If chknlap.Value = 1 Then
        check1.Visible = True
        Check2.Visible = True
        Check3.Visible = True
        Label18.Visible = True
        Text18.Visible = True
        Label19.Visible = True
        Text19.Visible = True
    End If ' If user turned off canned cycle function,
    ' This stuff should be invisible...
    If chknlap.Value = 0 Then
        check1.Visible = False
        Check2.Visible = False
        Check3.Visible = False
        Label18.Visible = False
        Text18.Visible = False
        Label19.Visible = False
        Text19.Visible = False
    End If End Sub Private Sub chknonlap_Click()
    Label18.Visible = False
    Text18.Visible = False
    Label19.Visible = False
    Text19.Visible = False
End Sub Private Sub Command1_Click()
    FRMFACEANDTURN.Visible = False
    frmMDI.ActiveForm.ActiveControl.SetFocus ' RETURNS THE CURSER TO THE SCREEN
End Sub Private Sub Command2_Click()

Screen.MousePointer = 11

If TEXT4.Visible = True And TEXT4.Text = "" Then
        F_T_Error_Blank_Text_Box
        GoTo 600
    End If If TEXT5.Visible = True And TEXT5.Text = "" Then
        F_T_Error_Blank_Text_Box
        GoTo 600
    End If If text6.Visible = True And text6.Text = "" Then
        F_T_Error_Blank_Text_Box
        GoTo 600
    End If If text7.Visible = True And text7.Text = "" Then
        F_T_Error_Blank_Text_Box
        GoTo 600
    End If If text9.Visible = True And text9.Text = "" Then
        F_T_Error_Blank_Text_Box
        GoTo 600
    End If If text10.Visible = True And text10.Text = "" Then
        F_T_Error_Blank_Text_Box
```

```
            GoTo 600
            End If

If text11.Visible = True And text11.Text = "" Then
            F_T_Error_Blank_Text_Box
            GoTo 600
            End If If text12.Visible = True And text12.Text = "" Then
            F_T_Error_Blank_Text_Box
            GoTo 600
            End If If text13.Visible = True And text13.Text = "" Then
            F_T_Error_Blank_Text_Box
            GoTo 600
            End If If TEXT14.Visible = True And TEXT14.Text = "" Then
            F_T_Error_Blank_Text_Box
            GoTo 600
            End If If text15.Visible = True And text15.Text = "" Then
            F_T_Error_Blank_Text_Box
            GoTo 600
            End If If TEXT16.Visible = True And TEXT16.Text = "" Then
            F_T_Error_Blank_Text_Box
            GoTo 600
            End If If Text17.Visible = True And Text17.Text = "" Then
            F_T_Error_Blank_Text_Box
            GoTo 600
            End If If Text18.Visible = True And Text18.Text = "" Then
            F_T_Error_Blank_Text_Box
            GoTo 600
            End If If Text19.Visible = True And Text19.Text = "" Then
            F_T_Error_Blank_Text_Box
            GoTo 600
            End If If option2.Value = True Then If ((TEXT14.Text * 2) / 2) < ((text6.Text * 2) / 2) Then
                MsgBox "The second diameter is smaller" & Chr(13) + Chr(10) & "than the first diameter !", 48, "Face and Turn Alert !"
                GoTo 600
                End If End If Dim TEXT8 As Double ' Used for "Z0.0500"
            Dim TEXT3 As Double ' Used for feed rates
            Dim TEXT2 As Double ' Used for feed rates
            Dim TEXT1 As Double    ' Used for feed rates
            TEXT8 = 0.05
            TEXT3 = 0.0025
            TEXT2 = 0.01
            TEXT1 = 0.002

700 FRMFACEANDTURN.Visible = False

' If user only wants a finish cycle
            If Check3 = 1 Then  ' Check3 is finish cycle only
```

```
            GoTo 40
            End If

If Label12.Visible = True Then
 5          Comp = text13.Text * 0.53 ' Calculates comp for chamfer
            EdgeBreak_1 = text12.Text + Comp
            End If If label1.Visible = True Then
10          Comp = text13.Text * 1 ' Calculates comp for radius
            EdgeBreak_1 = text12.Text + Comp
            End If STK1 = TEXT4.Text + 0.1     ' Stock diameter + 0.1000
15          STK2 = TEXT4.Text + 0.02    ' Stock diameter + 0.0200

EdgeBreak_Dia = (text6.Text) - (EdgeBreak_1 * 2) ' Calculates dia. to position

Screen.MousePointer = 11
20          .
                        ' Start writing the CNC program here !

40
25          STK1 = TEXT4.Text + 0.1     ' Stock diameter + 0.1000
            STK2 = TEXT4.Text + 0.02    ' Stock diameter + 0.0200

' Standard positioning and face off moves
30          Clipboard.SetText Rapid & XCode & Format(STK1, formats) & " Z" & Format(text7.Text, formats) & Chr(13) & Chr(10)
            editpasteproc
            Clipboard.SetText XCode & Format(STK2, formats) & Chr(13) & Chr(10)
            editpasteproc
            Clipboard.SetText Feed & XCode & Format(TEXT5.Text, formats) & " F" & Format(text10.Text, formats) & Chr(13) & Chr(10)
35          editpasteproc ' If user only wants a finish cycle
            If Check3 = 1 Then ' Check3 is finish cycle only
40          Clipboard.SetText Rapid & XCode & Format(STK2, formats) & " Z" & Format(TEXT8, formats) & Chr(13) & Chr(10)
            editpasteproc
            GoTo 50
            End If 45
            ' Check to see if user wants a canned cycle
            If chknlap = 1 Then
            Clipboard.SetText Rapid & XCode & Format(STK2, formats) & " Z" & Format(TEXT8, formats) & Chr(13) & Chr(10)
            editpasteproc
50
            ' If they used the first text box, paste it...
            If Not OD_Turn_Cycle_Line_1 = "" Then
            Clipboard.SetText OD_Turn_Cycle_Line_1
            editpasteproc
55          End If ' If the first text box was selected for "D & F" ...
            If OD_Line_Depth_and_Feed = "1" Then
            Clipboard.SetText " D" & Format(Text19.Text, formats) & " F" & Format(Text18.Text, formats) & Chr(13) + Chr(10)
60          editpasteproc
            Else
            If Not OD_Turn_Cycle_Line_1 = "" Then
            Clipboard.SetText Chr(13) + Chr(10)
            editpasteproc
65          End If
            End If ' If they used the second text box, paste it...
            If Not OD_Turn_Cycle_Line_2 = "" Then
70          Clipboard.SetText OD_Turn_Cycle_Line_2
            editpasteproc
            End If ' If the second text box was selected for "D & F" ...
```

```
            If OD_Line_Depth_and_Feed = "2" Then
                Clipboard.SetText " D" & Format(Text19.Text, formats) & " F" & Format(Text18.Text, formats) & Chr(13) + Chr(10)
                editpasteproc
            Else
                If Not OD_Turn_Cycle_Line_2 = "" Then
                    Clipboard.SetText Chr(13) + Chr(10)
                    editpasteproc
                End If
            End If End If 'If user is numbering first and last lines of cannad cycle
            If chknlap = 1 Then
                If Not OD_Turn_Cycle_Line_6 = "" Then
                Clipboard.SetText OD_Turn_Cycle_Line_6
                editpasteproc
                End If
            End If If Label12.Visible = True And label1.Visible = False Then    ' position to chamfer
            EdgeBreak_Dia = EdgeBreak_Dia - 0.0002   ' Chamfers need an extra "tenth" !
            Clipboard.SetText Rapid & XCode & Format(EdgeBreak_Dia, formats) & " Z" & Format(TEXT8, formats) & Chr(13) & Chr(10)
            editpasteproc
            End If If label1.Visible = True And Label12.Visible = False Then    ' position to radius
            Clipboard.SetText Rapid & XCode & Format(EdgeBreak_Dia, formats) & " Z" & Format(TEXT8, formats) & Chr(13) & Chr(10)
            editpasteproc
            End If ' "G01 Z0"
            Clipboard.SetText Feed & "Z" & Format(text7.Text, formats) & " F" & Format(TEXT3, formats) & Chr(13) & Chr(10)
            editpasteproc ' First edge break If Label12.Visible = True Then    ' chamfer - First diameter
            Clipboard.SetText G_Code_Chamfer & XCode & Format(text6.Text, formats) & " " & Chamfer_Z & "-" & Format(EdgeBreak_1, formats)
                & " F" & Format(TEXT1, formats) & Chr(13) & Chr(10)
            editpasteproc
            Clipboard.SetText Feed
            editpasteproc
            End If If label1.Visible = True Then    ' radius - First diameter
            Clipboard.SetText G_Code_Radius & XCode & Format(text6.Text, formats) & " " & Rad_Z & "-" & Format(EdgeBreak_1, formats) & " F"
                & Format(TEXT1, formats) & Chr(13) & Chr(10)
            editpasteproc
            Clipboard.SetText Feed
            editpasteproc
            End If ' Feed back in Z on first diameter
            Clipboard.SetText "Z-" & Format(text9.Text, formats) & " F" & Format(text11.Text, formats) & Chr(13) & Chr(10)
            editpasteproc ' Check to see if there are two diameters If option2 = True Then ' Declare "EdgeBreak_2"

If Label15.Visible = True Then    ' chamfer - Second diameter
                Comp = text13.Text * 0.53 ' Calculates comp for chamfer
```

```
                EdgeBreak_2 = text15.Text + Comp   ' Second edge break value
                Clipboard.SetText G_Code_Chamfer & XCode & Format(TEXT14.Text, formats) & " " & Chamfer_Z & "-" & Format(EdgeBreak_2,
            formats) & " F" & Format(TEXT1, formats) & Chr(13) & Chr(10)
                editpasteproc
                Clipboard.SetText Feed
                editpasteproc
                End If If label2.Visible = True Then     ' radius - Second diameter
                Comp = text13.Text * 1 ' Calculates comp for radius
                EdgeBreak_2 = text15.Text + Comp  ' Second edge break value
                Clipboard.SetText G_Code_Radius & XCode & Format(TEXT14.Text, formats) & " " & Rad_Z & "-" & Format(EdgeBreak_2, formats)
            & " F" & Format(TEXT1, formats) & Chr(13) & Chr(10)
                editpasteproc
                Clipboard.SetText Feed
                editpasteproc
                End If ' Feed to second "Z" depth
                Clipboard.SetText "Z-" & Format(TEXT16.Text, formats) & " F" & Format(Text17.Text, formats) & Chr(13) & Chr(10)
                editpasteproc
                End If 'If user is numbering first and last lines of cannad cycle
                If chknlap = 1 Then
                    If Not OD_Turn_Cycle_Line_7 = "" Then
                    Clipboard.SetText OD_Turn_Cycle_Line_7
                    editpasteproc
                    End If
                End If ' Feed up over the stock diameter
                Clipboard.SetText XCode & Format(STK2, formats) & " F" & Format(TEXT2, formats) & Chr(13) & Chr(10)
                editpasteproc ' Check to see if user is using a canned cycle If chknlap = 1 Then If Not OD_Turn_Cycle_Line_3 = "" Then
                    Clipboard.SetText OD_Turn_Cycle_Line_3
                    editpasteproc
                    ' If the third text box was selected for "D & F" ...
                    If OD_Line_Depth_and_Feed = "3" Then
                    Clipboard.SetText " D" & Format(Text19.Text, formats) & " F" & Format(Text18.Text, formats) & Chr(13) + Chr(10)
                    editpasteproc
                    Else
                    If Not OD_Turn_Cycle_Line_3 = "" Then
                    Clipboard.SetText Chr(13) + Chr(10)
                    editpasteproc
                    End If
                    End If
                End If Clipboard.SetText Rapid & "Z" & Format(TEXT8, formats) & Chr(13) & Chr(10)
                editpasteproc If Not OD_Turn_Cycle_Line_4 = "" Then
                Clipboard.SetText OD_Turn_Cycle_Line_4
                editpasteproc ' If the fourth text box was selected for "D & F" ...
                    If OD_Line_Depth_and_Feed = "4" Then
                    Clipboard.SetText " D" & Format(Text19.Text, formats) & " F" & Format(Text18.Text, formats) & Chr(13) + Chr(10)
                    editpasteproc
                    Else
                    If Not OD_Turn_Cycle_Line_4 = "" Then
                    Clipboard.SetText Chr(13) + Chr(10)
                    editpasteproc
                    End If
                    End If Clipboard.SetText Rapid & "Z" & Format(TEXT8, formats) & Chr(13) & Chr(10)
```

```
            editpasteproc
        End If

' If user only wants a rough cycle

If Check2 = 1 Then    ' check2 is for rough cycle only
            GoTo 600
        End If 50      ' Finish cycle
            If Not OD_Turn_Cycle_Line_5 = "" Then
            Clipboard.SetText OD_Turn_Cycle_Line_5 & Chr(13) + Chr(10)
            editpasteproc
            End If
        Clipboard.SetText Rapid & "Z" & Format(TEXT8, formats) & Chr(13) & Chr(10)
        editpasteproc
        GoTo 600
        End If ' if no canned cycle - get the hell out of here !
        Clipboard.SetText Rapid & XCode & Format(STK1, formats) & Chr(13) & Chr(10)
        editpasteproc Clipboard.SetText "Z" & Format(TEXT8, formats) & Chr(13) & Chr(10)
        editpasteproc Screen.MousePointer = 0

600

Screen.MousePointer = 0 frmMDI.ActiveForm.ActiveControl.SetFocus ' RETURNS THE CURSER TO THE SCREEN

End Sub

Private Sub Form_Deactivate()
        Visible = False
        frmMDI.ActiveForm.ActiveControl.SetFocus ' RETURNS THE CURSER TO THE SCREEN
        End Sub Private Sub Form_Load()

If WindowState = 0 Then
                Move (Screen.Width - FRMFACEANDTURN.Width) / 2, (Screen.Height - FRMFACEANDTURN.Height) / 2
            End If End Sub Private Sub Form_Paint()

If WindowState = 0 Then
                Move (Screen.Width - FRMFACEANDTURN.Width) / 2, (Screen.Height - FRMFACEANDTURN.Height) / 2
            End If End Sub Private Sub Form_Resize()

If WindowState = 0 Then
                Move (Screen.Width - FRMFACEANDTURN.Width) / 2, (Screen.Height - FRMFACEANDTURN.Height) / 2
            End If End Sub Private Sub label1_DblClick()
        label1.Visible = False
        Label12.Visible = True
        End Sub
```

```
Private Sub Label12_DblClick()
Label12.Visible = False
label1.Visible = True
End Sub Private Sub Label15_DblClick()
Label15.Visible = False
label2.Visible = True
End Sub Private Sub label2_DblClick()
label2.Visible = False
Label15.Visible = True
End Sub Private Sub opt1dia_Click()
Label14.Visible = False
TEXT14.Visible = False
Label15.Visible = False
text15.Visible = False
Label16.Visible = False
TEXT16.Visible = False
Label17.Visible = False
Text17.Visible = False
End Sub Private Sub opt2dia_Click()
Label14.Visible = True
TEXT14.Visible = True
Label15.Visible = True
text15.Visible = True
Label16.Visible = True
TEXT16.Visible = True
Label17.Visible = True
Text17.Visible = True
End Sub Private Sub Option1_Click()

' Option1 is for 1 Diameter.

' Check to see if first edge break is radius or chamfer.
If label1.Visible = True Then
ft_first_brk_rad = True
ft_first_brk_cham = False
End If ' Check to see if first edge break is radius or chamfer.
If Label12.Visible = True Then
ft_first_brk_cham = True
ft_first_brk_rad = False
End If ' Check to see if second edge break is radius or chamfer.
If label2.Visible = True Then
ft_second_brk_rad = True
ft_second_brk_cham = False
End If ' Check to see if second edge break is radius or chamfer.
If Label15.Visible = True Then
ft_second_brk_cham = True
ft_second_brk_rad = False
End If Label14.Visible = False
TEXT14.Visible = False
Label15.Visible = False
text15.Visible = False
Label16.Visible = False
TEXT16.Visible = False
Label17.Visible = False
```

```
Text17.Visible = False label2.Visible = False

Label6.Caption = "Diameter To Turn"
Label9.Caption = "Z depth to turn to"

End Sub

Private Sub option2_Click()

' Option2 is for 2 Diameters.

Label14.Visible = True
TEXT14.Visible = True
Label15.Visible = True
text15.Visible = True
Label16.Visible = True
TEXT16.Visible = True
Label17.Visible = True
Text17.Visible = True Label6.Caption = "First (small) Diameter"
Label9.Caption = "Z Depth of first Dia."

' Check to see if second edge break is radius or chamfer.
If ft_second_brk_rad = True Then
    label2.Visible = True
    Label15.Visible = False
End If If ft_second_brk_cham = True Then
    Label15.Visible = True
    label2.Visible = False
End If End Sub Private Sub optnlap_Click()
Label18.Visible = True
Text18.Visible = True
Label19.Visible = True
Text19.Visible = True
End Sub Private Sub OPTNONLAP_Click()
Label18.Visible = False
Text18.Visible = False
Label19.Visible = False
Text19.Visible = False
End Sub Private Sub optregular_Click()
Label13.Visible = False
text13.Visible = False
Label14.Visible = False
TEXT14.Visible = False
Label15.Visible = False
text15.Visible = False
End Sub Private Sub Text_KeyPress(KeyAscii As Integer)

End Sub

Private Sub Text10_KeyPress(KeyAscii As Integer)

If KeyAscii = (13) Then
    SendKeys ("{tab}"), True
    End If

Const DECIMAL_OK = -1         ' 0 = no, -1 = YES
```

```
Const MIN_VALUE = -999          ' Minimum value
Const MAX_VALUE = 999           ' Maximum value
key$ = Chr$(KeyAscii)           ' Convert to string
Select Case key$
    Case "0" To "9"             ' Numbers and minus signs
        Newvalue = Val(Left$(text10.Text, text10.SelStart) + key$ + Mid$(text10.Text, text10.SelStart + text10.SelLength + 1))
        If Newvalue > MAX_VALUE Or Newvalue < MIN_VALUE Then
            KeyAscii = 0
        End If
    Case "."
        If DECIMAL_OK = 0 Or InStr(text10.Text, ".") Then
            KeyAscii = 0
        End If
    Case Chr$(8)                ' Backspace
    Case Else
        KeyAscii = 0
End Select
If key$ = "-" And (InStr(text10.Text, "-") Or text10.SelStart <> 0) Then
    KeyAscii = 0
End If
End Sub Private Sub Text11_KeyPress(KeyAscii As Integer)

If KeyAscii = (13) Then
    SendKeys ("{tab}"), True
End If

Const DECIMAL_OK = -1           ' 0 = no, -1 = YES
Const MIN_VALUE = -999          ' Minimum value
Const MAX_VALUE = 999           ' Maximum value
key$ = Chr$(KeyAscii)           ' Convert to string
Select Case key$
    Case "0" To "9"             ' Numbers and minus signs
        Newvalue = Val(Left$(text11.Text, text11.SelStart) + key$ + Mid$(text11.Text, text11.SelStart + text11.SelLength + 1))
        If Newvalue > MAX_VALUE Or Newvalue < MIN_VALUE Then
            KeyAscii = 0
        End If
    Case "."
        If DECIMAL_OK = 0 Or InStr(text11.Text, ".") Then
            KeyAscii = 0
        End If
    Case Chr$(8)                ' Backspace
    Case Else
        KeyAscii = 0
End Select
If key$ = "-" And (InStr(text11.Text, "-") Or text11.SelStart <> 0) Then
    KeyAscii = 0
End If
End Sub Private Sub Text12_KeyPress(KeyAscii As Integer)

If KeyAscii = (13) Then
    SendKeys ("{tab}"), True
End If

Const DECIMAL_OK = -1           ' 0 = no, -1 = YES
Const MIN_VALUE = -999          ' Minimum value
Const MAX_VALUE = 999           ' Maximum value
key$ = Chr$(KeyAscii)           ' Convert to string
Select Case key$
    Case "0" To "9"             ' Numbers and minus signs
        Newvalue = Val(Left$(text12.Text, text12.SelStart) + key$ + Mid$(text12.Text, text12.SelStart + text12.SelLength + 1))
        If Newvalue > MAX_VALUE Or Newvalue < MIN_VALUE Then
            KeyAscii = 0
        End If
    Case "."
        If DECIMAL_OK = 0 Or InStr(text12.Text, ".") Then
            KeyAscii = 0
        End If
    Case Chr$(8)                ' Backspace
```

```
            Case Else
                KeyAscii = 0
            End Select
            If key$ = "-" And (InStr(text12.Text, "-") Or text12.SelStart <> 0) Then
                KeyAscii = 0
            End If End Sub Private Sub Text13_KeyPress(KeyAscii As Integer)

If KeyAscii = (13) Then
                SendKeys ("{tab}"), True
            End If Const DECIMAL_OK = -1        ' 0 = no, -1 = YES
            Const MIN_VALUE = -999       ' Minimum value
            Const MAX_VALUE = 999        ' Maximum value
            key$ = Chr$(KeyAscii)        ' Convert to string
            Select Case key$
                Case "0" To "9"          ' Numbers and minus signs
                    Newvalue = Val(Left$(text13.Text, text13.SelStart) + key$ + Mid$(text13.Text, text13.SelStart + text13.SelLength + 1))
                    If Newvalue > MAX_VALUE Or Newvalue < MIN_VALUE Then
                        KeyAscii = 0
                    End If
                Case "."
                    If DECIMAL_OK = 0 Or InStr(text13.Text, ".") Then
                        KeyAscii = 0
                    End If
                Case Chr$(8)             ' Backspace
                Case Else
                    KeyAscii = 0
            End Select
            If key$ = "-" And (InStr(text13.Text, "-") Or text13.SelStart <> 0) Then
                KeyAscii = 0
            End If End Sub Private Sub Text14_KeyPress(KeyAscii As Integer)

If KeyAscii = (13) Then
                SendKeys ("{tab}"), True
            End If Const DECIMAL_OK = -1        ' 0 = no, -1 = YES
            Const MIN_VALUE = -999       ' Minimum value
            Const MAX_VALUE = 999        ' Maximum value
            key$ = Chr$(KeyAscii)        ' Convert to string
            Select Case key$
                Case "0" To "9"          ' Numbers and minus signs
                    Newvalue = Val(Left$(TEXT14.Text, TEXT14.SelStart) + key$ + Mid$(TEXT14.Text, TEXT14.SelStart + TEXT14.SelLength + 1))
                    If Newvalue > MAX_VALUE Or Newvalue < MIN_VALUE Then
                        KeyAscii = 0
                    End If
                Case "."
                    If DECIMAL_OK = 0 Or InStr(TEXT14.Text, ".") Then
                        KeyAscii = 0
                    End If
                Case Chr$(8)             ' Backspace
                Case Else
                    KeyAscii = 0
            End Select
            If key$ = "-" And (InStr(TEXT14.Text, "-") Or TEXT14.SelStart <> 0) Then
                KeyAscii = 0
            End If End Sub Private Sub Text15_KeyPress(KeyAscii As Integer)

If KeyAscii = (13) Then
```

```
            SendKeys ("{tab}"), True
        End If

Const DECIMAL_OK = -1       ' 0 = no, -1 = YES
    Const MIN_VALUE = -999      ' Minimum value
    Const MAX_VALUE = 999       ' Maximum value
        key$ = Chr$(KeyAscii)   ' Convert to string
        Select Case key$
        Case "0" To "9"         ' Numbers and minus signs
            Newvalue = Val(Left$(text15.Text, text15.SelStart) + key$ + Mid$(text15.Text, text15.SelStart + text15.SelLength + 1))
            If Newvalue > MAX_VALUE Or Newvalue < MIN_VALUE Then
                KeyAscii = 0
            End If
        Case "."
            If DECIMAL_OK = 0 Or InStr(text15.Text, ".") Then
                KeyAscii = 0
            End If
        Case Chr$(8)            ' Backspace
        Case Else
            KeyAscii = 0
        End Select
        If key$ = "-" And (InStr(text15.Text, "-") Or text15.SelStart <> 0) Then
            KeyAscii = 0
        End If End Sub Private Sub text16_KeyPress(KeyAscii As Integer)

If KeyAscii = (13) Then
        SendKeys ("{tab}"), True
    End If

Const DECIMAL_OK = -1       ' 0 = no, -1 = YES
    Const MIN_VALUE = -999      ' Minimum value
    Const MAX_VALUE = 999       ' Maximum value
        key$ = Chr$(KeyAscii)   ' Convert to string
        Select Case key$
        Case "0" To "9"         ' Numbers and minus signs
            Newvalue = Val(Left$(TEXT16.Text, TEXT16.SelStart) + key$ + Mid$(TEXT16.Text, TEXT16.SelStart + TEXT16.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT16.Text, ".") Then
                KeyAscii = 0
            End If
        Case Chr$(8)            ' Backspace
        Case Else
            KeyAscii = 0
        End Select
        If key$ = "-" And (InStr(TEXT16.Text, "-") Or TEXT16.SelStart <> 0) Then
            KeyAscii = 0
        End If End Sub Private Sub Text17_KeyPress(KeyAscii As Integer)

If KeyAscii = (13) Then
        SendKeys ("{tab}"), True
    End If

Const DECIMAL_OK = -1       ' 0 = no, -1 = YES
    Const MIN_VALUE = -999      ' Minimum value
    Const MAX_VALUE = 999       ' Maximum value
        key$ = Chr$(KeyAscii)   ' Convert to string
        Select Case key$
        Case "0" To "9"         ' Numbers and minus signs
```

```
        Newvalue = Val(Left$(Text17.Text, Text17.SelStart) + key$ + Mid$(Text17.Text, Text17.SelStart + Text17.SelLength + 1))
        If Newvalue > MAX_VALUE Or Newvalue < MIN_VALUE Then
            KeyAscii = 0
        End If
    Case "."
        If DECIMAL_OK = 0 Or InStr(Text17.Text, ".") Then
            KeyAscii = 0
        End If
    Case Chr$(8)          ' Backspace
    Case Else
        KeyAscii = 0
    End Select
    If key$ = "-" And (InStr(Text17.Text, "-") Or Text17.SelStart <> 0) Then
        KeyAscii = 0
    End If End Sub Private Sub Text18_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
    Case "0" To "9"       ' Numbers and minus signs
        Newvalue = Val(Left$(Text18.Text, Text18.SelStart) + key$ + Mid$(Text18.Text, Text18.SelStart + Text18.SelLength + 1))
        If Newvalue > MAX_VALUE Or Newvalue < MIN_VALUE Then
            KeyAscii = 0
        End If
    Case "."
        If DECIMAL_OK = 0 Or InStr(Text18.Text, ".") Then
            KeyAscii = 0
        End If
    Case Chr$(8)          ' Backspace
    Case Else
        KeyAscii = 0
    End Select
    If key$ = "-" And (InStr(Text18.Text, "-") Or Text18.SelStart <> 0) Then
        KeyAscii = 0
    End If End Sub Private Sub Text19_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
    Case "0" To "9"       ' Numbers and minus signs
        Newvalue = Val(Left$(Text19.Text, Text19.SelStart) + key$ + Mid$(Text19.Text, Text19.SelStart + Text19.SelLength + 1))
        If Newvalue > MAX_VALUE Or Newvalue < MIN_VALUE Then
            KeyAscii = 0
        End If
    Case "."
        If DECIMAL_OK = 0 Or InStr(Text19.Text, ".") Then
            KeyAscii = 0
        End If
    Case Chr$(8)          ' Backspace
    Case Else
        KeyAscii = 0
    End Select
```

```
        If key$ = "-" And (InStr(Text19.Text, "-") Or Text19.SelStart <> 0) Then
            KeyAscii = 0
        End If
    End Sub Private Sub Text2_KeyPress(KeyAscii As Integer)

If KeyAscii = (13) Then
        SendKeys ("{tab}"), True
        End If

End Sub

Private Sub Text4_KeyPress(KeyAscii As Integer)

If KeyAscii = (13) Then
        SendKeys ("{tab}"), True
        End If

Const DECIMAL_OK = -1        ' 0 = no, -1 = YES
        Const MIN_VALUE = -999       ' Minimum value
        Const MAX_VALUE = 999        ' Maximum value
        key$ = Chr$(KeyAscii)        ' Convert to string
        Select Case key$
            Case "0" To "9"          ' Numbers and minus signs
                Newvalue = Val(Left$(TEXT4.Text, TEXT4.SelStart) + key$ + Mid$(TEXT4.Text, TEXT4.SelStart + TEXT4.SelLength + 1))
                If Newvalue > MAX_VALUE Or Newvalue < MIN_VALUE Then
                    KeyAscii = 0
                End If
            Case "."
                If DECIMAL_OK = 0 Or InStr(TEXT4.Text, ".") Then
                    KeyAscii = 0
                End If
            Case Chr$(8)              ' Backspace
            Case Else
                KeyAscii = 0
        End Select
        If key$ = "-" And (InStr(TEXT4.Text, "-") Or TEXT4.SelStart <> 0) Then
            KeyAscii = 0
        End If
    End Sub Private Sub Text5_KeyPress(KeyAscii As Integer)

If KeyAscii = (13) Then
        SendKeys ("{tab}"), True
        End If

Const DECIMAL_OK = -1        ' 0 = no, -1 = YES
        Const MIN_VALUE = -999       ' Minimum value
        Const MAX_VALUE = 999        ' Maximum value
        key$ = Chr$(KeyAscii)        ' Convert to string
        Select Case key$
            Case "0" To "9", "-"     ' Numbers and minus signs
                Newvalue = Val(Left$(TEXT5.Text, TEXT5.SelStart) + key$ + Mid$(TEXT5.Text, TEXT5.SelStart + TEXT5.SelLength + 1))
                If Newvalue > MAX_VALUE Or Newvalue < MIN_VALUE Then
                    KeyAscii = 0
                End If
            Case "."
                If DECIMAL_OK = 0 Or InStr(TEXT5.Text, ".") Then
                    KeyAscii = 0
                End If
            Case Chr$(8)              ' Backspace
            Case Else
                KeyAscii = 0
        End Select
        If key$ = "-" And (InStr(TEXT5.Text, "-") Or TEXT5.SelStart <> 0) Then
            KeyAscii = 0
        End If
    End Sub
```

```
Private Sub Text6_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text6.Text, text6.SelStart) + key$ + Mid$(text6.Text, text6.SelStart + text6.SelLength + 1))
            If Newvalue > MAX_VALUE Or Newvalue < MIN_VALUE Then
                KeyAscii = 0
            End If
        Case "."
            If DECIMAL_OK = 0 Or InStr(text6.Text, ".") Then
                KeyAscii = 0
            End If
        Case Chr$(8)             ' Backspace
        Case Else
            KeyAscii = 0
    End Select
    If key$ = "-" And (InStr(text6.Text, "-") Or text6.SelStart <> 0) Then
        KeyAscii = 0
    End If
End Sub Private Sub Text7_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text7.Text, text7.SelStart) + key$ + Mid$(text7.Text, text7.SelStart + text7.SelLength + 1))
            If Newvalue > MAX_VALUE Or Newvalue < MIN_VALUE Then
                KeyAscii = 0
            End If
        Case "."
            If DECIMAL_OK = 0 Or InStr(text7.Text, ".") Then
                KeyAscii = 0
            End If
        Case Chr$(8)             ' Backspace
        Case Else
            KeyAscii = 0
    End Select
    If key$ = "-" And (InStr(text7.Text, "-") Or text7.SelStart <> 0) Then
        KeyAscii = 0
    End If
End Sub Private Sub Text9_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text9.Text, text9.SelStart) + key$ + Mid$(text9.Text, text9.SelStart + text9.SelLength + 1))
```

```
            If Newvalue > MAX_VALUE Or Newvalue < MIN_VALUE Then
                KeyAscii = 0
            End If
            Case "."
5               If DECIMAL_OK = 0 Or InStr(text9.Text, ".") Then
                KeyAscii = 0
            End If
            Case Chr$(8)            ' Backspace
            Case Else
10              KeyAscii = 0
            End Select
            If key$ = "-" And (InStr(text9.Text, "-") Or text9.SelStart <> 0) Then
                KeyAscii = 0
            End If
15      End Sub Private Sub F_T_Error_Blank_Text_Box()
        MsgBox "Fill in all the blanks.", 48, "Face And Turn"
20      End Sub VERSION 2.00
        Begin Form frmGeneralHelp
            BorderStyle     =   3  'Fixed Double
25          Caption         =   "Qcam For Windows"
            ClientHeight    =   2595
            ClientLeft      =   1500
            ClientTop       =   2265
            ClientWidth     =   7200
30          Height          =   3000
            Left            =   1440
            LinkTopic       =   "Form2"
            ScaleHeight     =   2595
            ScaleWidth      =   7200
35          Top             =   1920
            Visible         =   0  'False
            Width           =   7320
            Begin CommandButton Command1
                Caption     =   "OK"
40              Height      =   375
                Left        =   3000
                TabIndex    =   1
                Top         =   2160
                Width       =   855
45          End
            Begin Label Label1
                Caption     = "     First of all, I assume you already know how to program a CNC lathe. Qcam for Windows will generate simple
        programs quickly and easily when you answer the questions asked. Use the editor to cut and paste more complicated tool paths into the
        programs you create.                                                                                    Be careful when using new part or append, they will
50      delete or alter programs if you choose an existing program.                                              You will need to edit certin parts
        such as the tool numbers, etc...Many parameters are set and will need editing, such as canned cycle depth of cut, etc...
                                                                                Qcam Version 4.0 1995 All Rights Reserved. Do Not Copy. Do Not
        Distribute.                                                                                                                                  "
                Height      =   3855
55              Left        =   0
                TabIndex    =   0
                Top         =   0
                Visible     =   0  'False
                Width       =   7095
60              WordWrap    =   -1 'True
            End
        End Sub Command1_Click ()
65      frmgeneralhelp.Visible = False
        frmgeneralhelp.Label1.Visible = False End Sub 70      Sub Form_Load ()
            If windowstate = 0 Then
                Move (screen.Width - frmgeneralhelp.Width) / 2, (screen.Height - frmgeneralhelp.Height) / 2
            End If
        End Sub
```

```
Sub Form_Paint ()
    If windowstate = 0 Then
        Move (screen.Width - frmgeneralhelp.Width) / 2, (screen.Height - frmgeneralhelp.Height) / 2
    End If
End Sub Sub Form_Resize ()
    If windowstate = 0 Then
        Move (screen.Width - frmgeneralhelp.Width) / 2, (screen.Height - frmgeneralhelp.Height) / 2
    End If
End Sub VERSION 4.00
Begin VB.Form frmgrooving
    BorderStyle     =   3  'Fixed Dialog
    Caption         =   "Grooving"
    ClientHeight    =   4590
    ClientLeft      =   1635
    ClientTop       =   1665
    ClientWidth     =   6540
    BeginProperty Font
        name            =   "MS Sans Serif"
        charset         =   1
        weight          =   700
        size            =   8.25
        underline       =   0  'False
        italic          =   0  'False
        strikethrough   =   0  'False
    EndProperty
    ForeColor       =   &H80000008&
    Height          =   5115
    Icon            =   "FRMGROOV.frx":0000
    Left            =   1515
    LinkTopic       =   "Form2"
    LockControls    =   -1  'True
    ScaleHeight     =   4590
    ScaleWidth      =   6540
    Top             =   1260
    Width           =   6780
    Begin VB.CommandButton Command3
        Caption         =   "Chamfer I.D"
        BeginProperty Font
            name            =   "MS Sans Serif"
            charset         =   1
            weight          =   400
            size            =   8.25
            underline       =   0  'False
            italic          =   0  'False
            strikethrough   =   0  'False
        EndProperty
        Height          =   375
        Left            =   4560
        TabIndex        =   22
        Top             =   4080
        Width           =   1095
    End
    Begin VB.TextBox Text6
        BackColor       =   &H00FFFFFF&
        Height          =   285
        Left            =   1800
        MaxLength       =   20
        TabIndex        =   2
        Top             =   1080
        Width           =   855
    End
    Begin VB.TextBox Text7
        BackColor       =   &H00FFFFFF&
        Height          =   285
        Left            =   1800
        MaxLength       =   20
        TabIndex        =   3
        Top             =   1560
        Width           =   855
    End
```

```
Begin VB.TextBox Text4
   BackColor    =   &H00FFFFFF&
   Height       =   285
   Left         =   1800
   MaxLength    =   20
   TabIndex     =   0
   Top          =   120
   Width        =   855
End
Begin VB.TextBox Text5
   BackColor    =   &H00FFFFFF&
   Height       =   285
   Left         =   1800
   MaxLength    =   20
   TabIndex     =   1
   Top          =   600
   Width        =   855
End
Begin VB.TextBox Text9
   BackColor    =   &H00FFFFFF&
   Height       =   285
   Left         =   4680
   MaxLength    =   20
   TabIndex     =   5
   Top          =   120
   Width        =   855
End
Begin VB.TextBox Text10
   BackColor    =   &H00FFFFFF&
   Height       =   285
   Left         =   4680
   MaxLength    =   20
   TabIndex     =   6
   Top          =   600
   Width        =   855
End
Begin VB.TextBox Text11
   BackColor    =   &H00FFFFFF&
   Height       =   285
   Left         =   4680
   MaxLength    =   20
   TabIndex     =   7
   Top          =   1080
   Width        =   855
End
Begin VB.TextBox Text12
   BackColor    =   &H00FFFFFF&
   Height       =   285
   Left         =   4680
   MaxLength    =   20
   TabIndex     =   8
   Top          =   1560
   Width        =   855
End
Begin VB.TextBox Text13
   BackColor    =   &H00FFFFFF&
   Height       =   285
   Left         =   4680
   MaxLength    =   20
   TabIndex     =   9
   Top          =   2040
   Width        =   855
End
Begin VB.TextBox Text14
   BackColor    =   &H00FFFFFF&
   Height       =   285
   Left         =   3600
   MaxLength    =   20
   TabIndex     =   10
   Top          =   2520
   Visible      =   0   'False
   Width        =   855
End
Begin VB.TextBox Text15
```

```
            BackColor       = &H00FFFFFF&
            Height          = 285
            Left            = 3600
            MaxLength       = 20
            TabIndex        = 11
            Top             = 3000
            Visible         = 0  'False
            Width           = 855
         End
         Begin VB.TextBox TEXT8
            BackColor       = &H00FFFFFF&
            Height          = 285
            Left            = 1800
            MaxLength       = 20
            TabIndex        = 4
            Top             = 2040
            Width           = 855
         End
         Begin VB.CheckBox chkg73
            Caption         = "Rough grooving cycle"
            BeginProperty Font
               name            = "MS Sans Serif"
               charset         = 1
               weight          = 400
               size            = 8.25
               underline       = 0  'False
               italic          = 0  'False
               strikethrough   = 0  'False
            EndProperty
            Height          = 375
            Left            = 3960
            TabIndex        = 14
            Top             = 3480
            Width           = 1935
         End
         Begin VB.OptionButton Option1
            Caption         = "O.D. Groove"
            BeginProperty Font
               name            = "MS Sans Serif"
               charset         = 1
               weight          = 400
               size            = 8.25
               underline       = 0  'False
               italic          = 0  'False
               strikethrough   = 0  'False
            EndProperty
            Height          = 375
            Left            = 1200
            TabIndex        = 16
            Top             = 3480
            Value           = -1  'True
            Width           = 1215
         End
         Begin VB.OptionButton Option2
            Caption         = "I.D. Groove"
            BeginProperty Font
               name            = "MS Sans Serif"
               charset         = 1
               weight          = 400
               size            = 8.25
               underline       = 0  'False
               italic          = 0  'False
               strikethrough   = 0  'False
            EndProperty
            Height          = 375
            Left            = 2640
            TabIndex        = 15
            Top             = 3480
            Width           = 1215
         End
         Begin VB.CommandButton Command2
            Caption         = "&Write"
            BeginProperty Font
               name            = "MS Sans Serif"
```

```
            charset      = 1
            weight       = 400
            size         = 8.25
            underline    = 0  'False
            italic       = 0  'False
            strikethrough = 0  'False
         EndProperty
         Height   = 375
         Left     = 1440
         TabIndex = 12
         Top      = 4080
         Width    = 1095
      End
      Begin VB.CommandButton Command1
         Caption     = "&Cancel"
         BeginProperty Font
            name         = "MS Sans Serif"
            charset      = 1
            weight       = 400
            size         = 8.25
            underline    = 0  'False
            italic       = 0  'False
            strikethrough = 0  'False
         EndProperty
         Height   = 375
         Left     = 3000
         TabIndex = 13
         Top      = 4080
         Width    = 1095
      End
      Begin VB.Label Label2
         Alignment    = 1  'Right Justify
         Caption      = "Corner Chamfers"
         BeginProperty Font
            name         = "MS Sans Serif"
            charset      = 1
            weight       = 400
            size         = 8.25
            underline    = 0  'False
            italic       = 0  'False
            strikethrough = 0  'False
         EndProperty
         Height   = 255
         Left     = 2880
         TabIndex = 31
         Top      = 240
         Visible  = 0  'False
         Width    = 1695
      End
      Begin VB.Label Label1
         Alignment    = 1  'Right Justify
         Caption      = "No Fillet Radius"
         BeginProperty Font
            name         = "MS Sans Serif"
            charset      = 1
            weight       = 400
            size         = 8.25
            underline    = 0  'False
            italic       = 0  'False
            strikethrough = 0  'False
         EndProperty
         Height   = 255
         Left     = 2760
         TabIndex = 30
         Top      = 720
         Visible  = 0  'False
         Width    = 1815
      End
      Begin VB.Label Label6
         Alignment    = 1  'Right Justify
         Caption      = "Groove Diameter"
         BeginProperty Font
            name         = "MS Sans Serif"
            charset      = 1
```

```
         weight    =  400
         size      =  8.25
         underline =  0  'False
         italic    =  0  'False
         strikethrough = 0  'False
      EndProperty
      Height     =  255
      Left       =  -120
      TabIndex   =  18
      Top        =  1200
      Width      =  1815
   End
   Begin VB.Label Label7
      Alignment  =  1  'Right Justify
      Caption    =  "Groove Width"
      BeginProperty Font
         name      =  "MS Sans Serif"
         charset   =  1
         weight    =  400
         size      =  8.25
         underline =  0  'False
         italic    =  0  'False
         strikethrough = 0  'False
      EndProperty
      Height     =  255
      Left       =  -120
      TabIndex   =  21
      Top        =  1680
      Width      =  1815
   End
   Begin VB.Label Label4
      Alignment  =  1  'Right Justify
      Caption    =  "Stock Diameter"
      BeginProperty Font
         name      =  "MS Sans Serif"
         charset   =  1
         weight    =  400
         size      =  8.25
         underline =  0  'False
         italic    =  0  'False
         strikethrough = 0  'False
      EndProperty
      Height     =  255
      Left       =  -120
      TabIndex   =  29
      Top        =  240
      Width      =  1815
   End
   Begin VB.Label Label5
      Alignment  =  1  'Right Justify
      Caption    =  "O.D. to be grooved"
      BeginProperty Font
         name      =  "MS Sans Serif"
         charset   =  1
         weight    =  400
         size      =  8.25
         underline =  0  'False
         italic    =  0  'False
         strikethrough = 0  'False
      EndProperty
      Height     =  255
      Left       =  -120
      TabIndex   =  28
      Top        =  720
      Width      =  1815
   End
   Begin VB.Label Label9
      Alignment  =  1  'Right Justify
      Caption    =  "Corner Radius"
      BeginProperty Font
         name      =  "MS Sans Serif"
         charset   =  1
         weight    =  400
         size      =  8.25
```

```
         underline       =  0  'False
         italic          =  0  'False
         strikethrough   =  0  'False
      EndProperty
      Height          =   255
      Left            =   2760
      TabIndex        =   27
      Top             =   240
      Width           =   1815
   End
   Begin VB.Label Label11
      Alignment       =   1  'Right Justify
      Caption         =   "Tool Width"
      BeginProperty Font
         name            =   "MS Sans Serif"
         charset         =   1
         weight          =   400
         size            =   8.25
         underline       =   0  'False
         italic          =   0  'False
         strikethrough   =   0  'False
      EndProperty
      Height          =   255
      Left            =   2760
      TabIndex        =   26
      Top             =   1200
      Width           =   1815
   End
   Begin VB.Label Label10
      Alignment       =   1  'Right Justify
      Caption         =   "Fillet Radius"
      BeginProperty Font
         name            =   "MS Sans Serif"
         charset         =   1
         weight          =   400
         size            =   8.25
         underline       =   0  'False
         italic          =   0  'False
         strikethrough   =   0  'False
      EndProperty
      Height          =   255
      Left            =   2760
      TabIndex        =   25
      Top             =   720
      Width           =   1815
   End
   Begin VB.Label Label12
      Alignment       =   1  'Right Justify
      Caption         =   "Tool nose radius"
      BeginProperty Font
         name            =   "MS Sans Serif"
         charset         =   1
         weight          =   400
         size            =   8.25
         underline       =   0  'False
         italic          =   0  'False
         strikethrough   =   0  'False
      EndProperty
      Height          =   255
      Left            =   2760
      TabIndex        =   24
      Top             =   1680
      Width           =   1815
   End
   Begin VB.Label Label13
      Alignment       =   1  'Right Justify
      Caption         =   "Finish Feed Rate"
      BeginProperty Font
         name            =   "MS Sans Serif"
         charset         =   1
         weight          =   400
         size            =   8.25
         underline       =   0  'False
         italic          =   0  'False
```

```
            strikethrough   =   0  'False
         EndProperty
         Height      =   255
         Left        =   2760
         TabIndex    =   23
         Top         =   2160
         Width       =   1815
      End
      Begin VB.Label Label14
         Alignment   =   1  'Right Justify
         Caption     =   "Roughing feed rate"
         BeginProperty Font
            name        =   "MS Sans Serif"
            charset     =   1
            weight      =   400
            size        =   8.25
            underline   =   0  'False
            italic      =   0  'False
            strikethrough   =   0  'False
         EndProperty
         Height      =   255
         Left        =   1680
         TabIndex    =   20
         Top         =   2640
         Visible     =   0  'False
         Width       =   1815
      End
      Begin VB.Label Label15
         Alignment   =   1  'Right Justify
         Caption     =   "Step over in ""Z"" "
         BeginProperty Font
            name        =   "MS Sans Serif"
            charset     =   1
            weight      =   400
            size        =   8.25
            underline   =   0  'False
            italic      =   0  'False
            strikethrough   =   0  'False
         EndProperty
         Height      =   255
         Left        =   1680
         TabIndex    =   19
         Top         =   3120
         Visible     =   0  'False
         Width       =   1815
      End
      Begin VB.Label Label8
         Alignment   =   1  'Right Justify
         Caption     =   "Z depth ""left side"""
         BeginProperty Font
            name        =   "MS Sans Serif"
            charset     =   1
            weight      =   400
            size        =   8.25
            underline   =   0  'False
            italic      =   0  'False
            strikethrough   =   0  'False
         EndProperty
         Height      =   255
         Left        =   -120
         TabIndex    =   17
         Top         =   2160
         Width       =   1815
      End
End
Attribute VB_Name = "frmgrooving"
Attribute VB_Creatable = False
Attribute VB_Exposed = False Private Sub chkg73_Click()
If chkg73.Value = 1 Then
Label14.Visible = True
End If
If chkg73.Value = 1 Then
```

```
            Label15.Visible = True
        End If
        If chkg73.Value = 1 Then
            text14.Visible = True
 5      End If
        If chkg73.Value = 1 Then
            text15.Visible = True
        End If 10      If chkg73.Value = 0 Then
            Label14.Visible = False
        End If
        If chkg73.Value = 0 Then
            Label15.Visible = False
15      End If
        If chkg73.Value = 0 Then
            text14.Visible = False
        End If
        If chkg73.Value = 0 Then
20          text15.Visible = False
        End If End Sub 25      Private Sub Command1_Click()
        frmgrooving.Visible = False
        frmMDI.ActiveForm.ActiveControl.SetFocus ' RETURNS THE CURSER TO THE SCREEN
        End Sub 30      Private Sub Command2_Click()

Screen.MousePointer = 11

If TEXT4.Visible = True And TEXT4.Text = "" Then
35          Groove_Blank_Text_Box
            GoTo 674
        End If If TEXT5.Visible = True And TEXT5.Text = "" Then
40          Groove_Blank_Text_Box
            GoTo 674
        End If If text6.Visible = True And text6.Text = "" Then
45          Groove_Blank_Text_Box
            GoTo 674
        End If If text7.Visible = True And text7.Text = "" Then
50          Groove_Blank_Text_Box
            GoTo 674
        End If If text8.Visible = True And text8.Text = "" Then
55          Groove_Blank_Text_Box
            GoTo 674
        End If If text9.Visible = True And text9.Text = "" Then
60          Groove_Blank_Text_Box
            GoTo 674
        End If If text10.Visible = True And text10.Text = "" Then
65          Groove_Blank_Text_Box
            GoTo 674
        End If If text11.Visible = True And text11.Text = "" Then
70          Groove_Blank_Text_Box
            GoTo 674
        End If If text12.Visible = True And text12.Text = "" Then
```

```
            Groove_Blank_Text_Box
            GoTo 674
            End If

5      If text13.Visible = True And text13.Text = "" Then
            Groove_Blank_Text_Box
            GoTo 674
            End If 10      If text14.Visible = True And text14.Text = "" Then
            Groove_Blank_Text_Box
            GoTo 674
            End If 15      If text15.Visible = True And text15.Text = "" Then
            Groove_Blank_Text_Box
            GoTo 674
            End If 20      If label1.Visible = False Then If ((text12.Text * 2) / 2) > ((text10.Text * 2) / 2) Then
            MsgBox "The fillet radius cant be smaller" & Chr(13) + Chr(10) & "than the Tool Nose Radius !"
            GoTo 674
25          End If End If 30      If Option1.Value = True Then If ((text6.Text * 2) / 2) > ((TEXT5.Text * 2) / 2) Then
            MsgBox "The groove diameter cant be larger" & Chr(13) + Chr(10) & "than the diameter being grooved !", 48, "O.D.Groove - Alert !"
            GoTo 674
35          End If End If 40      If option2.Value = True Then If ((text6.Text * 2) / 2) < ((TEXT5.Text * 2) / 2) Then
            MsgBox "The groove diameter cant be smaller" & Chr(13) + Chr(10) & "than the diameter being grooved !", 48, "I.D.Groove - Alert !"
            GoTo 674
45          End If End If 50
            WIDTH1 = ((text11.Text * 2) / 2)
            WIDTH2 = ((text7.Text * 2) / 2)
            If frmgrooving.Visible = True Then
55
            If WIDTH1 > WIDTH2 Then
            MsgBox "The tool width is larger" & Chr(13) + Chr(10) & "than the groove width !", 48, "Groove - Alert !"
            GoTo 674
            End If
60
        End If Dim TEXT1 As Double ' Used for "Z0.0500"
        Dim TEXT2 As Double ' Used for feed rates
65      Dim TEXT3 As Double ' Used for feed rates
        Dim TEXT16 As Double   ' Used for feed rates
        TEXT1 = 0.05
        TEXT2 = 0.0075
        TEXT3 = 0.0025
70      TEXT16 = 0.0015

' O.D. Groove - no canned cycle
        If Option1.Value = True And chkg73.Value = 0 Then
```

```
        GoTo 750
        End If

' I.D. Groove - no canned cycle
        If option2.Value = True And chkg73.Value = 0 Then
        GoTo 760
        End If ' O.D. Groove - with canned roughing cycle
        If Option1.Value = True And chkg73.Value = 1 Then
        GoTo 770
        End If ' I.D. Groove - with canned roughing cycle
        If option2.Value = True And chkg73.Value = 1 Then
        GoTo 780
        End If '''''''''''''''''''''''''''''''''''''''''''''''''''''''''''''''''''''
        '''''''''''''''''''''''''''''''''''''''''''''''''''''''''''''''''''''

' O.D. GROOVE - NO CANNED CYCLE

750

' XPOS = the stock diameter + 0.1000.
        XPOS = TEXT4.Text + 0.1

' L1 = Edge breaks + tool nose radius.
        If label2.Visible = True Then
        L1 = ((text9.Text * 2) / 2) + (((text12.Text * 2) / 2) * 0.53)
        End If
        If label2.Visible = False Then
        L1 = ((text9.Text * 2) / 2) + ((text12.Text * 2) / 2)
        End If ' L2 = fillet radius - tool nose radius.
        If label1.Visible = True Then
        L2 = 0 ' Do nothing !
        Else
        L2 = ((text10.Text * 2) / 2) - ((text12.Text * 2) / 2)
        End If ' Length1 = Groove width / 2.
        LENGTH1 = ((text7.Text * 2) / 2) / 2

' Length2 = Tool width / 2.
        LENGTH2 = ((text11.Text * 2) / 2) / 2

' Length3 = Left side - 1/2 the groove width + 1/2 tool width
        ' Used to feed the middle of the tool to the middle of the groove.
        LENGTH3 = (((text8.Text * 2) / 2) - LENGTH1) + LENGTH2

' Length4 = left side + edge break + Tool nose radius.
        LENGTH4 = ((text8.Text * 2) / 2) + ((text9.Text * 2) / 2) + ((text12.Text * 2) / 2)

' Length5 = left side - groove width - edge break.
        LENGTH5 = (((text8.Text * 2) / 2) - ((text7.Text * 2) / 2)) - ((text9.Text * 2) / 2)

' Length6 = Length5 - tool nose radius + tool width.
        LENGTH6 = (LENGTH5 - ((text12.Text * 2) / 2)) + ((text11.Text * 2) / 2)

' Length7 = Length6 + edge break + tool nose radius.
        LENGTH7 = LENGTH6 + ((text9.Text * 2) / 2) + ((text12.Text * 2) / 2)

' Length8 = left side - groove width + fillet radius.
        If text10.Visible = False Then
        LENGTH8 = (((text8.Text * 2) / 2) - ((text7.Text * 2) / 2))
        End If
        If text10.Visible = True Then
        LENGTH8 = (((text8.Text * 2) / 2) - ((text7.Text * 2) / 2)) + ((text10.Text * 2) / 2)
        End If
```

```
' Length9 = Length8 + 70% of the tool width.
LENGTH9 = LENGTH8 + (((text11.Text * 2) / 2) * 0.7)

' Length10 = left side - fillet radius.
If text10.Visible = False Then
LENGTH10 = ((text8.Text * 2) / 2)
End If
If text10.Visible = True Then
LENGTH10 = ((text8.Text * 2) / 2) - ((text10.Text * 2) / 2)
End If ' Length11 = left side - groove width + tool width + .005
LENGTH11 = (((text8.Text * 2) / 2) - ((text7.Text * 2) / 2)) + ((text11.Text * 2) / 2) + 0.005

' Length12 = left side - .005
LENGTH12 = ((text8.Text * 2) / 2) - 0.005

' Length13 = Length11 + 70% of the tolt width.
LENGTH13 = LENGTH11 + (((text11.Text * 2) / 2) * 0.7)

' DIA1 = Groove diameter + 2 times the fillet radius.
If text10.Visible = False Then
DIA1 = ((text6.Text * 2) / 2) + 0.005
End If
If text10.Visible = True Then
DIA1 = ((text6.Text * 2) / 2) + (((text10.Text * 2) / 2) * 2)
End If ' DIA2 = Groove diameter + .005
DIA2 = ((text6.Text * 2) / 2) + 0.005

' ODCLEAR = O.D. to be grooved + .025
ODCLEAR = ((TEXT5.Text * 2) / 2) + 0.025

' D = The height for the canned groove cycle - diameter value '
D = ODCLEAR - DIA2

' K = The user specified stepover in Z for roughing cycle.
K = text15.Text

' STOCK2 = stock diameter + .025
STOCK2 = ((TEXT4.Text * 2) / 2) + 0.025 frmgrooving.Visible = False

Screen.MousePointer = 11

Clipboard.SetText Rapid & XCode & Format(XPOS, formats) & " Z" & Format(TEXT1, formats) & Chr(13) & Chr(10)
editpasteproc
Clipboard.SetText "Z-" & Format(LENGTH3, formats) & Chr(13) & Chr(10)
editpasteproc
Clipboard.SetText XCode & Format(STOCK2, formats) & Chr(13) & Chr(10)
editpasteproc
Clipboard.SetText Feed & XCode & Format(ODCLEAR, formats) & " F" & Format(TEXT2, formats) & Chr(13) & Chr(10)
editpasteproc
Clipboard.SetText XCode & Format(text6.Text, formats) & " F" & Format(TEXT16, formats) & Chr(13) & Chr(10)
editpasteproc
Clipboard.SetText Rapid & XCode & Format(ODCLEAR, formats) & Chr(13) & Chr(10)
editpasteproc ' Add code here to set Z length for a chamfer or a radius...
Clipboard.SetText "Z-" & Format(LENGTH6, formats) & Chr(13) & Chr(10)
editpasteproc Clipboard.SetText Feed & XCode & Format(TEXT5.Text, formats) & " F" & Format(TEXT3, formats) & Chr(13) & Chr(10)
editpasteproc
```

```
' Set up either a radius or a chamfer...
If label2.Visible = True Then
Clipboard.SetText G_Code_Chamfer
editpasteproc
Else
Clipboard.SetText G_Code_Radius
editpasteproc
End If Clipboard.SetText "Z-" & Format(LENGTH7, formats) & " "
editpasteproc ' Paste the chamfer, X- or X+, and "L" value.
If label2.Visible = True Then
Clipboard.SetText Chamfer_X
editpasteproc
   If XCode = "X" Then
   Clipboard.SetText "-"
   editpasteproc
   End If
Clipboard.SetText Format(L1, formats)
editpasteproc
End If ' Else...

' Paste the radius, X- or X+, and "L" value.
If label2.Visible = False Then
Clipboard.SetText Rad_X
editpasteproc
   If XCode = "X" Then
   Clipboard.SetText "-"
   editpasteproc
   End If
Clipboard.SetText Format(L1, formats)
editpasteproc
End If ' Now paste the feed rate and new line...
Clipboard.SetText " F" & Format(text13.Text, formats) & Chr(13) & Chr(10)
editpasteproc ' Now check to see if user doesn't want a fillet radius.
If label1.Visible = True Then
Clipboard.SetText XCode & Format(text6.Text, formats) & " F" & Format(text13.Text, formats) & Chr(13) & Chr(10)
editpasteproc
Else   ' With the fillet radius.
Clipboard.SetText G_Code_Radius & XCode & Format(text6.Text, formats) & " " & Rad_Z & "-" & Format(L2, formats) & " F" &
Format(text13.Text, formats) & Chr(13) & Chr(10)
editpasteproc
End If ' Feed to the center of the groove
Clipboard.SetText "Z-" & Format(LENGTH3, formats) & Chr(13) & Chr(10)
editpasteproc
' Rapid up out of the groove.
Clipboard.SetText Rapid & XCode & Format(ODCLEAR, formats) & Chr(13) & Chr(10)
editpasteproc
' Position in "Z" for the other edge break.
Clipboard.SetText "Z-" & Format(LENGTH4, formats) & Chr(13) & Chr(10)
editpasteproc
' Feed down to the O.D.
Clipboard.SetText Feed & XCode & Format(TEXT5.Text, formats) & " F" & Format(TEXT3, formats) & Chr(13) & Chr(10)
editpasteproc ' Set up either a radius or a chamfer...
If label2.Visible = True Then
Clipboard.SetText G_Code_Chamfer
editpasteproc
Else
Clipboard.SetText G_Code_Radius
editpasteproc
End If
```

```
Clipboard.SetText "Z-" & Format(text8.Text, formats) & " "
editpasteproc

' Paste the chamfer, X- or X+, and "L" value.
If label2.Visible = True Then
Clipboard.SetText Chamfer_X
editpasteproc
    If XCode = "X" Then
    Clipboard.SetText "-"
    editpasteproc
    End If
Clipboard.SetText Format(L1, formats)
editpasteproc
End If ' Else...

' Paste the radius, X- or X+, and "L" value.
If label2.Visible = False Then
Clipboard.SetText Rad_X
editpasteproc
    If XCode = "X" Then
    Clipboard.SetText "-"
    editpasteproc
    End If
Clipboard.SetText Format(L1, formats)
editpasteproc
End If ' Now paste the feed rate and new line.
Clipboard.SetText " F" & Format(text13.Text, formats) & Chr(13) & Chr(10)
editpasteproc ' Now check to see if user doesn't want a fillet radius.
If label1.Visible = True Then
Clipboard.SetText XCode & Format(text6.Text, formats) & " F" & Format(text13.Text, formats) & Chr(13) & Chr(10)
editpasteproc
Else    ' With the fillet radius.
Clipboard.SetText G_Code_Radius & XCode & Format(text6.Text, formats) & " " & Rad_Z & Format(L2, formats) & " F" & Format(text13.Text, formats) & Chr(13) & Chr(10)
editpasteproc
End If ' Now feed to the center of the groove.
Clipboard.SetText "Z-" & Format(LENGTH3, formats) & Chr(13) & Chr(10)
editpasteproc ' Now rapid up out of the groove.
Clipboard.SetText Rapid & XCode & Format(XPOS, formats) & Chr(13) & Chr(10)
editpasteproc ' Rapid to "Z0.0500"
Clipboard.SetText "Z" & Format(TEXT1, formats) & Chr(13) & Chr(10)
editpasteproc Screen.MousePointer = 0

GoTo 675

'***************************************************************
'***************************************************************

' I.D. GROOVE - NO CANNED CYCLE
760

' XPOS = the stock diameter + 0.1000.
XPOS = TEXT5.Text - 0.1

' L1 = Edge breaks + tool nose radius.
If label2.Visible = True Then
L1 = ((text9.Text * 2) / 2) + (((text12.Text * 2) / 2) * 0.53)
End If
```

```
If label2.Visible = False Then
L1 = ((text9.Text * 2) / 2) + ((text12.Text * 2) / 2)
End If ' L2 = fillet radius - tool nose radius.
If label1.Visible = True Then
L2 = 0 ' Do nothing !
Else
L2 = ((text10.Text * 2) / 2) - ((text12.Text * 2) / 2)
End If ' Length1 = Groove width / 2.
LENGTH1 = ((text7.Text * 2) / 2) / 2

' Length2 = Tool width / 2.
LENGTH2 = ((text11.Text * 2) / 2) / 2

' Length3 = Left side - 1/2 the groove width + 1/2 tool width
' Used to feed the middle of the tool to the middle of the groove.
LENGTH3 = (((text8.Text * 2) / 2) - LENGTH1) + LENGTH2

' Length4 = left side + edge break + Tool nose radius.
LENGTH4 = ((text8.Text * 2) / 2) + ((text9.Text * 2) / 2) + ((text12.Text * 2) / 2)

' Length5 = left side - groove width - edge break.
LENGTH5 = (((text8.Text * 2) / 2) - ((text7.Text * 2) / 2)) - ((text9.Text * 2) / 2)

' Length6 = Length5 - tool nose radius + tool width.
LENGTH6 = (LENGTH5 - ((text12.Text * 2) / 2)) + ((text11.Text * 2) / 2)

' Length7 = Length6 + edge break + tool nose radius.
LENGTH7 = LENGTH6 + ((text9.Text * 2) / 2) + ((text12.Text * 2) / 2)

' Length8 = left side - groove width + fillet radius.
If text10.Visible = False Then
LENGTH8 = (((text8.Text * 2) / 2) - ((text7.Text * 2) / 2))
End If
If text10.Visible = True Then
LENGTH8 = (((text8.Text * 2) / 2) - ((text7.Text * 2) / 2)) + ((text10.Text * 2) / 2)
End If ' Length9 = Length8 + 70% of the tool width.
LENGTH9 = LENGTH8 + (((text11.Text * 2) / 2) * 0.7)

' Length10 = left side - fillet radius.
If text10.Visible = False Then
LENGTH10 = ((text8.Text * 2) / 2)
End If
If text10.Visible = True Then
LENGTH10 = ((text8.Text * 2) / 2) - ((text10.Text * 2) / 2)
End If ' Length11 = left side - groove width + tool width + .005
LENGTH11 = (((text8.Text * 2) / 2) - ((text7.Text * 2) / 2)) + ((text11.Text * 2) / 2) + 0.005

' Length12 = left side - .005
LENGTH12 = ((text8.Text * 2) / 2) - 0.005

' Length13 = Length11 + 70% of the toll width.
LENGTH13 = LENGTH11 + (((text11.Text * 2) / 2) * 0.7)

' DIA1 = Groove diameter + 2 times the fillet radius.
If text10.Visible = False Then
DIA1 = ((text6.Text * 2) / 2) - 0.005
End If
If text10.Visible = True Then
DIA1 = ((text6.Text * 2) / 2) - (((text10.Text * 2) / 2) * 2)
End If ' DIA2 = Groove diameter + .005
DIA2 = ((text6.Text * 2) / 2) - 0.005

' ODCLEAR = O.D. to be grooved + .025
ODCLEAR = ((TEXT5.Text * 2) / 2) - 0.025
```

```
' D = The height for the canned groove cycle - diameter value !
D = DIA2 - ODCLEAR ' K = The user specified stepover in Z for roughing cycle.
K = text15.Text ' STOCK2 = stock diameter + .025
STOCK2 = ((TEXT5.Text * 2) / 2) - 0.025 frmgrooving.Visible = False

Screen.MousePointer = 11

Clipboard.SetText Rapid & XCode & Format(XPOS, formats) & " Z" & Format(TEXT1, formats) & Chr(13) & Chr(10)
editpasteproc
Clipboard.SetText "Z-" & Format(LENGTH3, formats) & Chr(13) & Chr(10)
editpasteproc
Clipboard.SetText Feed & XCode & Format(ODCLEAR, formats) & " F" & Format(TEXT2, formats) & Chr(13) & Chr(10)
editpasteproc
Clipboard.SetText XCode & Format(text6.Text, formats) & " F" & Format(TEXT16, formats) & Chr(13) & Chr(10)
editpasteproc
Clipboard.SetText Rapid & XCode & Format(ODCLEAR, formats) & Chr(13) & Chr(10)
editpasteproc ' Add code here to set Z length for a chamfer or a radius
Clipboard.SetText "Z-" & Format(LENGTH6, formats) & Chr(13) & Chr(10)
editpasteproc Clipboard.SetText Feed & XCode & Format(TEXT5.Text, formats) & " F" & Format(TEXT3, formats) & Chr(13) & Chr(10)
editpasteproc ' Set up either a radius or a chamfer...
If label2.Visible = True Then
Clipboard.SetText G_Code_Chamfer
editpasteproc
Else
Clipboard.SetText G_Code_Radius
editpasteproc
End If Clipboard.SetText "Z-" & Format(LENGTH7, formats) & " "
editpasteproc ' Paste the chamfer, X- or X+, and "L" value.
If label2.Visible = True Then
Clipboard.SetText Chamfer_X
editpasteproc
    If XCode = "X-" Then
    Clipboard.SetText "-"
    editpasteproc
    End If
Clipboard.SetText Format(L1, formats)
editpasteproc
End If ' Else...

' Paste the radius, X- or X+, and "L" value
If label2.Visible = False Then
Clipboard.SetText Rad_X
editpasteproc
    If XCode = "X-" Then
    Clipboard.SetText "-"
    editpasteproc
    End If
Clipboard.SetText Format(L1, formats)
editpasteproc
End If
```

```
' Now paste the feed rate and new line...
Clipboard.SetText " F" & Format(text13.Text, formats) & Chr(13) & Chr(10)
editpasteproc ' Now check to see if user doesn't want a fillet radius.
If label1.Visible = True Then
Clipboard.SetText XCode & Format(text6.Text, formats) & " F" & Format(text13.Text, formats) & Chr(13) & Chr(10)
editpasteproc
Else    ' With the fillet radius.
Clipboard.SetText G_Code_Radius & XCode & Format(text6.Text, formats) & " " & Rad_Z & "-" & Format(L2, formats) & " F" &
Format(text13.Text, formats) & Chr(13) & Chr(10)
editpasteproc
End If ' Feed to the center of the groove
Clipboard.SetText "Z-" & Format(LENGTH3, formats) & Chr(13) & Chr(10)
editpasteproc ' Rapid out of the groove
Clipboard.SetText Rapid & XCode & Format(ODCLEAR, formats) & Chr(13) & Chr(10)
editpasteproc ' Position in Z for the other edge break...
Clipboard.SetText "Z-" & Format(LENGTH4, formats) & Chr(13) & Chr(10)
editpasteproc ' Feed up to the bore diameter.
Clipboard.SetText Feed & XCode & Format(TEXT5.Text, formats) & " F" & Format(TEXT3, formats) & Chr(13) & Chr(10)
editpasteproc ' Set up either a radius or a chamfer...
If label2.Visible = True Then
Clipboard.SetText G_Code_Chamfer
editpasteproc
Else
Clipboard.SetText G_Code_Radius
editpasteproc
End If Clipboard.SetText "Z-" & Format(text8.Text, formats) & " "
editpasteproc ' Paste the chamfer, X- or X+, and "L" value.
If label2.Visible = True Then
Clipboard.SetText Chamfer_X
editpasteproc
  If XCode = "X-" Then
   Clipboard.SetText "-"
   editpasteproc
  End If
Clipboard.SetText Format(L1, formats)
editpasteproc
End If ' Else...

' Paste the radius, X- or X+, and "L" value.
If label2.Visible = False Then
Clipboard.SetText Rad_X
editpasteproc
  If XCode = "X-" Then
   Clipboard.SetText "-"
   editpasteproc
  End If
Clipboard.SetText Format(L1, formats)
editpasteproc
End If ' Now paste the feed rate and new line...
Clipboard.SetText " F" & Format(text13.Text, formats) & Chr(13) & Chr(10)
editpasteproc ' Now check to see if user doesn't want a fillet radius.
If label1.Visible = True Then
```

```
Clipboard.SetText XCode & Format(text6.Text, formats) & " F" & Format(text13.Text, formats) & Chr(13) & Chr(10)
editpasteproc
Else    ' With the fillet radius.
Clipboard.SetText G_Code_Radius & XCode & Format(text6.Text, formats) & " " & Rad_Z & Format(L2, formats) & " F" &
Format(text13.Text, formats) & Chr(13) & Chr(10)
editpasteproc
End If ' Now feed to the center of the groove.
Clipboard.SetText "Z-" & Format(LENGTH3, formats) & Chr(13) & Chr(10)
editpasteproc ' Rapid out of the groove.
Clipboard.SetText Rapid & XCode & Format(XPOS, formats) & Chr(13) & Chr(10)
editpasteproc ' Rapid to "Z0.0500".
Clipboard.SetText "Z" & Format(TEXT1, formats) & Chr(13) & Chr(10)
editpasteproc Screen.MousePointer = 0

GoTo 675

'..............................................................................
'..............................................................................

' O.D. GROOVE - WITH CANNED CYCLE

770

' XPOS = the stock diameter + 0.1000.
XPOS = TEXT4.Text + 0.1

' L1 = Edge breaks + tool nose radius.
If label2.Visible = True Then
L1 = ((text9.Text * 2) / 2) + (((text12.Text * 2) / 2) * 0.53)
End If
If label2.Visible = False Then
L1 = ((text9.Text * 2) / 2) + ((text12.Text * 2) / 2)
End If ' L2 = fillet radius - tool nose radius.
If label1.Visible = True Then
L2 = 0 ' Do nothing !
Else
L2 = ((text10.Text * 2) / 2) - ((text12.Text * 2) / 2)
End If ' Length1 = Groove width / 2.
LENGTH1 = ((text7.Text * 2) / 2) / 2

' Length2 = Tool width / 2
LENGTH2 = ((text11.Text * 2) / 2) / 2

' Length3 = Left side - 1/2 the groove width + 1/2 tool width
' Used to feed the middle of the tool to the middle of the groove.
LENGTH3 = (((text8.Text * 2) / 2) - LENGTH1) + LENGTH2

' Length4 = left side + edge break + Tool nose radius
LENGTH4 = ((text8.Text * 2) / 2) + ((text9.Text * 2) / 2) + ((text12.Text * 2) / 2)

' Length5 = left side - groove width - edge break.
LENGTH5 = (((text8.Text * 2) / 2) - ((text7.Text * 2) / 2)) - ((text9.Text * 2) / 2)

' Length6 = Length5 - tool nose radius + tool width
LENGTH6 = (LENGTH5 - ((text12.Text * 2) / 2)) + ((text11.Text * 2) / 2)

' Length7 = Length6 + edge break + tool nose radius.
LENGTH7 = LENGTH6 + ((text9.Text * 2) / 2) + ((text12.Text * 2) / 2)

' Length8 = left side - groove width + fillet radius.
If text10.Visible = False Then
LENGTH8 = (((text8.Text * 2) / 2) - ((text7.Text * 2) / 2))
```

```
End If
If text10.Visible = True Then
LENGTH8 = (((text8.Text * 2) / 2) - ((text7.Text * 2) / 2)) + ((text10.Text * 2) / 2)
End If ' Length9 = Length8 + 70% of the tool width.
LENGTH9 = LENGTH8 + (((text11.Text * 2) / 2) * 0.7)

' Length10 = left side - fillet radius.
If text10.Visible = False Then
LENGTH10 = ((text8.Text * 2) / 2)
End If
If text10.Visible = True Then
LENGTH10 = ((text8.Text * 2) / 2) - ((text10.Text * 2) / 2)
End If ' Length11 = left side - groove width + tool width + .005
LENGTH11 = (((text8.Text * 2) / 2) - ((text7.Text * 2) / 2)) + ((text11.Text * 2) / 2) + 0.005

' Length12 = left side - .005
LENGTH12 = ((text8.Text * 2) / 2) - 0.005

' Length13 = Length11 + 70% of the toll width.
LENGTH13 = LENGTH11 + (((text11.Text * 2) / 2) * 0.7)

' DIA1 = Groove diameter + 2 times the fillet radius.
If text10.Visible = False Then
DIA1 = ((text6.Text * 2) / 2) + 0.005
End If
If text10.Visible = True Then
DIA1 = ((text6.Text * 2) / 2) + (((text10.Text * 2) / 2) * 2)
End If ' DIA2 = Groove diameter + .005
DIA2 = ((text6.Text * 2) / 2) + 0.005

' ODCLEAR = O.D. to be grooved + .025
ODCLEAR = ((TEXT5.Text * 2) / 2) + 0.025

' D = The height for the canned groove cycle - diameter value !
D = ODCLEAR - DIA2

' K = The user specified stepover in Z for roughing cycle.
K = text15.Text

' STOCK2 = stock diameter + .025
STOCK2 = ((TEXT4.Text * 2) / 2) + 0.025 frmgrooving.Visible = False

Screen.MousePointer = 11

' Rapid to the part.
Clipboard.SetText Rapid & XCode & Format(XPOS, formats) & " Z" & Format(TEXT1, formats) & Chr(13) & Chr(10)
editpasteproc ' Rapid to the right side of the groove + tool width + .005.
Clipboard.SetText "Z-" & Format(LENGTH11, formats) & Chr(13) & Chr(10)
editpasteproc ' Feed to .025 above the O.D. to be grooved
Clipboard.SetText Feed & XCode & Format(ODCLEAR, formats) & " F" & Format(TEXT2, formats) & Chr(13) & Chr(10)
editpasteproc ' Feed into the part - above the fillet radius.
Clipboard.SetText XCode & Format(DIA1, formats) & " F" & Format(TEXT16, formats) & Chr(13) & Chr(10)
editpasteproc ' Rapid up - above the O.D.
Clipboard.SetText Rapid & XCode & Format(ODCLEAR, formats) & Chr(13) & Chr(10)
editpasteproc
```

```
' Rapid over in Z to start the roughing cycle.
Clipboard.SetText "Z-" & Format(LENGTH13, formats) & Chr(13) & Chr(10)
editpasteproc ' Do the roughing cycle.
Clipboard.SetText G_Code_Groove & XCode & Format(DIA2, formats)
editpasteproc
Clipboard.SetText " Z-"
editpasteproc
If label1.Visible = True Then
Clipboard.SetText Format(LENGTH12, formats) & " "
editpasteproc
Else
Clipboard.SetText Format(LENGTH10, formats) & " "
editpasteproc
End If ' Check to see if the height is Dia. or Rad...
If Groove_Height_Rad_Or_Dia = "Rad" Then
D = D / 2
End If
' Paste the height value in Dia. or Rad.
Clipboard.SetText Letter_Code_Height & Format(D, formats) & " "
editpasteproc
' Paste the stepover and feed rate.
Clipboard.SetText Letter_Code_Stepover & Format(K, formats) & " F" & Format(text14.Text, formats) & Chr(13) & Chr(10)
editpasteproc ' Rapid up above the O.D.
Clipboard.SetText Rapid & XCode & Format(ODCLEAR, formats) & Chr(13) & Chr(10)
editpasteproc
If label1.Visible = True Then
GoTo 101
End If ' Rapid over in Z to the left side of the groove - .005.
Clipboard.SetText "Z-" & Format(LENGTH12, formats) & Chr(13) & Chr(10)
editpasteproc ' Feed down into the part - above the fillet radius.
Clipboard.SetText Feed & XCode & Format(DIA1, formats) & " F" & Format(TEXT16, formats) & Chr(13) & Chr(10)
editpasteproc ' Rapid up above the O.D.
Clipboard.SetText Rapid & XCode & Format(ODCLEAR, formats) & Chr(13) & Chr(10)
editpasteproc 101
' Rapid in Z to do the right side edge break.
Clipboard.SetText "Z-" & Format(LENGTH6, formats) & Chr(13) & Chr(10)
editpasteproc ' Feed down to the O.D.
Clipboard.SetText Feed & XCode & Format(TEXT5.Text, formats) & " F" & Format(TEXT3, formats) & Chr(13) & Chr(10)
editpasteproc ' Set up either a radius or a chamfer...
If label2.Visible = True Then
Clipboard.SetText G_Code_Chamfer
editpasteproc
Else
Clipboard.SetText G_Code_Radius
editpasteproc
End If Clipboard.SetText "Z-" & Format(LENGTH7, formats) & " "
editpasteproc ' Paste the chamfer, X- or X+, and "L" value.
If label2.Visible = True Then
Clipboard.SetText Chamfer_X
editpasteproc
    If XCode = "X" Then
```

```
            Clipboard.SetText "-"
            editpasteproc
            End If
         Clipboard.SetText Format(L1, formats)
         editpasteproc
         End If ' Else...

' Paste the radius, X- or X+, and "L" value.
         If label2.Visible = False Then
         Clipboard.SetText Rad_X
         editpasteproc
            If XCode = "X" Then
            Clipboard.SetText "-"
            editpasteproc
            End If
         Clipboard.SetText Format(L1, formats)
         editpasteproc
         End If ' Now paste the feed rate and new line...
         Clipboard.SetText " F" & Format(text13.Text, formats) & Chr(13) & Chr(10)
         editpasteproc ' Now check to see if user doesn't want a fillet radius.
         If label1.Visible = True Then
         Clipboard.SetText XCode & Format(text6.Text, formats) & " F" & Format(text13.Text, formats) & Chr(13) & Chr(10)
         editpasteproc
         Else    ' With the fillet radius.
         Clipboard.SetText G_Code_Radius & XCode & Format(text6.Text, formats) & " " & Rad_Z & "-" & Format(L2, formats) & " F" &
         Format(text13.Text, formats) & Chr(13) & Chr(10)
         editpasteproc
         End If ' Feed to the center of the groove
         Clipboard.SetText "Z-" & Format(LENGTH3, formats) & Chr(13) & Chr(10)
         editpasteproc
         ' Rapid up out of the groove.
         Clipboard.SetText Rapid & XCode & Format(ODCLEAR, formats) & Chr(13) & Chr(10)
         editpasteproc ' Position in Z to do the left side edge break.
         Clipboard.SetText "Z-" & Format(LENGTH4, formats) & Chr(13) & Chr(10)
         editpasteproc ' Feed down to the O.D. of the part.
         Clipboard.SetText Feed & XCode & Format(TEXT5.Text, formats) & " F" & Format(TEXT3, formats) & Chr(13) & Chr(10)
         editpasteproc ' Set up either a radius or a chamfer..
         If label2.Visible = True Then
         Clipboard.SetText G_Code_Chamfer
         editpasteproc
         Else
         Clipboard.SetText G_Code_Radius
         editpasteproc
         End If Clipboard.SetText "Z-" & Format(text8.Text, formats) & " "
         editpasteproc ' Paste the chamfer, X- or X+, and "L" value
         If label2.Visible = True Then
         Clipboard.SetText Chamfer_X
         editpasteproc
            If XCode = "X" Then
            Clipboard.SetText "-"
            editpasteproc
            End If
         Clipboard.SetText Format(L1, formats)
         editpasteproc
         End If
```

```
' Else...

' Paste the radius, X- or X+, and "L" value.
If label2.Visible = False Then
Clipboard.SetText Rad_X
editpasteproc
    If XCode = "X" Then
    Clipboard.SetText "-"
    editpasteproc
    End If
Clipboard.SetText Format(L1, formats)
editpasteproc
End If ' Now paste the feed rate and new line...
Clipboard.SetText " F" & Format(text13.Text, formats) & Chr(13) & Chr(10)
editpasteproc ' Now check to see if user doesn't want a fillet radius.
If label1.Visible = True Then
Clipboard.SetText XCode & Format(text6.Text, formats) & " F" & Format(text13.Text, formats) & Chr(13) & Chr(10)
editpasteproc
Else    ' With the fillet radius.
Clipboard.SetText G_Code_Radius & XCode & Format(text6.Text, formats) & " " & Rad_Z & Format(L2, formats) & " F" &
Format(text13.Text, formats) & Chr(13) & Chr(10)
editpasteproc
End If ' Now feed to the center of the groove.
Clipboard.SetText "Z-" & Format(LENGTH3, formats) & Chr(13) & Chr(10)
editpasteproc ' Now rapid up out of the groove
Clipboard.SetText Rapid & XCode & Format(XPOS, formats) & Chr(13) & Chr(10)
editpasteproc ' Rapid to "Z0.0500"
Clipboard.SetText "Z" & Format(TEXT1, formats) & Chr(13) & Chr(10)
editpasteproc Screen.MousePointer = 0

GoTo 675

'**************************************************************************
'**************************************************************************

' I.D. GROOVE - WITH CANNED CYCLE

780

' XPOS = the stock diameter + 0.1000.
XPOS = TEXT5.Text - 0.1

' L1 = Edge breaks + tool nose radius.
If label2.Visible = True Then
L1 = ((text9.Text * 2) / 2) + (((text12.Text * 2) / 2) * 0.53)
End If
If label2.Visible = False Then
L1 = ((text9.Text * 2) / 2) + ((text12.Text * 2) / 2)
End If ' L2 = fillet radius - tool nose radius.
If label1.Visible = True Then
L2 = 0 ' Do nothing !
Else
L2 = ((text10.Text * 2) / 2) - ((text12.Text * 2) / 2)
End If ' Length1 = Groove width / 2.
LENGTH1 = ((text7.Text * 2) / 2) / 2

' Length2 = Tool width / 2.
LENGTH2 = ((text11.Text * 2) / 2) / 2
```

```
' Length3 = Left side - 1/2 the groove width + 1/2 tool width
' Used to feed the middle of the tool to the middle of the groove.
LENGTH3 = (((text8.Text * 2) / 2) - LENGTH1) + LENGTH2

' Length4 = left side + edge break + Tool nose radius.
LENGTH4 = ((text8.Text * 2) / 2) + ((text9.Text * 2) / 2) + ((text12.Text * 2) / 2)

' Length5 = left side - groove width - edge break.
LENGTH5 = (((text8.Text * 2) / 2) - ((text7.Text * 2) / 2)) - ((text9.Text * 2) / 2)

' Length6 = Length5 - tool nose radius + tool width.
LENGTH6 = (LENGTH5 - ((text12.Text * 2) / 2)) + ((text11.Text * 2) / 2)

' Length7 = Length6 + edge break + tool nose radius.
LENGTH7 = LENGTH6 + ((text9.Text * 2) / 2) + ((text12.Text * 2) / 2)

' Length8 = left side - groove width + fillet radius.
If text10.Visible = False Then
LENGTH8 = (((text8.Text * 2) / 2) - ((text7.Text * 2) / 2))
End If
If text10.Visible = True Then
LENGTH8 = (((text8.Text * 2) / 2) - ((text7.Text * 2) / 2)) + ((text10.Text * 2) / 2)
End If ' Length9 = Length8 + 70% of the tool width.
LENGTH9 = LENGTH8 + (((text11.Text * 2) / 2) * 0.7)

' Length10 = left side - fillet radius.
If text10.Visible = False Then
LENGTH10 = ((text8.Text * 2) / 2)
End If
If text10.Visible = True Then
LENGTH10 = ((text8.Text * 2) / 2) - ((text10.Text * 2) / 2)
End If ' Length11 = left side - groove width + tool width + .005
LENGTH11 = (((text8.Text * 2) / 2) - ((text7.Text * 2) / 2)) + ((text11.Text * 2) / 2) + 0.005

' Length12 = left side - .005
LENGTH12 = ((text8.Text * 2) / 2) - 0.005

' Length13 = Length11 + 70% of the toll width.
LENGTH13 = LENGTH11 + (((text11.Text * 2) / 2) * 0.7)

' DIA1 = Groove diameter + 2 times the fillet radius.
If text10.Visible = False Then
DIA1 = ((text6.Text * 2) / 2) - 0.005
End If
If text10.Visible = True Then
DIA1 = ((text6.Text * 2) / 2) - (((text10.Text * 2) / 2) * 2)
End If ' DIA2 = Groove diameter + .005
DIA2 = ((text6.Text * 2) / 2) - 0.005

' ODCLEAR = O.D. to be grooved + .025
ODCLEAR = ((TEXT5.Text * 2) / 2) - 0.025

' D = The height for the canned groove cycle - diameter value !
D = DIA2 - ODCLEAR ' K = The user specified stepover in Z for roughing cycle.
K = text15.Text ' STOCK2 = stock diameter + .025
STOCK2 = ((TEXT5.Text * 2) / 2) - 0.025 frmgrooving.Visible = False

Screen.MousePointer = 11

' Rapid to the part.
Clipboard.SetText Rapid & XCode & Format(XPOS, formats) & " Z" & Format(TEXT1, formats) & Chr(13) & Chr(10)
```

```
editpasteproc

' Rapid to the right side of the groove + tool width + .005.
Clipboard.SetText "Z-" & Format(LENGTH11, formats) & Chr(13) & Chr(10)
editpasteproc ' Feed to .025 below the I.D. to be grooved.
Clipboard.SetText Feed & XCode & Format(ODCLEAR, formats) & " F" & Format(TEXT2, formats) & Chr(13) & Chr(10)
editpasteproc ' Feed into the part - below the fillet radius
Clipboard.SetText XCode & Format(DIA1, formats) & " F" & Format(TEXT16, formats) & Chr(13) & Chr(10)
editpasteproc ' Rapid down out of the groove.
Clipboard.SetText Rapid & XCode & Format(ODCLEAR, formats) & Chr(13) & Chr(10)
editpasteproc ' Position in Z to start the roughing cycle.
Clipboard.SetText "Z-" & Format(LENGTH13, formats) & Chr(13) & Chr(10)
editpasteproc ' Do the roughing cycle.
Clipboard.SetText G_Code_Groove & XCode & Format(DIA2, formats)
editpasteproc
Clipboard.SetText " Z-"
editpasteproc
If label1.Visible = True Then
Clipboard.SetText Format(LENGTH12, formats) & " "
editpasteproc
Else
Clipboard.SetText Format(LENGTH10, formats) & " "
editpasteproc
End If ' Check to see if the height is Dia. or Rad...
If Groove_Height_Rad_Or_Dia = "Rad" Then
D = D / 2
End If
' Paste the height value in Dia. or Rad.
Clipboard.SetText Letter_Code_Height & Format(D, formats) & " "
editpasteproc
' Paste the stepover and feed rate
Clipboard.SetText Letter_Code_Stepover & Format(K, formats) & " F" & Format(text14.Text, formats) & Chr(13) & Chr(10)
editpasteproc ' Rapid down out of the groove.
Clipboard.SetText Rapid & XCode & Format(ODCLEAR, formats) & Chr(13) & Chr(10)
editpasteproc
If label1.Visible = True Then
GoTo 202
End If ' Rapid over in Z to the left side of the groove - .005.
Clipboard.SetText "Z-" & Format(LENGTH12, formats) & Chr(13) & Chr(10)
editpasteproc ' Feed into the part - below the fillet radius.
Clipboard.SetText Feed & XCode & Format(DIA1, formats) & " F" & Format(TEXT16, formats) & Chr(13) & Chr(10)
editpasteproc ' Rapid down out of the groove.
Clipboard.SetText Rapid & XCode & Format(ODCLEAR, formats) & Chr(13) & Chr(10)
editpasteproc 202
' Position in Z to do the right hand side edge break.
Clipboard.SetText "Z-" & Format(LENGTH6, formats) & Chr(13) & Chr(10)
editpasteproc ' Feed up to the I.D. to be grooved.
Clipboard.SetText Feed & XCode & Format(TEXT5.Text, formats) & " F" & Format(TEXT3, formats) & Chr(13) & Chr(10)
editpasteproc
```

```
' Set up either a radius or a chamfer...
If label2.Visible = True Then
Clipboard.SetText G_Code_Chamfer
editpasteproc
Else
Clipboard.SetText G_Code_Radius
editpasteproc
End If Clipboard.SetText "Z-" & Format(LENGTH7, formats) & " "
editpasteproc ' Paste the chamfer, X- or X+, and "L" value.
If label2.Visible = True Then
Clipboard.SetText Chamfer_X
editpasteproc
   If XCode = "X-" Then
   Clipboard.SetText "-"
   editpasteproc
   End If
Clipboard.SetText Format(L1, formats)
editpasteproc
End If ' Else...

' Paste the radius, X- or X+, and "L" value.
If label2.Visible = False Then
Clipboard.SetText Rad_X
editpasteproc
   If XCode = "X-" Then
   Clipboard.SetText "-"
   editpasteproc
   End If
Clipboard.SetText Format(L1, formats)
editpasteproc
End If ' Now paste the feed rate and new line..
Clipboard.SetText " F" & Format(text13.Text, formats) & Chr(13) & Chr(10)
editpasteproc ' Now check to see if user doesn't want a fillet radius.
If label1.Visible = True Then
Clipboard.SetText XCode & Format(text6.Text, formats) & " F" & Format(text13.Text, formats) & Chr(13) & Chr(10)
editpasteproc
Else   ' With the fillet radius.
Clipboard.SetText G_Code_Radius & XCode & Format(text6.Text, formats) & " " & Rad_Z & "-" & Format(L2, formats) & " F" &
Format(text13.Text, formats) & Chr(13) & Chr(10)
editpasteproc
End If ' Feed to the center of the groove
Clipboard.SetText "Z-" & Format(LENGTH3, formats) & Chr(13) & Chr(10)
editpasteproc ' Rapid out of the groove
Clipboard.SetText Rapid & XCode & Format(ODCLEAR, formats) & Chr(13) & Chr(10)
editpasteproc ' Position in Z for the other edge break...
Clipboard.SetText "Z-" & Format(LENGTH4, formats) & Chr(13) & Chr(10)
editpasteproc ' Feed up to the bore diameter.
Clipboard.SetText Feed & XCode & Format(TEXT5.Text, formats) & " F" & Format(TEXT3, formats) & Chr(13) & Chr(10)
editpasteproc ' Set up either a radius or a chamfer...
If label2.Visible = True Then
Clipboard.SetText G_Code_Chamfer
editpasteproc
Else
Clipboard.SetText G_Code_Radius
```

```
              editpasteproc
              End If

Clipboard.SetText "Z-" & Format(text8.Text, formats) & " "
 5            editpasteproc ' Paste the chamfer, X- or X+, and "L" value.
              If label2.Visible = True Then
              Clipboard.SetText Chamfer_X
10            editpasteproc
                 If XCode = "X-" Then
                 Clipboard.SetText "-"
                 editpasteproc
                 End If
15            Clipboard.SetText Format(L1, formats)
              editpasteproc
              End If ' Else...
20
              ' Paste the radius, X- or X+, and "L" value.
              If label2.Visible = False Then
              Clipboard.SetText Rad_X
              editpasteproc
25               If XCode = "X-" Then
                 Clipboard.SetText "-"
                 editpasteproc
                 End If
              Clipboard.SetText Format(L1, formats)
30            editpasteproc
              End If ' Now paste the feed rate and new line...
              Clipboard.SetText " F" & Format(text13.Text, formats) & Chr(13) & Chr(10)
35            editpasteproc ' Now check to see if user doesn't want a fillet radius.
              If label1.Visible = True Then
              Clipboard.SetText XCode & Format(text6.Text, formats) & " F" & Format(text13.Text, formats) & Chr(13) & Chr(10)
40            editpasteproc
              Else   ' With the fillet radius
              Clipboard.SetText G_Code_Radius & XCode & Format(text6.Text, formats) & " " & Rad_Z & Format(L2, formats) & " F" &
              Format(text13.Text, formats) & Chr(13) & Chr(10)
              editpasteproc
45            End If ' Now feed to the center of the groove.
              Clipboard.SetText "Z-" & Format(LENGTH3, formats) & Chr(13) & Chr(10)
              editpasteproc
50
              ' Rapid out of the groove.
              Clipboard.SetText Rapid & XCode & Format(XPOS, formats) & Chr(13) & Chr(10)
              editpasteproc 55            ' Rapid to "Z0.0500".
              Clipboard.SetText "Z" & Format(TEXT1, formats) & Chr(13) & Chr(10)
              editpasteproc Screen.MousePointer = 0
60
              GoTo 675

673
              675
65            frmgrooving.Visible = False
              674

Screen.MousePointer = 0

70            frmMDI.ActiveForm.ActiveControl.SetFocus ' RETURNS THE CURSER TO THE SCREEN End Sub
              Private Sub Command3_Click()
              frmgrooving.Visible = False
```

```
frmidch.Visible = True
End Sub

Private Sub Form_Deactivate()
Visible = False
If Not frmidch.Visible = True Then
    frmMDI.ActiveForm.ActiveControl.SetFocus ' RETURNS THE CURSER TO THE SCREEN
End If
End Sub Private Sub Form_Load()

If WindowState = 0 Then
        Move (Screen.Width - frmgrooving.Width) / 2, (Screen.Height - frmgrooving.Height) / 2
    End If End Sub Private Sub Form_Paint()

If WindowState = 0 Then
        Move (Screen.Width - frmgrooving.Width) / 2, (Screen.Height - frmgrooving.Height) / 2
    End If End Sub Private Sub Form_Resize()

If WindowState = 0 Then
        Move (Screen.Width - frmgrooving.Width) / 2, (Screen.Height - frmgrooving.Height) / 2
    End If End Sub Private Sub label1_DblClick()
label1.Visible = False
Label10.Visible = True
text10.Visible = True
End Sub Private Sub Label10_DblClick()
Label10.Visible = False
text10.Visible = False
label1.Visible = True
End Sub Private Sub label2_DblClick()
label2.Visible = False
Label9.Visible = True
End Sub Private Sub Label9_DblClick()
Label9.Visible = False
label2.Visible = True
End Sub Private Sub Option1_Click()
Label4.Visible = True
TEXT4.Visible = True
Label4.Caption = "Stock Diameter"
Label5.Caption = "O.D. to be grooved"
End Sub Private Sub option2_Click()
Label4.Visible = False
TEXT4.Visible = False
Label5.Caption = "I.D. to be grooved"
End Sub Private Sub Text10_KeyPress(KeyAscii As Integer)
```

```
If KeyAscii = (13) Then
    SendKeys ("{tab}"), True
End If

Const DECIMAL_OK = -1          ' 0 = no, -1 = YES
Const MIN_VALUE = -999         ' Minimum value
Const MAX_VALUE = 999          ' Maximum value
    key$ = Chr$(KeyAscii)      ' Convert to string
    Select Case key$
        Case "0" To "9"        ' Numbers and minus signs
            Newvalue = Val(Left$(text10.Text, text10.SelStart) + key$ + Mid$(text10.Text, text10.SelStart + text10.SelLength + 1))
            If Newvalue > MAX_VALUE Or Newvalue < MIN_VALUE Then
                KeyAscii = 0
            End If
        Case "."
            If DECIMAL_OK = 0 Or InStr(text10.Text, ".") Then
                KeyAscii = 0
            End If
        Case Chr$(8)           ' Backspace
        Case Else
            KeyAscii = 0
    End Select
    If key$ = "-" And (InStr(text10.Text, "-") Or text10.SelStart <> 0) Then
        KeyAscii = 0
    End If End Sub Private Sub Text11_KeyPress(KeyAscii As Integer)

If KeyAscii = (13) Then
        SendKeys ("{tab}"), True
    End If

Const DECIMAL_OK = -1          ' 0 = no, -1 = YES
Const MIN_VALUE = -999         ' Minimum value
Const MAX_VALUE = 999          ' Maximum value
    key$ = Chr$(KeyAscii)      ' Convert to string
    Select Case key$
        Case "0" To "9"        ' Numbers and minus signs
            Newvalue = Val(Left$(text11.Text, text11.SelStart) + key$ + Mid$(text11.Text, text11.SelStart + text11.SelLength + 1))
            If Newvalue > MAX_VALUE Or Newvalue < MIN_VALUE Then
                KeyAscii = 0
            End If
        Case "."
            If DECIMAL_OK = 0 Or InStr(text11.Text, ".") Then
                KeyAscii = 0
            End If
        Case Chr$(8)           ' Backspace
        Case Else
            KeyAscii = 0
    End Select
    If key$ = "-" And (InStr(text11.Text, "-") Or text11.SelStart <> 0) Then
        KeyAscii = 0
    End If End Sub Private Sub Text12_KeyPress(KeyAscii As Integer)

If KeyAscii = (13) Then
        SendKeys ("{tab}"), True
    End If

Const DECIMAL_OK = -1          ' 0 = no, -1 = YES
Const MIN_VALUE = -999         ' Minimum value
Const MAX_VALUE = 999          ' Maximum value
    key$ = Chr$(KeyAscii)      ' Convert to string
    Select Case key$
        Case "0" To "9"        ' Numbers and minus signs
            Newvalue = Val(Left$(text12.Text, text12.SelStart) + key$ + Mid$(text12.Text, text12.SelStart + text12.SelLength + 1))
```

```
            If Newvalue > MAX_VALUE Or Newvalue < MIN_VALUE Then
                KeyAscii = 0
            End If
        Case "."
 5          If DECIMAL_OK = 0 Or InStr(text12.Text, ".") Then
                KeyAscii = 0
            End If
        Case Chr$(8)            ' Backspace
        Case Else
10          KeyAscii = 0
        End Select
        If key$ = "-" And (InStr(text12.Text, "-") Or text12.SelStart <> 0) Then
            KeyAscii = 0
        End If
15
    End Sub Private Sub Text13_KeyPress(KeyAscii As Integer)

20      If KeyAscii = (13) Then
            SendKeys ("{tab}"), True
        End If Const DECIMAL_OK = -1           ' 0 = no, -1 = YES
25      Const MIN_VALUE = -999          ' Minimum value
        Const MAX_VALUE = 999           ' Maximum value
        key$ = Chr$(KeyAscii)           ' Convert to string
        Select Case key$
            Case "0" To "9"             ' Numbers and minus signs
30              Newvalue = Val(Left$(text13.Text, text13.SelStart) + key$ + Mid$(text13.Text, text13.SelStart + text13.SelLength + 1))
                If Newvalue > MAX_VALUE Or Newvalue < MIN_VALUE Then
                    KeyAscii = 0
                End If
            Case "."
35              If DECIMAL_OK = 0 Or InStr(text13.Text, ".") Then
                    KeyAscii = 0
                End If
            Case Chr$(8)            ' Backspace
            Case Else
40              KeyAscii = 0
        End Select
        If key$ = "-" And (InStr(text13.Text, "-") Or text13.SelStart <> 0) Then
            KeyAscii = 0
        End If
45
    End Sub Private Sub Text14_KeyPress(KeyAscii As Integer)

50      If KeyAscii = (13) Then
            SendKeys ("{tab}"), True
        End If Const DECIMAL_OK = -1           ' 0 = no, -1 = YES
55      Const MIN_VALUE = -999          ' Minimum value
        Const MAX_VALUE = 999           ' Maximum value
        key$ = Chr$(KeyAscii)           ' Convert to string
        Select Case key$
            Case "0" To "9"             ' Numbers and minus signs
60              Newvalue = Val(Left$(text14.Text, text14.SelStart) + key$ + Mid$(text14.Text, text14.SelStart + text14.SelLength + 1))
                If Newvalue > MAX_VALUE Or Newvalue < MIN_VALUE Then
                    KeyAscii = 0
                End If
            Case "."
65              If DECIMAL_OK = 0 Or InStr(text14.Text, ".") Then
                    KeyAscii = 0
                End If
            Case Chr$(8)            ' Backspace
            Case Else
70              KeyAscii = 0
        End Select
        If key$ = "-" And (InStr(text14.Text, "-") Or text14.SelStart <> 0) Then
            KeyAscii = 0
        End If
```

```
End Sub

Private Sub Text15_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text15.Text, text15.SelStart) + key$ + Mid$(text15.Text, text15.SelStart + text15.SelLength + 1))
            If Newvalue > MAX_VALUE Or Newvalue < MIN_VALUE Then
                KeyAscii = 0
            End If
        Case "."
            If DECIMAL_OK = 0 Or InStr(text15.Text, ".") Then
                KeyAscii = 0
            End If
        Case Chr$(8)             ' Backspace
        Case Else
            KeyAscii = 0
    End Select
    If key$ = "-" And (InStr(text15.Text, "-") Or text15.SelStart <> 0) Then
        KeyAscii = 0
    End If End Sub Private Sub Text4_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(TEXT4.Text, TEXT4.SelStart) + key$ + Mid$(TEXT4.Text, TEXT4.SelStart + TEXT4.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT4.Text, ".") Then
                KeyAscii = 0
            End If
        Case Chr$(8)             ' Backspace
        Case Else
            KeyAscii = 0
    End Select
    If key$ = "-" And (InStr(TEXT4.Text, "-") Or TEXT4.SelStart <> 0) Then
        KeyAscii = 0
    End If End Sub Private Sub Text5_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
```

```
                    Newvalue = Val(Left$(TEXT5.Text, TEXT5.SelStart) + key$ + Mid$(TEXT5.Text, TEXT5.SelStart + TEXT5.SelLength + 1))
                    If Newvalue > MAX_VALUE Or Newvalue < MIN_VALUE Then
                        KeyAscii = 0
                    End If
 5              Case "."
                    If DECIMAL_OK = 0 Or InStr(TEXT5.Text, ".") Then
                        KeyAscii = 0
                    End If
                Case Chr$(8)         ' Backspace
10              Case Else
                    KeyAscii = 0
                End Select
                If key$ = "-" And (InStr(TEXT5.Text, "-") Or TEXT5.SelStart <> 0) Then
                    KeyAscii = 0
15              End If End Sub Private Sub Text6_KeyPress(KeyAscii As Integer)
20
                If KeyAscii = (13) Then
                SendKeys ("{tab}"), True
                End If 25              Const DECIMAL_OK = -1        ' 0 = no, -1 = YES
                Const MIN_VALUE = -999       ' Minimum value
                Const MAX_VALUE = 999        ' Maximum value
                key$ = Chr$(KeyAscii)        ' Convert to string
                Select Case key$
30              Case "0" To "9"      ' Numbers and minus signs
                    Newvalue = Val(Left$(text6.Text, text6.SelStart) + key$ + Mid$(text6.Text, text6.SelStart + text6.SelLength + 1))
                    If Newvalue > MAX_VALUE Or Newvalue < MIN_VALUE Then
                        KeyAscii = 0
                    End If
35              Case "."
                    If DECIMAL_OK = 0 Or InStr(text6.Text, ".") Then
                        KeyAscii = 0
                    End If
                Case Chr$(8)         ' Backspace
40              Case Else
                    KeyAscii = 0
                End Select
                If key$ = "-" And (InStr(text6.Text, "-") Or text6.SelStart <> 0) Then
                    KeyAscii = 0
45              End If End Sub Private Sub Text7_KeyPress(KeyAscii As Integer)
50
                If KeyAscii = (13) Then
                SendKeys ("{tab}"), True
                End If 55              Const DECIMAL_OK = -1        ' 0 = no, -1 = YES
                Const MIN_VALUE = -999       ' Minimum value
                Const MAX_VALUE = 999        ' Maximum value
                key$ = Chr$(KeyAscii)        ' Convert to string
                Select Case key$
60              Case "0" To "9"      ' Numbers and minus signs
                    Newvalue = Val(Left$(text7.Text, text7.SelStart) + key$ + Mid$(text7.Text, text7.SelStart + text7.SelLength + 1))
                    If Newvalue > MAX_VALUE Or Newvalue < MIN_VALUE Then
                        KeyAscii = 0
                    End If
65              Case "."
                    If DECIMAL_OK = 0 Or InStr(text7.Text, ".") Then
                        KeyAscii = 0
                    End If
                Case Chr$(8)         ' Backspace
70              Case Else
                    KeyAscii = 0
                End Select
                If key$ = "-" And (InStr(text7.Text, "-") Or text7.SelStart <> 0) Then
                    KeyAscii = 0
```

```
            End If

End Sub

Private Sub Text8_KeyPress(KeyAscii As Integer)

If KeyAscii = (13) Then
            SendKeys ("{tab}"), True
        End If

Const DECIMAL_OK = -1        ' 0 = no, -1 = YES
        Const MIN_VALUE = -999       ' Minimum value
        Const MAX_VALUE = 999        ' Maximum value
            key$ = Chr$(KeyAscii)    ' Convert to string
        Select Case key$
            Case "0" To "9"          ' Numbers and minus signs
                Newvalue = Val(Left$(text8.Text, text8.SelStart) + key$ + Mid$(text8.Text, text8.SelStart + text8.SelLength + 1))
                If Newvalue > MAX_VALUE Or Newvalue < MIN_VALUE Then
                    KeyAscii = 0
                End If
            Case "."
                If DECIMAL_OK = 0 Or InStr(text8.Text, ".") Then
                    KeyAscii = 0
                End If
            Case Chr$(8)             ' Backspace
            Case Else
                KeyAscii = 0
        End Select
        If key$ = "-" And (InStr(text8.Text, "-") Or text8.SelStart <> 0) Then
            KeyAscii = 0
        End If End Sub Private Sub Text9_KeyPress(KeyAscii As Integer)

If KeyAscii = (13) Then
            SendKeys ("{tab}"), True
        End If

Const DECIMAL_OK = -1        ' 0 = no, -1 = YES
        Const MIN_VALUE = -999       ' Minimum value
        Const MAX_VALUE = 999        ' Maximum value
            key$ = Chr$(KeyAscii)    ' Convert to string
        Select Case key$
            Case "0" To "9"          ' Numbers and minus signs
                Newvalue = Val(Left$(text9.Text, text9.SelStart) + key$ + Mid$(text9.Text, text9.SelStart + text9.SelLength + 1))
                If Newvalue > MAX_VALUE Or Newvalue < MIN_VALUE Then
                    KeyAscii = 0
                End If
            Case "."
                If DECIMAL_OK = 0 Or InStr(text9.Text, ".") Then
                    KeyAscii = 0
                End If
            Case Chr$(8)             ' Backspace
            Case Else
                KeyAscii = 0
        End Select
        If key$ = "-" And (InStr(text9.Text, "-") Or text9.SelStart <> 0) Then
            KeyAscii = 0
        End If End Sub Private Sub Groove_Blank_Text_Box()
    MsgBox "Fill in all the blanks.", 48, "Groove"
    End Sub VERSION 4.00
    Begin VB.Form Form1
        Appearance    =   0  'Flat
```

```
   BackColor       =   &H00FF0000&
   BorderStyle     =   3  'Fixed Dialog
   ClientHeight    =   2325
   ClientLeft      =   1140
   ClientTop       =   1635
   ClientWidth     =   5475
   ControlBox      =   0  'False
   Height          =   2790
   Left            =   1080
   LinkTopic       =   "Form1"
   MaxButton       =   0  'False
   MinButton       =   0  'False
   ScaleHeight     =   2325
   ScaleWidth      =   5475
   ShowInTaskbar   =   0  'False
   Top             =   1230
   Width           =   5595
End
Attribute VB_Name = "Form1"
Attribute VB_Creatable = False
Attribute VB_Exposed = False Sub Text3d(PrintObj As Object, Raised As Integer, Heavy As Integer, Textcolor As Long, LightColor As Long, DarkColor As Long,
Caption As String, Fontsize As String, X As Long, Y As Long)
Dim Lite As Long, Dark As Long, HoldMode As Integer If Raised Then
      Lite = LightColor
      Dark = DarkColor
   Else 'Indented
      Lite = DarkColor
      Dark = LightColor
   End If
HoldMode = PrintObj.ScaleMode
PrintObj.ScaleMode = 3

PrintObj.Fontsize = Val(Fontsize)
   PrintObj.AutoRedraw = True
   PrintObj.ForeColor = Lite
   PrintObj.CurrentX = X - 1
   PrintObj.CurrentY = Y - 1
   PrintObj.Print Caption
   PrintObj.ForeColor = Dark
   PrintObj.CurrentX = X + 1
   PrintObj.CurrentY = Y + 1
   PrintObj.Print Caption
   PrintObj.ForeColor = Textcolor
   PrintObj.CurrentX = X
   PrintObj.CurrentY = Y
   PrintObj.Print Caption PrintObj.ScaleMode = HoldMode End Sub Private Sub Form_Load()

' Paint the background.
GradateBackGround Me, &H400000, &HFF0000, 1, 1, 1

' Print 3D text on my start up form.
' Parameters 24, 40,30 are:
' 24 is the font size
' 40 is the "Z" position.
' 30 is the "X" position
Text3d Me, True, True, &HC0C0C0, &HFFFFFF, &H0&, "Qcam For Windows" & Chr(13) + Chr(10) & "      By J. Rowlette", 24, 40, 30

Screen.MousePointer = 11

If WindowState = 0 Then
      Move (Screen.Width - Form1.Width) / 2, (Screen.Height - Form1.Height) / 2
   End If
```

```
            Show

Load frmMDI 5         frmMDI.Show

Screen.MousePointer = 0

Unload Me
 10
            End Sub

15         Public Sub GradateBackGround(DestObj As Object, BackColor As Long, ForeColor As Long, GradStyle As Integer, X As Long, Y As
            Long)
            Dim foo As Integer, foobar As Integer
            Dim DestWidth As Integer, DestHeight As Integer, DestMode As Integer
            Dim StartPnt As Integer, EndPnt As Integer, DrawHeight As Double, DrawWidth As Double
 20         Dim dblG As Double, dblR As Double, dblB As Double
            Dim addg As Double, addr As Double, addb As Double
            Dim Mask As Long, Mask2 As Long, colorstep As Integer
            Dim bckR As Double, bckG As Double, bckB As Double
            Dim Linecolor As Long, PixelStep As Long, LineHeight As Integer
 25         Dim PixelCount As Integer, aspect As Single
            Dim CenterX As Long, CenterY As Long
            On Error Resume Next Screen.MousePointer = 11
 30
            'set up rgb bitmask
            Mask = 255
            Mask = Mask ^ 2
            Mask2 = 255
 35         Mask2 = 255 ^ 3

'Init dimensions in twips, set backcolor, set modes
            DestMode = DestObj.ScaleMode
            DestObj.ScaleMode = 1
 40         DestHeight = DestObj.ScaleHeight
            DestWidth = DestObj.ScaleWidth
            DestObj.BackColor = BackColor
            DestObj.AutoRedraw = True
            DestObj.DrawStyle = 5 'transparent
 45         DestObj.DrawMode = 13 'CopyPen 'solid offset
            Select Case GradStyle
            Case 2 'Horizontal
 50             StartPnt = DestWidth * 0.05
                EndPnt = DestWidth * 0.95
            Case Else
                StartPnt = DestHeight * 0.05
                EndPnt = DestHeight * 0.95
 55             Select Case GradStyle
                Case 3 'ellipse from upper left
                    CenterX = 0
                    CenterY = 0
                Case 4 'ellipse from upper right
 60                 CenterX = DestWidth
                    CenterY = 0
                Case 5 'ellipse from lower right
                    CenterX = DestWidth
                    CenterY = DestHeight
 65             Case 6 'ellipse from lower left
                    CenterX = 0
                    CenterY = DestHeight
                Case 7 'ellipse from upper center
                    CenterX = DestWidth / 2
 70                 CenterY = 0
                Case 8 'ellipse from right center
                    CenterX = DestWidth
                    CenterY = DestHeight / 2
                Case 9 'ellipse from lower center
```

```
            CenterX = DestWidth / 2
            CenterY = DestHeight
         Case 10 'ellipse from left center
            CenterX = 0
            CenterY = DestHeight / 2
         Case 11 'ellipse from x,y - twips
            CenterX = X
            CenterY = Y
      End Select
   End Select
   aspect = DestHeight / DestWidth Select Case GradStyle
      Case 0
         DrawHeight = EndPnt - StartPnt
      Case 1
         DrawHeight = Sqr((DestHeight / 2) ^ 2 + (DestWidth / 2) ^ 2)
      Case 2
         DrawWidth = EndPnt - StartPnt
      Case 3, 4, 5, 6
         DrawHeight = Sqr((DestHeight) ^ 2 + (DestWidth) ^ 2)
      Case 7, 8, 9, 10
         If DestHeight >= DestWidth Then
            DrawHeight = DestHeight
         Else
            DrawHeight = DestWidth
         End If
      Case 11
         DrawHeight = CenterX
         If Sqr(CenterY ^ 2 + CenterX ^ 2) > DrawHeight Then DrawHeight = Sqr(CenterY ^ 2 + CenterX ^ 2)
         If Sqr(CenterY ^ 2 + (DestWidth - CenterX) ^ 2) > DrawHeight Then DrawHeight = Sqr(CenterY ^ 2 + (DestWidth - CenterX) ^ 2)
         If Sqr((DestHeight - CenterY) ^ 2 + (DestWidth - CenterX) ^ 2) > DrawHeight Then DrawHeight = Sqr((DestHeight - CenterY) ^ 2 + (DestWidth - CenterX) ^ 2)
         If Sqr((DestHeight - CenterY) ^ 2 + CenterX ^ 2) > DrawHeight Then DrawHeight = Sqr((DestHeight - CenterY) ^ 2 + CenterX ^ 2)
         'DrawHeight = DrawHeight * .9
   End Select
   dblR = CDbl(BackColor And &HFF)
   dblG = CDbl(BackColor And &HFF00&) / 255
   dblB = CDbl(BackColor And &HFF0000) / &HFF00&
   bckR = CDbl(ForeColor And &HFF&)
   bckG = CDbl(ForeColor And &HFF00&) / 255
   bckB = CDbl(ForeColor And &HFF0000) / &HFF00&
   If GradStyle = 2 Then
      addr = (bckR - dblR) / (DrawWidth / Screen.TwipsPerPixelY)
      addg = (bckG - dblG) / (DrawWidth / Screen.TwipsPerPixelY)
      addb = (bckB - dblB) / (DrawWidth / Screen.TwipsPerPixelY)
   Else
      addr = (bckR - dblR) / (DrawHeight / Screen.TwipsPerPixelY)
      addg = (bckG - dblG) / (DrawHeight / Screen.TwipsPerPixelY)
      addb = (bckB - dblB) / (DrawHeight / Screen.TwipsPerPixelY)
   End If DestObj.Cls PixelStep = Screen.TwipsPerPixelY
   LineHeight = PixelStep * 2
   Select Case GradStyle
      Case 0 'Vertical
         For foo = 1 To DrawHeight Step PixelStep
            dblR = dblR + addr
            dblG = dblG + addg
            dblB = dblB + addb
            If dblR > 255 Then dblR = 255
            If dblG > 255 Then dblG = 255
            If dblB > 255 Then dblB = 255
            If dblR < 0 Then dblR = 0
            If dblG < 0 Then dblG = 0
            If dblB < 0 Then dblB = 0
            Linecolor = RGB(dblR, dblG, dblB)
            DestObj.Line (0, foo + StartPnt)-(DestWidth, foo + StartPnt + LineHeight), Linecolor, BF
         Next foo
         For foo = EndPnt To DestHeight Step PixelStep
            DestObj.Line (0, foo)-(DestWidth, foo + LineHeight), ForeColor, BF
         Next foo
```

```
Case 2 'horizontal
    For foo = 1 To DrawWidth Step PixelStep
        dblR = dblR + addr
        dblG = dblG + addg
        dblB = dblB + addb
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.Line (foo + StartPnt, 0)-(foo + StartPnt + LineHeight, DestHeight), Linecolor, BF
    Next foo
    For foo = EndPnt To DestWidth Step PixelStep
        DestObj.Line (foo, 0)-(foo + LineHeight, DestHeight), ForeColor, BF
    Next foo
Case 1 'circular
    Screen.MousePointer = 11
    DestObj.FillStyle = 0
    PixelCount = 5
    PixelStep = PixelStep * -1 * PixelCount
    For foo = DrawHeight To 1 Step PixelStep
        dblR = dblR + (addr * PixelCount)
        dblG = dblG + (addg * PixelCount)
        dblB = dblB + (addb * PixelCount)
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.FillColor = Linecolor
        DestObj.Circle (DestWidth / 2, DestHeight / 2), foo, Linecolor, , , aspect
    Next foo
    Screen.MousePointer = 0
Case Else 'elliptical from various points
    DestObj.FillStyle = 0
    PixelCount = 5
    PixelStep = PixelStep * -1 * PixelCount
    For foo = DrawHeight To 1 Step PixelStep
        dblR = dblR + (addr * PixelCount)
        dblG = dblG + (addg * PixelCount)
        dblB = dblB + (addb * PixelCount)
        If dblR > 255 Then dblR = 255
        If dblG > 255 Then dblG = 255
        If dblB > 255 Then dblB = 255
        If dblR < 0 Then dblR = 0
        If dblG < 0 Then dblG = 0
        If dblB < 0 Then dblB = 0
        Linecolor = RGB(dblR, dblG, dblB)
        DestObj.FillColor = Linecolor
        DestObj.Circle (CenterX, CenterY), foo, Linecolor, , , aspect
    Next foo
End Select
DestObj.ScaleMode = DestMode
Screen.MousePointer = 0
End Sub
VERSION 4.00
Begin VB.Form frmnewtool
    BorderStyle     =   3  'Fixed Dialog
    Caption         =   "New Tool Start Up"
    ClientHeight    =   2175
    ClientLeft      =   3420
    ClientTop       =   2370
    ClientWidth     =   3555
    BeginProperty Font
        name        =   "MS Sans Serif"
        charset     =   1
        weight      =   700
        size        =   8.25
        underline   =   0  'False
        italic      =   0  'False
```

```
      strikethrough   =   0  'False
   EndProperty
   ForeColor       =   &H80000008&
   Height          =   2700
   Icon            =   "FRMNEWTO.frx":0000
   Left            =   3300
   LinkTopic       =   "Form1"
   LockControls    =   -1  'True
   ScaleHeight     =   2175
   ScaleWidth      =   3555
   Top             =   1965
   Width           =   3795
   Begin VB.CommandButton Command1
      Caption         =   "&Cancel"
      BeginProperty Font
         name            =   "MS Sans Serif"
         charset         =   1
         weight          =   400
         size            =   8.25
         underline       =   0  'False
         italic          =   0  'False
         strikethrough   =   0  'False
      EndProperty
      Height          =   375
      Left            =   2040
      TabIndex        =   4
      Top             =   1680
      Width           =   975
   End
   Begin VB.CommandButton Command2
      Caption         =   "&Write"
      BeginProperty Font
         name            =   "MS Sans Serif"
         charset         =   1
         weight          =   400
         size            =   8.25
         underline       =   0  'False
         italic          =   0  'False
         strikethrough   =   0  'False
      EndProperty
      Height          =   375
      Left            =   720
      TabIndex        =   3
      Top             =   1680
      Width           =   975
   End
   Begin VB.TextBox Text3
      BackColor       =   &H00FFFFFF&
      Height          =   285
      Left            =   1560
      MaxLength       =   6
      TabIndex        =   2
      Top             =   1080
      Width           =   1815
   End
   Begin VB.TextBox Text2
      BackColor       =   &H00FFFFFF&
      Height          =   285
      Left            =   1560
      MaxLength       =   50
      TabIndex        =   1
      Top             =   600
      Width           =   1815
   End
   Begin VB.TextBox Text1
      BackColor       =   &H00FFFFFF&
      Height          =   285
      Left            =   1560
      MaxLength       =   20
      TabIndex        =   0
      Top             =   120
      Width           =   1815
   End
   Begin VB.Label Label3
```

```
    Alignment       =   1  'Right Justify
    Caption         =   "R.P.M."
    BeginProperty Font
       name         =   "MS Sans Serif"
       charset      =   1
       weight       =   400
       size         =   8.25
       underline    =   0   'False
       italic       =   0   'False
       strikethrough =  0   'False
    EndProperty
    Height          =   255
    Left            =   480
    TabIndex        =   7
    Top             =   1200
    Width           =   975
 End
 Begin VB.Label Label4
    Alignment       =   1   'Right Justify
    Caption         =   "Tool Comment"
    BeginProperty Font
       name         =   "MS Sans Serif"
       charset      =   1
       weight       =   400
       size         =   8.25
       underline    =   0   'False
       italic       =   0   'False
       strikethrough =  0   'False
    EndProperty
    Height          =   255
    Left            =   120
    TabIndex        =   6
    Top             =   720
    Width           =   1335
 End
 Begin VB.Label Label5
    Alignment       =   1   'Right Justify
    Caption         =   "Sequence Number"
    BeginProperty Font
       name         =   "MS Sans Serif"
       charset      =   1
       weight       =   400
       size         =   8.25
       underline    =   0   'False
       italic       =   0   'False
       strikethrough =  0   'False
    EndProperty
    Height          =   255
    Left            =   120
    TabIndex        =   5
    Top             =   240
    Width           =   1335
 End
End
Attribute VB_Name = "frmnewtool"
Attribute VB_Creatable = False
Attribute VB_Exposed = False
Private Sub Command1_Click()
frmnewtool.Visible = False
frmMDI.ActiveForm.ActiveControl.SetFocus ' RETURNS THE CURSER TO THE SCREEN
End Sub Private Sub Command2_Click()

Screen.MousePointer = 11

If text1.Text = "" Then
MsgBox "Fill in all the blanks.", 48, "New Tool Start"
GoTo 100
End If
```

```
If text2.Text = "" Then
    MsgBox "Fill in all the blanks.", 48, "New Tool Start"
    GoTo 100
End If If text3.Text = "" Then
    MsgBox "Fill in all the blanks.", 48, "New Tool Start"
    GoTo 100
End If frmnewtool.Visible = False Screen.MousePointer = 11

Clipboard.Clear
Clipboard.SetText "N"
editpasteproc      ' TEXT1 = SEQUENCE NUMBER
Clipboard.SetText text1.Text
editpasteproc
Clipboard.SetText " ("
editpasteproc      ' TEXT5 = TOOL COMMENT
Clipboard.SetText UCase(text2.Text)
editpasteproc
Clipboard.SetText ")" & Chr(13) & Chr(10)
editpasteproc If Not Tool_Home_Start_1 = "" Then 'send tool to home... line 1
    Clipboard.SetText Tool_Home_Start_1
    editpasteproc
    Clipboard.SetText Chr(13) + Chr(10)
    editpasteproc
End If If Not Tool_Home_Start_2 = "" Then ' send tool to home... line 2
    Clipboard.SetText Tool_Home_Start_2
    editpasteproc
    Clipboard.SetText Chr(13) + Chr(10)
    editpasteproc
End If Clipboard.SetText Rapid & "T0000 " & ClntOn & Chr(13) & Chr(10)
editpasteproc               ' TEXT4 = R.P.M.
Clipboard.SetText "G97" & " S" & text3.Text & " " & Spinfrd & Chr(13) & Chr(10)
editpasteproc ' Reset the mouse pointer.
Screen.MousePointer = 0
GoTo 300 frmnewtool.Visible = False
100
300

Screen.MousePointer = 0 frmMDI.ActiveForm.ActiveControl.SetFocus ' RETURNS THE CURSER TO THE SCREEN

End Sub

Private Sub Form_Deactivate()
Visible = False
frmMDI.ActiveForm.ActiveControl.SetFocus ' RETURNS THE CURSER TO THE SCREEN
End Sub Private Sub Form_Load()
    If WindowState = 0 Then
        Move (Screen.Width - frmnewtool.Width) / 2, (Screen.Height - frmnewtool.Height) / 2
    End If
End Sub Private Sub Form_Paint()
    If WindowState = 0 Then
        Move (Screen.Width - frmnewtool.Width) / 2, (Screen.Height - frmnewtool.Height) / 2
```

```
        End If

End Sub

Private Sub Form_Resize()
    If WindowState = 0 Then
        Move (Screen.Width - frmnewtool.Width) / 2, (Screen.Height - frmnewtool.Height) / 2
    End If End Sub Private Sub Text1_KeyPress(KeyAscii As Integer)
    If KeyAscii = (13) Then
        SendKeys ("{TAB}"), True
    End If Const DECIMAL_OK = -1           ' 0 = no, -1 = YES
    Const MIN_VALUE = -999          ' Minimum value
    Const MAX_VALUE = 999           ' Maximum value
    key$ = Chr$(KeyAscii)           ' Convert to string
    Select Case key$
        Case "0" To "9"         ' Numbers and minus signs
            Newvalue = Val(Left$(text1.Text, text1.SelStart) + key$ + Mid$(text1.Text, text1.SelStart + text1.SelLength + 1))
            If Newvalue > MAX_VALUE Or Newvalue < MIN_VALUE Then
                KeyAscii = 0
            End If
        'Case "."
        '   If DECIMAL_OK = 0 Or InStr(Text1.Text, ".") Then
        '       keyascii = 0
        '   End If
        Case Chr$(8)            ' Backspace
        Case Else
            KeyAscii = 0
    End Select
    If key$ = "-" And (InStr(text1.Text, "-") Or text1.SelStart <> 0) Then
        KeyAscii = 0
    End If
    If key$ = "." And (InStr(text1.Text, "-") Or text1.SelStart <> 0) Then
        KeyAscii = 0
    End If End Sub Private Sub Text2_KeyPress(KeyAscii As Integer)
    If KeyAscii = (13) Then
        SendKeys ("{TAB}"), True
    End If
End Sub Private Sub Text3_KeyPress(KeyAscii As Integer)
    If KeyAscii = (13) Then
        SendKeys ("{TAB}"), True
    End If Const DECIMAL_OK = -1           ' 0 = no, -1 = YES
    Const MIN_VALUE = -999          ' Minimum value
    Const MAX_VALUE = 999999        ' Maximum value
    key$ = Chr$(KeyAscii)           ' Convert to string
    Select Case key$
        Case "0" To "9"         ' Numbers and minus signs
            Newvalue = Val(Left$(text1.Text, text1.SelStart) + key$ + Mid$(text1.Text, text1.SelStart + text1.SelLength + 1))
            If Newvalue > MAX_VALUE Or Newvalue < MIN_VALUE Then
                KeyAscii = 0
            End If
        Case "."
            If DECIMAL_OK = 0 Or InStr(text1.Text, ".") Then
                KeyAscii = 0
            End If
        Case Chr$(8)            ' Backspace
        Case Else
            KeyAscii = 0
    End Select
    If key$ = "-" And (InStr(text1.Text, "-") Or text1.SelStart <> 0) Then
        KeyAscii = 0
```

```
        End If
        If key$ = "." And (InStr(text1.Text, "-") Or text1.SelStart <> 0) Then
            KeyAscii = 0
        End If
    End Sub Private Sub Text4_KeyPress(KeyAscii As Integer)

If KeyAscii = (13) Then
            SendKeys ("{tab}"), True
        End If

End Sub

Private Sub Text5_KeyPress(KeyAscii As Integer)
        If KeyAscii = (13) Then
            SendKeys ("{TAB}"), True
        End If Const DECIMAL_OK = -1       ' 0 = no, -1 = YES
        Const MIN_VALUE = -999      ' Minimum value
        Const MAX_VALUE = 999       ' Maximum value
        key$ = Chr$(KeyAscii)       ' Convert to string
        Select Case key$
            Case "0" To "9"         ' Numbers and minus signs
                Newvalue = Val(Left$(text1.Text, text1.SelStart) + key$ + Mid$(text1.Text, text1.SelStart + text1.SelLength + 1))
                If Newvalue > MAX_VALUE Or Newvalue < MIN_VALUE Then
                    KeyAscii = 0
                End If
            Case "."
                If DECIMAL_OK = 0 Or InStr(text1.Text, ".") Then
                    KeyAscii = 0
                End If
            Case Chr$(8)            ' Backspace
            Case Else
                KeyAscii = 0
        End Select
        If key$ = "-" And (InStr(text1.Text, "-") Or text1.SelStart <> 0) Then
            KeyAscii = 0
        End If
        If key$ = "." And (InStr(text1.Text, "-") Or text1.SelStart <> 0) Then
            KeyAscii = 0
        End If
    End Sub VERSION 4.00
    Begin VB.Form frmPartstop
        BorderStyle     =   3  'Fixed Dialog
        Caption         =   "Part Stop"
        ClientHeight    =   1365
        ClientLeft      =   2880
        ClientTop       =   2835
        ClientWidth     =   3315
        BeginProperty Font
            name            =   "MS Sans Serif"
            charset         =   1
            weight          =   700
            size            =   8.25
            underline       =   0  'False
            italic          =   0  'False
            strikethrough   =   0  'False
        EndProperty
        ForeColor       =   &H80000008&
        Height          =   1890
        Icon            =   "FRMPARTS.frx":0000
        Left            =   2760
        LinkTopic       =   "Form2"
        LockControls    =   -1  'True
        ScaleHeight     =   1365
        ScaleWidth      =   3315
        Top             =   2430
        Width           =   3555
        Begin VB.TextBox Text2
            Appearance      =   0  'Flat
```

```
            Height      =  285
            Left        =  1200
            TabIndex    =  4
            TabStop     =  0  'False
            Text        =  "0.5000"
            Top         =  2040
            Visible     =  0  'False
            Width       =  1215
         End
         Begin VB.TextBox Text1
            BackColor   =  &H00FFFFFF&
            Height      =  285
            Left        =  1800
            MaxLength   =  20
            TabIndex    =  0
            Top         =  240
            Width       =  855
         End
         Begin VB.CommandButton Command1
            Caption     =  "&Cancel"
            BeginProperty Font
               name         =  "MS Sans Serif"
               charset      =  1
               weight       =  400
               size         =  8.25
               underline    =  0  'False
               italic       =  0  'False
               strikethrough =  0  'False
            EndProperty
            Height      =  375
            Left        =  1920
            TabIndex    =  2
            Top         =  840
            Width       =  975
         End
         Begin VB.CommandButton Command2
            Caption     =  "&Write"
            BeginProperty Font
               name         =  "MS Sans Serif"
               charset      =  1
               weight       =  400
               size         =  8.25
               underline    =  0  'False
               italic       =  0  'False
               strikethrough =  0  'False
            EndProperty
            Height      =  375
            Left        =  600
            TabIndex    =  1
            Top         =  840
            Width       =  975
         End
         Begin VB.Label Label1
            Alignment   =  1  'Right Justify
            Caption     =  "Sequence Number"
            BeginProperty Font
               name         =  "MS Sans Serif"
               charset      =  1
               weight       =  400
               size         =  8.25
               underline    =  0  'False
               italic       =  0  'False
               strikethrough =  0  'False
            EndProperty
            Height      =  255
            Left        =  120
            TabIndex    =  3
            Top         =  360
            Width       =  1575
         End
      End
      Attribute VB_Name = "frmPartstop"
      Attribute VB_Creatable = False
      Attribute VB_Exposed = False
```

```
Private Sub Command1_Click()
frmPartstop.Visible = False
frmMDI.ActiveForm.ActiveControl.SetFocus ' RETURNS THE CURSER TO THE SCREEN
End Sub Private Sub Command2_Click()

Screen.MousePointer = 11

If text1.Text = "" Then
MsgBox "Fill in all the blanks.", 48, "Part Stop"
GoTo 100
End If frmPartstop.Visible = False Screen.MousePointer = 11

Clipboard.Clear
Clipboard.SetText "N" & text1.Text & " (PART STOP)" & Chr(13) & Chr(10)
editpasteproc If Not Tool_Home_Start_1 = "" Then 'send tool to home... line 1
Clipboard.SetText Tool_Home_Start_1
editpasteproc
Clipboard.SetText Chr(13) + Chr(10)
editpasteproc
End If If Not Tool_Home_Start_2 = "" Then ' send tool to home... line 2
Clipboard.SetText Tool_Home_Start_2
editpasteproc
Clipboard.SetText Chr(13) + Chr(10)
editpasteproc
End If Clipboard.SetText Rapid & "T0000" & Chr(13) & Chr(10)
editpasteproc
Clipboard.SetText Rapid & "X0 Z0" & Chr(13) & Chr(10)
editpasteproc
Clipboard.SetText prgstop & Chr(13) & Chr(10)
editpasteproc
Clipboard.SetText Rapid & "Z" & Format(text2.Text, formats) & Chr(13) & Chr(10)
editpasteproc If Not Tool_Home_End_1 = "" Then 'send tool to home... line 1
Clipboard.SetText Tool_Home_End_1
editpasteproc
Clipboard.SetText Chr(13) + Chr(10)
editpasteproc
End If If Not Tool_Home_End_2 = "" Then ' send tool to home... line 2
Clipboard.SetText Tool_Home_End_2
editpasteproc
Clipboard.SetText Chr(13) + Chr(10)
editpasteproc
End If Clipboard.SetText opstp & Chr(13) & Chr(10)
editpasteproc Screen.MousePointer = 0

101
frmPartstop.Visible = False
100

Screen.MousePointer = 0
```

```
frmMDI.ActiveForm.ActiveControl.SetFocus ' RETURNS THE CURSER TO THE SCREEN

End Sub

Private Sub Form_Deactivate()
Visible = False
frmMDI.ActiveForm.ActiveControl.SetFocus ' RETURNS THE CURSER TO THE SCREEN
End Sub Private Sub Form_Load()

'top = 0
    'left = 2055
    If WindowState = 0 Then
        Move (Screen.Width - frmPartstop.Width) / 2, (Screen.Height - frmPartstop.Height) / 2
    End If End Sub Private Sub Form_Paint()

'top = 0
    'left = 2055

If WindowState = 0 Then
        Move (Screen.Width - frmPartstop.Width) / 2, (Screen.Height - frmPartstop.Height) / 2
    End If End Sub Private Sub Form_Resize()

'top = 0
    'left = 2055

If WindowState = 0 Then
        Move (Screen.Width - frmPartstop.Width) / 2, (Screen.Height - frmPartstop.Height) / 2
    End If End Sub Private Sub Text1_KeyPress(KeyAscii As Integer)

If KeyAscii = (13) Then
    SendKeys ("{TAB}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text1.Text, text1.SelStart) + key$ + Mid$(text1.Text, text1.SelStart + text1.SelLength + 1))
            If Newvalue > MAX_VALUE Or Newvalue < MIN_VALUE Then
                KeyAscii = 0
            End If
        'Case "."
        '    If DECIMAL_OK = 0 Or InStr(text1.Text, ".") Then
        '        keyascii = 0
        '    End If
        Case Chr$(8)             ' Backspace
        Case Else
            KeyAscii = 0
    End Select
    If key$ = "-" And (InStr(text1.Text, "-") Or text1.SelStart <> 0) Then
        KeyAscii = 0
    End If
    If key$ = "." And (InStr(text1.Text, ".") Or text1.SelStart <> 0) Then
        KeyAscii = 0
    End If
End Sub

VERSION 4.00
```

```
Begin VB.Form frmPstout
   BackColor       =   &H00C0C0C0&
   BorderStyle     =   3  'Fixed Dialog
   Caption         =   "Post Output"
   ClientHeight    =   6375
   ClientLeft      =   285
   ClientTop       =   675
   ClientWidth     =   8790
   Height          =   6780
   Icon            =   "FRMPSTOU.frx":0000
   Left            =   225
   LinkTopic       =   "Form1"
   MaxButton       =   0   'False
   MinButton       =   0   'False
   ScaleHeight     =   6375
   ScaleWidth      =   8790
   ShowInTaskbar   =   0   'False
   Top             =   330
   Width           =   8910
   Begin VB.CommandButton Command3
      Caption         =   "&Save"
      Height          =   375
      Left            =   7680
      TabIndex        =   3
      Top             =   4680
      Width           =   975
   End
   Begin VB.CommandButton Command4
      Caption         =   "&Open"
      Height          =   375
      Left            =   7680
      TabIndex        =   2
      Top             =   4080
      Width           =   975
   End
   Begin VB.CommandButton Command5
      Caption         =   "&New"
      Height          =   375
      Left            =   7680
      TabIndex        =   1
      Top             =   3480
      Width           =   975
   End
   Begin VB.CommandButton Command2
      Caption         =   "Close"
      Height          =   375
      Left            =   7680
      TabIndex        =   0
      Top             =   5280
      Width           =   975
   End
   Begin TabDlg.SSTab SSTab1
      Height          =   5535
      Left            =   120
      TabIndex        =   4
      Top             =   120
      Width           =   7335
      _version        =   65536
      _extentx        =   12938
      _extenty        =   9763
      _stockprops     =   15
      caption         =   "&General"
      BeginProperty font {FB8F0823-0164-101B-84ED-08002B2EC713}
         name            =   "MS Sans Serif"
         charset         =   1
         weight          =   700
         size            =   8.25
         underline       =   0   'False
         italic          =   0   'False
         strikethrough   =   0   'False
      EndProperty
      tabsperrow      =   2
      tab             =   2
      taborientation  =   0
```

```
tabs            = 12
style           = 0
tabmaxwidth     = 0
tabheight       = 529
tabcaption(0)   = "Qcam"
tab(0).controlcount= 2
tab(0).controlenabled= 0 'False
tab(0).control(0)= "Label40"
tab(0).control(1)= "Picture1"
tabcaption(1)   = "&Thread"
tab(1).controlcount= 10
tab(1).controlenabled= 0 'False
tab(1).control(0)= "Text46"
tab(1).control(1)= "Check4"
tab(1).control(2)= "Check3"
tab(1).control(3)= "Text45"
tab(1).control(4)= "Text44"
tab(1).control(5)= "Text43"
tab(1).control(6)= "Label48"
tab(1).control(7)= "Label47"
tab(1).control(8)= "Label46"
tab(1).control(9)= "Label45"
tabcaption(2)   = "&General"
tab(2).controlcount= 39
tab(2).controlenabled= -1 'True
tab(2).control(0)= "CommonDialog1"
tab(2).control(1)= "Label1"
tab(2).control(2)= "Label2"
tab(2).control(3)= "Label4"
tab(2).control(4)= "Label5"
tab(2).control(5)= "Label6"
tab(2).control(6)= "Label7"
tab(2).control(7)= "Label8"
tab(2).control(8)= "Label9"
tab(2).control(9)= "Label19"
tab(2).control(10)= "Label20"
tab(2).control(11)= "Label27"
tab(2).control(12)= "Label28"
tab(2).control(13)= "Label29"
tab(2).control(14)= "Label30"
tab(2).control(15)= "Label31"
tab(2).control(16)= "Label3"
tab(2).control(17)= "Label10"
tab(2).control(18)= "Label59"
tab(2).control(19)= "Text1"
tab(2).control(20)= "Text2"
tab(2).control(21)= "Text4"
tab(2).control(22)= "Text5"
tab(2).control(23)= "Text6"
tab(2).control(24)= "Text7"
tab(2).control(25)= "Text8"
tab(2).control(26)= "Text9"
tab(2).control(27)= "Text10"
tab(2).control(28)= "Text11"
tab(2).control(29)= "Text12"
tab(2).control(30)= "Text13"
tab(2).control(31)= "Text14"
tab(2).control(32)= "Text15"
tab(2).control(33)= "Text16"
tab(2).control(34)= "Option1"
tab(2).control(35)= "Option2"
tab(2).control(36)= "Text17"
tab(2).control(37)= "Text18"
tab(2).control(38)= "Text61"
tabcaption(3)   = "&Drill Cycles"
tab(3).controlcount= 7
tab(3).controlenabled= 0 'False
tab(3).control(0)= "Label36"
tab(3).control(1)= "Label38"
tab(3).control(2)= "Label39"
tab(3).control(3)= "Label37"
tab(3).control(4)= "Text36"
tab(3).control(5)= "Text38"
tab(3).control(6)= "Text39"
```

```
tabcaption(4)   =  "G&roove Cycles"
tab(4).controlcount=  10
tab(4).controlenabled=  0  'False
tab(4).control(0)=  "Label41"
tab(4).control(1)=  "Label42"
tab(4).control(2)=  "Label43"
tab(4).control(3)=  "Label44"
tab(4).control(4)=  "Text37"
tab(4).control(5)=  "Text40"
tab(4).control(6)=  "Text41"
tab(4).control(7)=  "Text42"
tab(4).control(8)=  "Check1"
tab(4).control(9)=  "Check2"
tabcaption(5)   =  "&O.D. Turning cycles"
tab(5).controlcount=  13
tab(5).controlenabled=  0  'False
tab(5).control(0)=  "Text58"
tab(5).control(1)=  "Text57"
tab(5).control(2)=  "Check5"
tab(5).control(3)=  "Text55"
tab(5).control(4)=  "Text50"
tab(5).control(5)=  "Text49"
tab(5).control(6)=  "Text48"
tab(5).control(7)=  "Text47"
tab(5).control(8)=  "Label56"
tab(5).control(9)=  "Label55"
tab(5).control(10)=  "Label54"
tab(5).control(11)=  "Label52"
tab(5).control(12)=  "Label49"
tabcaption(6)   =  "&I.D. Boring cycles"
tab(6).controlcount=  13
tab(6).controlenabled=  0  'False
tab(6).control(0)=  "Text60"
tab(6).control(1)=  "Text59"
tab(6).control(2)=  "Check6"
tab(6).control(3)=  "Text56"
tab(6).control(4)=  "Text54"
tab(6).control(5)=  "Text53"
tab(6).control(6)=  "Text52"
tab(6).control(7)=  "Text51"
tab(6).control(8)=  "Label58"
tab(6).control(9)=  "Label57"
tab(6).control(10)=  "Label53"
tab(6).control(11)=  "Label51"
tab(6).control(12)=  "Label50"
tabcaption(7)   =  "Tool Home With Program Stop"
tab(7).controlcount=  7
tab(7).controlenabled=  0  'False
tab(7).control(0)=  "Text35"
tab(7).control(1)=  "Text34"
tab(7).control(2)=  "Text33"
tab(7).control(3)=  "Label35"
tab(7).control(4)=  "Label34"
tab(7).control(5)=  "Label33"
tab(7).control(6)=  "Label32"
tabcaption(8)   =  "Tool Start"
tab(8).controlcount=  5
tab(8).controlenabled=  0  'False
tab(8).control(0)=  "Label11"
tab(8).control(1)=  "Label12"
tab(8).control(2)=  "Label26"
tab(8).control(3)=  "Text29"
tab(8).control(4)=  "Text30"
tabcaption(9)   =  "Tool Home"
tab(9).controlcount=  5
tab(9).controlenabled=  0  'False
tab(9).control(0)=  "Label13"
tab(9).control(1)=  "Label15"
tab(9).control(2)=  "Label25"
tab(9).control(3)=  "Text31"
tab(9).control(4)=  "Text32"
tabcaption(10)   =  "Program &End"
tab(10).controlcount=  6
tab(10).controlenabled=  0  'False
```

```
tab(10).control(0)=    "Label24"
tab(10).control(1)=    "Text28"
tab(10).control(2)=    "Text27"
tab(10).control(3)=    "Text26"
tab(10).control(4)=    "Text25"
tab(10).control(5)=    "Text24"
tabcaption(11) =   "Program &Start"
tab(11).controlcount=  12
tab(11).controlenabled=   0  'False
tab(11).control(0)=    "Label23"
tab(11).control(1)=    "Label22"
tab(11).control(2)=    "Label21"
tab(11).control(3)=    "Label18"
tab(11).control(4)=    "Label17"
tab(11).control(5)=    "Label16"
tab(11).control(6)=    "Text23"
tab(11).control(7)=    "Text22"
tab(11).control(8)=    "Text21"
tab(11).control(9)=    "Text20"
tab(11).control(10)=   "Text19"
tab(11).control(11)=   "Text3"
Begin VB.TextBox Text61
   BackColor    =   &H00FFFFFF&
   Height       =   285
   Left         =   1920
   MaxLength    =   4
   TabIndex     =   132
   Top          =   3600
   Width        =   855
End
Begin VB.TextBox Text60
   BackColor    =   &H00FFFFFF&
   Height       =   285
   Left         =   -69480
   MaxLength    =   4
   TabIndex     =   127
   Top          =   4800
   Visible      =   0  'False
   Width        =   855
End
Begin VB.TextBox Text59
   BackColor    =   &H00FFFFFF&
   Height       =   285
   Left         =   -71040
   MaxLength    =   4
   TabIndex     =   126
   Top          =   4800
   Visible      =   0  'False
   Width        =   855
End
Begin VB.CheckBox Check6
   Caption      =   "Number the first and last lines ?"
   Height       =   255
   Left         =   -74040
   TabIndex     =   125
   Top          =   4800
   Width        =   2535
End
Begin VB.TextBox Text58
   BackColor    =   &H00FFFFFF&
   Height       =   285
   Left         =   -69480
   MaxLength    =   4
   TabIndex     =   124
   Top          =   4800
   Visible      =   0  'False
   Width        =   855
End
Begin VB.TextBox Text57
   BackColor    =   &H00FFFFFF&
   Height       =   285
   Left         =   -71040
   MaxLength    =   4
   TabIndex     =   123
```

```
          Top         = 4800
          Visible     = 0 'False
          Width       = 855
       End
 5     Begin VB.CheckBox Check5
          Caption     = "Number the first and last lines ?"
          Height      = 255
          Left        = -74040
          TabIndex    = 122
10        Top         = 4800
          Width       = 2535
       End
       Begin VB.TextBox Text56
          BackColor   = &H00FFFFFF&
15        Height      = 285
          Left        = -74040
          TabIndex    = 116
          Top         = 4320
          Width       = 3855
20     End
       Begin VB.TextBox Text55
          BackColor   = &H00FFFFFF&
          Height      = 285
          Left        = -74040
25        TabIndex    = 115
          Top         = 4320
          Width       = 3855
       End
       Begin VB.TextBox Text54
30        BackColor   = &H00FFFFFF&
          Height      = 285
          Left        = -74040
          TabIndex    = 113
          Top         = 3600
35        Width       = 3855
       End
       Begin VB.TextBox Text53
          BackColor   = &H00FFFFFF&
          Height      = 285
40        Left        = -74040
          TabIndex    = 112
          Top         = 3240
          Width       = 3855
       End
45     Begin VB.TextBox Text52
          BackColor   = &H00FFFFFF&
          Height      = 285
          Left        = -74040
          TabIndex    = 111
50        Top         = 2520
          Width       = 3855
       End
       Begin VB.TextBox Text51
          BackColor   = &H00FFFFFF&
55        Height      = 285
          Left        = -74040
          TabIndex    = 110
          Top         = 2160
          Width       = 3855
60     End
       Begin VB.TextBox Text50
          BackColor   = &H00FFFFFF&
          Height      = 285
          Left        = -74040
65        TabIndex    = 109
          Top         = 3600
          Width       = 3855
       End
       Begin VB.TextBox Text49
70        BackColor   = &H00FFFFFF&
          Height      = 285
          Left        = -74040
          TabIndex    = 108
          Top         = 3240
```

```
        Width          = 3855
    End
    Begin VB.TextBox Text48
        BackColor      = &H00FFFFFF&
        Height         = 285
        Left           = -74040
        TabIndex       = 107
        Top            = 2520
        Width          = 3855
    End
    Begin VB.TextBox Text47
        BackColor      = &H00FFFFFF&
        Height         = 285
        Left           = -74040
        TabIndex       = 106
        Top            = 2160
        Width          = 3855
    End
    Begin VB.TextBox Text46
        BackColor      = &H00FFFFFF&
        Height         = 285
        Left           = -72600
        MaxLength      = 4
        TabIndex       = 105
        Top            = 3960
        Width          = 855
    End
    Begin VB.CheckBox Check4
        Caption        = "Height value Rad."
        Height         = 255
        Left           = -70080
        TabIndex       = 101
        Top            = 3000
        Width          = 1575
    End
    Begin VB.CheckBox Check3
        Caption        = "Height value Dia."
        Height         = 255
        Left           = -71640
        TabIndex       = 100
        Top            = 3000
        Width          = 1575
    End
    Begin VB.TextBox Text45
        BackColor      = &H00FFFFFF&
        Height         = 285
        Left           = -72600
        MaxLength      = 4
        TabIndex       = 99
        Top            = 3480
        Width          = 855
    End
    Begin VB.TextBox Text44
        BackColor      = &H00FFFFFF&
        Height         = 285
        Left           = -72600
        MaxLength      = 4
        TabIndex       = 98
        Top            = 3000
        Width          = 855
    End
    Begin VB.TextBox Text43
        BackColor      = &H00FFFFFF&
        Height         = 285
        Left           = -72600
        MaxLength      = 4
        TabIndex       = 97
        Top            = 2520
        Width          = 855
    End
    Begin VB.CheckBox Check2
        Caption        = "Height value Rad."
        Height         = 255
        Left           = -70080
```

```
        TabIndex    =  95
        Top         =  2760
        Width       =  1575
     End
     Begin VB.CheckBox Check1
        Caption     =  "Height value Dia."
        Height      =  255
        Left        =  -71760
        TabIndex    =  94
        Top         =  2760
        Width       =  1575
     End
     Begin VB.TextBox Text42
        BackColor   =  &H00FFFFFF&
        Height      =  285
        Left        =  -72720
        MaxLength   =  4
        TabIndex    =  89
        Top         =  3720
        Width       =  855
     End
     Begin VB.TextBox Text41
        BackColor   =  &H00FFFFFF&
        Height      =  285
        Left        =  -72720
        MaxLength   =  4
        TabIndex    =  88
        Top         =  3240
        Width       =  855
     End
     Begin VB.TextBox Text40
        BackColor   =  &H00FFFFFF&
        Height      =  285
        Left        =  -72720
        MaxLength   =  4
        TabIndex    =  87
        Top         =  2760
        Width       =  855
     End
     Begin VB.TextBox Text37
        BackColor   =  &H00FFFFFF&
        Height      =  285
        Left        =  -72720
        MaxLength   =  4
        TabIndex    =  86
        Top         =  2280
        Width       =  855
     End
     Begin VB.TextBox Text39
        BackColor   =  &H00FFFFFF&
        Height      =  285
        Left        =  -71280
        MaxLength   =  4
        TabIndex    =  80
        Top         =  3000
        Width       =  855
     End
     Begin VB.TextBox Text38
        BackColor   =  &H00FFFFFF&
        Height      =  285
        Left        =  -71280
        MaxLength   =  4
        TabIndex    =  79
        Top         =  3480
        Width       =  855
     End
     Begin VB.TextBox Text36
        BackColor   =  &H00FFFFFF&
        Height      =  285
        Left        =  -71280
        MaxLength   =  4
        TabIndex    =  78
        Top         =  2640
        Width       =  855
```

```
        End
        Begin VB.TextBox Text35
            BackColor   =   &H00FFFFFF&
            Height      =   285
            Left        =   -72240
            TabIndex    =   73
            Top         =   3840
            Width       =   3375
        End
        Begin VB.TextBox Text34
            BackColor   =   &H00FFFFFF&
            Height      =   285
            Left        =   -72240
            TabIndex    =   72
            Top         =   3360
            Width       =   3375
        End
        Begin VB.TextBox Text33
            BackColor   =   &H00FFFFFF&
            Height      =   285
            Left        =   -72240
            TabIndex    =   71
            Top         =   2880
            Width       =   3375
        End
        Begin VB.TextBox Text32
            BackColor   =   &H00FFFFFF&
            Height      =   285
            Left        =   -72240
            TabIndex    =   68
            Top         =   3120
            Width       =   3375
        End
        Begin VB.TextBox Text31
            BackColor   =   &H00FFFFFF&
            Height      =   285
            Left        =   -72240
            TabIndex    =   67
            Top         =   2640
            Width       =   3375
        End
        Begin VB.TextBox Text30
            BackColor   =   &H00FFFFFF&
            Height      =   285
            Left        =   -72480
            TabIndex    =   62
            Top         =   3240
            Width       =   3375
        End
        Begin VB.TextBox Text29
            BackColor   =   &H00FFFFFF&
            Height      =   285
            Left        =   -72480
            TabIndex    =   61
            Top         =   2760
            Width       =   3375
        End
        Begin VB.PictureBox Picture1
            Height      =   2415
            Left        =   -74160
            Picture     =   "FRMPSTOU.frx":030A
            ScaleHeight =   2355
            ScaleWidth  =   4755
            TabIndex    =   60
            Top         =   2400
            Width       =   4815
        End
        Begin VB.TextBox Text18
            BackColor   =   &H00FFFFFF&
            Height      =   285
            Left        =   4920
            MaxLength   =   1
            TabIndex    =   34
            Top         =   3900
```

```
        Width       = 855
    End
    Begin VB.TextBox Text17
        BackColor   =   &H00FFFFFF&
        Height      =   285
        Left        =   4920
        MaxLength   =   1
        TabIndex    =   33
        Top         =   4620
        Width       =   855
    End
    Begin VB.OptionButton Option2
        Caption     =   "X Negitive"
        Height      =   255
        Left        =   5160
        TabIndex    =   32
        TabStop     =   0   'False
        Top         =   5100
        Width       =   1215
    End
    Begin VB.OptionButton Option1
        Caption     =   "X Positive"
        Height      =   255
        Left        =   3600
        TabIndex    =   31
        TabStop     =   0   'False
        Top         =   5100
        Width       =   1215
    End
    Begin VB.TextBox Text16
        BackColor   =   &H00FFFFFF&
        Height      =   285
        Left        =   4920
        MaxLength   =   1
        TabIndex    =   30
        Top         =   4260
        Width       =   855
    End
    Begin VB.TextBox Text15
        BackColor   =   &H00FFFFFF&
        Height      =   285
        Left        =   1920
        MaxLength   =   4
        TabIndex    =   29
        Top         =   3960
        Width       =   855
    End
    Begin VB.TextBox Text14
        BackColor   =   &H00FFFFFF&
        Height      =   285
        Left        =   1920
        MaxLength   =   4
        TabIndex    =   28
        Top         =   4320
        Width       =   855
    End
    Begin VB.TextBox Text13
        BackColor   =   &H00FFFFFF&
        Height      =   285
        Left        =   1920
        MaxLength   =   4
        TabIndex    =   27
        Top         =   4680
        Width       =   855
    End
    Begin VB.TextBox Text12
        BackColor   =   &H00FFFFFF&
        Height      =   285
        Left        =   4920
        MaxLength   =   1
        TabIndex    =   26
        Top         =   3540
        Width       =   855
    End
```

```
Begin VB.TextBox Text11
   BackColor    =   &H00FFFFFF&
   Height       =   285
   Left         =   4920
   MaxLength    =   4
   TabIndex     =   25
   Top          =   2100
   Width        =   855
End
Begin VB.TextBox Text10
   BackColor    =   &H00FFFFFF&
   Height       =   285
   Left         =   1920
   MaxLength    =   4
   TabIndex     =   24
   Top          =   5040
   Width        =   855
End
Begin VB.TextBox Text9
   BackColor    =   &H00FFFFFF&
   Height       =   285
   Left         =   4920
   MaxLength    =   6
   TabIndex     =   23
   Top          =   3180
   Width        =   855
End
Begin VB.TextBox Text8
   BackColor    =   &H00FFFFFF&
   Height       =   285
   Left         =   4920
   MaxLength    =   4
   TabIndex     =   22
   Top          =   2820
   Width        =   855
End
Begin VB.TextBox Text7
   BackColor    =   &H00FFFFFF&
   Height       =   285
   Left         =   4920
   MaxLength    =   4
   TabIndex     =   21
   Top          =   2460
   Width        =   855
End
Begin VB.TextBox Text6
   BackColor    =   &H00FFFFFF&
   Height       =   285
   Left         =   1920
   MaxLength    =   4
   TabIndex     =   20
   Top          =   3240
   Width        =   855
End
Begin VB.TextBox Text5
   BackColor    =   &H00FFFFFF&
   Height       =   285
   Left         =   1920
   MaxLength    =   4
   TabIndex     =   19
   Top          =   2880
   Width        =   855
End
Begin VB.TextBox Text4
   BackColor    =   &H00FFFFFF&
   Height       =   285
   Left         =   1920
   MaxLength    =   4
   TabIndex     =   18
   Top          =   2520
   Width        =   855
End
Begin VB.TextBox Text2
   BackColor    =   &H00FFFFFF&
```

```
         Height       =   285
         Left         =   1920
         MaxLength    =   4
         TabIndex     =   17
         Top          =   2160
         Width        =   855
      End
      Begin VB.TextBox Text1
         BackColor    =   &H00FFFFFF&
         Height       =   285
         Left         =   1920
         MaxLength    =   4
         TabIndex     =   16
         Top          =   1800
         Width        =   855
      End
      Begin VB.TextBox Text3
         BackColor    =   &H00FFFFFF&
         Height       =   285
         Left         =   -72840
         TabIndex     =   15
         Top          =   2160
         Width        =   3375
      End
      Begin VB.TextBox Text19
         BackColor    =   &H00FFFFFF&
         Height       =   285
         Left         =   -72840
         TabIndex     =   14
         Top          =   2640
         Width        =   3375
      End
      Begin VB.TextBox Text20
         BackColor    =   &H00FFFFFF&
         Height       =   285
         Left         =   -72840
         TabIndex     =   13
         Top          =   3120
         Width        =   3375
      End
      Begin VB.TextBox Text21
         BackColor    =   &H00FFFFFF&
         Height       =   285
         Left         =   -72840
         TabIndex     =   12
         Top          =   3600
         Width        =   3375
      End
      Begin VB.TextBox Text22
         BackColor    =   &H00FFFFFF&
         Height       =   285
         Left         =   -72840
         TabIndex     =   11
         Top          =   4080
         Width        =   3375
      End
      Begin VB.TextBox Text23
         BackColor    =   &H00FFFFFF&
         Height       =   285
         Left         =   -72840
         TabIndex     =   10
         Top          =   4560
         Width        =   3375
      End
      Begin VB.TextBox Text24
         BackColor    =   &H00FFFFFF&
         Height       =   285
         Left         =   -72600
         TabIndex     =   9
         Top          =   2640
         Width        =   3015
      End
      Begin VB.TextBox Text25
         BackColor    =   &H00FFFFFF&
```

```
            Height          =   285
            Left            =   -72600
            TabIndex        =   8
            Top             =   3120
            Width           =   3015
         End
         Begin VB.TextBox Text26
            BackColor       =   &H00FFFFFF&
            Height          =   285
            Left            =   -72600
            TabIndex        =   7
            Top             =   3600
            Width           =   3015
         End
         Begin VB.TextBox Text27
            BackColor       =   &H00FFFFFF&
            Height          =   285
            Left            =   -72600
            TabIndex        =   6
            Top             =   4080
            Width           =   3015
         End
         Begin VB.TextBox Text28
            BackColor       =   &H00FFFFFF&
            Height          =   285
            Left            =   -72600
            TabIndex        =   5
            Top             =   4560
            Width           =   3015
         End
         Begin VB.Label Label59
            Alignment       =   1  'Right Justify
            Caption         =   "Letter code for dwell"
            Height          =   255
            Left            =   240
            TabIndex        =   133
            Top             =   3720
            Width           =   1575
         End
         Begin VB.Label Label58
            Alignment       =   1  'Right Justify
            Caption         =   "Last"
            Height          =   255
            Left            =   -70080
            TabIndex        =   131
            Top             =   4920
            Visible         =   0  'False
            Width           =   495
         End
         Begin VB.Label Label57
            Alignment       =   1  'Right Justify
            Caption         =   "First"
            Height          =   255
            Left            =   -71640
            TabIndex        =   130
            Top             =   4920
            Visible         =   0  'False
            Width           =   495
         End
         Begin VB.Label Label56
            Alignment       =   1  'Right Justify
            Caption         =   "Last"
            Height          =   255
            Left            =   -70080
            TabIndex        =   129
            Top             =   4920
            Visible         =   0  'False
            Width           =   495
         End
         Begin VB.Label Label55
            Alignment       =   1  'Right Justify
            Caption         =   "First"
            Height          =   255
            Left            =   -71640
```

```
         TabIndex        =  128
         Top             =  4920
         Visible         =  0  'False
         Width           =  495
      End
      Begin VB.Label Label54
         Caption         =  "Enter the ending lines of your canned boring cycle below."
         Height          =  255
         Left            =  -74160
         TabIndex        =  121
         Top             =  3000
         Width           =  4095
      End
      Begin VB.Label Label53
         Caption         =  "Enter the ending lines of your canned boring cycle below."
         Height          =  255
         Left            =  -74160
         TabIndex        =  120
         Top             =  3000
         Width           =  4095
      End
      Begin VB.Label Label52
         Caption         =  "Enter the text for your finishing cycle below."
         Height          =  255
         Left            =  -74040
         TabIndex        =  119
         Top             =  4080
         Width           =  3855
      End
      Begin VB.Label Label51
         Caption         =  "Enter the text for your finishing cycle below."
         Height          =  255
         Left            =  -74040
         TabIndex        =  118
         Top             =  4080
         Width           =  3855
      End
      Begin VB.Label Label50
         Caption         =  "Enter the start up lines of your canned boring cycle below."
         Height          =  255
         Left            =  -74160
         TabIndex        =  117
         Top             =  1920
         Width           =  4095
      End
      Begin VB.Label Label49
         Caption         =  "Enter the start up lines of your canned turning cycle below."
         Height          =  255
         Left            =  -74160
         TabIndex        =  114
         Top             =  1920
         Width           =  4215
      End
      Begin VB.Label Label48
         Alignment       =  1  'Right Justify
         Caption         =  "Letter code for feed rate"
         Height          =  255
         Left            =  -74760
         TabIndex        =  104
         Top             =  4080
         Width           =  2055
      End
      Begin VB.Label Label47
         Alignment       =  1  'Right Justify
         Caption         =  "Letter code for depth of cut"
         Height          =  255
         Left            =  -74760
         TabIndex        =  103
         Top             =  3600
         Width           =  2055
      End
      Begin VB.Label Label46
         Alignment       =  1  'Right Justify
         Caption         =  "Letter code for thread height"
```

```
         Height         =   255
         Left           =   -74880
         TabIndex       =   102
         Top            =   3120
         Width          =   2175
      End
      Begin VB.Label Label45
         Alignment      =   1  'Right Justify
         Caption        =   "G code for threading cycle"
         Height         =   255
         Left           =   -74760
         TabIndex       =   96
         Top            =   2640
         Width          =   2055
      End
      Begin VB.Label Label44
         Alignment      =   1  'Right Justify
         Caption        =   "Letter code for pecking in X"
         Height         =   255
         Left           =   -74880
         TabIndex       =   93
         Top            =   3840
         Width          =   2055
      End
      Begin VB.Label Label43
         Alignment      =   1  'Right Justify
         Caption        =   "Letter code for Z stepover"
         Height         =   255
         Left           =   -74760
         TabIndex       =   92
         Top            =   3360
         Width          =   1935
      End
      Begin VB.Label Label42
         Alignment      =   1  'Right Justify
         Caption        =   "Letter code for height in X"
         Height         =   255
         Left           =   -74760
         TabIndex       =   91
         Top            =   2880
         Width          =   1935
      End
      Begin VB.Label Label41
         Alignment      =   1  'Right Justify
         Caption        =   "G code for groove cycle"
         Height         =   255
         Left           =   -74880
         TabIndex       =   90
         Top            =   2400
         Width          =   2055
      End
      Begin VB.Label Label40
         Caption        =   "Opening or Saving a post file saves it as the default."
         BeginProperty Font
            name        =   "MS Sans Serif"
            charset     =   1
            weight      =   700
            size        =   9.75
            underline   =   0  'False
            italic      =   0  'False
            strikethrough = 0  'False
         EndProperty
         Height         =   375
         Left           =   -74400
         TabIndex       =   85
         Top            =   5040
         Width          =   5775
      End
      Begin VB.Label Label37
         Caption        =   $"FRMPSTOU.frx":CF44
         Height         =   735
         Left           =   -72840
         TabIndex       =   84
         Top            =   4080
```

```
        Width           =   2695
      End
      Begin VB.Label Label39
         Alignment       =   1  'Right Justify
         Caption         =   "First Peck Letter Code"
         Height          =   255
         Left            =   -73080
         TabIndex        =   83
         Top             =   3120
         Width           =   1695
      End
      Begin VB.Label Label38
         Alignment       =   1  'Right Justify
         Caption         =   "Second Peck Letter Code"
         Height          =   255
         Left            =   -73440
         TabIndex        =   82
         Top             =   3600
         Width           =   2055
      End
      Begin VB.Label Label36
         Alignment       =   1  'Right Justify
         Caption         =   "G code"
         Height          =   255
         Left            =   -73080
         TabIndex        =   81
         Top             =   2760
         Width           =   1695
      End
      Begin VB.Label Label35
         Alignment       =   1  'Right Justify
         Caption         =   "Second Line"
         Height          =   255
         Left            =   -73320
         TabIndex        =   77
         Top             =   3480
         Width           =   975
      End
      Begin VB.Label Label34
         Alignment       =   1  'Right Justify
         Caption         =   "Third Line"
         Height          =   255
         Left            =   -73320
         TabIndex        =   76
         Top             =   3960
         Width           =   975
      End
      Begin VB.Label Label33
         Alignment       =   1  'Right Justify
         Caption         =   "First Line"
         Height          =   255
         Left            =   -73320
         TabIndex        =   75
         Top             =   3000
         Width           =   975
      End
      Begin VB.Label Label32
         Caption         =   $"FRMPSTOU.frx":CFAD
         Height          =   375
         Left            =   -73440
         TabIndex        =   74
         Top             =   2160
         Width           =   3255
      End
      Begin VB.Label Label26
         Caption         =   $"FRMPSTOU.frx":CFF3
         Height          =   375
         Left            =   -73680
         TabIndex        =   70
         Top             =   2160
         Width           =   3255
      End
      Begin VB.Label Label25
         Caption         =   "Enter the imformation to send the tool home."
```

```
         Height          =  375
         Left            =  -73680
         TabIndex        =  69
         Top             =  2160
         Width           =  3255
      End
      Begin VB.Label Label15
         Alignment       =  1  'Right Justify
         Caption         =  "First Line"
         Height          =  255
         Left            =  -73320
         TabIndex        =  66
         Top             =  2760
         Width           =  975
      End
      Begin VB.Label Label13
         Alignment       =  1  'Right Justify
         Caption         =  "Second Line"
         Height          =  255
         Left            =  -73320
         TabIndex        =  65
         Top             =  3240
         Width           =  975
      End
      Begin VB.Label Label12
         Alignment       =  1  'Right Justify
         Caption         =  "Second Line"
         Height          =  255
         Left            =  -73560
         TabIndex        =  64
         Top             =  3360
         Width           =  975
      End
      Begin VB.Label Label11
         Alignment       =  1  'Right Justify
         Caption         =  "First Line"
         Height          =  255
         Left            =  -73560
         TabIndex        =  63
         Top             =  2880
         Width           =  975
      End
      Begin VB.Label Label24
         Caption         =  "Enter the last few lines of your program here."
         Height          =  495
         Left            =  -72240
         TabIndex        =  58
         Top             =  2040
         Width           =  1695
      End
      Begin VB.Label Label10
         Alignment       =  1  'Right Justify
         Caption         =  "Radius Character Z"
         Height          =  255
         Left            =  3120
         TabIndex        =  57
         Top             =  4020
         Width           =  1695
      End
      Begin VB.Label Label3
         Alignment       =  1  'Right Justify
         Caption         =  "Chamfer Character Z"
         Height          =  255
         Left            =  3000
         TabIndex        =  56
         Top             =  4740
         Width           =  1815
      End
      Begin VB.Label Label31
         Alignment       =  1  'Right Justify
         Caption         =  "Chamfer Character X"
         Height          =  255
         Left            =  3240
         TabIndex        =  55
```

```
              Top             =   4380
              Width           =   1575
           End
           Begin VB.Label Label30
              Alignment       =   1  'Right Justify
              Caption         =   "Spindle Forward"
              Height          =   255
              Left            =   360
              TabIndex        =   54
              Top             =   4080
              Width           =   1455
           End
           Begin VB.Label Label29
              Alignment       =   1  'Right Justify
              Caption         =   "Spindle Backward"
              Height          =   255
              Left            =   240
              TabIndex        =   53
              Top             =   4440
              Width           =   1575
           End
           Begin VB.Label Label28
              Alignment       =   1  'Right Justify
              Caption         =   "Spindle Stop"
              Height          =   255
              Left            =   720
              TabIndex        =   52
              Top             =   4800
              Width           =   1095
           End
           Begin VB.Label Label27
              Alignment       =   1  'Right Justify
              Caption         =   "Radius Character X"
              Height          =   255
              Left            =   3000
              TabIndex        =   51
              Top             =   3660
              Width           =   1815
           End
           Begin VB.Label Label20
              Alignment       =   1  'Right Justify
              Caption         =   "Coolant Off"
              Height          =   255
              Left            =   3720
              TabIndex        =   50
              Top             =   2220
              Width           =   1095
           End
           Begin VB.Label Label19
              Alignment       =   1  'Right Justify
              Caption         =   "Coolant On"
              Height          =   255
              Left            =   720
              TabIndex        =   49
              Top             =   5160
              Width           =   1095
           End
           Begin VB.Label Label9
              Alignment       =   1  'Right Justify
              Caption         =   "Format Style"
              Height          =   255
              Left            =   3360
              TabIndex        =   48
              Top             =   3300
              Width           =   1455
           End
           Begin VB.Label Label8
              Alignment       =   1  'Right Justify
              Caption         =   "Programed Stop"
              Height          =   255
              Left            =   3360
              TabIndex        =   47
              Top             =   2940
              Width           =   1455
```

```
      End
      Begin VB.Label Label7
         Alignment       =   1  'Right Justify
         Caption         =   "Optional Stop"
         Height          =   255
         Left            =   3600
         TabIndex        =   46
         Top             =   2580
         Width           =   1215
      End
      Begin VB.Label Label6
         Alignment       =   1  'Right Justify
         Caption         =   "Dwell"
         Height          =   255
         Left            =   1200
         TabIndex        =   45
         Top             =   3360
         Width           =   615
      End
      Begin VB.Label Label5
         Alignment       =   1  'Right Justify
         Caption         =   "G code for radius"
         Height          =   255
         Left            =   240
         TabIndex        =   44
         Top             =   3000
         Width           =   1575
      End
      Begin VB.Label Label4
         Alignment       =   1  'Right Justify
         Caption         =   "G code for chamfer"
         Height          =   255
         Left            =   120
         TabIndex        =   43
         Top             =   2640
         Width           =   1695
      End
      Begin VB.Label Label2
         Alignment       =   1  'Right Justify
         Caption         =   "Rapid"
         Height          =   255
         Left            =   1080
         TabIndex        =   42
         Top             =   2280
         Width           =   735
      End
      Begin VB.Label Label1
         Alignment       =   1  'Right Justify
         Caption         =   "Feed"
         Height          =   255
         Left            =   1200
         TabIndex        =   41
         Top             =   1920
         Width           =   615
      End
      Begin MSComDlg.CommonDialog CommonDialog1
         Left            =   240
         Top             =   4860
         _version        =   65536
         _extentx        =   847
         _extenty        =   847
         _stockprops     =   0
      End
      Begin VB.Label Label16
         Alignment       =   1  'Right Justify
         Caption         =   "First Line"
         Height          =   255
         Left            =   -73920
         TabIndex        =   40
         Top             =   2280
         Width           =   975
      End
      Begin VB.Label Label17
         Alignment       =   1  'Right Justify
```

```
            Caption        =  "Second Line"
            Height         =  255
            Left           =  -73920
            TabIndex       =  39
            Top            =  2760
            Width          =  975
         End
         Begin VB.Label Label18
            Alignment      =  1  'Right Justify
            Caption        =  "Third Line"
            Height         =  255
            Left           =  -73920
            TabIndex       =  38
            Top            =  3240
            Width          =  975
         End
         Begin VB.Label Label21
            Alignment      =  1  'Right Justify
            Caption        =  "Fourth Line"
            Height         =  255
            Left           =  -74160
            TabIndex       =  37
            Top            =  3720
            Width          =  1215
         End
         Begin VB.Label Label22
            Alignment      =  1  'Right Justify
            Caption        =  "Fifth Line"
            Height         =  255
            Left           =  -73800
            TabIndex       =  36
            Top            =  4200
            Width          =  855
         End
         Begin VB.Label Label23
            Alignment      =  1  'Right Justify
            Caption        =  "Programers Name"
            Height         =  255
            Left           =  -74400
            TabIndex       =  35
            Top            =  4680
            Width          =  1455
         End
      End
      Begin VB.Label Label14
         Alignment      =  2  'Center
         BackColor      =  &H00C0C0C0&
         BeginProperty Font
            name           =  "MS Sans Serif"
            charset        =  1
            weight         =  700
            size           =  12
            underline      =  0  'False
            italic         =  0  'False
            strikethrough  =  0  'False
         EndProperty
         ForeColor      =  &H0C0000FF&
         Height         =  375
         Left           =  240
         TabIndex       =  59
         Top            =  5880
         Width          =  6855
      End
      Begin MSComDlg.CommonDialog CommonDialog2
         Left           =  8040
         Top            =  240
         _version       =  65536
         _extentx       =  847
         _extenty       =  847
         _stockprops    =  0
      End
End
Attribute VB_Name = "frmPstout"
Attribute VB_Creatable = False
```

```
Attribute VB_Exposed = False

Private Sub check1_Click()
If check1 = 1 Then
Check2 = 0
End If
End Sub

Private Sub Check2_Click()
If Check2 = 1 Then
check1 = 0
End If
End Sub

Private Sub Check3_Click()
If Check3 = 1 Then
Check4 = 0
End If
End Sub

Private Sub Check4_Click()
If Check4 = 1 Then
Check3 = 0
End If
End Sub

Private Sub Check5_Click()

If Check5 = 1 Then
Label55.Visible = True
Label56.Visible = True
Text57.Visible = True
Text58.Visible = True
End If If Check5 = 0 Then
Label55.Visible = False
Label56.Visible = False
Text57.Visible = False
Text58.Visible = False
End If End Sub Private Sub Check6_Click()

If Check6 = 1 Then
Label57.Visible = True
Label58.Visible = True
Text59.Visible = True
Text60.Visible = True
End If if Check6 = 0 Then
Label57.Visible = False
Label58.Visible = False
Text59.Visible = False
Text60.Visible = False
End If End Sub Private Sub Command2_Click()
frmPstout.Visible = False
frmMDI.ActiveForm.ActiveControl.SetFocus ' RETURNS THE CURSER TO THE SCREEN
End Sub Private Sub Command3_Click()

' User pressed the save button
```

```
        ' Display a common dialog window...
        Dim RetVal
        On Error Resume Next
        CommonDialog2.Filter = "post (*.pst)|*.pst|All Files (*.*)|*"  ' Filters
        CommonDialog2.FilterIndex = 1   ' Sets *.pst as first choice
        CommonDialog2.Action = 2   ' Shows the "Save As" style box
        frmPstout.Label14 = CommonDialog2.Filename
        frmMDI.label1 = CommonDialog2.Filename ' Check to see if the file exists...

Dim x As Integer   ' Set "X" as a number to be used as a file number..

x = FreeFile

On Error Resume Next
        Open CommonDialog2.Filename For Input As x
        If Err = 0 Then    ' If I dont get an error, then the file must exist.
            Filename = True
        Else: Filename = Not True
        Close x   ' Closes file number "x"
        End If If Filename = True Then   ' Must be a existing filename !
        Close x
        'MsgBox "FILENAME TRUE"
        GoTo 400   ' Ask the user if they want to overwrite the file.
        End If If Filename = Not True Then ' It must be a new file, save it !
        Close x
        'MsgBox "FILE NAME FALSE"
        GoTo 500   ' Go ahead and save the file...
            Close x 400   ' Set up a message box, ask the user Yes or No, and get a response...

Const MB_OK = 0, MB_OKCANCEL = 1   ' Define buttons.
            Const MB_YESNOCANCEL = 3, MB_YESNO = 4
            Const MB_ICONSTOP = 16, MB_ICONQUESTION = 32   ' Define Icons.
            Const MB_ICONEXCLAMATION = 48, MB_ICONINFORMATION = 64
            Const MB_DEFBUTTON2 = 256, IDYES = 6, IDNO = 7   ' Define other.
            Dim DgDef, Msg, Response, Title ' Declare variables.
            Title = "File already exists !"
            ' Put together a sample message box with all the proper components.
            Msg = "File already exists" & Chr(13) + Chr(10)
            Msg = Msg & " Do you want to overwrite the file"
            DgDef = MB_YESNO + MB_ICONSTOP + MB_DEFBUTTON2 ' Describe dialog.

Response = MsgBox(Msg, DgDef, Title)   ' Get user response.
            If Response = IDNO Then    ' Evaluate response
                ' The user pressed the "No" button - do not overwrite the file
                GoTo 1001  ' and take appropriate
            Else   ' action.
                ' The user pressed the "Yes" button - overwrite the file...

End If

500
        'MsgBox "500 !!!"
            'Dim PostName As String
            PostName = Label14.Caption
            PostName = CommonDialog2.Filename   ' Sets "postname" as file name Open CommonDialog2.Filename For Output As #1   ' Open file for input.

Print #1, frmPstout.text3.Text ' = PRG_STRT_1
        Print #1, frmPstout.Text19.Text ' = PRG_STRT_2
        Print #1, frmPstout.Text20.Text ' = PRG_STRT_3
        Print #1, frmPstout.Text21.Text ' = PRG_STRT_4
```

```
Print #1, frmPstout.Text22.Text ' = PRG_STRT_5
Print #1, frmPstout.Text23.Text ' = PRG_STRT_6

Print #1, frmPstout.text1.Text ' = Feed
Print #1, frmPstout.text2.Text ' = Rapid
Print #1, frmPstout.text4.Text ' = G_Code_Chamfer
Print #1, frmPstout.text5.Text ' = G_Code_Radius
Print #1, frmPstout.text6.Text ' = dwell
Print #1, frmPstout.text15.Text ' = Spinfrd
Print #1, frmPstout.text14.Text '= Spinbckwrd
Print #1, frmPstout.text13.Text '= Spinstop
Print #1, frmPstout.text10.Text '= ClntOn
Print #1, frmPstout.text11.Text '= ClntOff
Print #1, frmPstout.text7.Text ' = opstp
Print #1, frmPstout.text8.Text ' = prgstop
Print #1, frmPstout.text9.Text ' = formats
Print #1, frmPstout.text12.Text ' = Rad_X
Print #1, frmPstout.Text18.Text ' = Rad_Z
Print #1, frmPstout.text16.Text ' = Chamfer_X
Print #1, frmPstout.Text17.Text ' = Chamfer_Z If Option1 = True Then
Print #1, "X"
End If If option2 = True Then
Print #1, "X-"
End If Print #1, frmPstout.Text24.Text ' = PRG_END_1
Print #1, frmPstout.Text25.Text ' = PRG_END_2
Print #1, frmPstout.Text26.Text ' = PRG_END_3
Print #1, frmPstout.Text27.Text ' = PRG_END_4
Print #1, frmPstout.Text28.Text ' = PRG_END_5

Print #1, frmPstout.Text29.Text '= Tool_Home_Start_1
Print #1, frmPstout.Text30.Text '= Tool_Home_Start_2

Print #1, frmPstout.Text31.Text '= Tool_Home_End_1
Print #1, frmPstout.Text32.Text '= Tool_Home_End_2

Print #1, frmPstout.Text24.Text '= Prg_End_1
Print #1, frmPstout.Text25.Text '= Prg_End_2
Print #1, frmPstout.Text26.Text '= Prg_End_3
Print #1, frmPstout.Text27.Text '= Prg_End_4
Print #1, frmPstout.Text28.Text '= Prg_End_5

Print #1, frmPstout.Text33.Text '= opt_stop_1
Print #1, frmPstout.Text34.Text '= opt_stop_2
Print #1, frmPstout.Text35.Text '= opt_stop_3

Print #1, frmPstout.Text36.Text '= Drill_G_Code
Print #1, frmPstout.Text39.Text '= Drill_Peck_1
Print #1, frmPstout.Text38.Text '= Drill_Peck_2

Close #1

' RE-READ THE VALUES

Open CommonDialog2.Filename For Input As #1    ' Open file for input.

Dim linesfromfile As String

Do While Not EOF(1)
    Line Input #1, PRG_STRT_1
    Line Input #1, PRG_STRT_2
    Line Input #1, PRG_STRT_3
    Line Input #1, PRG_STRT_4
    Line Input #1, PRG_STRT_5
    Line Input #1, PRG_STRT_6
```

```
        Line Input #1, Feed
        Line Input #1, Rapid
        Line Input #1, G_Code_Chamfer
        Line Input #1, G_Code_Radius
        Line Input #1, dwell
        Line Input #1, Spinfrd
        Line Input #1, Spinbckwrd
        Line Input #1, Spinstop
        Line Input #1, ClntOn
        Line Input #1, ClntOff
        Line Input #1, opstp
        Line Input #1, prgstop
        Line Input #1, formats
        Line Input #1, Rad_X
        Line Input #1, Rad_Z
        Line Input #1, Chamfer_X
        Line Input #1, Chamfer_Z
        Line Input #1, XCode Line Input #1, PRG_END_1
        Line Input #1, PRG_END_2
        Line Input #1, PRG_END_3
        Line Input #1, PRG_END_4
        Line Input #1, PRG_END_5

Line Input #1, Tool_Home_Start_1
        Line Input #1, Tool_Home_Start_2

Line Input #1, Tool_Home_End_1
        Line Input #1, Tool_Home_End_2

Line Input #1, PRG_END_1
        Line Input #1, PRG_END_2
        Line Input #1, PRG_END_3
        Line Input #1, PRG_END_4
        Line Input #1, PRG_END_5

Line Input #1, Opt_Stop_1
        Line Input #1, Opt_Stop_2
        Line Input #1, Opt_Stop_3

Line Input #1, Drill_G_Code
        Line Input #1, Drill_Peck_1
        Line Input #1, Drill_Peck_2

Loop

Close #1    ' Close file.

' Set Qcampost.ini
    pstname = WritePrivateProfileString("Last Post Used", "lastpost", PostName, "Qcampost.ini")
    Clipboard.SetText PostName End If
FileExists = False Dim FName, FNum, i, Msg2, TestString ' Declare variables.

FNum = FreeFile ' Determine file number.
        FName = CommonDialog2.Filename

Close   ' Close all files.

1001

End Sub

Private Sub Command4_Click()

' User pressed the open button
```

```
            Dim RetVal
            On Error Resume Next
            CommonDialog2.Filter = "Post (*.pst)|*.pst|All Files (*.*)|*.*" ' Filters
 5          CommonDialog2.FilterIndex = 1   ' Sets *.pst as first choice
            CommonDialog2.Action = 1    ' Shows the "Open" style box
            frmPstout.Label14 = CommonDialog2.Filename
            frmMDI.label1 = CommonDialog2.Filename
            Dim PostName As String
10          PostName = Label14.Caption
            PostName = CommonDialog2.Filename  ' Sets "postname" as file name Open PostName For Input As #1    ' Open file for input.

15
                ' Reads the file
            Do While Not EOF(1)
                Line Input #1, PRG_STRT_1
                Line Input #1, PRG_STRT_2
20              Line Input #1, PRG_STRT_3
                Line Input #1, PRG_STRT_4
                Line Input #1, PRG_STRT_5
                Line Input #1, PRG_STRT_6

25              Line Input #1, Feed
                Line Input #1, Rapid
                Line Input #1, G_Code_Chamfer
                Line Input #1, G_Code_Radius
                Line Input #1, dwell
30              Line Input #1, Spinfrd
                Line Input #1, Spinbckwrd
                Line Input #1, Spinstop
                Line Input #1, ClntOn
                Line Input #1, ClntOff
35              Line Input #1, opstp
                Line Input #1, prgstop
                Line Input #1, formats
                Line Input #1, Rad_X
                Line Input #1, Rad_Z
40              Line Input #1, Chamfer_X
                Line Input #1, Chamfer_Z
                Line Input #1, XCode If XCode = "X" Then ' This just sets the option buttons.
45              Option1 = True
                option2 = False
                End If If XCode = "X-" Then 'This just sets the option buttons.
50              option2 = True
                Option1 = False
                End If Line Input #1, PRG_END_1
55              Line Input #1, PRG_END_2
                Line Input #1, PRG_END_3
                Line Input #1, PRG_END_4
                Line Input #1, PRG_END_5

60              Line Input #1, Tool_Home_Start_1
                Line Input #1, Tool_Home_Start_2

Line Input #1, Tool_Home_End_1
                Line Input #1, Tool_Home_End_2
65
                Line Input #1, PRG_END_1
                Line Input #1, PRG_END_2
                Line Input #1, PRG_END_3
                Line Input #1, PRG_END_4
70              Line Input #1, PRG_END_5

Line Input #1, Opt_Stop_1
                Line Input #1, Opt_Stop_2
                Line Input #1, Opt_Stop_3
```

```
        Line Input #1, Drill_G_Code
        Line Input #1, Drill_Peck_1
        Line Input #1, Drill_Peck_2
    Loop frmPstout.text3.Text = PRG_STRT_1 ' Shows the next line.
    frmPstout.Text19.Text = PRG_STRT_2 ' Shows the next line.
    frmPstout.Text20.Text = PRG_STRT_3 ' Shows the next line.
    frmPstout.Text21.Text = PRG_STRT_4 ' Shows the next line.
    frmPstout.Text22.Text = PRG_STRT_5 ' Shows the next line.
    frmPstout.Text23.Text = PRG_STRT_6 ' Shows the next line.

frmPstout.text1.Text = Feed ' Shows the next line.
    frmPstout.text2.Text = Rapid ' Shows the next line.
    frmPstout.text4.Text = G_Code_Chamfer ' Shows the next line.
    frmPstout.text5.Text = G_Code_Radius ' Shows the next line.
    frmPstout.text6.Text = dwell ' Shows the next line.
    frmPstout.text15.Text = Spinfrd ' Shows the next line.
    frmPstout.text14.Text = Spinbckwrd ' Shows the next line.
    frmPstout.text13.Text = Spinstop ' Shows the next line.
    frmPstout.text10.Text = ClntOn ' Shows the next line.
    frmPstout.text11.Text = ClntOff ' Shows the next line.
    frmPstout.text17.Text = opstp ' Shows the next line.
    frmPstout.text8.Text = prgstop ' Shows the next line.
    frmPstout.text9.Text = formats ' Shows the next line.
    frmPstout.text12.Text = Rad_X ' Shows the next line.
    frmPstout.Text18.Text = Rad_Z ' Shows the next line.
    frmPstout.text16.Text = Chamfer_X ' Shows the next line.
    frmPstout.Text17.Text = Chamfer_Z ' Shows the next line.

frmPstout.Text24.Text = PRG_END_1 ' Shows the next line.
    frmPstout.Text25.Text = PRG_END_2 ' Shows the next line.
    frmPstout.Text26.Text = PRG_END_3 ' Shows the next line.
    frmPstout.Text27.Text = PRG_END_4 ' Shows the next line.
    frmPstout.Text28.Text = PRG_END_5 ' Shows the next line.

frmPstout.Text29.Text = Tool_Home_Start_1 ' Shows the next line.
    frmPstout.Text30.Text = Tool_Home_Start_2 ' Shows the next line.

frmPstout.Text31.Text = Tool_Home_End_1 ' Shows the next line.
    frmPstout.Text32.Text = Tool_Home_End_2 ' Shows the next line.

frmPstout.Text24.Text = PRG_END_1
    frmPstout.Text25.Text = PRG_END_2
    frmPstout.Text26.Text = PRG_END_3
    frmPstout.Text27.Text = PRG_END_4
    frmPstout.Text28.Text = PRG_END_5 frmPstout.Text33.Text = Opt_Stop_1
    frmPstout.Text34.Text = Opt_Stop_2
    frmPstout.Text35.Text = Opt_Stop_3 frmPstout.Text36.Text = Drill_G_Code
    frmPstout.Text39.Text = Drill_Peck_1
    frmPstout.Text38.Text = Drill_Peck_2

Close #1   ' Close file.

' Set the option buttons for X or X-
If XCode = "X" Then
    Option1 = True
    option2 = False
End If If XCode = "X-" Then
    option2 = True
    Option1 = False
End If
```

```
                ' Write post name to qcampost.ini...
        pstname = WritePrivateProfileString("Last Post Used", "lastpost", PostName, "Qcampost.ini")

End Sub

Private Sub Command5_Click()

' The user pressed the "New" button.

Dim RetVal
            On Error Resume Next
            CommonDialog2.Filter = "Post (*.pst)|*.pst|All Files (*.*)|*.*" ' Filters
            CommonDialog2.FilterIndex = 1    ' Sets *.txt as first choice
            CommonDialog2.Action = 1   ' Shows the "Open" style box
            frmPstout.Label14 = CommonDialog2.Filename
            Dim PostName As String
            PostName = Label14.Caption
            PostName = CommonDialog2.Filename  ' Sets "postname" as file name Open PostName For Output As #1   ' Open file for output.
                ' Creates a new file...
                ' When you press "Close" it writes it to "QcamPost.ini"...
            Close #1   ' Close file.

End Sub

Private Sub Form_Deactivate()
        Visible = False
        frmMDI.ActiveForm.ActiveControl.SetFocus ' RETURNS THE CURSER TO THE SCREEN
        End Sub Private Sub Form_Load()
        If WindowState = 0 Then
            Move (Screen.Width - frmPstout.Width) / 2, (Screen.Height - frmPstout.Height) / 2
        End If
        End Sub Private Sub Form_Paint()
        If WindowState = 0 Then
            Move (Screen.Width - frmPstout.Width) / 2, (Screen.Height - frmPstout.Height) / 2
        End If
        End Sub Private Sub Form_Resize()
        If WindowState = 0 Then
            Move (Screen.Width - frmPstout.Width) / 2, (Screen.Height - frmPstout.Height) / 2
        End If
        End Sub Line 281: Property Picture in Picture1 had an invalid file reference
        Line 549: Property Caption in Label37 must be a quoted string
        Line 611: Property Caption in Label32 must be a quoted string
        Line 619: Property Caption in Label26 must be a quoted string
        VERSION 4.00
        Begin VB.Form frmStartup
            BorderStyle     =   3  'Fixed Dialog
            Caption         =   "First Tool"
            ClientHeight    =   3090
            ClientLeft      =   2040
            ClientTop       =   2205
            ClientWidth     =   5475
            FillColor       =   &H00FFFF00&
            BeginProperty Font
                name            =   "MS Sans Serif"
                charset         =   1
                weight          =   700
                size            =   12
                underline       =   0  'False
                italic          =   0  'False
                strikethrough   =   0  'False
            EndProperty
```

```
   ForeColor       =   &H80000008&
   Height          =   3615
   Icon            =   "FRMSTART.frx":0000
   Left            =   1920
   LinkTopic       =   "Form2"
   LockControls    =   -1  'True
   ScaleHeight     =   3090
   ScaleWidth      =   5475
   Top             =   1800
   Visible         =   0   'False
   Width           =   5715
   Begin VB.TextBox Text3
      BackColor       =   &H00FFFFFF&
      BeginProperty Font
         name            =   "MS Sans Serif"
         charset         =   1
         weight          =   700
         size            =   8.25
         underline       =   0   'False
         italic          =   0   'False
         strikethrough   =   0   'False
      EndProperty
      Height          =   285
      Left            =   2160
      MaxLength       =   20
      TabIndex        =   1
      Top             =   600
      Width           =   2535
   End
   Begin VB.TextBox Text4
      BackColor       =   &H00FFFFFF&
      BeginProperty Font
         name            =   "MS Sans Serif"
         charset         =   1
         weight          =   700
         size            =   8.25
         underline       =   0   'False
         italic          =   0   'False
         strikethrough   =   0   'False
      EndProperty
      Height          =   285
      Left            =   2160
      MaxLength       =   50
      TabIndex        =   2
      Top             =   1080
      Width           =   2535
   End
   Begin VB.TextBox Text5
      BackColor       =   &H00FFFFFF&
      BeginProperty Font
         name            =   "MS Sans Serif"
         charset         =   1
         weight          =   700
         size            =   8.25
         underline       =   0   'False
         italic          =   0   'False
         strikethrough   =   0   'False
      EndProperty
      Height          =   285
      Left            =   2160
      MaxLength       =   6
      TabIndex        =   3
      Top             =   1560
      Width           =   2535
   End
   Begin VB.CheckBox Check1
      Alignment       =   1   'Right Justify
      Caption         =   "Add Part Stop First"
      BeginProperty Font
         name            =   "MS Sans Serif"
         charset         =   1
         weight          =   400
         size            =   8.25
         underline       =   0   'False
```

```
              italic          = 0  'False
              strikethrough   = 0  'False
           EndProperty
           Height       = 375
5          Left         = 1200
           TabIndex     = 5
           Top          = 2040
           Width        = 2055
        End
10      Begin VB.CommandButton Command2
           Caption      = "&Write"
           BeginProperty Font
              name         = "MS Sans Serif"
              charset      = 1
15            weight       = 400
              size         = 8.25
              underline    = 0  'False
              italic       = 0  'False
              strikethrough = 0  'False
20         EndProperty
           Height       = 375
           Left         = 2040
           TabIndex     = 4
           Top          = 2520
25         Width        = 975
        End
        Begin VB.CommandButton Command1
           Caption      = "&Cancel"
           BeginProperty Font
30            name         = "MS Sans Serif"
              charset      = 1
              weight       = 400
              size         = 8.25
              underline    = 0  'False
35            italic       = 0  'False
              strikethrough = 0  'False
           EndProperty
           Height       = 375
           Left         = 3360
40         TabIndex     = 6
           Top          = 2520
           Width        = 975
        End
        Begin VB.TextBox Text2
45         BackColor    = &H00FFFFFF&
           BeginProperty Font
              name         = "MS Sans Serif"
              charset      = 1
              weight       = 700
50            size         = 8.25
              underline    = 0  'False
              italic       = 0  'False
              strikethrough = 0  'False
           EndProperty
55         Height       = 285
           Left         = 2160
           TabIndex     = 0
           Top          = 120
           Width        = 2535
60      End
        Begin VB.Label Label5
           Alignment    = 1  'Right Justify
           Caption      = "Sequence Number"
           BeginProperty Font
65            name         = "MS Sans Serif"
              charset      = 1
              weight       = 400
              size         = 8.25
              underline    = 0  'False
70            italic       = 0  'False
              strikethrough = 0  'False
           EndProperty
           Height       = 255
           Left         = 240
```

```
            TabIndex        =   10
            Top             =   720
            Width           =   1815
         End
         Begin VB.Label Label4
            Alignment       =   1  'Right Justify
            Caption         =   "Tool Comment"
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   255
            Left            =   240
            TabIndex        =   9
            Top             =   1200
            Width           =   1815
         End
         Begin VB.Label Label3
            Alignment       =   1  'Right Justify
            Caption         =   "R.P.M."
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   255
            Left            =   240
            TabIndex        =   8
            Top             =   1680
            Width           =   1815
         End
         Begin VB.Label Label2
            Alignment       =   1  'Right Justify
            Caption         =   "Customer and Part number"
            BeginProperty Font
               name         =   "MS Sans Serif"
               charset      =   1
               weight       =   400
               size         =   8.25
               underline    =   0   'False
               italic       =   0   'False
               strikethrough =  0   'False
            EndProperty
            Height          =   255
            Left            =   0
            TabIndex        =   7
            Top             =   240
            Width           =   2055
         End
      End
Attribute VB_Name = "frmStartup"
Attribute VB_Creatable = False
Attribute VB_Exposed = False Private Sub Command1_Click()
frmStartup.Visible = False
frmMDI.ActiveForm.ActiveControl.SetFocus ' RETURNS THE CURSER TO THE SCREEN
End Sub Private Sub Command2_Click()

Screen.MousePointer = 11

If text2.Text = "" Then
```

```
            MsgBox "Fill in all the blanks.", 48, "Program Start"
            GoTo 100
            End If 5         If text3.Text = "" Then
            MsgBox "Fill in all the blanks.", 48, "Program Start"
            GoTo 100
            End If 10         If text4.Text = "" Then
            MsgBox "Fill in all the blanks.", 48, "Program Start"
            GoTo 100
            End If 15         If text5.Text = "" Then
            MsgBox "Fill in all the blanks.", 48, "Program Start"
            GoTo 100
            End If 20         If frmStartup.check1.Value = 1 Then
            GoTo 200
            End If frmStartup.Visible = False
 25
            ' Display the hourglass mouse pointer.
            Screen.MousePointer = 11

Clipboard.Clear
 30
                 ' First of five optional lines of program start.
            If Not PRG_STRT_1 = "" Then
            Clipboard.SetText PRG_STRT_1
            editpasteproc
 35         Clipboard.SetText Chr(13) + Chr(10)
            editpasteproc
            End If If Not PRG_STRT_2 = "" Then
 40         Clipboard.SetText PRG_STRT_2
            editpasteproc
            Clipboard.SetText Chr(13) + Chr(10)
            editpasteproc
            End If
 45
            If Not PRG_STRT_3 = "" Then
            Clipboard.SetText PRG_STRT_3
            editpasteproc
            Clipboard.SetText Chr(13) + Chr(10)
 50         editpasteproc
            End If If Not PRG_STRT_4 = "" Then
            Clipboard.SetText PRG_STRT_4
 55         editpasteproc
            Clipboard.SetText Chr(13) + Chr(10)
            editpasteproc
            End If 60         If Not PRG_STRT_5 = "" Then
            Clipboard.SetText PRG_STRT_5
            editpasteproc
            Clipboard.SetText Chr(13) + Chr(10)
            editpasteproc
 65         End If Clipboard.SetText "("
            editpasteproc    ' TEXT2 = CUSTOMER & PART NUMBER
            Clipboard.SetText UCase(text2.Text)
 70         editpasteproc
            Clipboard.SetText ")" & Chr(13) + Chr(10)
            editpasteproc
            Clipboard.SetText "("
            editpasteproc
```

```
            Clipboard.SetText Date$
            editpasteproc

If Not PRG_STRT_6 = "" Then
 5              Clipboard.SetText " " & PRG_STRT_6
                editpasteproc
              Else
                Clipboard.SetText " PROGRAMERS NAME"
                editpasteproc
10          End If Clipboard.SetText ")" & Chr(13) & Chr(10)
            editpasteproc
            Clipboard.SetText "N"
15          editpasteproc       ' TEXT1 = SEQUENCE NUMBER
            Clipboard.SetText text3.Text
            editpasteproc
            Clipboard.SetText " ("
            editpasteproc       ' TEXT5 = TOOL COMMENT
20          Clipboard.SetText UCase(text4.Text)
            editpasteproc
            Clipboard.SetText ")" & Chr(13) & Chr(10)
            editpasteproc 25
            If Not Tool_Home_Start_1 = "" Then 'send tool to home... line 1
            Clipboard.SetText Tool_Home_Start_1
            editpasteproc
            Clipboard.SetText Chr(13) + Chr(10)
30          editpasteproc
            End If If Not Tool_Home_Start_2 = "" Then ' send tool to home... line 2
            Clipboard.SetText Tool_Home_Start_2
35          editpasteproc
            Clipboard.SetText Chr(13) + Chr(10)
            editpasteproc
            End If 40          Clipboard.SetText Rapid & "T0000 " & ClntOn & Chr(13) & Chr(10)
            editpasteproc         ' TEXT4 = R.P.M.
            Clipboard.SetText "G97" & " S" & text5.Text & " " & Spinfrd & Chr(13) & Chr(10)
            editpasteproc 45          ' Reset the mouse pointer
            Screen.MousePointer = 0
            GoTo 300

50          '_____ WITH PART STOP _____

' Display the hourglass mouse pointer
            200

55          frmStartup.Visible = False

Screen.MousePointer = 11

Clipboard.Clear      ' TEXT3 = PROGRAM NAME
60
            ' First of five optional lines of program start.
            If Not PRG_STRT_1 = "" Then
            Clipboard.SetText PRG_STRT_1
            editpasteproc
65          Clipboard.SetText Chr(13) + Chr(10)
            editpasteproc
            End If If Not PRG_STRT_2 = "" Then
70          Clipboard.SetText PRG_STRT_2
            editpasteproc
            Clipboard.SetText Chr(13) + Chr(10)
            editpasteproc
            End If
```

```
If Not PRG_STRT_3 = "" Then
Clipboard.SetText PRG_STRT_3
editpasteproc
Clipboard.SetText Chr(13) + Chr(10)
editpasteproc
End If If Not PRG_STRT_4 = "" Then
Clipboard.SetText PRG_STRT_4
editpasteproc
Clipboard.SetText Chr(13) + Chr(10)
editpasteproc
End If If Not PRG_STRT_5 = "" Then
Clipboard.SetText PRG_STRT_5
editpasteproc
Clipboard.SetText Chr(13) + Chr(10)
editpasteproc
End If Clipboard.SetText "("
editpasteproc    ' TEXT2 = CUSTOMER & PART NUMBER
Clipboard.SetText UCase(text2.Text)
editpasteproc
Clipboard.SetText ")" & Chr(13) + Chr(10)
editpasteproc
Clipboard.SetText "("
editpasteproc
Clipboard.SetText Date$
editpasteproc If Not PRG_STRT_6 = "" Then
    Clipboard.SetText " " & PRG_STRT_6
    editpasteproc
Else
    Clipboard.SetText " PROGRAMERS NAME"
    editpasteproc
End If Clipboard.SetText ")" & Chr(13) & Chr(10)
editpasteproc
'_____ HERE IS THE ADDED PART STOP ! _____
Clipboard.SetText "N1 (PART STOP)" & Chr(13) & Chr(10)
editpasteproc If Not Tool_Home_Start_1 = "" Then 'send tool to home... line 1
Clipboard.SetText Tool_Home_Start_1
editpasteproc
Clipboard.SetText Chr(13) + Chr(10)
editpasteproc
End If If Not Tool_Home_Start_2 = "" Then ' send tool to home... line 2
Clipboard.SetText Tool_Home_Start_2
editpasteproc
Clipboard.SetText Chr(13) + Chr(10)
editpasteproc
End If Clipboard.SetText Rapid & "T0000 " & Chr(13) & Chr(10)
editpasteproc
Clipboard.SetText Rapid & "X0 Z0" & Chr(13) & Chr(10)
editpasteproc
Clipboard.SetText prgstop & Chr(13) & Chr(10)
editpasteproc
Clipboard.SetText Rapid & "Z" & Format(frmPartstop.text2.Text, formats) & Chr(13) & Chr(10)
editpasteproc If Not Tool_Home_End_1 = "" Then 'send tool to home... line 1
Clipboard.SetText Tool_Home_End_1
editpasteproc
Clipboard.SetText Chr(13) + Chr(10)
editpasteproc
```

```
            End If

If Not Tool_Home_End_2 = "" Then ' send tool to home... line 2
            Clipboard.SetText Tool_Home_End_2
 5          editpasteproc
            Clipboard.SetText Chr(13) + Chr(10)
            editpasteproc
            End If 10          Clipboard.SetText opslp & Chr(13) & Chr(10)
            editpasteproc
            '_____ ETC... ! _____
            Clipboard.SetText "N"
            editpasteproc    ' TEXT1 = SEQUENCE NUMBER
15          Clipboard.SetText text3.Text
            editpasteproc
            Clipboard.SetText " ("
            editpasteproc    ' TEXT5 = TOOL COMMENT
            Clipboard.SetText UCase(text4.Text)
20          editpasteproc
            Clipboard.SetText ")" & Chr(13) & Chr(10)
            editpasteproc If Not Tool_Home_Start_1 = "" Then 'send tool to home... line 1
25          Clipboard.SetText Tool_Home_Start_1
            editpasteproc
            Clipboard.SetText Chr(13) + Chr(10)
            editpasteproc
            End If
30
            If Not Tool_Home_Start_2 = "" Then ' send tool to home... line 2
            Clipboard.SetText Tool_Home_Start_2
            editpasteproc
            Clipboard.SetText Chr(13) + Chr(10)
35          editpasteproc
            End If Clipboard.SetText Rapid & "T0000 " & ClntOn & Chr(13) & Chr(10)
            editpasteproc        ' TEXT4 = R.P.M.
40          Clipboard.SetText "G97" & " S" & text5.Text & " " & Spinfrd & Chr(13) & Chr(10)
            editpasteproc ' Reset the mouse pointer.
            Screen.MousePointer = 0
45
            frmPartstop.Visible = False 100
            300
50
            Screen.MousePointer = 0 frmMDI.ActiveForm.ActiveControl.SetFocus ' RETURNS THE CURSER TO THE SCREEN

55          End Sub

Private Sub Form_Deactivate()
            Visible = False
            frmMDI.ActiveForm.ActiveControl.SetFocus ' RETURNS THE CURSER TO THE SCREEN
60          End Sub Private Sub Form_Load()

'TOP = 0
65              'LEFT = 1700

If WindowState = 0 Then
                    Move (Screen.Width - frmStartup.Width) / 2, (Screen.Height - frmStartup.Height) / 2
                End If
70
            End Sub Private Sub Form_Paint()
```

```
'TOP = 0
'LEFT = 1700

If WindowState = 0 Then
    Move (Screen.Width - frmStartup.Width) / 2, (Screen.Height - frmStartup.Height) / 2
End If End Sub Private Sub Form_Resize()

'TOP = 0
'LEFT = 1700

If WindowState = 0 Then
    Move (Screen.Width - frmStartup.Width) / 2, (Screen.Height - frmStartup.Height) / 2
End If End Sub Private Sub Text1_KeyPress(KeyAscii As Integer)

If KeyAscii = (13) Then
SendKeys ("{tab}"), True
End If

End Sub

Private Sub Text2_KeyPress(KeyAscii As Integer)

If KeyAscii = (13) Then
SendKeys ("{tab}"), True
End If

End Sub

Private Sub Text3_KeyPress(KeyAscii As Integer)
If KeyAscii = (13) Then
SendKeys ("{TAB}"), True
End If Const DECIMAL_OK = -1        ' 0 = no, -1 = YES
Const MIN_VALUE = -999       ' Minimum value
Const MAX_VALUE = 999        ' Maximum value
key$ = Chr$(KeyAscii)        ' Convert to string
Select Case key$
    Case "0" To "9"          ' Numbers and minus signs
        Newvalue = Val(Left$(text3.Text, text3.SelStart) + key$ + Mid$(text3.Text, text3.SelStart + text3.SelLength + 1))
        If Newvalue > MAX_VALUE Or Newvalue < MIN_VALUE Then
            KeyAscii = 0
        End If
    Case "."
        If DECIMAL_OK = 0 Or InStr(text3.Text, ".") Then
            KeyAscii = 0
        End If
    Case Chr$(8)             ' Backspace
    Case Else
        KeyAscii = 0
End Select
If key$ = "-" And (InStr(text3.Text, "-") Or text3.SelStart <> 0) Then
    KeyAscii = 0
End If
If key$ = "." And (InStr(text3.Text, "-") Or text3.SelStart <> 0) Then
    KeyAscii = 0
End If End Sub Private Sub Text4_KeyPress(KeyAscii As Integer)

If KeyAscii = (13) Then
SendKeys ("{tab}"), True
End If
```

```
End Sub

Private Sub Text5_KeyPress(KeyAscii As Integer)
   If KeyAscii = (13) Then
    SendKeys ("{TAB}"), True
   End If Const DECIMAL_OK = -1         ' 0 = no, -1 = YES
Const MIN_VALUE = -999        ' Minimum value
Const MAX_VALUE = 999999      ' Maximum value
   key$ = Chr$(KeyAscii)      ' Convert to string
   Select Case key$
     Case "0" To "9"           ' Numbers and minus signs
       Newvalue = Val(Left$(text5.Text, text5.SelStart) + key$ + Mid$(text5.Text, text5.SelStart + text5.SelLength + 1))
       If Newvalue > MAX_VALUE Or Newvalue < MIN_VALUE Then
         KeyAscii = 0
       End If
     Case "."
       If DECIMAL_OK = 0 Or InStr(text5.Text, ".") Then
         KeyAscii = 0
       End If
     Case Chr$(8)              ' Backspace
     Case Else
       KeyAscii = 0
   End Select
   If key$ = "-" And (InStr(text5.Text, "-") Or text5.SelStart <> 0) Then
     KeyAscii = 0
   End If
   If key$ = "." And (InStr(text5.Text, "-") Or text5.SelStart <> 0) Then
     KeyAscii = 0
   End If End Sub VERSION 4.00
Begin VB.Form frmtap
   BorderStyle     =   3  'Fixed Dialog
   Caption         =   "Tapping"
   ClientHeight    =   1680
   ClientLeft      =   2850
   ClientTop       =   3000
   ClientWidth     =   4065
   BeginProperty Font
      name          =   "MS Sans Serif"
      charset       =   1
      weight        =   700
      size          =   8.25
      underline     =   0  'False
      italic        =   0  'False
      strikethrough =   0  'False
   EndProperty
   ForeColor       =   &H80000008&
   Height          =   2205
   Icon            =   "FRMTAP.frx":0000
   Left            =   2730
   LinkTopic       =   "Form3"
   LockControls    =   -1  'True
   MaxButton       =   0  'False
   MinButton       =   0  'False
   ScaleHeight     =   1680
   ScaleWidth      =   4065
   ShowInTaskbar   =   0  'False
   Top             =   2595
   Width           =   4305
   Begin VB.TextBox Text2
      BackColor       =   &H00FFFFFF&
      Height          =   285
      Left            =   1800
      MaxLength       =   20
      TabIndex        =   1
      Top             =   600
      Width           =   855
   End
```

```
Begin VB.TextBox Text1
    BackColor       =   &H00FFFFFF&
    Height          =   285
    Left            =   1800
    MaxLength       =   20
    TabIndex        =   0
    Top             =   120
    Width           =   855
End
Begin VB.CommandButton Command2
    Caption         =   "&Write"
    BeginProperty Font
        name            =   "MS Sans Serif"
        charset         =   1
        weight          =   400
        size            =   8.25
        underline       =   0   'False
        italic          =   0   'False
        strikethrough   =   0   'False
    EndProperty
    Height          =   375
    Left            =   1080
    TabIndex        =   2
    Top             =   1080
    Width           =   975
End
Begin VB.CommandButton Command1
    Caption         =   "&Cancel"
    BeginProperty Font
        name            =   "MS Sans Serif"
        charset         =   1
        weight          =   400
        size            =   8.25
        underline       =   0   'False
        italic          =   0   'False
        strikethrough   =   0   'False
    EndProperty
    Height          =   375
    Left            =   2400
    TabIndex        =   3
    Top             =   1080
    Width           =   975
End
Begin VB.Label Label5
    Alignment       =   1  'Right Justify
    Caption         =   "Threads Per Inch"
    BeginProperty Font
        name            =   "MS Sans Serif"
        charset         =   1
        weight          =   400
        size            =   8.25
        underline       =   0   'False
        italic          =   0   'False
        strikethrough   =   0   'False
    EndProperty
    Height          =   255
    Left            =   240
    TabIndex        =   4
    Top             =   720
    Width           =   1455
End
Begin VB.Label Label4
    Alignment       =   1  'Right Justify
    Caption         =   "Depth of Tap"
    BeginProperty Font
        name            =   "MS Sans Serif"
        charset         =   1
        weight          =   400
        size            =   8.25
        underline       =   0   'False
        italic          =   0   'False
        strikethrough   =   0   'False
    EndProperty
    Height          =   255
```

```
         Left            = 600
         TabIndex        = 5
         Top             = 240
         Width           = 1095
      End
   End
   Attribute VB_Name = "frmtap"
   Attribute VB_Creatable = False
   Attribute VB_Exposed = False
   Private Sub Command1_Click()
   frmtap.Visible = False
   frmMDI.ActiveForm.ActiveControl.SetFocus ' RETURNS THE CURSER TO THE SCREEN
   End Sub Private Sub Command2_Click()

Screen.MousePointer = 11

If TEXT1.Text = "" Then
   MsgBox "Fill in all the blanks.", 48, "Taping"
   GoTo 500
   End If If TEXT2.Text = "" Then
   MsgBox "Fill in all the blanks.", 48, "Tapping"
   GoTo 500
   End If Dim zclear As Double    ' Used for "Z0.2500"
   zclear = 0.25 pitch = 1 / TEXT2.Text
   frmtap.Visible = False

Screen.MousePointer = 11

Clipboard.Clear
      Clipboard.SetText Rapid & "X0 Z" & Format(zclear, formats) & Chr(13) & Chr(10)
      editpasteproc
      Clipboard.SetText Feed & "Z-"
      editpasteproc
      Clipboard.SetText Format(TEXT1.Text, formats)
      editpasteproc
      Clipboard.SetText " F"
      editpasteproc
      Clipboard.SetText Format(pitch, formats) & Chr(13) & Chr(10)
      editpasteproc
      Clipboard.SetText Spinstop & Chr(13) & Chr(10)
      editpasteproc
      Clipboard.SetText Spinbckwrd & Chr(13) & Chr(10)
      editpasteproc
      Clipboard.SetText Feed & "Z" & Format(zclear, formats)
      editpasteproc
      Clipboard.SetText " F"
      editpasteproc
      Clipboard.SetText Format(pitch, formats) & Chr(13) & Chr(10)
      editpasteproc
      Clipboard.SetText Spinstop & Chr(13) & Chr(10)
      editpasteproc Screen.MousePointer = 0

500

Screen.MousePointer = 0 frmMDI.ActiveForm.ActiveControl.SetFocus ' RETURNS THE CURSER TO THE SCREEN

End Sub

Private Sub Form_Deactivate()
   Visible = False
```

```
frmMDI.ActiveForm.ActiveControl.SetFocus   ' RETURNS THE CURSER TO THE SCREEN
End Sub Private Sub Form_Load()
    If WindowState = 0 Then
        Move (Screen.Width - frmtap.Width) / 2, (Screen.Height - frmtap.Height) / 2
    End If End Sub Private Sub Form_Paint()
    If WindowState = 0 Then
        Move (Screen.Width - frmtap.Width) / 2, (Screen.Height - frmtap.Height) / 2
    End If End Sub Private Sub Form_Resize()
    If WindowState = 0 Then
        Move (Screen.Width - frmtap.Width) / 2, (Screen.Height - frmtap.Height) / 2
    End If End Sub Private Sub Text1_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(TEXT1.Text, TEXT1.SelStart) + key$ + Mid$(TEXT1.Text, TEXT1.SelStart + TEXT1.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT1.Text, ".") Then
                KeyAscii = 0
            End If
        Case Chr$(8)             ' Backspace
        Case Else
            KeyAscii = 0
    End Select
    If key$ = "-" And (InStr(TEXT1.Text, "-") Or TEXT1.SelStart <> 0) Then
        KeyAscii = 0
    End If End Sub Private Sub Text2_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(TEXT2.Text, TEXT2.SelStart) + key$ + Mid$(TEXT1.Text, TEXT1.SelStart + TEXT1.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT2.Text, ".") Then
```

```
            KeyAscii = 0
        End If
        Case Chr$(8)           ' Backspace
        Case Else
            KeyAscii = 0
    End Select
    If key$ = "-" And (InStr(TEXT1.Text, "-") Or TEXT1.SelStart <> 0) Then
        KeyAscii = 0
    End If End Sub VERSION 4.00
Begin VB.Form frmThread
    BorderStyle     =   3  'Fixed Dialog
    Caption         =   "Threading"
    ClientHeight    =   3015
    ClientLeft      =   1440
    ClientTop       =   2175
    ClientWidth     =   4635
    BeginProperty Font
        name            =   "MS Sans Serif"
        charset         =   1
        weight          =   700
        size            =   8.25
        underline       =   0   'False
        italic          =   0   'False
        strikethrough   =   0   'False
    EndProperty
    ForeColor       =   &H80000008&
    Height          =   3540
    Icon            =   "FRMTHREA.frx":0000
    Left            =   1320
    LinkTopic       =   "Form2"
    LockControls    =   -1  'True
    ScaleHeight     =   3015
    ScaleWidth      =   4635
    Top             =   1770
    Width           =   4875
    Begin VB.TextBox Text7
        BackColor       =   &H00FFFFFF&
        Height          =   285
        Left            =   2400
        MaxLength       =   20
        TabIndex        =   3
        Top             =   1560
        Width           =   855
    End
    Begin VB.CommandButton Command1
        Caption         =   "&Cancel"
        BeginProperty Font
            name            =   "MS Sans Serif"
            charset         =   1
            weight          =   400
            size            =   8.25
            underline       =   0   'False
            italic          =   0   'False
            strikethrough   =   0   'False
        EndProperty
        Height          =   375
        Left            =   2520
        TabIndex        =   5
        Top             =   2520
        Width           =   975
    End
    Begin VB.CommandButton Command2
        Caption         =   "&Write"
        BeginProperty Font
            name            =   "MS Sans Serif"
            charset         =   1
            weight          =   400
            size            =   8.25
            underline       =   0   'False
```

```
          italic        = 0  'False
          strikethrough = 0  'False
       EndProperty
       Height      = 375
 5     Left        = 1200
       TabIndex    = 4
       Top         = 2520
       Width       = 975
    End
10  Begin VB.TextBox Text5
       BackColor   = &H00FFFFFF&
       Height      = 285
       Left        = 2400
       MaxLength   = 20
15     TabIndex    = 1
       Top         = 600
       Width       = 855
    End
    Begin VB.TextBox Text4
20     BackColor   = &H00FFFFFF&
       Height      = 285
       Left        = 2400
       MaxLength   = 20
       TabIndex    = 0
25     Top         = 120
       Width       = 855
    End
    Begin VB.TextBox Text6
       BackColor   = &H00FFFFFF&
30     Height      = 285
       Left        = 2400
       MaxLength   = 20
       TabIndex    = 2
       Top         = 1080
35     Width       = 855
    End
    Begin VB.OptionButton Option1
       Caption     = "O.D. Thread"
       BeginProperty Font
40        name          = "MS Sans Serif"
          charset       = 1
          weight        = 400
          size          = 8.25
          underline     = 0  'False
45        italic        = 0  'False
          strikethrough = 0  'False
       EndProperty
       Height      = 375
       Left        = 840
50     TabIndex    = 7
       Top         = 2040
       Value       = -1 'True
       Width       = 1335
    End
55  Begin VB.OptionButton Option2
       Caption     = "I.D. Thread"
       BeginProperty Font
          name          = "MS Sans Serif"
          charset       = 1
60        weight        = 400
          size          = 8.25
          underline     = 0  'False
          italic        = 0  'False
          strikethrough = 0  'False
65     EndProperty
       Height      = 375
       Left        = 2760
       TabIndex    = 6
       Top         = 2040
70     Width       = 1455
    End
    Begin VB.Label Label7
       Alignment   = 1  'Right Justify
       Caption     = """X""" positioning Point"
```

```
    BeginProperty Font
        name        = "MS Sans Serif"
        charset     = 1
        weight      = 400
        size        = 8.25
        underline   = 0  'False
        italic      = 0  'False
        strikethrough = 0  'False
    EndProperty
    Height    =   255
    Left      =   720
    TabIndex  =   9
    Top       =   1680
    Width     =   1575
End
Begin VB.Label Label5
    Alignment   =   1  'Right Justify
    Caption     =   "Threads per. inch"
    BeginProperty Font
        name        = "MS Sans Serif"
        charset     = 1
        weight      = 400
        size        = 8.25
        underline   = 0  'False
        italic      = 0  'False
        strikethrough = 0  'False
    EndProperty
    Height    =   255
    Left      =   960
    TabIndex  =   10
    Top       =   720
    Width     =   1335
End
Begin VB.Label Label4
    Alignment   =   1  'Right Justify
    Caption     =   "Major Diameter"
    BeginProperty Font
        name        = "MS Sans Serif"
        charset     = 1
        weight      = 400
        size        = 8.25
        underline   = 0  'False
        italic      = 0  'False
        strikethrough = 0  'False
    EndProperty
    Height    =   255
    Left      =   1080
    TabIndex  =   11
    Top       =   240
    Width     =   1215
End
Begin VB.Label Label6
    Alignment   =   1  'Right Justify
    Caption     =   "Depth of thread in ""Z"""
    BeginProperty Font
        name        = "MS Sans Serif"
        charset     = 1
        weight      = 400
        size        = 8.25
        underline   = 0  'False
        italic      = 0  'False
        strikethrough = 0  'False
    EndProperty
    Height    =   255
    Left      =   480
    TabIndex  =   8
    Top       =   1200
    Width     =   1815
End
End
Attribute VB_Name = "frmThread"
Attribute VB_Creatable = False
Attribute VB_Exposed = False
```

```
Private Sub Command1_Click()
frmThread.Visible = False
frmMDI.ActiveForm.ActiveControl.SetFocus ' RETURNS THE CURSER TO THE SCREEN
End Sub Private Sub Command2_Click()

Screen.MousePointer = 11

If text4.Text = "" Then
MsgBox "Fill in all the blanks.", 48, "Thread"
GoTo 855
End If If TEXT5.Text = "" Then
MsgBox "Fill in all the blanks.", 48, "Thread"
GoTo 855
End If If text6.Visible = True And text6.Text = "" Then
MsgBox "Fill in all the blanks.", 48, "Thread"
GoTo 855
End If If text7.Visible = True And text7.Text = "" Then
MsgBox "Fill in all the blanks.", 48, "Thread"
GoTo 855
End If Dim Zclear As Double   ' Used for "Z0.1500"
Zclear = 0.15

If option2.Value = True Then
GoTo 866
End If

865             'O.D. Thread
MAJORDIA = ((text4.Text * 2) / 2)
DEPTH = ((text6.Text * 2) / 2)
TPI = ((TEXT5.Text * 2) / 2)
XPOS = ((text7.Text * 2) / 2)
F = 1 / TPI
C = 1.2272 / TPI
M = MAJORDIA - C
KV = F * 0.64
X1 = MD + KV * 2
H = MAJORDIA - M
D = H / 6

' Check to see if user programs in diameter or radius...
If Thread_Height_Rad_Or_Dia = "Rad" Then
H = H / 2
End If frmThread.Visible = False Screen.MousePointer = 11

Clipboard.SetText Rapid & XCode & Format(XPOS, formats) & " Z" & Format(Zclear, formats) & Chr(13) & Chr(10)
editpasteproc
Clipboard.SetText G_Code_Thread & XCode & Format(M, formats) & " Z-" & Format(DEPTH, formats) & Thread_Height & Format(H, formats) & Thread_Depth_Of_Cut & Format(D, formats) & Thread_Feed & Format(F, formats) & Chr(13) & Chr(10)
editpasteproc
Clipboard.SetText Rapid & " Z" & Format(Zclear, formats) & Chr(13) & Chr(10)
editpasteproc frmThread.Visible = False Screen.MousePointer = 0

GoTo 855
```

```
866            ' I.D. Thread
MAJORDIA = ((text4.Text * 2) / 2)
DEPTH = ((text6.Text * 2) / 2)
TPI = ((TEXT5.Text * 2) / 2)
XPOS = ((text7.Text * 2) / 2)
F = 1 / TPI
C = 1.2272 / TPI
M = MAJORDIA - C
KV = F * 0.64
X1 = MD + KV * 2
H = MAJORDIA - M
D = H / 6

' Check to see if user programs in diameter or radius...
If Thread_Height_Rad_Or_Dia = "Rad" Then
    H = H / 2
End If frmThread.Visible = False Screen.MousePointer = 11

Clipboard.SetText Rapid & XCode & Format(XPOS, formats) & " Z" & Format(Zclear, formats) & Chr(13) & Chr(10)
editpasteproc
Clipboard.SetText G_Code_Thread & XCode & Format(MAJORDIA, formats) & " Z-" & Format(DEPTH, formats) & Thread_Height &
Format(H, formats) & Thread_Depth_Of_Cut & Format(D, formats) & Thread_Feed & Format(F, formats) & Chr(13) & Chr(10)
editpasteproc
Clipboard.SetText Rapid & "Z" & Format(Zclear, formats) & Chr(13) & Chr(10)
editpasteproc frmThread.Visible = False Screen.MousePointer = 0
856
frmThread.Visible = False

855

Screen.MousePointer = 0 frmMDI.ActiveForm.ActiveControl.SetFocus ' RETURNS THE CURSER TO THE SCREEN

End Sub

Private Sub Form_Deactivate()
Visible = False
frmMDI.ActiveForm.ActiveControl.SetFocus ' RETURNS THE CURSER TO THE SCREEN
End Sub Private Sub Form_Load()

If WindowState = 0 Then
        Move (Screen.Width - frmThread.Width) / 2, (Screen.Height - frmThread.Height) / 2
    End If End Sub Private Sub Form_Paint()

If WindowState = 0 Then
        Move (Screen.Width - frmThread.Width) / 2, (Screen.Height - frmThread.Height) / 2
    End If End Sub Private Sub Form_Resize()

If WindowState = 0 Then
        Move (Screen.Width - frmThread.Width) / 2, (Screen.Height - frmThread.Height) / 2
    End If
```

```
End Sub

Private Sub Text2_KeyPress(KeyAscii As Integer)

If KeyAscii = (13) Then
    SendKeys ("{tab}"), True
    End If

End Sub

Private Sub Text3_KeyPress(KeyAscii As Integer)

End Sub

Private Sub Text4_KeyPress(KeyAscii As Integer)

If KeyAscii = (13) Then
    SendKeys ("{tab}"), True
    End If
    Const DECIMAL_OK = -1          ' 0 = no, -1 = YES
    Const MIN_VALUE = -999         ' Minimum value
    Const MAX_VALUE = 999          ' Maximum value
    key$ = Chr$(KeyAscii)          ' Convert to string
    Select Case key$
        Case "0" To "9"            ' Numbers and minus signs
            Newvalue = Val(Left$(text4.Text, text4.SelStart) + key$ + Mid$(text4.Text, text4.SelStart + text4.SelLength + 1))
            If Newvalue > MAX_VALUE Or Newvalue < MIN_VALUE Then
                KeyAscii = 0
            End If
        Case "."
            If DECIMAL_OK = 0 Or InStr(text4.Text, ".") Then
                KeyAscii = 0
            End If
        Case Chr$(8)               ' Backspace
        Case Else
            KeyAscii = 0
    End Select
    If key$ = "-" And (InStr(text4.Text, "-") Or text4.SelStart <> 0) Then
        KeyAscii = 0
    End If
End Sub Private Sub Text5_KeyPress(KeyAscii As Integer)

If KeyAscii = (13) Then
    SendKeys ("{tab}"), True
    End If
    Const DECIMAL_OK = -1          ' 0 = no, -1 = YES
    Const MIN_VALUE = -999         ' Minimum value
    Const MAX_VALUE = 999          ' Maximum value
    key$ = Chr$(KeyAscii)          ' Convert to string
    Select Case key$
        Case "0" To "9"            ' Numbers and minus signs
            Newvalue = Val(Left$(TEXT5.Text, TEXT5.SelStart) + key$ + Mid$(TEXT5.Text, TEXT5.SelStart + TEXT5.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT5.Text, ".") Then
                KeyAscii = 0
            End If
        Case Chr$(8)               ' Backspace
        Case Else
            KeyAscii = 0
    End Select
    If key$ = "-" And (InStr(TEXT5.Text, "-") Or TEXT5.SelStart <> 0) Then
        KeyAscii = 0
    End If
End Sub Private Sub Text6_KeyPress(KeyAscii As Integer)
```

```
        If KeyAscii = (13) Then
            SendKeys ("{tab}"), True
        End If Const DECIMAL_OK = -1          ' 0 = no, -1 = YES
    Const MIN_VALUE = -999         ' Minimum value
    Const MAX_VALUE = 999          ' Maximum value
        key$ = Chr$(KeyAscii)      ' Convert to string
        Select Case key$
            Case "0" To "9"        ' Numbers and minus signs
                Newvalue = Val(Left$(text6.Text, text6.SelStart) + key$ + Mid$(text6.Text, text6.SelStart + text6.SelLength + 1))
                If Newvalue > MAX_VALUE Or Newvalue < MIN_VALUE Then
                    KeyAscii = 0
                End If
            Case "."
                If DECIMAL_OK = 0 Or InStr(text6.Text, ".") Then
                    KeyAscii = 0
                End If
            Case Chr$(8)           ' Backspace
            Case Else
                KeyAscii = 0
        End Select
        If key$ = "-" And (InStr(text6.Text, "-") Or text6.SelStart <> 0) Then
            KeyAscii = 0
        End If
    End Sub Private Sub Text7_KeyPress(KeyAscii As Integer)

If KeyAscii = (13) Then
            SendKeys ("{tab}"), True
        End If

Const DECIMAL_OK = -1          ' 0 = no, -1 = YES
    Const MIN_VALUE = -999         ' Minimum value
    Const MAX_VALUE = 999          ' Maximum value
        key$ = Chr$(KeyAscii)      ' Convert to string
        Select Case key$
            Case "0" To "9"        ' Numbers and minus signs
                Newvalue = Val(Left$(text7.Text, text7.SelStart) + key$ + Mid$(text7.Text, text7.SelStart + text7.SelLength + 1))
                If Newvalue > MAX_VALUE Or Newvalue < MIN_VALUE Then
                    KeyAscii = 0
                End If
            Case "."
                If DECIMAL_OK = 0 Or InStr(text7.Text, ".") Then
                    KeyAscii = 0
                End If
            Case Chr$(8)           ' Backspace
            Case Else
                KeyAscii = 0
        End Select
        If key$ = "-" And (InStr(text7.Text, "-") Or text7.SelStart <> 0) Then
            KeyAscii = 0
        End If
    End Sub VERSION 4.00
    Begin VB.Form frmtoolhome
        BorderStyle     =   3  'Fixed Dialog
        Caption         =   "Tool Home"
        ClientHeight    =   3000
        ClientLeft      =   2595
        ClientTop       =   2625
        ClientWidth     =   3690
        BeginProperty Font
            name          =   "MS Sans Serif"
            charset       =   1
            weight        =   700
            size          =   8.25
            underline     =   0   'False
            italic        =   0   'False
            strikethrough =   0   'False
        EndProperty
```

```
      ForeColor       =   &H80000008&
      Height          =   3525
      Icon            =   "FRMTOOLH.frx":0000
      Left            =   2475
      LinkTopic       =   "Form4"
      LockControls    =   -1  'True
      ScaleHeight     =   3000
      ScaleWidth      =   3690
      Top             =   2220
      Width           =   3930
      Begin VB.OptionButton Option3
         Caption         =   "Tool Home - Programed stop"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   495
         Left            =   960
         TabIndex        =   4
         Top             =   960
         Width           =   2295
      End
      Begin VB.CommandButton Command2
         Caption         =   "&Write"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   375
         Left            =   840
         TabIndex        =   0
         Top             =   2400
         Width           =   975
      End
      Begin VB.CommandButton Command1
         Caption         =   "&Cancel"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   375
         Left            =   2160
         TabIndex        =   3
         Top             =   2400
         Width           =   975
      End
      Begin VB.OptionButton Option2
         Caption         =   "Tool Home - Program End"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   495
         Left            =   960
```

```
            TabIndex        =   2
            Top             =   1680
            Width           =   2175
         End
      Begin VB.OptionButton Option1
         Caption         =   "Tool Home - Optional stop"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   495
         Left            =   960
         TabIndex        =   1
         Top             =   240
         Value           =   -1  'True
         Width           =   2295
      End
   End
   Attribute VB_Name = "frmtoolhome"
   Attribute VB_Creatable = False
   Attribute VB_Exposed = False
   Private Sub Command1_Click()
   frmtoolhome.Visible = False
   frmMDI.ActiveForm.ActiveControl.SetFocus ' RETURNS THE CURSER TO THE SCREEN
   End Sub Private Sub Command2_Click()

Screen.MousePointer = 11

If Option1 = True Then
   GoTo 100
   End If

If option2 = True Then
   GoTo 200
   End If

If Option3 = True Then
   GoTo 400
   End If

100
        Visible = False
        Screen.MousePointer = 11
      Clipboard.Clear If Not Tool_Home_End_1 = "" Then 'send tool to home w/optional stop .. line 1
   Clipboard.SetText Tool_Home_End_1
   editpasteproc
   Clipboard.SetText Chr(13) + Chr(10)
   editpasteproc
   End If If Not Tool_Home_End_2 = "" Then ' send tool to home w/ optional stop... line 2
   Clipboard.SetText Tool_Home_End_2
   editpasteproc
   Clipboard.SetText Chr(13) + Chr(10)
   editpasteproc
   End If Clipboard.SetText opstp & Chr(13) & Chr(10)
   editpasteproc Screen.MousePointer = 0
```

```
         GoTo 300
     200
         Visible = False
         Screen.MousePointer = 11
 5       Clipboard.Clear If Not PRG_END_1 = "" Then 'Program end line #1
         Clipboard.SetText PRG_END_1
         editpasteproc
10       Clipboard.SetText Chr(13) + Chr(10)
         editpasteproc
         End If If Not PRG_END_2 = "" Then 'Program end line #2
15       Clipboard.SetText PRG_END_2
         editpasteproc
         Clipboard.SetText Chr(13) + Chr(10)
         editpasteproc
         End If
20
         If Not PRG_END_3 = "" Then 'Program end line #3
         Clipboard.SetText PRG_END_3
         editpasteproc
         Clipboard.SetText Chr(13) + Chr(10)
25       editpasteproc
         End If If Not PRG_END_4 = "" Then 'Program end line #4
         Clipboard.SetText PRG_END_4
30       editpasteproc
         Clipboard.SetText Chr(13) + Chr(10)
         editpasteproc
         End If 35       If Not PRG_END_5 = "" Then 'Program end line #5
         Clipboard.SetText PRG_END_5
         editpasteproc
         Clipboard.SetText Chr(13) + Chr(10)
         editpasteproc
40       End If Screen.MousePointer = 0

45       GoTo 300

400

50           Visible = False
             Screen.MousePointer = 11
             Clipboard.Clear If Not Opt_Stop_1 = "" Then 'send tool to home w/programed stop... line 1
55       Clipboard.SetText Opt_Stop_1
         editpasteproc
         Clipboard.SetText Chr(13) + Chr(10)
         editpasteproc
         End If
60
         If Not Opt_Stop_2 = "" Then ' send tool to home w/ programed stop.. line 2
         Clipboard.SetText Opt_Stop_2
         editpasteproc
         Clipboard.SetText Chr(13) + Chr(10)
65       editpasteproc
         End If If Not Opt_Stop_3 = "" Then ' send tool to home w/ programed stop... line 2
         Clipboard.SetText Opt_Stop_3
70       editpasteproc
         Clipboard.SetText Chr(13) + Chr(10)
         editpasteproc
         End If
```

```
          Clipboard.SetText prgstop & Chr(13) & Chr(10)
          editpasteproc Screen.MousePointer = 0
  5           GoTo 300

300

Screen.MousePointer = 0
 10
          frmMDI.ActiveForm.ActiveControl.SetFocus ' RETURNS THE CURSER TO THE SCREEN End Sub 15       Private Sub Form_Deactivate()
          frmtoolhome.Visible = False
          frmMDI.ActiveForm.ActiveControl.SetFocus ' RETURNS THE CURSER TO THE SCREEN
          End Sub 20       Private Sub Form_Load()

If WindowState = 0 Then
                  Move (Screen.Width - frmtoolhome.Width) / 2, (Screen.Height - frmtoolhome.Height) / 2
              End If
 25
          End Sub Private Sub Form_Paint()

30           If WindowState = 0 Then
                  Move (Screen.Width - frmtoolhome.Width) / 2, (Screen.Height - frmtoolhome.Height) / 2
              End If 35       End Sub Private Sub Form_Resize()

If WindowState = 0 Then
 40               Move (Screen.Width - frmtoolhome.Width) / 2, (Screen.Height - frmtoolhome.Height) / 2
              End If End Sub
 45
          VERSION 4.00
          Begin VB.Form frmTrepan
             BorderStyle   = 3 'Fixed Dialog
             Caption       = "Trepan"
 50          ClientHeight  = 4140
             ClientLeft    = 2205
             ClientTop     = 1830
             ClientWidth   = 4305
             BeginProperty Font
 55             name         = "MS Sans Serif"
                charset      = 1
                weight       = 700
                size         = 8.25
                underline    = 0 'False
 60             italic       = 0 'False
                strikethrough = 0 'False
             EndProperty
             ForeColor     = &H80000008&
             Height        = 4605
 65          icon          = "FRMTREPA.frx":0000
             Left          = 2145
             LinkTopic     = "Form2"
             LockControls  = -1 'True
             ScaleHeight   = 4140
 70          ScaleWidth    = 4305
             Top           = 1425
             Width         = 4425
             Begin VB.CommandButton Command1
                Caption    = "&Cancel"
```

```
BeginProperty Font
    name        =   "MS Sans Serif"
    charset     =   1
    weight      =   400
    size        =   8.25
    underline   =   0   'False
    italic      =   0   'False
    strikethrough = 0   'False
EndProperty
Height      =   375
Left        =   2520
TabIndex    =   8
Top         =   3555
Width       =   1095
End
Begin VB.CommandButton Command2
    Caption     =   "&Write"
    BeginProperty Font
        name        =   "MS Sans Serif"
        charset     =   1
        weight      =   400
        size        =   8.25
        underline   =   0   'False
        italic      =   0   'False
        strikethrough = 0   'False
    EndProperty
    Height      =   375
    Left        =   1125
    TabIndex    =   7
    Top         =   3555
    Width       =   975
End
Begin VB.TextBox TEXT8
    BackColor   =   &H00FFFFFF&
    Height      =   285
    Left        =   2400
    MaxLength   =   20
    TabIndex    =   4
    Top         =   2040
    Width       =   855
End
Begin VB.TextBox Text10
    BackColor   =   &H00FFFFFF&
    Height      =   285
    Left        =   2400
    MaxLength   =   20
    TabIndex    =   6
    Top         =   3000
    Width       =   855
End
Begin VB.TextBox Text9
    BackColor   =   &H00FFFFFF&
    Height      =   285
    Left        =   2400
    MaxLength   =   20
    TabIndex    =   5
    Top         =   2520
    Width       =   855
End
Begin VB.TextBox Text5
    BackColor   =   &H00FFFFFF&
    Height      =   285
    Left        =   2400
    MaxLength   =   20
    TabIndex    =   1
    Top         =   600
    Width       =   855
End
Begin VB.TextBox Text4
    BackColor   =   &H00FFFFFF&
    Height      =   285
    Left        =   2400
    MaxLength   =   20
    TabIndex    =   0
```

```
        Top             =  120
        Width           =  855
     End
     Begin VB.TextBox Text7
        BackColor       =  &H00FFFFFF&
        Height          =  285
        Left            =  2400
        MaxLength       =  20
        TabIndex        =  3
        Top             =  1560
        Width           =  855
     End
     Begin VB.TextBox Text6
        BackColor       =  &H00FFFFFF&
        Height          =  285
        Left            =  2400
        MaxLength       =  20
        TabIndex        =  2
        Top             =  1080
        Width           =  855
     End
     Begin VB.Label Label8
        Alignment       =  1  'Right Justify
        Caption         =  "Fillet radius"
        BeginProperty Font
           name         =  "MS Sans Serif"
           charset      =  1
           weight       =  400
           size         =  8.25
           underline    =  0  'False
           italic       =  0  'False
           strikethrough =  0  'False
        EndProperty
        Height          =  255
        Left            =  840
        TabIndex        =  15
        Top             =  2160
        Width           =  1455
     End
     Begin VB.Label Label10
        Alignment       =  1  'Right Justify
        Caption         =  "Tool nose radius"
        BeginProperty Font
           name         =  "MS Sans Serif"
           charset      =  1
           weight       =  400
           size         =  8.25
           underline    =  0  'False
           italic       =  0  'False
           strikethrough =  0  'False
        EndProperty
        Height          =  255
        Left            =  720
        TabIndex        =  11
        Top             =  3120
        Width           =  1575
     End
     Begin VB.Label Label9
        Alignment       =  1  'Right Justify
        Caption         =  "Tool Width"
        BeginProperty Font
           name         =  "MS Sans Serif"
           charset      =  1
           weight       =  400
           size         =  8.25
           underline    =  0  'False
           italic       =  0  'False
           strikethrough =  0  'False
        EndProperty
        Height          =  255
        Left            =  1080
        TabIndex        =  14
        Top             =  2640
        Width           =  1215
```

```
        End
     Begin VB.Label Label5
        Alignment       =   1  'Right Justify
        Caption         =   "Small Trepan Diameter"
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   120
        TabIndex        =   13
        Top             =   720
        Width           =   2175
     End
     Begin VB.Label Label4
        Alignment       =   1  'Right Justify
        Caption         =   "Large Trepan Diameter"
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   240
        TabIndex        =   12
        Top             =   240
        Width           =   2055
     End
     Begin VB.Label Label7
        Alignment       =   1  'Right Justify
        Caption         =   "Radius' on face"
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   720
        TabIndex        =   10
        Top             =   1680
        Width           =   1575
     End
     Begin VB.Label Label6
        Alignment       =   1  'Right Justify
        Caption         =   "Finish depth in ""Z"""
        BeginProperty Font
           name         =   "MS Sans Serif"
           charset      =   1
           weight       =   400
           size         =   8.25
           underline    =   0   'False
           italic       =   0   'False
           strikethrough =  0   'False
        EndProperty
        Height          =   255
        Left            =   600
        TabIndex        =   9
        Top             =   1200
        Width           =   1695
     End
  End
```

```
Attribute VB_Name = "frmTrepan"
Attribute VB_Creatable = False
Attribute VB_Exposed = False Private Sub Command1_Click()
frmTrepan.Visible = False
frmMDI.ActiveForm.ActiveControl.SetFocus ' RETURNS THE CURSER TO THE SCREEN
End Sub Private Sub Command2_Click()

Screen.MousePointer = 11

If TEXT4.Text = "" Then
MsgBox "Fill in all the blanks.", 48, "Trepan"
GoTo 690
End If If TEXT5.Text = "" Then
MsgBox "Fill in all the blanks.", 48, "Trepan"
GoTo 690
End If If text6.Visible = True And text6.Text = "" Then
MsgBox "Fill in all the blanks.", 48, "Trepan"
GoTo 690
End If If text7.Visible = True And text7.Text = "" Then
MsgBox "Fill in all the blanks.", 48, "Trepan"
GoTo 690
End If If TEXT8.Visible = True And TEXT8.Text = "" Then
MsgBox "Fill in all the blanks.", 48, "Trepan"
GoTo 690
End If If text9.Visible = True And text9.Text = "" Then
MsgBox "Fill in all the blanks.", 48, "Trepan"
GoTo 690
End If If text10.Visible = True And text10.Text = "" Then
MsgBox "Fill in all the blanks.", 48, "Trepan"
GoTo 690
End If If TEXT8.Visible = True Then
    If ((text10.Text * 2) / 2) > ((TEXT8.Text * 2) / 2) Then
    MsgBox "The Tool Nose Radius is larger" & Chr(13) + Chr(10) & "than the fillet radius !", 48, "Trepan Alert !"
    GoTo 690
    End If
End If Dim TEXT1 As Double ' Used for "Z0.0500"
Dim TEXT14 As Double ' Used for feed rates
Dim text13 As Double ' Used for feed rates
Dim TEXT3 As Double   ' Used for feed rates
Dim TEXT2 As Double   ' Used for feed rates
TEXT1 = 0.05
TEXT14 = 0.025
text13 = 0.0075
TEXT3 = 0.0013
TEXT2 = 0.0025

Dim fillet
If TEXT8.Visible = True Then fillet = 1
If TEXT8.Visible = False Then fillet = 2

DIA1 = ((TEXT4.Text * 2) / 2)
DIA2 = ((TEXT5.Text * 2) / 2)
ZEND = ((text6.Text * 2) / 2)
```

```
R1 = ((text7.Text * 2) / 2)
R2 = ((TEXT8.Text * 2) / 2)
TWIDTH = ((text9.Text * 2) / 2)
TNR = ((text10.Text * 2) / 2)

R = R1 + TNR
RR = R2 - TNR
X1 = (DIA1 + DIA2) / 2
X2 = TWIDTH / 2
X3 = DIA1 + (R * 2)
X4 = X3 - (TWIDTH * 2)
X5 = DIA1 - (TWIDTH * 2)
X6 = DIA2 - (R * 2)
XPOS = X1 - TWIDTH
L1 = ZSTART - 0.025 frmTrepan.Visible = False

Screen.MousePointer = 11

Clipboard.SetText Rapid & XCode & Format(XPOS, formats) & " Z" & Format(TEXT1, formats) & Chr(13) & Chr(10)
editpasteproc
Clipboard.SetText Feed & "Z" & Format(TEXT14, formats) & " F" & Format(text13, formats) & Chr(13) & Chr(10)
editpasteproc
Clipboard.SetText "Z-" & Format(ZEND, formats) & " F" & Format(TEXT3, formats) & Chr(13) & Chr(10)
editpasteproc
Clipboard.SetText Rapid & "Z" & Format(TEXT14, formats) & Chr(13) & Chr(10)
editpasteproc
Clipboard.SetText XCode & Format(X4, formats) & Chr(13) & Chr(10)
editpasteproc
Clipboard.SetText Feed & "Z0" & " F" & Format(TEXT2, formats) & Chr(13) & Chr(10)
editpasteproc
Clipboard.SetText G_Code_Radius & XCode & Format(X5, formats) & " " & Rad_Z & "-" & Format(R, formats) & " F" & Format(TEXT3, formats) & Chr(13) & Chr(10)
editpasteproc If fillet = 1 Then
Clipboard.SetText G_Code_Radius
editpasteproc
End If Clipboard.SetText "Z-" & Format(ZEND, formats)
editpasteproc If fillet = 2 Then
Clipboard.SetText Chr(13) & Chr(10)
editpasteproc
End If If fillet = 1 Then
    Clipboard.SetText " " & Rad_X
    editpasteproc
      If Not XCode = "X-" Then      ' If "X+" then put a minus sign.
      Clipboard.SetText "-"
      editpasteproc
      End If
    Clipboard.SetText Format(RR, formats) & Chr(13) & Chr(10)
    editpasteproc
End If Clipboard.SetText XCode & Format(XPOS, formats) & Chr(13) & Chr(10)
editpasteproc
Clipboard.SetText Rapid & "Z" & Format(TEXT1, formats) & Chr(13) & Chr(10)
editpasteproc
Clipboard.SetText XCode & Format(X6, formats) & Chr(13) & Chr(10)
editpasteproc
Clipboard.SetText Feed & "Z0" & " F" & Format(TEXT2, formats) & Chr(13) & Chr(10)
editpasteproc
Clipboard.SetText G_Code_Radius & XCode & Format(DIA2, formats) & " " & Rad_Z & "-" & Format(R, formats) & " F" & Format(TEXT3, formats) & Chr(13) & Chr(10)
editpasteproc If fillet = 1 Then
Clipboard.SetText G_Code_Radius
```

```
    editpasteproc
    End If

Clipboard.SetText "Z-" & Format(ZEND, formats)
5   editpasteproc

If fillet = 2 Then
      Clipboard.SetText Chr(13) & Chr(10)
      editpasteproc
10  End If If fillet = 1 Then
      Clipboard.SetText " " & Rad_X
      editpasteproc
15      If XCode = "X-" Then     ' If "X-" then put a minus sign.
          Clipboard.SetText "-"
          editpasteproc
        End If
      Clipboard.SetText Format(RR, formats) & Chr(13) & Chr(10)
20    editpasteproc
    End If Clipboard.SetText XCode & Format(XPOS, formats) & Chr(13) & Chr(10)
    editpasteproc
25  Clipboard.SetText Rapid & "Z" & Format(TEXT1, formats) & Chr(13) & Chr(10)
    editpasteproc Screen.MousePointer = 0

30  frmTrepan.Visible = False 691
    frmTrepan.Visible = False 35  690

Screen.MousePointer = 0 frmMDI.ActiveForm.ActiveControl.SetFocus ' RETURNS THE CURSER TO THE SCREEN
40
    End Sub Private Sub Form_Deactivate()
    Visible = False
45  frmMDI.ActiveForm.ActiveControl.SetFocus ' RETURNS THE CURSER TO THE SCREEN
    End Sub Private Sub Form_Load()

50    If WindowState = 0 Then
        Move (Screen.Width - frmTrepan.Width) / 2, (Screen.Height - frmTrepan.Height) / 2
      End If End Sub
55
    Private Sub Form_Paint()

If WindowState = 0 Then
        Move (Screen.Width - frmTrepan.Width) / 2, (Screen.Height - frmTrepan.Height) / 2
60    End If End Sub Private Sub Form_Resize()
65
      If WindowState = 0 Then
        Move (Screen.Width - frmTrepan.Width) / 2, (Screen.Height - frmTrepan.Height) / 2
      End If 70  End Sub Private Sub Option1_Click()
    text11.Visible = False
    Label11.Visible = False
```

```
        text12.Visible = False
        Label12.Visible = False
        End Sub 5      Private Sub option2_Click()
        text11.Visible = True
        Label11.Visible = True
        text12.Visible = True
        Label12.Visible = True
10      MsgBox "No roughing cycle yet !", 48, "Rough Trepan Cycle"
        option2 = False
        Option1 = True
        End Sub 15      Private Sub Label8_DblClick()

If TEXT8.Visible = True Then
                Label8.Caption = "No fillet radius"
                TEXT8.Visible = False
20              Exit Sub
            End If If TEXT8.Visible = False Then
                Label8.Caption = "Fillet radius"
25              TEXT8.Visible = True
                Exit Sub
            End If End Sub
30
        Private Sub Text10_KeyPress(KeyAscii As Integer)

If KeyAscii = (13) Then
35              SendKeys ("{tab}"), True
            End If Const DECIMAL_OK = -1       ' 0 = no, -1 = YES
            Const MIN_VALUE = -999      ' Minimum value
40          Const MAX_VALUE = 999       ' Maximum value
            key$ = Chr$(KeyAscii)       ' Convert to string
            Select Case key$
                Case "0" To "9"         ' Numbers and minus signs
                    Newvalue = Val(Left$(text10.Text, text10.SelStart) + key$ + Mid$(text10.Text, text10.SelStart + text10.SelLength + 1))
45                  If Newvalue > MAX_VALUE Or Newvalue < MIN_VALUE Then
                        KeyAscii = 0
                    End If
                Case "."
                    If DECIMAL_OK = 0 Or InStr(text10.Text, ".") Then
50                      KeyAscii = 0
                    End If
                Case Chr$(8)            ' Backspace
                Case Else
                    KeyAscii = 0
55          End Select
            If key$ = "-" And (InStr(text10.Text, "-") Or text10.SelStart <> 0) Then
                KeyAscii = 0
            End If 60      End Sub Private Sub Text11_KeyPress(KeyAscii As Integer)

If KeyAscii = (13) Then
65              SendKeys ("{tab}"), True
            End If Const DECIMAL_OK = -1       ' 0 = no, -1 = YES
            Const MIN_VALUE = -999      ' Minimum value
70          Const MAX_VALUE = 999       ' Maximum value
            key$ = Chr$(KeyAscii)       ' Convert to string
            Select Case key$
                Case "0" To "9"         ' Numbers and minus signs
                    Newvalue = Val(Left$(text11.Text, text11.SelStart) + key$ + Mid$(text11.Text, text11.SelStart + text11.SelLength + 1))
```

```
            If Newvalue > MAX_VALUE Or Newvalue < MIN_VALUE Then
                KeyAscii = 0
            End If
        Case "."
5           If DECIMAL_OK = 0 Or InStr(text11.Text, ".") Then
                KeyAscii = 0
            End If
        Case Chr$(8)            ' Backspace
        Case Else
10          KeyAscii = 0
        End Select
        If key$ = "-" And (InStr(text11.Text, "-") Or text11.SelStart <> 0) Then
            KeyAscii = 0
        End If
15
End Sub Private Sub Text12_KeyPress(KeyAscii As Integer)

20      If KeyAscii = (13) Then
            SendKeys ("{tab}"), True
        End If Const DECIMAL_OK = -1       ' 0 = no, -1 = YES
25      Const MIN_VALUE = -999      ' Minimum value
        Const MAX_VALUE = 999       ' Maximum value
        key$ = Chr$(KeyAscii)       ' Convert to string
        Select Case key$
        Case "0" To "9"             ' Numbers and minus signs
30          Newvalue = Val(Left$(text12.Text, text12.SelStart) + key$ + Mid$(text12.Text, text12.SelStart + text12.SelLength + 1))
            If Newvalue > MAX_VALUE Or Newvalue < MIN_VALUE Then
                KeyAscii = 0
            End If
        Case "."
35          If DECIMAL_OK = 0 Or InStr(text12.Text, ".") Then
                KeyAscii = 0
            End If
        Case Chr$(8)            ' Backspace
        Case Else
40          KeyAscii = 0
        End Select
        If key$ = "-" And (InStr(text12.Text, "-") Or text12.SelStart <> 0) Then
            KeyAscii = 0
        End If
45
End Sub Private Sub Text4_KeyPress(KeyAscii As Integer)

50      If KeyAscii = (13) Then
            SendKeys ("{tab}"), True
        End If Const DECIMAL_OK = -1       ' 0 = no, -1 = YES
55      Const MIN_VALUE = -999      ' Minimum value
        Const MAX_VALUE = 999       ' Maximum value
        key$ = Chr$(KeyAscii)       ' Convert to string
        Select Case key$
        Case "0" To "9"             ' Numbers and minus signs
60          Newvalue = Val(Left$(TEXT4.Text, TEXT4.SelStart) + key$ + Mid$(TEXT4.Text, TEXT4.SelStart + TEXT4.SelLength + 1))
            If Newvalue > MAX_VALUE Or Newvalue < MIN_VALUE Then
                KeyAscii = 0
            End If
        Case "."
65          If DECIMAL_OK = 0 Or InStr(TEXT4.Text, ".") Then
                KeyAscii = 0
            End If
        Case Chr$(8)            ' Backspace
        Case Else
70          KeyAscii = 0
        End Select
        If key$ = "-" And (InStr(TEXT4.Text, "-") Or TEXT4.SelStart <> 0) Then
            KeyAscii = 0
        End If
```

```
End Sub

Private Sub Text5_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(TEXT5.Text, TEXT5.SelStart) + key$ + Mid$(TEXT5.Text, TEXT5.SelStart + TEXT5.SelLength + 1))
            If Newvalue > MAX_VALUE Or Newvalue < MIN_VALUE Then
                KeyAscii = 0
            End If
        Case "."
            If DECIMAL_OK = 0 Or InStr(TEXT5.Text, ".") Then
                KeyAscii = 0
            End If
        Case Chr$(8)             ' Backspace
        Case Else
            KeyAscii = 0
    End Select
    If key$ = "-" And (InStr(TEXT5.Text, "-") Or TEXT5.SelStart <> 0) Then
        KeyAscii = 0
    End If End Sub Private Sub Text6_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
            Newvalue = Val(Left$(text6.Text, text6.SelStart) + key$ + Mid$(text6.Text, text6.SelStart + text6.SelLength + 1))
            If Newvalue > MAX_VALUE Or Newvalue < MIN_VALUE Then
                KeyAscii = 0
            End If
        Case "."
            If DECIMAL_OK = 0 Or InStr(text6.Text, ".") Then
                KeyAscii = 0
            End If
        Case Chr$(8)             ' Backspace
        Case Else
            KeyAscii = 0
    End Select
    If key$ = "-" And (InStr(text6.Text, "-") Or text6.SelStart <> 0) Then
        KeyAscii = 0
    End If End Sub Private Sub Text7_KeyPress(KeyAscii As Integer)

If KeyAscii = (13) Then
        SendKeys ("{tab}"), True
    End If

Const DECIMAL_OK = -1        ' 0 = no, -1 = YES
    Const MIN_VALUE = -999       ' Minimum value
    Const MAX_VALUE = 999        ' Maximum value
    key$ = Chr$(KeyAscii)        ' Convert to string
    Select Case key$
        Case "0" To "9"          ' Numbers and minus signs
```

```
        Newvalue = Val(Left$(text7.Text, text7.SelStart) + key$ + Mid$(text7.Text, text7.SelStart + text7.SelLength + 1))
        If Newvalue > MAX_VALUE Or Newvalue < MIN_VALUE Then
            KeyAscii = 0
        End If
    Case "."
        If DECIMAL_OK = 0 Or InStr(text7.Text, ".") Then
            KeyAscii = 0
        End If
    Case Chr$(8)            ' Backspace
    Case Else
        KeyAscii = 0
End Select
If key$ = "-" And (InStr(text7.Text, "-") Or text7.SelStart <> 0) Then
    KeyAscii = 0
End If End Sub Private Sub Text8_KeyPress(KeyAscii As Integer)

If KeyAscii = (13) Then
SendKeys ("{tab}"), True
End If

Const DECIMAL_OK = -1        ' 0 = no, -1 = YES
Const MIN_VALUE = -999       ' Minimum value
Const MAX_VALUE = 999        ' Maximum value
    key$ = Chr$(KeyAscii)    ' Convert to string
    Select Case key$
    Case "0" To "9"          ' Numbers and minus signs
        Newvalue = Val(Left$(TEXT8.Text, TEXT8.SelStart) + key$ + Mid$(TEXT8.Text, TEXT8.SelStart + TEXT8.SelLength + 1))
        If Newvalue > MAX_VALUE Or Newvalue < MIN_VALUE Then
            KeyAscii = 0
        End If
    Case "."
        If DECIMAL_OK = 0 Or InStr(TEXT8.Text, ".") Then
            KeyAscii = 0
        End If
    Case Chr$(8)            ' Backspace
    Case Else
        KeyAscii = 0
End Select
If key$ = "-" And (InStr(TEXT8.Text, "-") Or TEXT8.SelStart <> 0) Then
    KeyAscii = 0
End If End Sub Private Sub Text9_KeyPress(KeyAscii As Integer)

If KeyAscii = (13) Then
SendKeys ("{tab}"), True
End If

Const DECIMAL_OK = -1        ' 0 = no, -1 = YES
Const MIN_VALUE = -999       ' Minimum value
Const MAX_VALUE = 999        ' Maximum value
    key$ = Chr$(KeyAscii)    ' Convert to string
    Select Case key$
    Case "0" To "9"          ' Numbers and minus signs
        Newvalue = Val(Left$(text9.Text, text9.SelStart) + key$ + Mid$(text9.Text, text9.SelStart + text9.SelLength + 1))
        If Newvalue > MAX_VALUE Or Newvalue < MIN_VALUE Then
            KeyAscii = 0
        End If
    Case "."
        If DECIMAL_OK = 0 Or InStr(text9.Text, ".") Then
            KeyAscii = 0
        End If
    Case Chr$(8)            ' Backspace
    Case Else
        KeyAscii = 0
End Select
If key$ = "-" And (InStr(text9.Text, "-") Or text9.SelStart <> 0) Then
    KeyAscii = 0
```

```
        End If

End Sub

VERSION 4.00
Begin VB.Form frmidch
    BorderStyle     =   3  'Fixed Dialog
    Caption         =   "Chamfer Back Of I.D. Only"
    ClientHeight    =   4125
    ClientLeft      =   1725
    ClientTop       =   1575
    ClientWidth     =   4440
    BeginProperty Font
        name            =   "MS Sans Serif"
        charset         =   1
        weight          =   700
        size            =   8.25
        underline       =   0   'False
        italic          =   0   'False
        strikethrough   =   0   'False
    EndProperty
    ForeColor       =   &H80000008&
    Height          =   4650
    Icon            =   "IDCHAMFR.frx":0000
    Left            =   1605
    LinkTopic       =   "Form2"
    LockControls    =   -1  'True
    MaxButton       =   0   'False
    MinButton       =   0   'False
    ScaleHeight     =   4125
    ScaleWidth      =   4440
    ShowInTaskbar   =   0   'False
    Top             =   1170
    Width           =   4680
    Begin VB.TextBox Text10
        BackColor       =   &H00FFFFFF&
        Height          =   285
        Left            =   2520
        MaxLength       =   20
        TabIndex        =   2
        Top             =   1080
        Width           =   855
    End
    Begin VB.TextBox Text9
        BackColor       =   &H00FFFFFF&
        Height          =   285
        Left            =   2520
        MaxLength       =   50
        TabIndex        =   3
        Top             =   1560
        Width           =   855
    End
    Begin VB.TextBox Text8
        BackColor       =   &H00FFFFFF&
        Height          =   285
        Left            =   2520
        MaxLength       =   20
        TabIndex        =   4
        Top             =   2040
        Width           =   855
    End
    Begin VB.TextBox Text7
        BackColor       =   &H00FFFFFF&
        Height          =   285
        Left            =   2520
        MaxLength       =   20
        TabIndex        =   5
        Top             =   2520
        Width           =   855
    End
    Begin VB.TextBox Text6
        BackColor       =   &H00FFFFFF&
        Height          =   285
        Left            =   2520
```

```
            MaxLength  =  20
            TabIndex   =  6
            Top        =  3000
            Width      =  855
         End
         Begin VB.CommandButton Command1
            Caption    =  "&Cancel"
            BeginProperty Font
               name          =  "MS Sans Serif"
               charset       =  1
               weight        =  400
               size          =  8.25
               underline     =  0   'False
               italic        =  0   'False
               strikethrough =  0   'False
            EndProperty
            Height     =  375
            Left       =  2640
            TabIndex   =  8
            Top        =  3600
            Width      =  1095
         End
         Begin VB.CommandButton Command2
            Caption    =  "&Write"
            BeginProperty Font
               name          =  "MS Sans Serif"
               charset       =  1
               weight        =  400
               size          =  8.25
               underline     =  0   'False
               italic        =  0   'False
               strikethrough =  0   'False
            EndProperty
            Height     =  375
            Left       =  1200
            TabIndex   =  7
            Top        =  3600
            Width      =  1095
         End
         Begin VB.TextBox Text4
            BackColor  =  &H00FFFFFF&
            Height     =  285
            Left       =  2520
            MaxLength  =  20
            TabIndex   =  0
            Top        =  120
            Width      =  855
         End
         Begin VB.TextBox Text5
            BackColor  =  &H00FFFFFF&
            Height     =  285
            Left       =  2520
            MaxLength  =  20
            TabIndex   =  1
            Top        =  600
            Width      =  855
         End
         Begin VB.Label Label2
            Alignment  =  1   'Right Justify
            Caption    =  "Feed Rate On Radius"
            BeginProperty Font
               name          =  "MS Sans Serif"
               charset       =  1
               weight        =  400
               size          =  8.25
               underline     =  0   'False
               italic        =  0   'False
               strikethrough =  0   'False
            EndProperty
            Height     =  255
            Left       =  120
            TabIndex   =  17
            Top        =  3120
            Visible    =  0   'False
```

```
            Width           = 2295
         End
         Begin VB.Label Label1
            Alignment       = 1  'Right Justify
            Caption         = "What Size Radius"
            BeginProperty Font
               name         = "MS Sans Serif"
               charset      = 1
               weight       = 400
               size         = 8.25
               underline    = 0  'False
               italic       = 0  'False
               strikethrough = 0  'False
            EndProperty
            Height          = 255
            Left            = 480
            TabIndex        = 16
            Top             = 1200
            Visible         = 0  'False
            Width           = 1935
         End
         Begin VB.Label Label10
            Alignment       = 1  'Right Justify
            Caption         = "What Size Chamfer"
            BeginProperty Font
               name         = "MS Sans Serif"
               charset      = 1
               weight       = 400
               size         = 8.25
               underline    = 0  'False
               italic       = 0  'False
               strikethrough = 0  'False
            EndProperty
            Height          = 255
            Left            = 600
            TabIndex        = 11
            Top             = 1200
            Width           = 1815
         End
         Begin VB.Label Label9
            Alignment       = 1  'Right Justify
            Caption         = "Tool Width"
            BeginProperty Font
               name         = "MS Sans Serif"
               charset      = 1
               weight       = 400
               size         = 8.25
               underline    = 0  'False
               italic       = 0  'False
               strikethrough = 0  'False
            EndProperty
            Height          = 255
            Left            = 600
            TabIndex        = 12
            Top             = 1680
            Width           = 1815
         End
         Begin VB.Label Label8
            Alignment       = 1  'Right Justify
            Caption         = "Tool Nose Radius"
            BeginProperty Font
               name         = "MS Sans Serif"
               charset      = 1
               weight       = 400
               size         = 8.25
               underline    = 0  'False
               italic       = 0  'False
               strikethrough = 0  'False
            EndProperty
            Height          = 255
            Left            = 600
            TabIndex        = 13
            Top             = 2160
            Width           = 1815
```

```
      End
      Begin VB.Label Label7
         Alignment       =   1  'Right Justify
         Caption         =   "Feed Rate On Plunge Cut"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   255
         Left            =   120
         TabIndex        =   15
         Top             =   2640
         Width           =   2295
      End
      Begin VB.Label Label6
         Alignment       =   1  'Right Justify
         Caption         =   "Feed Rate On Chamfer"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   255
         Left            =   240
         TabIndex        =   14
         Top             =   3120
         Width           =   2175
      End
      Begin VB.Label Label4
         Alignment       =   1  'Right Justify
         Caption         =   "I.D. To Chamfer"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   255
         Left            =   600
         TabIndex        =   10
         Top             =   240
         Width           =   1815
      End
      Begin VB.Label Label5
         Alignment       =   1  'Right Justify
         Caption         =   "Length Of Part"
         BeginProperty Font
            name            =   "MS Sans Serif"
            charset         =   1
            weight          =   400
            size            =   8.25
            underline       =   0   'False
            italic          =   0   'False
            strikethrough   =   0   'False
         EndProperty
         Height          =   255
         Left            =   240
         TabIndex        =   9
         Top             =   720
         Width           =   2175
      End
   End
```

```
Attribute VB_Name = "frmidch"
Attribute VB_Creatable = False
Attribute VB_Exposed = False
Private Sub Command1_Click()
frmidch.Visible = False
frmMDI.ActiveForm.ActiveControl.SetFocus ' RETURNS THE CURSER TO THE SCREEN
End Sub Private Sub Command2_Click()

Screen.MousePointer = 11

If text4.Text = "" Then
MsgBox "Fill in all the blanks.", 48, "I.D. Back Chamfer"
GoTo 755
End If If TEXT5.Text = "" Then
MsgBox "Fill in all the blanks.", 48, "I.D. Back Chamfer"
GoTo 755
End If If text6.Visible = True And text6.Text = "" Then
MsgBox "Fill in all the blanks.", 48, "I.D. Back Chamfer"
GoTo 755
End If If text7.Visible = True And text7.Text = "" Then
MsgBox "Fill in all the blanks.", 48, "I.D. Back Chamfer"
GoTo 755
End If If TEXT8.Visible = True And TEXT8.Text = "" Then
MsgBox "Fill in all the blanks.", 48, "I.D. Back Chamfer"
GoTo 755
End If If text9.Visible = True And text9.Text = "" Then
MsgBox "Fill in all the blanks.", 48, "I.D. Back Chamfer"
GoTo 755
End If If text10.Text = "" Then
MsgBox "Fill in all the blanks.", 48, "I.D. Back Chamfer"
GoTo 755
End If Dim TEXT1 As Double ' Used for "Z0.0500"
Dim TEXT2 As Double ' Used for feed rates
Dim TEXT3 As Double   ' Used for feed rates
TEXT1 = 0.05
TEXT2 = 0.01
TEXT3 = 0.0025 iD = ((text4.Text * 2) / 2)
loa = ((TEXT5.Text * 2) / 2)
chamfer = ((text10.Text * 2) / 2)
TWIDTH = ((text9.Text * 2) / 2)
TNR = ((TEXT8.Text * 2) / 2)
plungefeed = ((text7.Text * 2) / 2)
chamferfeed = ((text6.Text * 2) / 2)
XPOS = iD - 0.1
Comp = TNR * 0.53

If Label4.Caption = "I.D. To Radius" Then
Comp = TNR * 1
End If
```

```
I = chamfer + Comp
L1 = loa + TWIDTH
L2 = L1 + 0.005
L3 = (L1 - I) - 0.0011
IDCLEAR = iD - 0.025
IDRELIEF = iD + (I * 2)

frmidch.Visible = False

Screen.MousePointer = 11

Clipboard.SetText Rapid & XCode & Format(XPOS, formats) & " Z" & Format(TEXT1, formats) & Chr(13) & Chr(10)
editpasteproc
Clipboard.SetText "Z-" & Format(L2, formats) & Chr(13) & Chr(10)
editpasteproc
Clipboard.SetText Feed & XCode & Format(iDCLEAR, formats) & " F" & Format(TEXT2, formats) & Chr(13) & Chr(10)
editpasteproc
Clipboard.SetText XCode & Format(iDRELIEF, formats) & " F" & Format(plungefeed, formats) & Chr(13) & Chr(10)
editpasteproc
Clipboard.SetText Rapid & XCode & Format(iDCLEAR, formats) & Chr(13) & Chr(10)
editpasteproc
Clipboard.SetText "Z-" & Format(L3, formats) & Chr(13) & Chr(10)
editpasteproc
Clipboard.SetText Feed & XCode & Format(iD, formats) & " F" & Format(TEXT3, formats) & Chr(13) & Chr(10)
editpasteproc If Label4.Caption = "I.D. To Radius" Then
Clipboard.SetText G_Code_Radius
editpasteproc
End If If Label4.Caption = "I.D. To Chamfer" Then
Clipboard.SetText G_Code_Chamfer
editpasteproc
End If Clipboard.SetText "Z-" & Format(L1, formats)
editpasteproc If Label4.Caption = "I.D. To Radius" Then
Clipboard.SetText " " & Rad_X
editpasteproc
End If If Label4.Caption = "I.D. To Chamfer" Then
Clipboard.SetText " " & Chamfer_X
editpasteproc
End If If XCode = "X-" Then    'L- or I-... if X- !
Clipboard.SetText "-"
editpasteproc
End If Clipboard.SetText Format(I, formats) & " F" & Format(chamferfeed, formats) & Chr(13) & Chr(10)
editpasteproc
Clipboard.SetText Rapid & XCode & Format(XPOS, formats) & Chr(13) & Chr(10)
editpasteproc
Clipboard.SetText "Z" & Format(TEXT1, formats) & Chr(13) & Chr(10)
editpasteproc Screen.MousePointer = 0 frmidch.Visible = False

GoTo 755

756
755

Screen.MousePointer = 0 frmMDI.ActiveForm.ActiveControl.SetFocus ' RETURNS THE CURSER TO THE SCREEN
```

```
End Sub

Private Sub Form_Deactivate()
Visible = False
frmMDI.ActiveForm.ActiveControl.SetFocus ' RETURNS THE CURSER TO THE SCREEN
End Sub Private Sub Form_Load()

If WindowState = 0 Then
        Move (Screen.Width - frmidch.Width) / 2, (Screen.Height - frmidch.Height) / 2
    End If End Sub Private Sub Form_Paint()

If WindowState = 0 Then
        Move (Screen.Width - frmidch.Width) / 2, (Screen.Height - frmidch.Height) / 2
    End If End Sub Private Sub Form_Resize()

If WindowState = 0 Then
        Move (Screen.Width - frmidch.Width) / 2, (Screen.Height - frmidch.Height) / 2
    End If End Sub Private Sub label1_DblClick()
label1.Visible = False
Label10.Visible = True
label2.Visible = False
Label6.Visible = True
Label4.Caption = "I.D. To Chamfer"
End Sub Private Sub Label10_DblClick()
Label10.Visible = False
label1.Visible = True
Label6.Visible = False
label2.Visible = True
Label4.Caption = "I.D. To Radius"
End Sub Private Sub Text10_KeyPress(KeyAscii As Integer)
    If KeyAscii = (13) Then
        SendKeys ("{TAB}"), True
    End If Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
        Case "0" To "9"         ' Numbers and minus signs
            Newvalue = Val(Left$(text10.Text, text10.SelStart) + key$ + Mid$(text10.Text, text10.SelStart + text10.SelLength + 1))
            If Newvalue > MAX_VALUE Or Newvalue < MIN_VALUE Then
                KeyAscii = 0
            End If
        Case "."
            If DECIMAL_OK = 0 Or InStr(text10.Text, ".") Then
                KeyAscii = 0
            End If
        Case Chr$(8)            ' Backspace
        Case Else
            KeyAscii = 0
    End Select
    If key$ = "-" And (InStr(text10.Text, "-") Or text10.SelStart <> 0) Then
        KeyAscii = 0
```

```
        End If

End Sub

5      Private Sub Text4_KeyPress(KeyAscii As Integer)
            If KeyAscii = (13) Then
                SendKeys ("{TAB}"), True
            End If 10          Const DECIMAL_OK = -1       ' 0 = no, -1 = YES
            Const MIN_VALUE = -999      ' Minimum value
            Const MAX_VALUE = 999       ' Maximum value
            key$ = Chr$(KeyAscii)       ' Convert to string
            Select Case key$
15              Case "0" To "9"         ' Numbers and minus signs
                    Newvalue = Val(Left$(text4.Text, text4.SelStart) + key$ + Mid$(text4.Text, text4.SelStart + text4.SelLength + 1))
                    If Newvalue > MAX_VALUE Or Newvalue < MIN_VALUE Then
                        KeyAscii = 0
                    End If
20              Case "."
                    If DECIMAL_OK = 0 Or InStr(text4.Text, ".") Then
                        KeyAscii = 0
                    End If
                Case Chr$(8)            ' Backspace
25              Case Else
                    KeyAscii = 0
            End Select
            If key$ = "-" And (InStr(text4.Text, "-") Or text4.SelStart <> 0) Then
                KeyAscii = 0
30          End If End Sub Private Sub Text5_KeyPress(KeyAscii As Integer)
35          If KeyAscii = (13) Then
                SendKeys ("{TAB}"), True
            End If Const DECIMAL_OK = -1       ' 0 = no, -1 = YES
40          Const MIN_VALUE = -999      ' Minimum value
            Const MAX_VALUE = 999       ' Maximum value
            key$ = Chr$(KeyAscii)       ' Convert to string
            Select Case key$
                Case "0" To "9"         ' Numbers and minus signs
45                  Newvalue = Val(Left$(TEXT5.Text, TEXT5.SelStart) + key$ + Mid$(TEXT5.Text, TEXT5.SelStart + TEXT5.SelLength + 1))
                    If Newvalue > MAX_VALUE Or Newvalue < MIN_VALUE Then
                        KeyAscii = 0
                    End If
                Case "."
50                  If DECIMAL_OK = 0 Or InStr(TEXT5.Text, ".") Then
                        KeyAscii = 0
                    End If
                Case Chr$(8)            ' Backspace
                Case Else
55                  KeyAscii = 0
            End Select
            If key$ = "-" And (InStr(TEXT5.Text, "-") Or TEXT5.SelStart <> 0) Then
                KeyAscii = 0
            End If
60
        End Sub Private Sub Text6_KeyPress(KeyAscii As Integer)
            If KeyAscii = (13) Then
65          SendKeys ("{TAB}"), True
            End If Const DECIMAL_OK = -1       ' 0 = no, -1 = YES
            Const MIN_VALUE = -999      ' Minimum value
70          Const MAX_VALUE = 999       ' Maximum value
            key$ = Chr$(KeyAscii)       ' Convert to string
            Select Case key$
                Case "0" To "9"         ' Numbers and minus signs
                    Newvalue = Val(Left$(text6.Text, text6.SelStart) + key$ + Mid$(text6.Text, text6.SelStart + text6.SelLength + 1))
```

```
        If Newvalue > MAX_VALUE Or Newvalue < MIN_VALUE Then
            KeyAscii = 0
        End If
    Case "."
        If DECIMAL_OK = 0 Or InStr(text6.Text, ".") Then
            KeyAscii = 0
        End If
    Case Chr$(8)          ' Backspace
    Case Else
        KeyAscii = 0
    End Select
    If key$ = "-" And (InStr(text6.Text, "-") Or text6.SelStart <> 0) Then
        KeyAscii = 0
    End If End Sub Private Sub Text7_KeyPress(KeyAscii As Integer)
    If KeyAscii = (13) Then
        SendKeys ("{TAB}"), True
    End If Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
    Case "0" To "9"       ' Numbers and minus signs
        Newvalue = Val(Left$(text7.Text, text7.SelStart) + key$ + Mid$(text7.Text, text7.SelStart + text7.SelLength + 1))
        If Newvalue > MAX_VALUE Or Newvalue < MIN_VALUE Then
            KeyAscii = 0
        End If
    Case "."
        If DECIMAL_OK = 0 Or InStr(text7.Text, ".") Then
            KeyAscii = 0
        End If
    Case Chr$(8)          ' Backspace
    Case Else
        KeyAscii = 0
    End Select
    If key$ = "-" And (InStr(text7.Text, "-") Or text7.SelStart <> 0) Then
        KeyAscii = 0
    End If End Sub Private Sub Text8_KeyPress(KeyAscii As Integer)
    If KeyAscii = (13) Then
        SendKeys ("{TAB}"), True
    End If Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
    Case "0" To "9"       ' Numbers and minus signs
        Newvalue = Val(Left$(TEXT8.Text, TEXT8.SelStart) + key$ + Mid$(TEXT8.Text, TEXT8.SelStart + TEXT8.SelLength + 1))
        If Newvalue > MAX_VALUE Or Newvalue < MIN_VALUE Then
            KeyAscii = 0
        End If
    Case "."
        If DECIMAL_OK = 0 Or InStr(TEXT8.Text, ".") Then
            KeyAscii = 0
        End If
    Case Chr$(8)          ' Backspace
    Case Else
        KeyAscii = 0
    End Select
    If key$ = "-" And (InStr(TEXT8.Text, "-") Or TEXT8.SelStart <> 0) Then
        KeyAscii = 0
    End If End Sub
```

```
Private Sub Text9_KeyPress(KeyAscii As Integer)
    If KeyAscii = (13) Then
        SendKeys ("{TAB}"), True
    End If Const DECIMAL_OK = -1       ' 0 = no, -1 = YES
    Const MIN_VALUE = -999      ' Minimum value
    Const MAX_VALUE = 999       ' Maximum value
    key$ = Chr$(KeyAscii)       ' Convert to string
    Select Case key$
        Case "0" To "9"         ' Numbers and minus signs
            Newvalue = Val(Left$(text9.Text, text9.SelStart) + key$ + Mid$(text9.Text, text9.SelStart + text9.SelLength + 1))
            If Newvalue > MAX_VALUE Or Newvalue < MIN_VALUE Then
                KeyAscii = 0
            End If
        Case "."
            If DECIMAL_OK = 0 Or InStr(text9.Text, ".") Then
                KeyAscii = 0
            End If
        Case Chr$(8)            ' Backspace
        Case Else
            KeyAscii = 0
    End Select
    If key$ = "-" And (InStr(text9.Text, "-") Or text9.SelStart <> 0) Then
        KeyAscii = 0
    End If End Sub Line 19: Property Icon in frmidch had an invalid file reference.
VERSION 4.00
Begin VB.MDIForm frmMDI
    Appearance      =   0  'Flat
    BackColor       =   &H00404040&
    Caption         =   "Qcam For Windows        CNC Lathe Software"
    ClientHeight    =   5415
    ClientLeft      =   60
    ClientTop       =   1650
    ClientWidth     =   9480
    Height          =   6165
    Icon            =   "MDI.frx":0000
    Left            =   0
    LinkTopic       =   "MDIForm1"
    LockControls    =   -1  'True
    Top             =   960
    Width           =   9600
    WindowState     =   2  'Maximized
    Begin VB.PictureBox Picture1
        Align           =   1  'Align Top
        BackColor       =   &H00FFFF00&
        ClipControls    =   0  'False
        BeginProperty Font
            name            =   "MS Sans Serif"
            charset         =   1
            weight          =   700
            size            =   8.25
            underline       =   0  'False
            italic          =   0  'False
            strikethrough   =   0  'False
        EndProperty
        Height          =   1200
        Left            =   0
        ScaleHeight     =   1140
        ScaleWidth      =   9420
        TabIndex        =   1
        Top             =   375
        Width           =   9480
        Begin VB.CommandButton Command12
            Appearance      =   0  'Flat
            BackColor       =   &H80000005&
            Caption         =   "Drilling"
            Height          =   375
            Left            =   1920
            TabIndex        =   13
```

```
                Top             =   120
                Width           =   1095
            End
            Begin VB.CommandButton Command11
                Appearance      =   0  'Flat
                BackColor       =   &H80000005&
                Caption         =   "O.D. Turning"
                Height          =   375
                Left            =   3480
                TabIndex        =   12
                Top             =   120
                Width           =   1095
            End
            Begin VB.CommandButton Command10
                Appearance      =   0  'Flat
                BackColor       =   &H80000005&
                Caption         =   "Grooving"
                Height          =   375
                Left            =   5040
                TabIndex        =   11
                Top             =   120
                Width           =   1095
            End
            Begin VB.CommandButton Command9
                Appearance      =   0  'Flat
                BackColor       =   &H80000005&
                Caption         =   "Threading"
                Height          =   375
                Left            =   6600
                TabIndex        =   10
                Top             =   120
                Width           =   1095
            End
            Begin VB.CommandButton Command8
                Appearance      =   0  'Flat
                BackColor       =   &H80000005&
                Caption         =   "New Tool"
                Height          =   375
                Left            =   8160
                TabIndex        =   9
                Top             =   120
                Width           =   1095
            End
            Begin VB.CommandButton Command7
                Appearance      =   0  'Flat
                BackColor       =   &H80000005&
                Caption         =   "Part Stop"
                Height          =   375
                Left            =   360
                TabIndex        =   8
                Top             =   600
                Width           =   1095
            End
            Begin VB.CommandButton Command6
                Appearance      =   0  'Flat
                BackColor       =   &H80000005&
                Caption         =   "Tapping"
                Height          =   375
                Left            =   1920
                TabIndex        =   7
                Top             =   600
                Width           =   1095
            End
            Begin VB.CommandButton Command5
                Appearance      =   0  'Flat
                BackColor       =   &H80000005&
                Caption         =   "I.D. Boring"
                Height          =   375
                Left            =   3480
                TabIndex        =   6
                Top             =   600
                Width           =   1095
            End
            Begin VB.CommandButton Command4
```

```
         Appearance      =   0  'Flat
         BackColor       =   &H80000005&
         Caption         =   "Trepan"
         Height          =   375
         Left            =   5040
         TabIndex        =   5
         Top             =   600
         Width           =   1095
      End
      Begin VB.CommandButton Command3
         Appearance      =   0  'Flat
         BackColor       =   &H80000005&
         Caption         =   "Cut Off"
         Height          =   375
         Left            =   6600
         TabIndex        =   4
         Top             =   600
         Width           =   1095
      End
      Begin VB.CommandButton Command2
         Appearance      =   0  'Flat
         BackColor       =   &H80000005&
         Caption         =   "Tool Home"
         Height          =   375
         Left            =   8160
         TabIndex        =   3
         Top             =   600
         Width           =   1095
      End
      Begin VB.CommandButton Command1
         Appearance      =   0  'Flat
         BackColor       =   &H80000005&
         Caption         =   "Start"
         Height          =   375
         Left            =   360
         TabIndex        =   2
         Top             =   120
         Width           =   1095
      End
   End
   Begin VB.PictureBox picToolbar
      Align           =   1  'Align Top
      ClipControls    =   0  'False
      BeginProperty Font
         name            =   "MS Sans Serif"
         charset         =   1
         weight          =   700
         size            =   8.25
         underline       =   0  'False
         italic          =   0  'False
         strikethrough   =   0  'False
      EndProperty
      Height          =   375
      Left            =   0
      ScaleHeight     =   315
      ScaleWidth      =   9420
      TabIndex        =   0
      Top             =   0
      Width           =   9480
      Begin VB.Label Label1
         BeginProperty Font
            name            =   "MS Sans Serif"
            charset         =   1
            weight          =   400
            size            =   9.75
            underline       =   0  'False
            italic          =   0  'False
            strikethrough   =   0  'False
         EndProperty
         ForeColor       =   &H00000000&
         Height          =   375
         Left            =   2040
         TabIndex        =   14
         Top             =   0
```

```
            Width           =   7335
         End
         Begin MSComDlg.CommonDialog CMDialog1
            Left            =   6360
            Top             =   0
            _version        =   65536
            _extentx        =   847
            _extenty        =   847
            _stockprops     =   0
            cancelerror     =   -1  'True
            filter          =   "Text Files (*.txt)|*.txt|All Files (*.*)|*.*"
         End
         Begin VB.Image imgPasteButtonUp
            Height          =   330
            Left            =   5280
            Picture         =   "MDI.frx":030A
            Top             =   0
            Visible         =   0   'False
            Width           =   375
         End
         Begin VB.Image imgPasteButtonDn
            Height          =   330
            Left            =   4920
            Picture         =   "MDI.frx":04EC
            Top             =   0
            Visible         =   0   'False
            Width           =   375
         End
         Begin VB.Image imgCopyButtonDn
            Height          =   330
            Left            =   4200
            Picture         =   "MDI.frx":06CE
            Top             =   0
            Visible         =   0   'False
            Width           =   375
         End
         Begin VB.Image imgCopyButtonUp
            Height          =   330
            Left            =   4560
            Picture         =   "MDI.frx":08B0
            Top             =   0
            Visible         =   0   'False
            Width           =   375
         End
         Begin VB.Image imgCutButtonDn
            Height          =   330
            Left            =   3840
            Picture         =   "MDI.frx":0A92
            Top             =   0
            Visible         =   0   'False
            Width           =   375
         End
         Begin VB.Image imgCutButtonUp
            Height          =   330
            Left            =   3480
            Picture         =   "MDI.frx":0C74
            Top             =   0
            Visible         =   0   'False
            Width           =   375
         End
         Begin VB.Image imgFileOpenButtonDn
            Height          =   330
            Left            =   2760
            Picture         =   "MDI.frx":0E56
            Top             =   0
            Visible         =   0   'False
            Width           =   360
         End
         Begin VB.Image imgFileOpenButtonUp
            Height          =   330
            Left            =   3120
            Picture         =   "MDI.frx":0FE0
            Top             =   0
            Visible         =   0   'False
```

```
         Width           =   360
      End
      Begin VB.Image imgFileNewButtonUp
         Height          =   330
         Left            =   2400
         Picture         =   "MDI.frx":116A
         Top             =   0
         Visible         =   0   'False
         Width           =   360
      End
      Begin VB.Image imgFileNewButtonDn
         Height          =   330
         Left            =   2040
         Picture         =   "MDI.frx":12F4
         Top             =   0
         Visible         =   0   'False
         Width           =   375
      End
      Begin VB.Image imgPasteButton
         Height          =   330
         Left            =   1440
         Picture         =   "MDI.frx":14D6
         Top             =   0
         Width           =   375
      End
      Begin VB.Image imgCopyButton
         Height          =   330
         Left            =   1080
         Picture         =   "MDI.frx":16B8
         Top             =   0
         Width           =   375
      End
      Begin VB.Image imgCutButton
         Height          =   330
         Left            =   720
         Picture         =   "MDI.frx":189A
         Top             =   0
         Width           =   375
      End
      Begin VB.Image imgFileOpenButton
         Height          =   330
         Left            =   360
         Picture         =   "MDI.frx":1A7C
         Top             =   0
         Width           =   360
      End
      Begin VB.Image imgFileNewButton
         Height          =   330
         Left            =   0
         Picture         =   "MDI.frx":1C06
         Top             =   0
         Width           =   360
      End
   End
   Begin VB.Menu mnuFile
      Caption         =   "&File"
      Begin VB.Menu mnuFNew
         Caption         =   "&New"
      End
      Begin VB.Menu mnuFOpen
         Caption         =   "&Open"
      End
      Begin VB.Menu mnuFExit
         Caption         =   "E&xit"
      End
      Begin VB.Menu mnuRecentFile
         Caption         =   "-"
         Index           =   0
         Visible         =   0   'False
      End
      Begin VB.Menu mnuRecentFile
         Caption         =   "RecentFile1"
         Index           =   1
         Visible         =   0   'False
```

```
        End
    Begin VB.Menu mnuRecentFile
        Caption     =   "RecentFile2"
        Index       =   2
        Visible     =   0   'False
    End
    Begin VB.Menu mnuRecentFile
        Caption     =   "RecentFile3"
        Index       =   3
        Visible     =   0   'False
    End
    Begin VB.Menu mnuRecentFile
        Caption     =   "RecentFile4"
        Index       =   4
        Visible     =   0   'False
    End
End
Begin VB.Menu mnuOptions
    Caption     =   "&Options"
    Begin VB.Menu mnuOToolbar
        Caption     =   "&Toolbar"
    End
End
End
Attribute VB_Name = "frmMDI"
Attribute VB_Creatable = False
Attribute VB_Exposed = False Private Sub Command1_Click()
frmStartup.Visible = True
End Sub Private Sub Command10_Click()
frmgrooving.Visible = True
End Sub Private Sub Command11_Click()
FRMFACEANDTURN.Visible = True
End Sub Private Sub Command12_Click()
frmDrilling.Visible = True
End Sub Private Sub Command2_Click()
frmtoolhome.Visible = True
End Sub Private Sub Command3_Click()
frmcutoff.Visible = True
End Sub Private Sub Command4_Click()
frmTrepan.Visible = True
End Sub Private Sub Command5_Click()
FRMBORING.Visible = True
End Sub Private Sub Command6_Click()
frmtap.Visible = True
End Sub Private Sub Command7_Click()
frmPartstop.Visible = True
End Sub Private Sub Command8_Click()
frmnewtool.Visible = True
End Sub
```

```
Private Sub Command9_Click()
    frmThread.Visible = True
End Sub

Private Sub imgCopyButton_Click()
    imgCopyButton.Refresh
    EditCopyProc
End Sub Private Sub imgCopyButton_MouseDown(Button As Integer, Shift As Integer, x As Single, Y As Single)
    imgCopyButton.Picture = imgCopyButtonDn.Picture
End Sub Private Sub imgCopyButton_MouseMove(Button As Integer, Shift As Integer, x As Single, Y As Single)
    ' If the button is pressed, display the up bitmap if the
    ' mouse is dragged outside the button's area, otherwise
    ' display the up bitmap
    Select Case Button
    Case 1
        If x <= 0 Or x > imgCopyButton.Width Or Y < 0 Or Y > imgCopyButton.Height Then
            imgCopyButton.Picture = imgCopyButtonUp.Picture
        Else
            imgCopyButton.Picture = imgCopyButtonDn.Picture
        End If
    End Select
End Sub Private Sub imgCopyButton_MouseUp(Button As Integer, Shift As Integer, x As Single, Y As Single)
    imgCopyButton.Picture = imgCopyButtonUp.Picture
End Sub Private Sub imgCutButton_Click()
    imgCutButton.Refresh
    EditCutProc
End Sub Private Sub imgCutButton_MouseDown(Button As Integer, Shift As Integer, x As Single, Y As Single)
    imgCutButton.Picture = imgCutButtonDn.Picture
End Sub Private Sub imgCutButton_MouseMove(Button As Integer, Shift As Integer, x As Single, Y As Single)
    ' If the button is pressed, display the up bitmap if the
    ' mouse is dragged outside the button's area, otherwise
    ' display the up bitmap
    Select Case Button
    Case 1
        If x <= 0 Or x > imgCutButton.Width Or Y < 0 Or Y > imgCutButton.Height Then
            imgCutButton.Picture = imgCutButtonUp.Picture
        Else
            imgCutButton.Picture = imgCutButtonDn.Picture
        End If
    End Select
End Sub Private Sub imgCutButton_MouseUp(Button As Integer, Shift As Integer, x As Single, Y As Single)
    imgCutButton.Picture = imgCutButtonUp.Picture
End Sub Private Sub imgFileNewButton_Click()
    imgFileNewButton.Refresh
    FileNew
End Sub Private Sub imgFileNewButton_MouseDown(Button As Integer, Shift As Integer, x As Single, Y As Single)
    imgFileNewButton.Picture = imgFileNewButtonDn.Picture
End Sub Private Sub imgFileNewButton_MouseMove(Button As Integer, Shift As Integer, x As Single, Y As Single)
    ' If the button is pressed, display the up bitmap if the
    ' mouse is dragged outside the button's area, otherwise
    ' display the up bitmap
    Select Case Button
    Case 1
        If x <= 0 Or x > imgFileNewButton.Width Or Y < 0 Or Y > imgFileNewButton.Height Then
```

```
            imgFileNewButton.Picture = imgFileNewButtonUp.Picture
         Else
            imgFileNewButton.Picture = imgFileNewButtonDn.Picture
         End If
      End Select
   End Sub Private Sub imgFileNewButton_MouseUp(Button As Integer, Shift As Integer, x As Single, Y As Single)
      imgFileNewButton.Picture = imgFileNewButtonUp.Picture
   End Sub Private Sub imgFileOpenButton_Click()
      imgFileOpenButton.Refresh
      FOpenProc
   End Sub Private Sub imgFileOpenButton_MouseDown(Button As Integer, Shift As Integer, x As Single, Y As Single)
      imgFileOpenButton.Picture = imgFileOpenButtonDn.Picture
   End Sub Private Sub imgFileOpenButton_MouseMove(Button As Integer, Shift As Integer, x As Single, Y As Single)
      ' If the button is pressed, display the up bitmap if the
      ' mouse is dragged outside the button's area, otherwise
      ' display the up bitmap
      Select Case Button
         Case 1
            If x <= 0 Or x > imgFileOpenButton.Width Or Y < 0 Or Y > imgFileOpenButton.Height Then
               imgFileOpenButton.Picture = imgFileOpenButtonUp.Picture
            Else
               imgFileOpenButton.Picture = imgFileOpenButtonDn.Picture
            End If
      End Select
   End Sub Private Sub imgFileOpenButton_MouseUp(Button As Integer, Shift As Integer, x As Single, Y As Single)
      imgFileOpenButton.Picture = imgFileOpenButtonUp.Picture
   End Sub Private Sub imgPasteButton_Click()
      imgPasteButton.Refresh
      editpasteproc
   End Sub Private Sub imgPasteButton_MouseDown(Button As Integer, Shift As Integer, x As Single, Y As Single)
      imgPasteButton.Picture = imgPasteButtonDn.Picture
   End Sub Private Sub imgPasteButton_MouseMove(Button As Integer, Shift As Integer, x As Single, Y As Single)
      ' If the button is pressed, display the up bitmap if the
      ' mouse is dragged outside the button's area, otherwise
      ' display the up bitmap
      Select Case Button
         Case 1
            If x <= 0 Or x > imgPasteButton.Width Or Y < 0 Or Y > imgPasteButton.Height Then
               imgPasteButton.Picture = imgPasteButtonUp.Picture
            Else
               imgPasteButton.Picture = imgPasteButtonDn.Picture
            End If
      End Select
   End Sub Private Sub imgPasteButton_MouseUp(Button As Integer, Shift As Integer, x As Single, Y As Single)
      imgPasteButton.Picture = imgPasteButtonUp.Picture
   End Sub Private Sub MDIForm_Load()

Screen.MousePointer = 11
      ' Application starts here (Load event of Startup form).
      Show
      ' Always set working directory to directory containing the application.
      ChDir App.Path
      dir_now = CurDir$
      'Initialize document form arrays, and show first document.
```

```
        ReDim Document(1)
        ReDim FState(1)
        Document(1).Tag = 1
        FState(1).Dirty = False
5       Document(1).Show ' Read qcam.INI and set recent file menu items appropriately
        GetRecentFiles 10      ' Read Qcampost.ini to set the last post - "Lstpst"...

On Error Resume Next
        Qcam_Ini$ = App.Path + "\Qcam.ini"
            Size% = 255
15          lstpst = Space$(Size%)
            Lstpost = GetPrivateProfileString("Last Post Used", "lastpost", "", lstpst, 255, Qcam_Ini$)

20      Open lstpst For Input As #1    ' Open file for input.

On Error GoTo 999

' Reads the file
25              Do While Not EOF(1)
                    Line Input #1, PRG_STRT_1
                    Line Input #1, PRG_STRT_2
                    Line Input #1, PRG_STRT_3
                    Line Input #1, PRG_STRT_4
30                  Line Input #1, PRG_STRT_5
                    Line Input #1, PRG_STRT_6

Line Input #1, Feed
                    Line Input #1, Rapid
35                  Line Input #1, G_Code_Chamfer
                    Line Input #1, G_Code_Radius
                    Line Input #1, dwell
                    Line Input #1, Spinfrd
                    Line Input #1, Spinbckwrd
40                  Line Input #1, Spinstop
                    Line Input #1, ClntOn
                    Line Input #1, ClntOff
                    Line Input #1, opstp
                    Line Input #1, prgstop
45                  Line Input #1, formats
                    Line Input #1, Rad_X
                    Line Input #1, Rad_Z
                    Line Input #1, Chamfer_X
                    Line Input #1, Chamfer_Z
50                  Line Input #1, XCode If XCode = "X" Then ' This just sets the option buttons.
                        Option1 = True
                        option2 = False
55                  End If If XCode = "X-" Then 'This just sets the option buttons.
                        option2 = True
                        Option1 = False
60                  End If Line Input #1, PRG_END_1
                    Line Input #1, PRG_END_2
                    Line Input #1, PRG_END_3
65                  Line Input #1, PRG_END_4
                    Line Input #1, PRG_END_5

Line Input #1, Tool_Home_Start_1
                    Line Input #1, Tool_Home_Start_2
70
                    Line Input #1, Tool_Home_End_1
                    Line Input #1, Tool_Home_End_2

Line Input #1, PRG_END_1
```

```
            Line Input #1, PRG_END_2
            Line Input #1, PRG_END_3
            Line Input #1, PRG_END_4
            Line Input #1, PRG_END_5

Line Input #1, Opt_Stop_1
            Line Input #1, Opt_Stop_2
            Line Input #1, Opt_Stop_3

Line Input #1, Drill_G_Code
            Line Input #1, Drill_Peck_1
            Line Input #1, Drill_Peck_2

Line Input #1, G_Code_Thread
            Line Input #1, Thread_Height
            Line Input #1, Thread_Depth_Of_Cut
            Line Input #1, Thread_Feed Line Input #1, G_Code_Groove
            Line Input #1, Letter_Code_Height
            Line Input #1, Letter_Code_Stepover
            Line Input #1, Letter_Code_X_Pecking Line Input #1, ID_Bore_Cycle_Line_1
            Line Input #1, ID_Bore_Cycle_Line_2
            Line Input #1, ID_Bore_Cycle_Line_3
            Line Input #1, ID_Bore_Cycle_Line_4
            Line Input #1, ID_Bore_Cycle_Line_5
            Line Input #1, ID_Bore_Cycle_Line_6
            Line Input #1, ID_Bore_Cycle_Line_7

Line Input #1, OD_Turn_Cycle_Line_1
            Line Input #1, OD_Turn_Cycle_Line_2
            Line Input #1, OD_Turn_Cycle_Line_3
            Line Input #1, OD_Turn_Cycle_Line_4
            Line Input #1, OD_Turn_Cycle_Line_5
            Line Input #1, OD_Turn_Cycle_Line_6
            Line Input #1, OD_Turn_Cycle_Line_7

Line Input #1, Dwell_Value_Letter_Code

Line Input #1, Thread_Height_Rad_Or_Dia

Line Input #1, Groove_Height_Rad_Or_Dia

Line Input #1, ID_Canned_Cycle_Number_First_And_Last_Lines

Line Input #1, OD_Canned_Cycle_Number_First_And_Last_Lines

Line Input #1, OD_Line_Depth_and_Feed

Line Input #1, ID_Line_Depth_and_Feed

Loop
      Close #1     ' Close file.

frmMDI.label1 = "Current post - " & lstpst

GoTo 1001

999
      Command1.Enabled = False
      Command2.Enabled = False
      Command3.Enabled = False
      Command4.Enabled = False
      Command5.Enabled = False
      Command6.Enabled = False
      Command7.Enabled = False
      Command8.Enabled = False
      Command9.Enabled = False
      Command10.Enabled = False
      Command11.Enabled = False
      Command12.Enabled = False
      MsgBox "Load a post to enable Qcam"
```

```
            GoTo 1001

1001
            'End If
            ' Set first form in tile mode on loading qcam
            frmMDI.Arrange TILE_HORIZONTAL
            Screen.MousePointer = 0
            If Filename = True Then
                frmMDI.label1 = "Current post file - " & lstpst
            End If
        End Sub Private Sub MDIForm_Unload(Cancel As Integer)
            ' If the Unload was not canceled (in the QueryUnload events for the Notepad forms)
            ' there will be no document windows left, so go ahead and end the application.

If Not AnyPadsLeft() Then
                End
            End If

End Sub

Private Sub mnuFExit_Click()
            End
        End Sub

Private Sub mnuFNew_Click()
            FileNew
        End Sub

Private Sub mnuFOpen_Click()
            FOpenProc
        End Sub

Private Sub mnuOptions_Click()
            mnuOToolbar.Checked = frmMDI!picToolbar.Visible
        End Sub Private Sub mnuOToolbar_Click()
            OptionsToolbarProc Me
        End Sub Private Sub mnuRecentFile_Click(index As Integer)
            OpenFile (mnuRecentFile(index).Caption)
            ' Update recent files list.
            GetRecentFiles
        End Sub Line 11: Property Icon in frmMDI had an invalid file reference.
        Line 190: Property Picture in imgPasteButtonUp had an invalid file reference.
        Line 198: Property Picture in imgPasteButtonDn had an invalid file reference.
        Line 206: Property Picture in imgCopyButtonDn had an invalid file reference.
        Line 214: Property Picture in imgCopyButtonUp had an invalid file reference.
        Line 222: Property Picture in imgCutButtonDn had an invalid file reference.
        Line 230: Property Picture in imgCutButtonUp had an invalid file reference.
        Line 238: Property Picture in imgFileOpenButtonDn had an invalid file reference.
        Line 246: Property Picture in imgFileOpenButtonUp had an invalid file reference.
        Line 254: Property Picture in imgFileNewButtonUp had an invalid file reference.
        Line 262: Property Picture in imgFileNewButtonDn had an invalid file reference.
        Line 270: Property Picture in imgPasteButton had an invalid file reference.
        Line 277: Property Picture in imgCopyButton had an invalid file reference.
        Line 284: Property Picture in imgCutButton had an invalid file reference.
        Line 291: Property Picture in imgFileOpenButton had an invalid file reference.
        Line 298: Property Picture in imgFileNewButton had an invalid file reference.
        Attribute VB_Name = "MDINOTE"
        Option Explicit Global Const modal = 1
        Global Const CASCADE = 0
        Global Const TILE_HORIZONTAL = 1
```

```
Global Const TILE_VERTICAL = 2
Global Const ARRANGE_ICONS = 3

Type FormState
    Deleted As Integer
    Dirty As Integer
    Color As Long
End Type
Global store As String
Global FState() As FormState
Global Document() As New frmNotePad
Global gFindString, gFindCase As Integer, gFindDirection As Integer
Global gCurPos As Integer, gFirstTime As Integer
Global ArrayNum As Integer ' API functions used to read and write to Qcam.INI.
' Used for handling the recent files list.
Declare Function GetPrivateProfileString Lib "Kernel" (ByVal lpApplicationName As String, ByVal lpKeyName As String, ByVal lpDefault As String, ByVal lpReturnedString As String, ByVal nSize As Integer, ByVal lpFileName As String) As Integer
Declare Function WritePrivateProfileString Lib "Kernel" (ByVal lpApplicationName As String, ByVal lpKeyName As String, ByVal lpString As String, ByVal lpFileName As String) As Integer ' API function to get the windows directory.
Declare Function GetWindowsDirectory Lib "Kernel" (ByVal lpBuffer As String, ByVal nSize As Integer) As Integer Function AnyPadsLeft() As Integer
    Dim i As Integer ' Cycle throught the document array.
    ' Return True if there is at least one
    ' open document remaining.
    For i = 1 To UBound(Document)
        If Not FState(i).Deleted Then
            AnyPadsLeft = True
            Exit Function
        End If
    Next
End Function Sub CenterForm(frmParent As Form, frmChild As Form)
' This procedure centers a child form over a parent form.
' Calling this routine loads the dialog. Use the Show method
' to display the dialog after calling this routine ( ie MyFrm.Show 1)

Dim l, t
    ' get left offset
    l = frmParent.Left + ((frmParent.Width - frmChild.Width) / 2)
    If (l + frmChild.Width > Screen.Width) Then
        l = Screen.Width = frmChild.Width
    End If ' get top offset
    t = frmParent.Top + ((frmParent.Height - frmChild.Height) / 2)
    If (t + frmChild.Height > Screen.Height) Then
        t = Screen.Height - frmChild.Height
    End If ' center the child formfv
    frmChild.Move l, t End Sub Sub EditCopyProc()
    ' Copy selected text to Clipboard.
    Clipboard.SetText frmMDI.ActiveForm.ActiveControl.SelText
End Sub Sub EditCutProc()
    ' Copy selected text to Clipboard.
    Clipboard.SetText frmMDI.ActiveForm.ActiveControl.SelText
    ' Delete selected text.
    frmMDI.ActiveForm.ActiveControl.SelText = ""
End Sub
```

```
Sub editpasteproc()
    ' Place text from Clipboard into active control.
    frmMDI.ActiveForm.ActiveControl.SelText = Clipboard.GetText()
End Sub Sub FileNew()
    Dim fIndex As Integer fIndex = FindFreeIndex()
    Document(fIndex).Tag = fIndex
    Document(fIndex).Caption = "Untitled:" & fIndex
    Document(fIndex).Show ' Make sure toolbar edit buttons are visible
    frmMDI!imgCutButton.Visible = True
    frmMDI!imgCopyButton.Visible = True
    frmMDI!imgPasteButton.Visible = True
    frmMDI!Picture1.Visible = True End Sub Function FindFreeIndex() As Integer
    Dim i As Integer
    Dim ArrayCount As Integer ArrayCount = UBound(Document)

' Cycle throught the document array. If one of the
    ' documents has been deleted, then return that
    ' index.
    For i = 1 To ArrayCount
        If FState(i).Deleted Then
            FindFreeIndex = i
            FState(i).Deleted = False
            Exit Function
        End If
    Next ' If none of the elements in the document array have
    ' been deleted, then increment the document and the
    ' state arrays by one and return the index to the
    ' new element.

ReDim Preserve Document(ArrayCount + 1)
    ReDim Preserve FState(ArrayCount + 1)
    FindFreeIndex = UBound(Document)
End Function Sub FindIt()
    Dim start, pos, findstring, sourcestring, Msg, Response, Offset If (gCurPos = frmMDI.ActiveForm.ActiveControl.SelStart) Then
        Offset = 1
    Else
        Offset = 0
    End If If gFirstTime Then Offset = 0 start = frmMDI.ActiveForm.ActiveControl.SelStart + Offset

If gFindCase Then
        findstring = gFindString
        sourcestring = frmMDI.ActiveForm.ActiveControl.Text
    Else
        findstring = UCase(gFindString)
        sourcestring = UCase(frmMDI.ActiveForm.ActiveControl.Text)
    End If If gFindDirection = 1 Then
        pos = InStr(start + 1, sourcestring, findstring)
    Else
        For pos = start - 1 To 0 Step -1
            If pos = 0 Then Exit For
```

```
            If Mid(sourcestring, pos, Len(findstring)) = findstring Then Exit For
         Next
      End If ' If string is found
   If pos Then
      frmMDI.ActiveForm.ActiveControl.SelStart = pos - 1
      frmMDI.ActiveForm.ActiveControl.SelLength = Len(findstring)
   Else
      Msg = "Cannot find " & Chr(34) & gFindString & Chr(34)
      Response = MsgBox(Msg, 0, App.Title)
   End If gCurPos = frmMDI.ActiveForm.ActiveControl.SelStart
   gFirstTime = False End Sub Sub GetRecentFiles()

Dim RetVal, key, i, j
   Dim IniString As String
   Dim Qcam_Ini$

' This variable must be large enough to hold the return string
   ' from the GetPrivateProfileString API.
   IniString = String(255, 0)
   Qcam_Ini$ = App.Path + "\Qcam.ini"
   ' Get recent file strings from qcam.INI
   For i = 1 To 4
      key = "RecentFile" & i
      RetVal = GetPrivateProfileString("Recent Files", key, "Not Used", IniString, Len(IniString), Qcam_Ini$)
      If RetVal And Left(IniString, 8) <> "Not Used" Then
      ' Update the MDI form's menu.
         frmMDI.mnuRecentFile(0).Visible = True
         frmMDI.mnuRecentFile(i).Caption = IniString
         frmMDI.mnuRecentFile(i).Visible = True ' Iterate through all the notepads and update each menu.
         For j = 1 To UBound(Document)
            If Not FState(j).Deleted Then
               Document(j).mnuRecentFile(0).Visible = True
               Document(j).mnuRecentFile(i).Caption = IniString
               Document(j).mnuRecentFile(i).Visible = True
            End If
         Next j
      End If
   Next i End Sub Sub OptionsToolbarProc(CurrentForm As Form)
   CurrentForm.mnuOToolbar.Checked = Not CurrentForm.mnuOToolbar.Checked
   If TypeOf CurrentForm Is MDIForm Then
   Else
      frmMDI.mnuOToolbar.Checked = CurrentForm.mnuOToolbar.Checked
   End If
   If CurrentForm.mnuOToolbar.Checked Then
      frmMDI.picToolbar.Visible = True
   Else
      frmMDI.picToolbar.Visible = False
   End If
End Sub Sub WriteRecentFiles(OpenFileName)

Dim i, j, key, RetVal
   Dim IniString As String
   Dim Qcam_Ini$
   IniString = String(255, 0)
   Qcam_Ini$ = App.Path + "\Qcam.ini"
   ' Copy RecentFile1 to RecentFile2, etc.
```

```
        For i = 4 To 1 Step -1
          key = "RecentFile" & i
          RetVal = GetPrivateProfileString("Recent Files", key, "Not Used", IniString, Len(IniString), Qcam_Ini$)
          If RetVal And Left(IniString, 8) <> "Not Used" Then
            key = "RecentFile" & (i + 1)
            RetVal = WritePrivateProfileString("Recent Files", key, IniString, Qcam_Ini$)
          End If
        Next i ' Write openfile to first Recent File.
        RetVal = WritePrivateProfileString("Recent Files", "RecentFile1", OpenFileName, Qcam_Ini$)

End Sub

VERSION 4.00
        Begin VB.Form frmNotePad
          Caption         =   "Qcam - Untitled"
          ClientHeight    =   3990
          ClientLeft      =   75
          ClientTop       =   2010
          ClientWidth     =   8985
          BeginProperty Font
            name          =   "MS Sans Serif"
            charset       =   1
            weight        =   700
            size          =   8.25
            underline     =   0   'False
            Italic        =   0   'False
            strikethrough =   0   'False
          EndProperty
          ForeColor       =   &H80000008&
          Height          =   4740
          Icon            =   "NOTEPAD.frx":0000
          Left            =   15
          LinkTopic       =   "Form1"
          LockControls    =   -1  'True
          MDIChild        =   -1  'True
          ScaleHeight     =   3990
          ScaleWidth      =   8985
          Top             =   1320
          Visible         =   0   'False
          Width           =   9105
          Begin VB.TextBox Text1
            Height        =   4995
            HideSelection =   0   'False
            Left          =   0
            MultiLine     =   -1  'True
            ScrollBars    =   3   'Both
            TabIndex      =   0
            Top           =   0
            Width         =   9015
          End
          Begin VB.Menu mnuFile
            Caption       =   "&File"
            Begin VB.Menu mnuFNew
              Caption     =   "&New"
            End
            Begin VB.Menu mnuFOpen
              Caption     =   "&Open..."
            End
            Begin VB.Menu mnuFClose
              Caption     =   "&Close"
            End
            Begin VB.Menu mnuFSave
              Caption     =   "&Save"
            End
            Begin VB.Menu mnuFSaveAs
              Caption     =   "Save &As..."
            End
            Begin VB.Menu S2
              Caption     =   "-"
            End
            Begin VB.Menu print
```

```
         Caption     =  "&Print"
      End
      Begin VB.Menu mnuFSep
         Caption     =  "-"
      End
      Begin VB.Menu mnuFExit
         Caption     =  "E&xit"
      End
      Begin VB.Menu mnuRecentFile
         Caption     =  "-"
         Index       =  0
         Visible     =  0  'False
      End
      Begin VB.Menu mnuRecentFile
         Caption     =  "RecentFile1"
         Index       =  1
         Visible     =  0  'False
      End
      Begin VB.Menu mnuRecentFile
         Caption     =  "RecentFile2"
         Index       =  2
         Visible     =  0  'False
      End
      Begin VB.Menu mnuRecentFile
         Caption     =  "RecentFile3"
         Index       =  3
         Visible     =  0  'False
      End
      Begin VB.Menu mnuRecentFile
         Caption     =  "RecentFile4"
         Index       =  4
         Visible     =  0  'False
      End
   End
   Begin VB.Menu mnuEdit
      Caption     =  "&Edit"
      Begin VB.Menu mnuECut
         Caption     =  "Cu&t"
         Shortcut    =  ^X
      End
      Begin VB.Menu mnuECopy
         Caption     =  "&Copy"
         Shortcut    =  ^C
      End
      Begin VB.Menu mnuEPaste
         Caption     =  "&Paste"
         Shortcut    =  ^V
      End
      Begin VB.Menu mnuEDelete
         Caption     =  "De&lete"
         Shortcut    =  {DEL}
      End
      Begin VB.Menu mnuESep1
         Caption     =  "-"
      End
      Begin VB.Menu mnuESelectAll
         Caption     =  "Select &All"
      End
      Begin VB.Menu mnuETime
         Caption     =  "Time/&Date"
      End
   End
   Begin VB.Menu mnuSearch
      Caption     =  "&Search"
      Begin VB.Menu mnuSFind
         Caption     =  "&Find"
      End
      Begin VB.Menu mnuSFindNext
         Caption     =  "Find &Next"
         Shortcut    =  {F3}
      End
   End
   Begin VB.Menu mnuOptions
      Caption     =  "&Options"
```

```
        Begin VB.Menu mnuOToolbar
            Caption         =   "&Toolbar"
        End
        Begin VB.Menu mnuFont
            Caption         =   "&Font"
            Begin VB.Menu mnuFontName
                Caption         =   "FontName"
                Index           =   0
            End
        End
    End
    Begin VB.Menu Pst
        Caption         =   "&Post Options"
        Begin VB.Menu sel_post
            Caption         =   "Select Post"
        End
    End
    Begin VB.Menu mnuWindow
        Caption         =   "&Window"
        WindowList      =   -1  'True
        Begin VB.Menu mnuWCascade
            Caption         =   "&Cascade"
        End
        Begin VB.Menu mnuWTile
            Caption         =   "&Tile"
        End
        Begin VB.Menu mnuWArrange
            Caption         =   "&Arrange Icons"
        End
    End
    Begin VB.Menu Help
        Caption         =   "&Help"
        Begin VB.Menu QHelp
            Caption         =   "Qcam Help"
        End
        Begin VB.Menu AboutQcam
            Caption         =   "About Qcam"
        End
    End
    Begin VB.Menu d
        Caption         =   " "
    End
    Begin VB.Menu Q
        Caption         =   "&Quit"
    End
End
Attribute VB_Name = "frmNotePad"
Attribute VB_Creatable = False
Attribute VB_Exposed = False Private Sub AboutQcam_Click()
MsgBox "Qcam for Windows - 1996 Qcam Software Inc." & Chr(13) + Chr(10) & "All Rights Reserved" & Chr(13) + Chr(10) & "Do not
copy. Do not distribute.", , "Qcam Software Inc. 1996"
End Sub Private Sub Form_Load()
    Dim i As Integer mnuFontName(0).Caption = Screen.Fonts(0)
    For i = 1 To Screen.FontCount - 1
        Load mnuFontName(i)
        mnuFontName(0).Caption = Screen.Fonts(i)
    Next End Sub Private Sub Form_QueryUnload(Cancel As Integer, UnloadMode As Integer)
    Dim Msg, Filename, NL
    Dim Response As Integer If FState(Me.Tag).Dirty Then
        Filename = Me.Caption
        NL = Chr$(10) & Chr$(13)
```

```
            Msg = "The text in [" & Filename & "] has changed."
            Msg = Msg & NL
            Msg = Msg & "Do you want to save the changes?"
            Response = MsgBox(Msg, 51, frmMDI.Caption)
 5          Select Case Response
            ' User selects Yes
            Case 6
                'Get the filename to save the file
                Filename = GetFileName()
10              'If the user did notspecify a file name,
                'cancel the unload; otherwise, save it.
                If Filename = "" Then
                    Cancel = True
                Else
15                  SaveFileAs (Filename)
                End If ' User selects No
            ' Ok to unload
20          Case 7
                Cancel = False
            ' User selects Cancel
            ' Cancel the unload
            Case 2
25              Cancel = True
            End Select
        End If
    End Sub 30  Private Sub Form_Resize()
        If WindowState <> 1 And ScaleHeight <> 0 Then
            TEXT1.Visible = False
            TEXT1.Height = ScaleHeight
            TEXT1.Width = ScaleWidth
35          TEXT1.Visible = True
        End If
    End Sub Private Sub Form_Unload(Cancel As Integer)
40      FState(Me.Tag).Deleted = True 'Hide toolbar edit buttons if no notepad windows
        If Not AnyPadsLeft() Then
            frmMDI!imgCutButton.Visible = False
45          frmMDI!imgCopyButton.Visible = False
            frmMDI!imgPasteButton.Visible = False
            frmMDI.Picture1.Visible = False
            Unload frmStartup
            Unload frmPartstop
50          Unload frmDrilling
            Unload frmTrepan
            Unload frmidch
            Unload frmgrooving
            Unload frmcutoff
55          Unload frmnewtool
            Unload frmThread
            Unload FRMFACEANDTURN
            Unload frmtoolhome
            Unload frmtap
60          Unload FRMBORING
        End If
    End Sub Private Sub mnuECopy_Click()
65      EditCopyProc
    End Sub Private Sub mnuECut_Click()
        EditCutProc
70  End Sub Private Sub mnuEDelete_Click()
    ' If cursor is not at the end of the notepad.
    If Screen.ActiveControl.SelStart <> Len(Screen.ActiveControl.Text) Then
```

```
' If nothing is selected, extend selection by one.
If Screen.ActiveControl.SelLength = 0 Then
  Screen.ActiveControl.SelLength = 1
  ' If cursor is on a blank line, extend selection by two.
  If Asc(Screen.ActiveControl.SelText) = 13 Then
    Screen.ActiveControl.SelLength = 2
  End If
End If
' Delete selected text.
Screen.ActiveControl.SelText = ""
End If
End Sub Private Sub mnuEPaste_Click()
  editpasteproc
End Sub Private Sub mnuESelectAll_Click()
  frmMDI.ActiveForm.TEXT1.SelStart = 0
  frmMDI.ActiveForm.TEXT1.SelLength = Len(frmMDI.ActiveForm.TEXT1.Text)
End Sub Private Sub mnuETime_Click()
  Dim TimeStr As String, DateStr As String TEXT1.SelText = Now
End Sub Private Sub mnuFClose_Click()
  Unload Me
End Sub Private Sub mnuFExit_Click()
  ' Unloading the MDI form invokes the QueryUnload event
  ' for each child form, then the MDI form - before unloading
  ' the MDI form. Setting the Cancel argument to True in any of the
  ' QueryUnload events aborts the unload.

Unload frmMDI

End Sub

Private Sub mnuFNew_Click()
  FileNew
End Sub

Private Sub mnuFontName_Click(index As Integer)
  TEXT1.FontName = mnuFontName(index).Caption
End Sub Private Sub mnuFOpen_Click()
  FOpenProc
End Sub Private Sub mnuFSave_Click()
  Dim Filename As String If Left(Me.Caption, 8) = "Untitled" Then
    ' The file hasn't been saved yet,
    ' get the filename, then call the
    ' save procedure
    Filename = GetFileName()
  Else
    ' The caption contains the name of the open file
    Filename = Me.Caption
  End If
  ' call the save procedure, if Filename = Empty then
  ' the user selected Cancel in the Save As dialog, otherwise
  ' save the file
  If Filename <> "" Then
    SaveFileAs Filename
  End If
End Sub
```

```
Private Sub mnuFSaveAs_Click()

' This code checks to see if a file exists
    ' and then prompts you for a response...

Dim x As Integer x = FreeFile

On Error Resume Next
    Open GetFileName For Input As x
    If Err = 0 Then
        Filename = True
        Close x
    Else: Filename = False If Filename = False Then   ' Must be a new filename !....
    Dim SaveFileName As String If SaveFileName <> "" Then SaveFileName = GetFileName()
        SaveFileAs (frmMDI.CMDialog1.Filename)
        ' Update the recent files menu
        UpdateFileMenu (SaveFileName)

End If
    GoTo 500
    End If

Const MB_OK = 0, MB_OKCANCEL = 1   ' Define buttons.
    Const MB_YESNOCANCEL = 3, MB_YESNO = 4
    Const MB_ICONSTOP = 16, MB_ICONQUESTION = 32   ' Define icons.
    Const MB_ICONEXCLAMATION = 48, MB_ICONINFORMATION = 64
    Const MB_DEFBUTTON2 = 256, IDYES = 6, IDNO = 7   ' Define other.
    Dim DgDef, Msg, Response, Title ' Declare variables.
    Title = "File already exists !"
    ' Put together a sample message box with all the proper components.
    Msg = "File already exists" & Chr(13) + Chr(10)
    Msg = Msg & " Do you want to overwrite the file"
    DgDef = MB_YESNO + MB_ICONSTOP + MB_DEFBUTTON2 ' Describe dialog.

Response = MsgBox(Msg, DgDef, Title)   ' Get user response.
    If Response = IDNO Then   ' Evaluate response
        ' The user pressed the "No" button - do not overwrite the file
        GoTo 1001 ' and take appropriate
    End If
    If Response = IDYES Then   ' action.
        ' The user pressed the "Yes" button - overwrite the file...
        'Dim SaveFileName As String If SaveFileName <> "" Then SaveFileName = GetFileName()
        SaveFileAs (frmMDI.CMDialog1.Filename)
        ' Update the recent files menu
        UpdateFileMenu (SaveFileName)

End If
    'MsgBox Msg ' Display action taken.

'End If

FileExists = False
    'End If
1001
500
End Sub

Private Sub mnuOptions_Click()
    mnuOToolbar.Checked = frmMDI!picToolbar.Visible
End Sub Private Sub mnuOToolbar_Click()
    OptionsToolbarProc Me
End Sub
```

```
Private Sub mnuRecentFile_Click(index As Integer)
    OpenFile (mnuRecentFile(index).Caption)
    ' Update recent files list for new notepad
    GetRecentFiles
End Sub Private Sub mnuSFind_Click()
    If Me!TEXT1.SelText <> "" Then
        frmFind!TEXT1.Text = Me!TEXT1.SelText
    Else
        frmFind!TEXT1.Text = findstring
    End If
    gFirstTime = True
    frmFind.Show
End Sub Private Sub mnuSFindNext_Click()
    If Len(gFindString) > 0 Then
        FindIt
    Else
        mnuSFind_Click
    End If
End Sub Private Sub mnuWArrange_Click()
    frmMDI.Arrange ARRANGE_ICONS
End Sub Private Sub mnuWCascade_Click()
    frmMDI.Arrange CASCADE
End Sub Private Sub mnuWTile_Click()
    frmMDI.Arrange TILE_HORIZONTAL
End Sub Private Sub print_Click()
frmMDI.CMDialog1.Action = 5
Print current; x = 0
Print current; Y = 0
Printer.Print TEXT1
Printer.CurrentX = Printer.ScaleWidth / 2 - HWidth
Printer.CurrentY = Printer.ScaleHeight / 2 - HHeight
Printer.NewPage
Printer.EndDoc
End Sub Private Sub Q_Click()
Unload frmMDI
End Sub Private Sub QHelp_Click()
MsgBox "See the Readme.TXT file for help."
End Sub Private Sub sel_post_Click()

Dim RetVal
    On Error Resume Next
    frmMDI.CMDialog1.Filename = ""
    frmMDI.CMDialog1.Title = "Qcam Post Selection"
    frmMDI.CMDialog1.Filter = "Post (*.pst)|*.pst|All Files (*.*)|*.*" ' Filters
    frmMDI.CMDialog1.FilterIndex = 1    ' Sets *.pst as first choice
    frmMDI.CMDialog1.Action = 1    ' Shows the "Open" style box If Err = 32755 Then 'user pressed cancel
    GoTo 123
    End If frmMDI.label1 = frmMDI.CMDialog1.Filename
```

```
Dim PostName As String
PostName = Label14.Caption
PostName = frmMDI.CMDialog1.Filename   ' Sets "postname" as file name Open PostName For Input As #1    ' Open file for input.

' Reads the file
         Do While Not EOF(1)
             Line Input #1, PRG_STRT_1
             Line Input #1, PRG_STRT_2
             Line Input #1, PRG_STRT_3
             Line Input #1, PRG_STRT_4
             Line Input #1, PRG_STRT_5
             Line Input #1, PRG_STRT_6

Line Input #1, Feed
             Line Input #1, Rapid
             Line Input #1, G_Code_Chamfer
             Line Input #1, G_Code_Radius
             Line Input #1, dwell
             Line Input #1, Spinfrd
             Line Input #1, Spinbckwrd
             Line Input #1, Spinstop
             Line Input #1, ClntOn
             Line Input #1, ClntOff
             Line Input #1, opstp
             Line Input #1, prgstop
             Line Input #1, formats
             Line Input #1, Rad_X
             Line Input #1, Rad_Z
             Line Input #1, Chamfer_X
             Line Input #1, Chamfer_Z
             Line Input #1, XCode If XCode = "X" Then ' This just sets the option buttons.
                 Option1 = True
                 option2 = False
             End If If XCode = "X-" Then 'This just sets the option buttons.
                 option2 = True
                 Option1 = False
             End If Line Input #1, PRG_END_1
             Line Input #1, PRG_END_2
             Line Input #1, PRG_END_3
             Line Input #1, PRG_END_4
             Line Input #1, PRG_END_5

Line Input #1, Tool_Home_Start_1
             Line Input #1, Tool_Home_Start_2

Line Input #1, Tool_Home_End_1
             Line Input #1, Tool_Home_End_2

Line Input #1, PRG_END_1
             Line Input #1, PRG_END_2
             Line Input #1, PRG_END_3
             Line Input #1, PRG_END_4
             Line Input #1, PRG_END_5

Line Input #1, Opt_Stop_1
             Line Input #1, Opt_Stop_2
             Line Input #1, Opt_Stop_3

Line Input #1, Drill_G_Code
             Line Input #1, Drill_Peck_1
             Line Input #1, Drill_Peck_2

Line Input #1, G_Code_Thread
             Line Input #1, Thread_Height
             Line Input #1, Thread_Depth_Of_Cut
```

```
        Line Input #1, Thread_Feed

Line Input #1, G_Code_Groove
        Line Input #1, Letter_Code_Height
        Line Input #1, Letter_Code_Stepover
        Line Input #1, Letter_Code_X_Pecking Line Input #1, ID_Bore_Cycle_Line_1
        Line Input #1, ID_Bore_Cycle_Line_2
        Line Input #1, ID_Bore_Cycle_Line_3
        Line Input #1, ID_Bore_Cycle_Line_4
        Line Input #1, ID_Bore_Cycle_Line_5
        Line Input #1, ID_Bore_Cycle_Line_6
        Line Input #1, ID_Bore_Cycle_Line_7

Line Input #1, OD_Turn_Cycle_Line_1
        Line Input #1, OD_Turn_Cycle_Line_2
        Line Input #1, OD_Turn_Cycle_Line_3
        Line Input #1, OD_Turn_Cycle_Line_4
        Line Input #1, OD_Turn_Cycle_Line_5
        Line Input #1, OD_Turn_Cycle_Line_6
        Line Input #1, OD_Turn_Cycle_Line_7

Line Input #1, Dwell_Value_Letter_Code

Line Input #1, Thread_Height_Rad_Or_Dia

Line Input #1, Groove_Height_Rad_Or_Dia

Line Input #1, ID_Canned_Cycle_Number_First_And_Last_Lines

Line Input #1, OD_Canned_Cycle_Number_First_And_Last_Lines

Line Input #1, OD_Line_Depth_and_Feed

Line Input #1, ID_Line_Depth_and_Feed

Loop

Close #1   ' Close file.

' Set Qcampost.ini
    Qcam_Ini$ = App.Path + "\Qcam.ini"
    pstname = WritePrivateProfileString("Last Post Used", "lastpost", PostName, Qcam_Ini$)

frmMDI.Command1.Enabled = True
    frmMDI.Command2.Enabled = True
    frmMDI.Command3.Enabled = True
    frmMDI.Command4.Enabled = True
    frmMDI.Command5.Enabled = True
    frmMDI.Command6.Enabled = True
    frmMDI.Command7.Enabled = True
    frmMDI.Command8.Enabled = True
    frmMDI.Command9.Enabled = True
    frmMDI.Command10.Enabled = True
    frmMDI.Command11.Enabled = True
    frmMDI.Command12.Enabled = True 123 ' Go here if the user pressed cancle End Sub Private Sub Text1_Change()
        FState(Me.Tag).Dirty = True
    End Sub Private Sub Text1_GotFocus()
        If frmFind.Visible Then
            frmFind.ZOrder 0
        End If
    End Sub Line 19: Property Icon in frmNotePad had an invalid file reference.
    Attribute VB_Name = "POST_CAM"
```

```
     ' These are the Global variables for the post files ...

Global PRG_STRT_1 As String   ' These are the first lines of the prog.
Global PRG_STRT_2 As String
Global PRG_STRT_3 As String
Global PRG_STRT_4 As String
Global PRG_STRT_5 As String
Global PRG_STRT_6 As String Global PRG_END_1 As String   ' These are the last lines of the prog...
Global PRG_END_2 As String
Global PRG_END_3 As String
Global PRG_END_4 As String
Global PRG_END_5 As String Global Tool_Home_Start_1 As String   ' These are for sending the tool home....
Global Tool_Home_Start_2 As String Global Tool_Home_End_1 As String
Global Tool_Home_End_2 As String ' These are self explanatory...
Global Feed As String
Global Rapid As String
Global XCode As String
Global cw As String
Global ccw As String
Global dwell As String
Global opstp As String
Global prgstop As String
Global formats As String
Global Spinfrd As String
Global Spinbckwrd As String
Global Spinstop As String
Global Rchar As String
Global ClntOff As String
Global ClntOn As String
Global Rad_X As String
Global Rad_Z As String
Global Chamfer_X As String
Global Chamfer_Z As String
Global G_Code_Chamfer As String
Global G_Code_Radius As String Global PostName As String Global Opt_Stop_1 As String
Global Opt_Stop_2 As String
Global Opt_Stop_3 As String Global Drill_G_Code As String   ' Drilling...
Global Drill_Peck_1 As String
Global Drill_Peck_2 As String Global G_Code_Thread As String   ' Thread variables...
Global Thread_Height As String
Global Thread_Depth_Of_Cut As String
Global Thread_Feed As String Global G_Code_Groove As String   ' Grooving...
Global Letter_Code_Height As String
Global Letter_Code_Stepover As String
Global Letter_Code_X_Pecking As String Global ID_Bore_Cycle_Line_1 As String   ' Start I.D. Boring Cycle...
Global ID_Bore_Cycle_Line_2 As String
Global ID_Bore_Cycle_Line_3 As String   ' End I.D. Boring Cycle
Global ID_Bore_Cycle_Line_4 As String
Global ID_Bore_Cycle_Line_5 As String   ' Finishing Cycle
Global ID_Bore_Cycle_Line_6 As String   ' Number First Line
Global ID_Bore_Cycle_Line_7 As String   ' Number Last Line
```

```
Global OD_Turn_Cycle_Line_1 As String   ' Start O.D. Turning Cycle...
Global OD_Turn_Cycle_Line_2 As String
Global OD_Turn_Cycle_Line_3 As String   ' End O.D. Turning Cycle
Global OD_Turn_Cycle_Line_4 As String
Global OD_Turn_Cycle_Line_5 As String   ' Finishing Cycle
Global OD_Turn_Cycle_Line_6 As String   ' Number First Line
Global OD_Turn_Cycle_Line_7 As String   ' Number Last Line Global Dwell_Value_Letter_Code As String ' ... !

Global Thread_Height_Rad_Or_Dia As String

Global Groove_Height_Rad_Or_Dia As String

Global ID_Canned_Cycle_Number_First_And_Last_Lines As String

Global OD_Canned_Cycle_Number_First_And_Last_Lines As String

Global OD_Line_Depth_and_Feed

Global ID_Line_Depth_and_Feed

' Ya, I know this isint part of the posting, but I needed
' a good place to store a few global variables !!!

Global ft_first_brk_rad
Global ft_first_brk_cham
Global ft_second_brk_rad
Global ft_second_brk_cham
Global br_first_brk_rad
Global br_first_brk_cham
Global br_second_brk_rad
Global br_second_brk_cham

[Last Post Used]
lastpost=C:\V_BASIC\QCAM\QCAMPOST\OKUMA.PST

[Recent Files]
RecentFile1=C:\V_BASIC\QCAM\NEW_4.1\CHK_FILE.TXT
Form=FRMINTRO.FRM
Module=MDINOTE; MDINOTE.BAS
Module=FILOPEN; FILOPEN.BAS
Module=POST_CAM; POST_CAM.BAS
Form=MDI.FRM
Form=NOTEPAD.FRM
Form=FIND.FRM
Form=FRMSTART.FRM
Form=FRMPARTS.FRM
Form=FRMDRILL.FRM
Form=FRMNEWTO.FRM
Form=FRMTAP.FRM
Form=FRMBORIN.FRM
Form=FRMTOOLH.FRM
Form=FRMFACEA.FRM
Form=FRMTHREA.FRM
Form=FRMCUTOF.FRM
Form=FRMGROOV.FRM
Form=IDCHAMFR.FRM
Form=FRMTREPA.FRM
Reference="\G{00025E01-0000-0000-C000-000000000046}#2.5#0#C:\WINDOWS\SYSTEM\DAO2516.DLL#Microsoft DAO 2.5
Object Library
Object={F9043C88-F6F2-101A-A3C9-08002B2F49FB}#1.0#0; COMDLG16.OCX
Object={BDC217C8-ED16-11CD-956C-0000C04E4C0A}#1.0#0; TABCTL16.OCX
ProjWinSize=72,427,213,400
ProjWinShow=2
IconForm="frmMDI"
HelpFile=""
Title="Qcam"
ExeName="QCAM.EXE"
Name="QCAM"
HelpContextID="0"
StartMode=0
VersionCompatible="0"
```

```
MajorVer=1
MinorVer=0
RevisionVer=0
AutoIncrementVer=0
ServerSupportFiles=0
VersionCompanyName="Jeff Rowlette"
[SetupWiz]
VBExe=C:\V_BASIC\VB.EXE
SetupProj=C:\V_BASIC\SETUPKIT\SETUP1\SETUP1.VBP
BootStrap=C:\V_BASIC\SETUPKIT\KITFILES\SETUP.EXE
CompressToDir=C:\V_BASIC\QCAM\NEW_4.1\SETUPWIZ\

[Flags]
AppTitle=Qcam
DefaultDir=$(ProgramFiles)\QCAM
MakeFilePath=C:\V_BASIC\QCAM\NEW_4.1\QCAM.VBP,0
Disk Drive=0
Disk Type=0:1.44 MB Disk
AppExeName=C:\V_BASIC\QCAM\NEW_4.1\QCAM.EXE
Deployment=0
RemoteProvider=0
DataAccess=-1
Btrieve=0
FilesChanged=0
CheckSum=243200

[Dependencies]
File1=C:\WINDOWS\SYSTEM\DAO2516.DLL,0,32763
File2=C:\WINDOWS\SYSTEM\COMDLG16.OCX,0,32764
File3=C:\WINDOWS\SYSTEM\TABCTL16.OCX,0,32764

[DB Drivers]
File1=Btrieve,Btrieve,1,2
File2=dBaseIII,dBase III,1,0
File3=dBaseIV,dBase IV,1,0
File4=FoxPro2.0,FoxPro 2.0,1,0
File5=FoxPro2.5,FoxPro 2.5,1,0
File6=FoxPro2.6,FoxPro 2.6,1,0
File7=Paradox3.X,Paradox 3.X,1,0
File8=Paradox4.X,Paradox 4.X,1,0
File9=Excel3.0,Excel 3.0,1,0
File10=Excel4.0,Excel 4.0,1,0
File11=Excel5.0,Excel 5.0,1,0
File12=Excel,Excel,1,0
File13=Text,Text,1,0
File14=WordMerge,Word Merge,1,0

[Files]
File1=C:\WINDOWS\SYSTEM\VB40016.DLL,0,$(WinSysPath),,|32767|,-1,0,0,0,,,0
File2=C:\WINDOWS\SYSTEM\OC25.DLL,0,$(WinSysPath),$(DLLSelfRegister),|32767|,-1,0,0,0,,,0
File3=C:\V_BASIC\SETUPKIT\KITFILES\SYS16\OLE2.DLL,0,$(WinSysPath),OLE2.REG,|32767|,-1,0,0,0,,,0
File4=C:\V_BASIC\SETUPKIT\KITFILES\SYS16\TYPELIB.DLL,0,$(WinSysPath),,|32767|2|,-1,0,0,0,,,0
File5=C:\V_BASIC\SETUPKIT\KITFILES\SYS16\OLE2DISP.DLL,0,$(WinSysPath),,|32767|2|,-1,0,0,0,,,0
File6=C:\V_BASIC\SETUPKIT\KITFILES\SYS16\OLE2PROX.DLL,0,$(WinSysPath),,|32767|2|,-1,0,0,0,,,0
File7=C:\V_BASIC\SETUPKIT\KITFILES\SYS16\OLE2CONV.DLL,0,$(WinSysPath),,|32767|2|,-1,0,0,0,,,0
File8=C:\V_BASIC\SETUPKIT\KITFILES\SYS16\STORAGE.DLL,0,$(WinSysPath),,|32767|2|,-1,0,0,0,,,0
File9=C:\V_BASIC\SETUPKIT\KITFILES\SYS16\COMPOBJ.DLL,0,$(WinSysPath),,|32767|2|,-1,0,0,0,,,0
File10=C:\V_BASIC\SETUPKIT\KITFILES\SYS16\OLE2.REG,0,$(WinSysPath),,|32767|2|,-1,0,0,0,,,0
File11=C:\V_BASIC\SETUPKIT\KITFILES\SYS16\OLE2NLS.DLL,0,$(WinSysPath),,|32767|2|,-1,0,0,0,,,0
File12=C:\V_BASIC\SETUPKIT\KITFILES\SYS16\STDOLE.TLB,0,$(WinSysPath),,|32767|2|,-1,0,0,0,,,0
File13=C:\V_BASIC\SETUPKIT\KITFILES\SYS16\SCP.DLL,0,$(WinSysPath),,|32767|2|,-1,0,0,0,,,0
File14=C:\WINDOWS\SYSTEM\VAEN21.OLB,0,$(WinSysPath),,|32767|15|,-1,0,0,0,,,0
File15=C:\WINDOWS\SYSTEM\CTL3DV2.DLL,0,$(WinSysPath),,|32767|,-1,0,0,0,,,0
File16=C:\WINDOWS\SYSTEM\DAO2516.DLL,0,$(WinSysPath),$(DLLSelfRegister),|32763|,-1,0,0,0,,,0
File17=C:\WINDOWS\SYSTEM\MSAJT200.DLL,0,$(WinSysPath),,|15|,-1,0,0,0,,,0
File18=C:\WINDOWS\SYSTEM\MSJETERR.DLL,0,$(WinSysPath),,|15|,-1,0,0,0,,,0
File19=C:\WINDOWS\SYSTEM\MSJETINT.DLL,0,$(WinSysPath),,|15|,-1,0,0,0,,,0
File20=C:\WINDOWS\SYSTEM\VBAJET.DLL,0,$(WinSysPath),,|15|,-1,0,0,0,,,0
File21=C:\WINDOWS\SYSTEM\VBDB16.DLL,0,$(WinSysPath),,|15|,-1,0,0,0,,,0
File22=C:\WINDOWS\SYSTEM\COMDLG16.OCX,0,$(WinSysPath),$(DLLSelfRegister),|32764|,-1,0,0,0,,,0
File23=C:\WINDOWS\SYSTEM\TABCTL16.OCX,0,$(WinSysPath),$(DLLSelfRegister),|32764|,-1,0,0,0,,,0
File24=C:\V_BASIC\QCAM\NEW_4.1\QCAM.EXE,0,$(AppPath),$(EXESelfRegister),|32766|,-1,0,0,0,,,0
File25=C:\V_BASIC\QCAM\NEW_4.1\QCAM.ICO,0,$(AppPath),,|32760|,-1,0,0,0,,,0
File26=C:\V_BASIC\QCAM\NEW_4.1\QCAM.BMP,0,$(AppPath),,|32760|,-1,0,0,0,,,0
```

```
File27=C:\V_BASIC\QCAM\QCAMPOST\FANUC10T.PST,0,$(AppPath),,|32760|,-1,0,0,0,,,0
File28=C:\V_BASIC\QCAM\QCAMPOST\FANUC6T.PST,0,$(AppPath),,|32760|,-1,0,0,0,,,0
File29=C:\V_BASIC\QCAM\QCAMPOST\OKUMA.PST,0,$(AppPath),,|32760|,-1,0,0,0,,,0
File30=C:\V_BASIC\QCAM\QCAMPOST\QPOST.BMP,0,$(AppPath),,|32760|,-1,0,0,0,,,0
File31=C:\V_BASIC\QCAM\QCAMPOST\QPOST.EXE,0,$(AppPath),$(EXESelfRegister),|32760|,-1,0,0,0,,,0
File32=C:\V_BASIC\QCAM\QCAMPOST\QPOST.ICO,0,$(AppPath),,|32760|,-1,0,0,0,,,0
File33=C:\WINDOWS\SYSTEM\THREED16.OCX,0,$(WinSysPath),$(DLLSelfRegister),|32760|,-1,0,0,0,,,0
File34=C:\WINDOWS\SYSTEM\THREED16.OCA,0,$(AppPath),,|32760|,-1,0,0,0,,,0
File35=C:\WINDOWS\SYSTEM\THREED.VBX,0,$(WinSysPath),,|32760|,-1,0,0,0,,,0
```

What is claimed is:

1. A method of non-graphical programming of a machine control to control the operations of a machine, the method comprising the steps of:
   (a) displaying one or more data entry fields on a display for a user to input data including the physical dimensions of a part to be machined, without selecting G codes;
   (b) receiving the input data;
   (c) storing the input data in a memory device; and
   (d) generating program code for said machine control utilizing the stored input data according to a predetermined programming convention, the program code including program instructions for the machine control to control operations of the machine in machining the part;
   wherein the user can program machining of the part without a graphical representation of the part.

2. The method of claim 1 further comprising the step of displaying the generated program code and allowing the user to edit the generated program code.

3. The method of claim 1 wherein:
   (a) the method further comprises the steps of: (i) displaying one or more machine control information for the user to select a desired machine control from among different machine controls; and (ii) receiving the user's selection; and
   (b) the step of generating program code includes generating program code for the machine control selected by the user, wherein the program code is generated according to a predetermined programming convention for the selected machine control.

4. The method of claim 3 wherein the step of generating program code includes:
   (a) accessing a data base including programming conventions for said different machine controls; and
   (b) obtaining the programming convention for the selected machine control.

5. The method of claim 1 further comprising the step of transmitting the program code to the machine control.

6. A method of non-graphical programming of a machine control to control the operations of a machine, the method comprising the steps of:
   (a) displaying one or more machine control information for a user to select a desired machine control from among different machine controls;
   (b) receiving the user's selection;
   (c) displaying one or more data entry fields on a computer display for a user to input data including the physical dimensions of a part to be machined, without selecting G codes;
   (d) receiving the input data;
   (e) storing the input data in a memory device;
   (f) generating program code for the selected machine control utilizing the stored input data according to a predetermined programming convention for the selected machine control, the program code including program instructions for the machine control to control operations of the machine in machining the part; and
   (g) displaying the generated program code and allowing the user to edit the generated program code;
   wherein the user can program machining of the part without a graphical representation of the part.

7. The method of claim 6 wherein the step of generating program code includes:
   (a) accessing a data base including programming conventions for said different machine controls; and
   (b) obtaining the programming convention for the selected machine control.

8. The method of claim 7 further comprising the step of transmitting the program code to the machine control.

9. A system for non-graphical programming of a machine control to control the operations of a machine, the system comprising:
   (a) an input device for entry of data;
   (b) means for displaying one or more data entry fields on a display for a user to input data including the physical dimensions of a part to be machined, without selecting G codes;
   (c) a storage device for storing the input data; and
   (d) a program code generator for generating program code for said machine control utilizing the stored input data according to a predetermined programming convention, the program code including program instructions for the machine control to control operations of the machine in machining the part;
   wherein the user can program machining of the part without a graphical representation of the part.

10. The system of claim 9 further comprising means for displaying the generated program code and allowing the user to edit the generated program code.

11. The system of claim 9 wherein:
    (a) the system further comprises a selector for displaying one or more machine control information and allowing the user to select a desired machine control from among different machine controls; and
    (b) the program generator includes means for generating program code for a selected machine control, wherein the program code is generated according to a predetermined programming convention for the selected machine control.

12. The system of claim 11 further comprising:
    (a) a data base including programming conventions for said different machine controls; and
    (b) a data base access means for obtaining the programming convention for the selected machine control.

13. The system of claim 9 further comprising means for transmitting the program code to the machine control.

14. A system for non-graphical programming of a machine control to control the operations of a machine, the system comprising:
    (a) an input device for entry of data;
    (b) a selector for displaying one or more machine control information and allowing a user to select a desired machine control from among different machine controls;
    (c) means for displaying one or more data entry fields on a display for a user to input data including the physical dimensions of a part to be machined;
    (d) a storage device for storing the input data;
    (e) a program code generator for generating program code for the selected machine control utilizing the stored input data according to a predetermined programming convention for the selected machine control, the program code including program instructions for the machine control to control operations of the machine in machining the part; and
    (f) means for displaying the generated program code and allowing the user to edit the generated program code;

whereby the user can program machining of the part without a graphical representation of the part.

15. The system of claim 14 further comprising:
   (a) a data base including programming conventions for said different machine controls; and
   (b) a data base access means for obtaining the programming convention for the selected machine control.

16. The system of claim 15 further comprising means for transmitting the program code to the machine control.

17. A software system for configuring a computer system comprising a processor, an input device, a display and a memory device, for non-graphical programming of a machine control to control the operations of a machine, the software system comprising program instructions embedded in a computer-readable medium for:
   (a) displaying one or more data entry fields on the display for a user to input data including the physical dimensions of a part to be machined without selecting G codes;
   (b) receiving the input data via the input device;
   (c) storing the input data in the memory device; and
   (d) generating program code for said machine control utilizing the stored input data according to a predetermined programming convention, the program code including program instructions for the machine control to control operations of the machine in machining the part;
   wherein the user can program machining of the part without a graphical representation of the part.

18. The software system of claim 17 further comprising program instructions for displaying the generated program code on the display and allowing the user to edit the generated program code via the input device.

19. The software system of claim 17 wherein:
   (a) the software system further comprises: (i) program instructions for displaying one or more machine control information on the display and allowing the user to select a desired machine control via the input device from among different machine controls; and (ii) program instructions for receiving the user's selection; and
   (b) the program instructions for generating program code include program instructions for generating program code for the machine control selected by the user, wherein the program code is generated according to a predetermined programming convention for the selected machine control.

20. The software system of claim 19 wherein the program instructions for generating program code include program instructions for:

(a) accessing a data base including programming conventions for said different machine controls; and
   (b) obtaining the programming convention for the selected machine control.

21. The software system of claim 17 further comprising program instructions for transmitting the program code from the computer system to the machine control.

22. A software system for configuring a computer system comprising a processor, a input device, a display and a memory device, for non-graphical programming of a machine control to control the operations of a machine, the software system comprising program instructions embedded in a computer-readable medium for:
   (a) displaying one or more machine control information on the display and allowing a user to select a desired machine control from among different machine controls via the input device;
   (b) receiving the user's selection;
   (c) displaying one or more data entry fields on the display for a user to input data including the physical dimensions of a part to be machined;
   (d) receiving the input data via the input device;
   (e) storing the input data in the memory device;
   (f) generating program code for the selected machine control utilizing the stored input data according to a predetermined programming convention for the selected machine control, the program code including program instructions for the machine control to control operations of the machine in machining the part; and
   (g) displaying the generated program code on the display and allowing the user to edit the generated program code via the input device;
   wherein the user can program machining of the part without a graphical representation of the part.

23. The software system of claim 22 wherein the program instructions for generating program code include program instructions for:
   (a) accessing a data base including programming conventions for said different machine controls; and
   (b) obtaining the programming convention for the selected machine control.

24. The software system of claim 23 further comprising program instructions for transmitting the program code from the computer system to the machine control.

* * * * *